(12) United States Patent
Hwang et al.

(10) Patent No.: US 11,537,214 B2
(45) Date of Patent: Dec. 27, 2022

(54) VEHICLE DISPLAY SYSTEM FOR VEHICLE

(71) Applicant: LG Electronics Inc., Seoul (KR)

(72) Inventors: Inyoung Hwang, Seoul (KR); Kyoungha Lee, Seoul (KR); Kangmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 16/841,285

(22) Filed: Apr. 6, 2020

(65) Prior Publication Data

US 2020/0234347 A1 Jul. 23, 2020

Related U.S. Application Data

(63) Continuation-in-part of application No. PCT/KR2018/009563, filed on Aug. 21, 2018, and a
(Continued)

(51) Int. Cl.
*G06F 3/03* (2006.01)
*G06T 7/246* (2017.01)
(Continued)

(52) U.S. Cl.
CPC ......... *G06F 3/0304* (2013.01); *G06K 9/6201* (2013.01); *G06Q 30/0283* (2013.01);
(Continued)

(58) Field of Classification Search
CPC .............. B60K 35/00; B60K 2370/175; B60K 2370/176; G06F 3/017; G06F 3/0304;
(Continued)

(56) References Cited

U.S. PATENT DOCUMENTS 9,911,290 B1 * 3/2018 Zalewski ............... G06Q 20/12
10,457,179 B1 * 10/2019 Kentley-Klay ........ B60N 2/879
(Continued)

FOREIGN PATENT DOCUMENTS

CN   C108332829   7/2018
DE   102015013081  4/2016
(Continued)

OTHER PUBLICATIONS

European Office Action in European Appln. No. 19 191 149.4, dated Feb. 19, 2021, 9 pages.

*Primary Examiner* — Maria E Vazquez Colon
(74) *Attorney, Agent, or Firm* — Fish & Richardson P.C.

(57) ABSTRACT

An electronic device configured to charge an occupant in a vehicle. The electronic device includes: an interface unit configured to exchange signals with at least one internal camera configured to capture at least one image of an inside of a cabin of the vehicle; at least one processor; and at least one computer memory that is operably connectable to the at least one processor and that has stored thereon instructions which, when executed, cause the at least one processor to perform operations including: receiving, through the interface unit, image data that was generated based on processing the at least one image of the inside of the cabin captured by the at least one internal camera; and generating cost charging data based on a motion of a user detected from the received image data.

19 Claims, 100 Drawing Sheets

Related U.S. Application Data continuation of application No. PCT/KR2018/009210, filed on Aug. 10, 2018.

(51) Int. Cl.

| | | |
|---|---|---|
| *G06K 9/62* | (2022.01) | |
| *G06Q 30/02* | (2012.01) | |
| *H04N 5/247* | (2006.01) | |
| *G09F 21/04* | (2006.01) | |
| *G06V 10/22* | (2022.01) | |
| *G06V 10/60* | (2022.01) | |
| *G06V 20/56* | (2022.01) | |
| *G06V 20/59* | (2022.01) | |
| *G06V 40/20* | (2022.01) | |
| *G06Q 20/18* | (2012.01) | |

(52) U.S. Cl.
CPC .............. *G06T 7/246* (2017.01); *G06V 10/22* (2022.01); *G06V 10/60* (2022.01); *G06V 20/56* (2022.01); *G06V 20/59* (2022.01); *G06V 40/20* (2022.01); *G09F 21/04* (2013.01); *G09F 21/049* (2020.05); *H04N 5/247* (2013.01); *G06Q 20/18* (2013.01); *G06T 2207/30196* (2013.01); *G06T 2207/30252* (2013.01); *G06T 2207/30268* (2013.01)

(58) Field of Classification Search
CPC .. G06K 9/6201; G06Q 30/02; G06Q 30/0283; G06Q 30/06; G06Q 20/18; G06Q 30/0265; G06T 7/246; G06T 2207/30196; G06T 2207/30252; G06T 2207/30268; G06V 10/22; G06V 10/60; G06V 20/56; G06V 20/59; G06V 40/20; G09F 21/04; G09F 21/049; G09F 27/005; G09F 9/30; H04N 5/247

See application file for complete search history.

(56) References Cited

U.S. PATENT DOCUMENTS

| | | | | |
|---|---|---|---|---|
| 2010/0049624 | A1* | 2/2010 | Ito | G06Q 30/00 705/26.1 |
| 2015/0012396 | A1 | 1/2015 | Puerini et al. | |
| 2017/0345100 | A1* | 11/2017 | Bowie | G06Q 40/08 |
| 2017/0349098 | A1 | 12/2017 | Uhm | |
| 2018/0052494 | A1 | 2/2018 | Coburn | |
| 2018/0154774 | A1 | 6/2018 | Park et al. | |
| 2018/0374002 | A1* | 12/2018 | Li | G06Q 10/02 |
| 2019/0244161 | A1* | 8/2019 | Abhishek | G06Q 10/087 |

FOREIGN PATENT DOCUMENTS

| | | |
|---|---|---|
| EP | 2889723 | 12/2014 |
| EP | 3696651 | 12/2014 |
| KR | 20130046137 A * | 5/2013 |

\* cited by examiner

FIG. 1
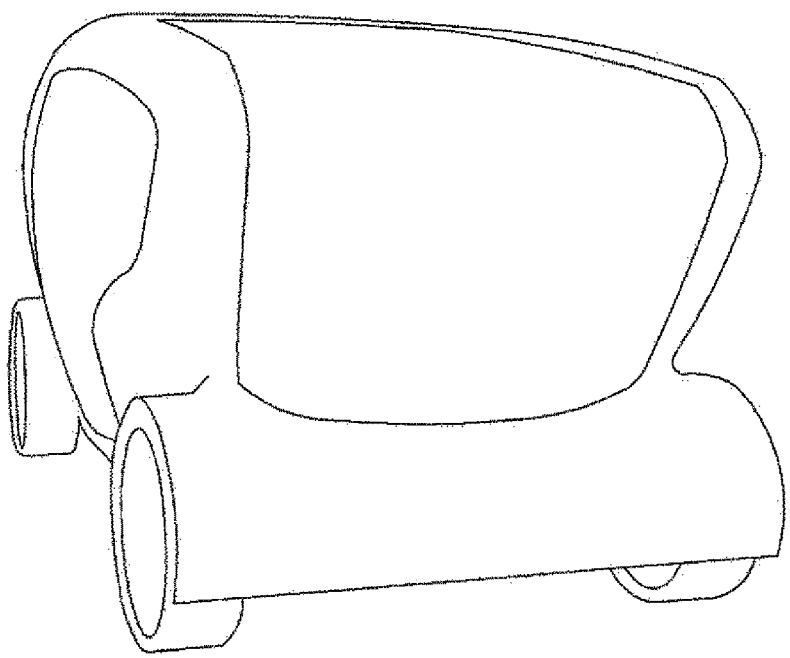
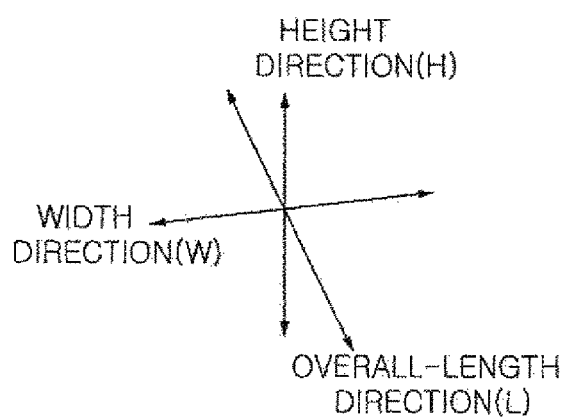

FIG. 12
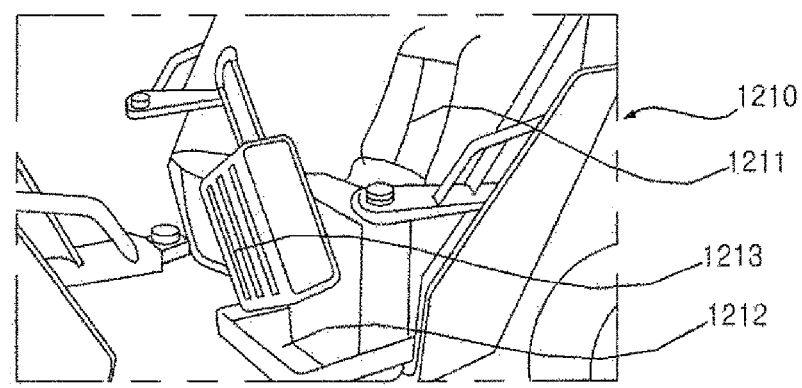
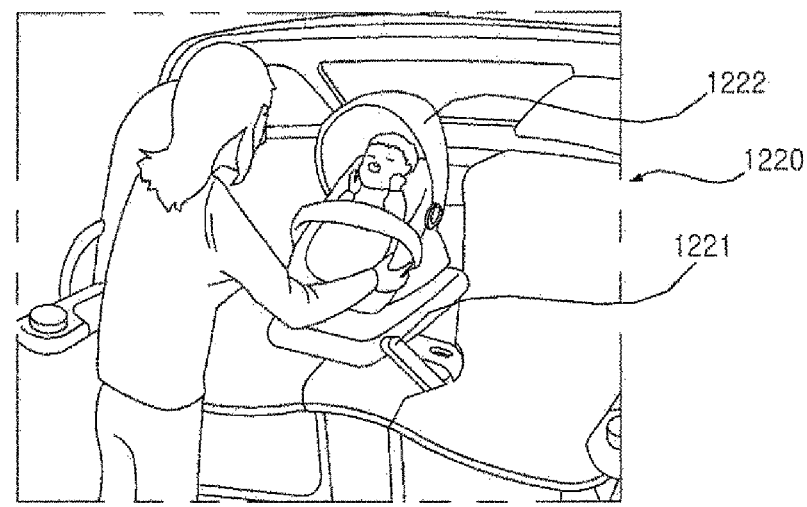
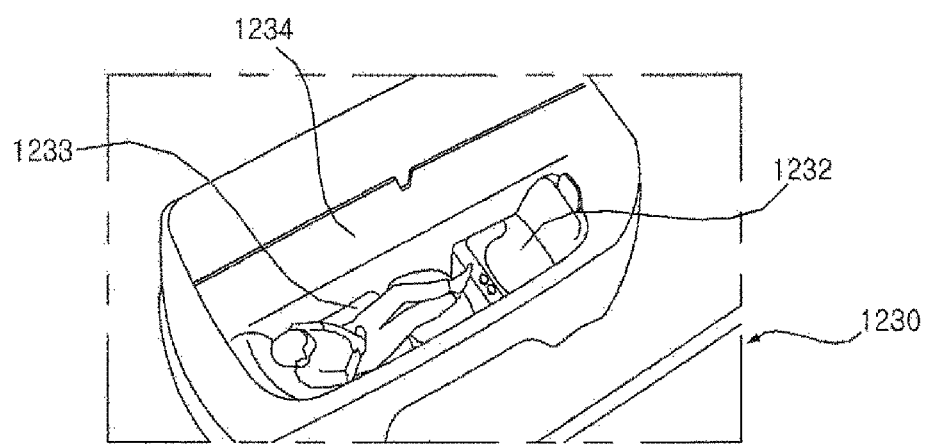

FIG. 17
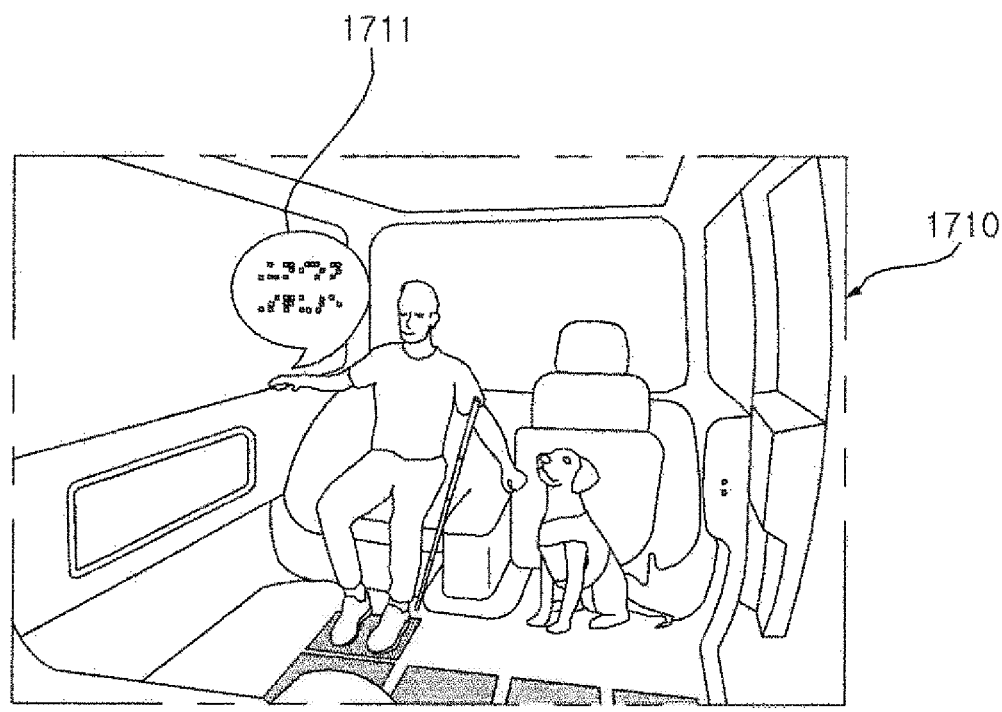
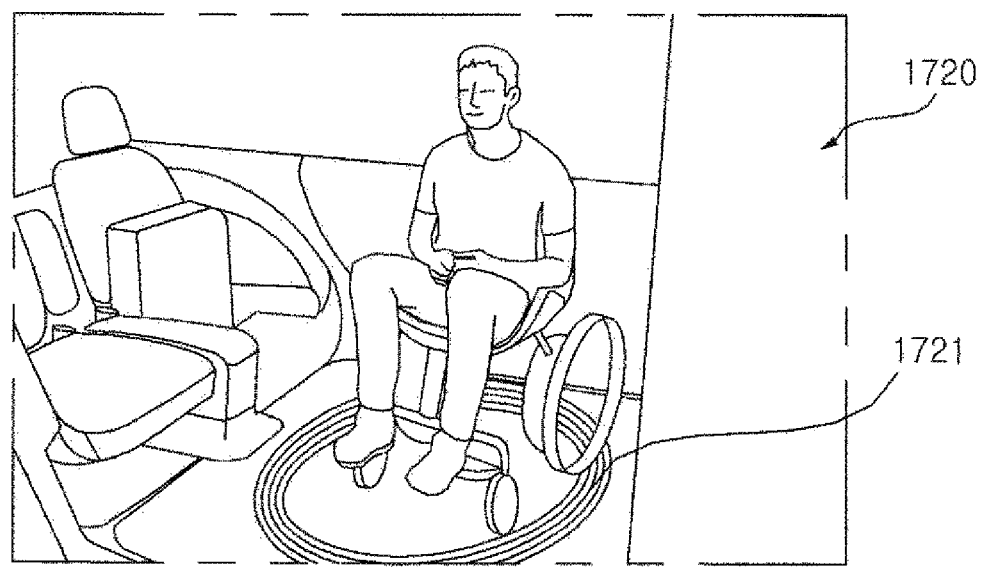

FIG. 26
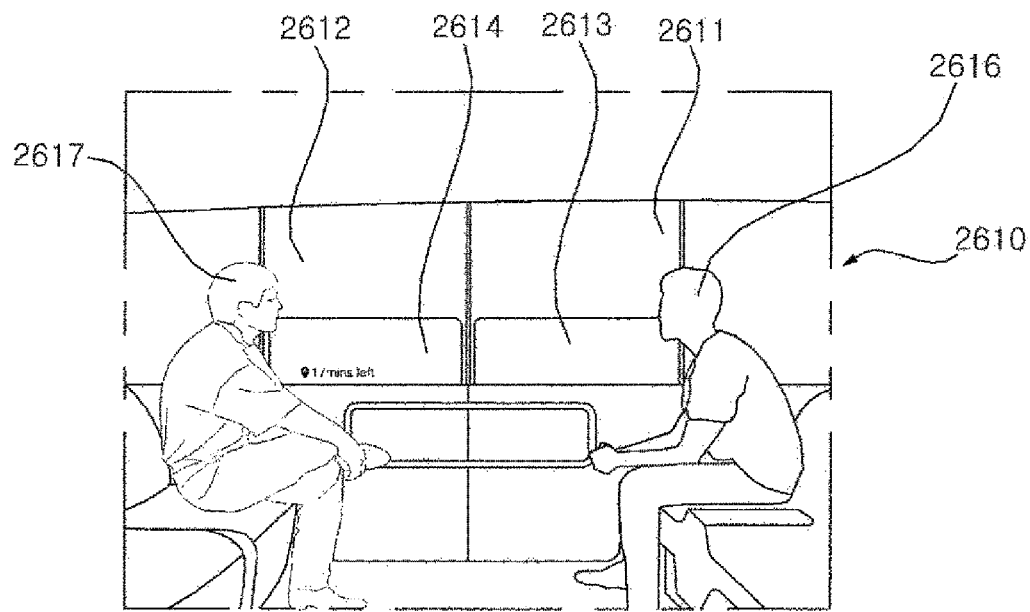
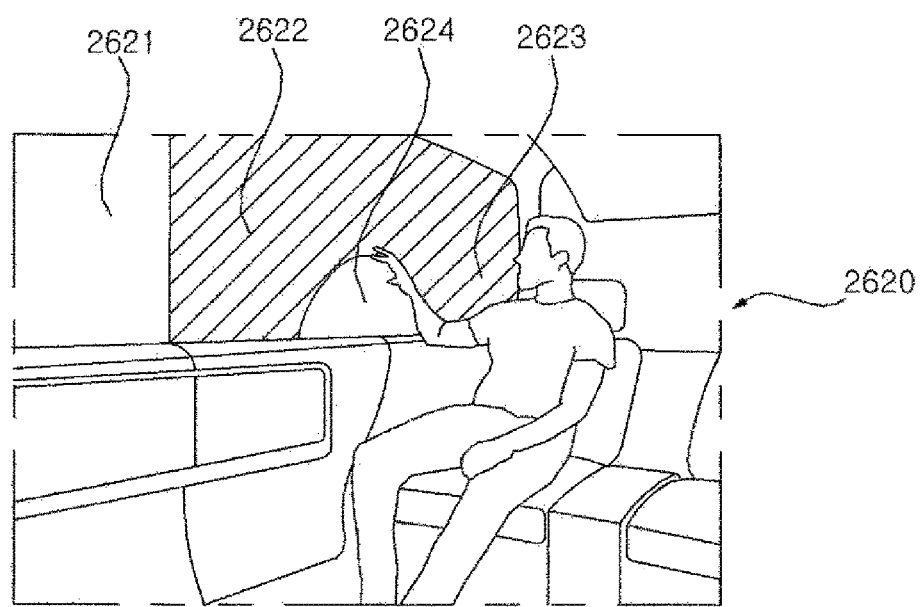

FIG. 29
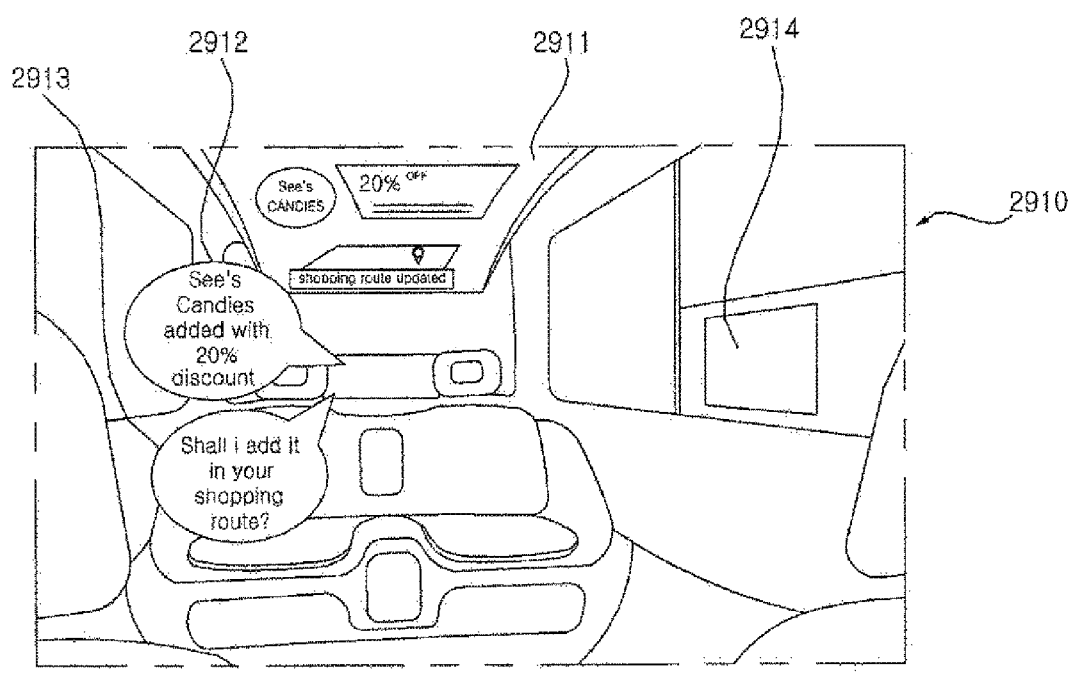
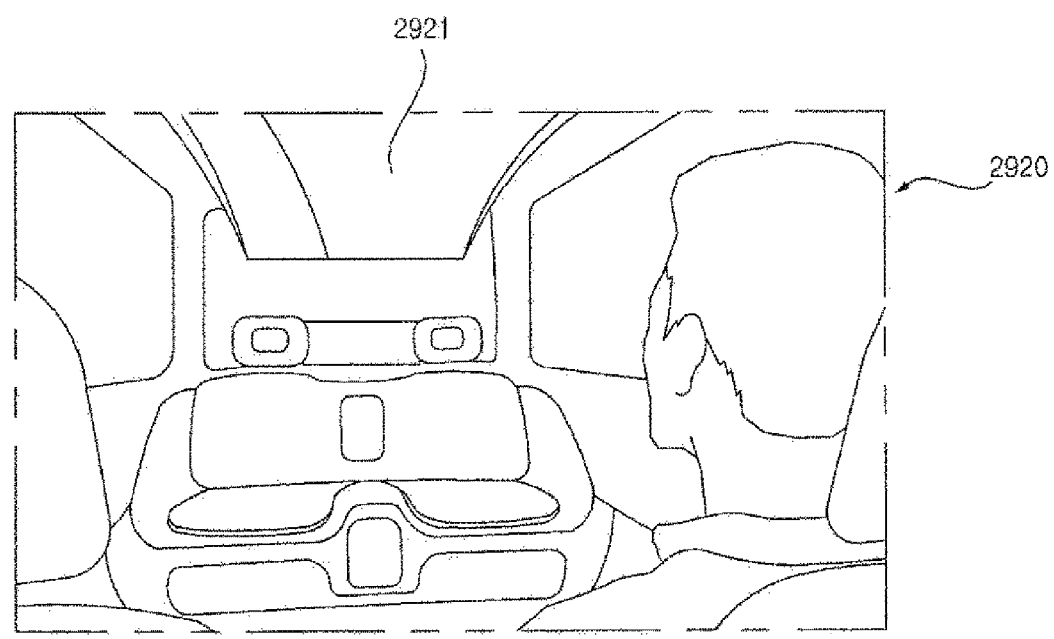

FIG. 31
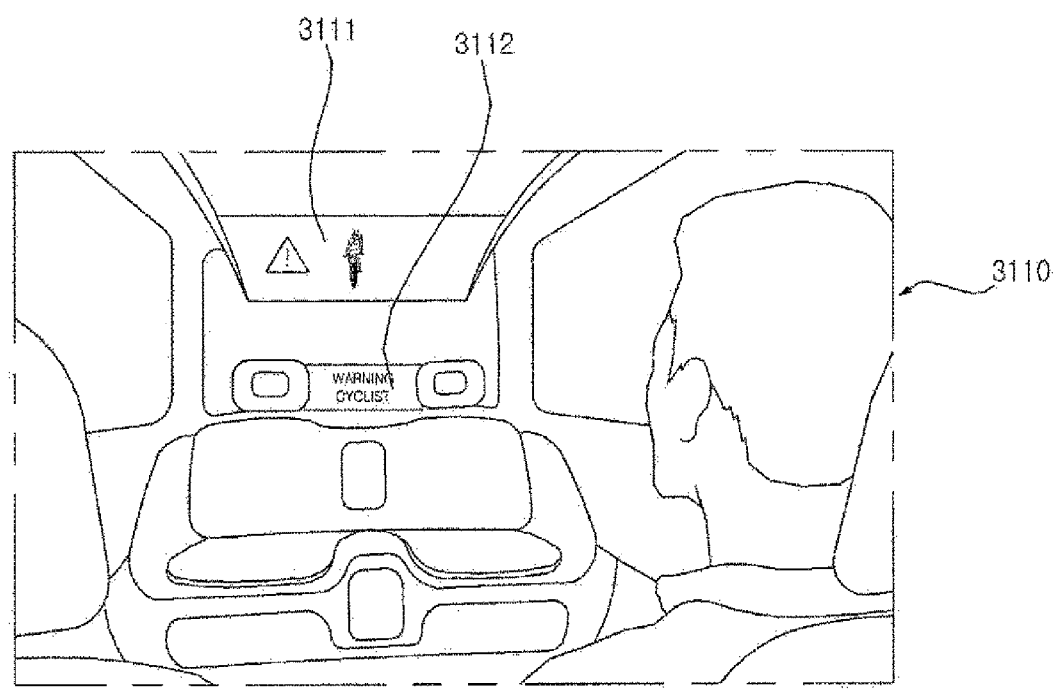
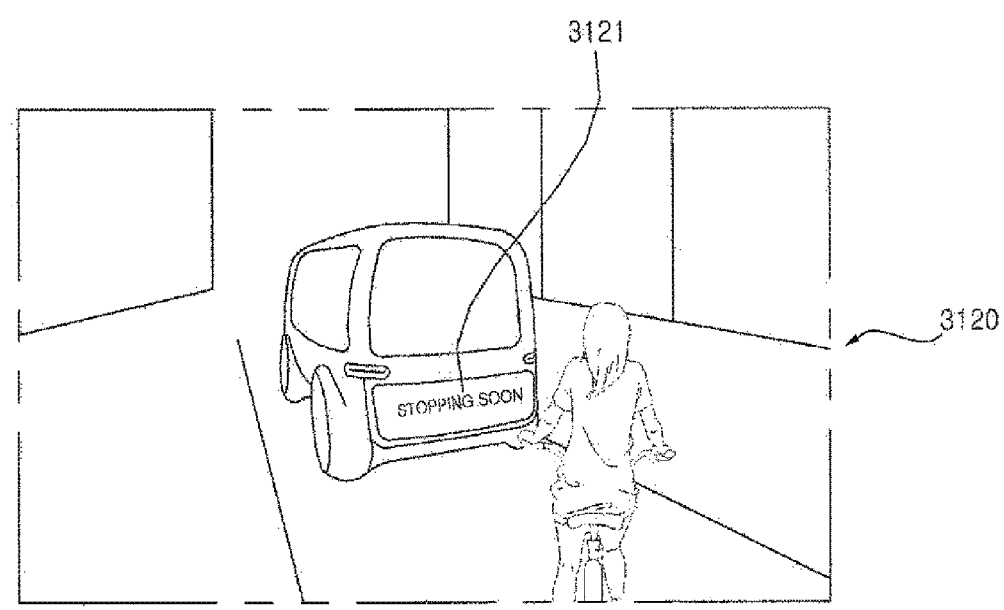

3610

FIG. 56
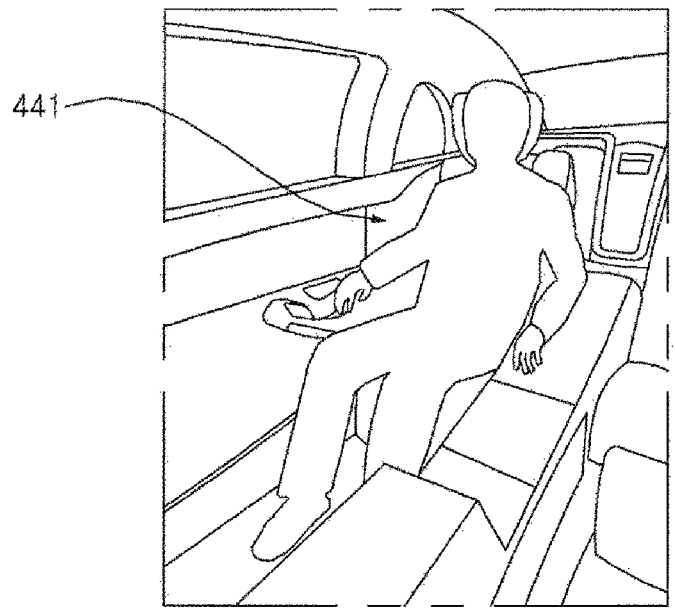
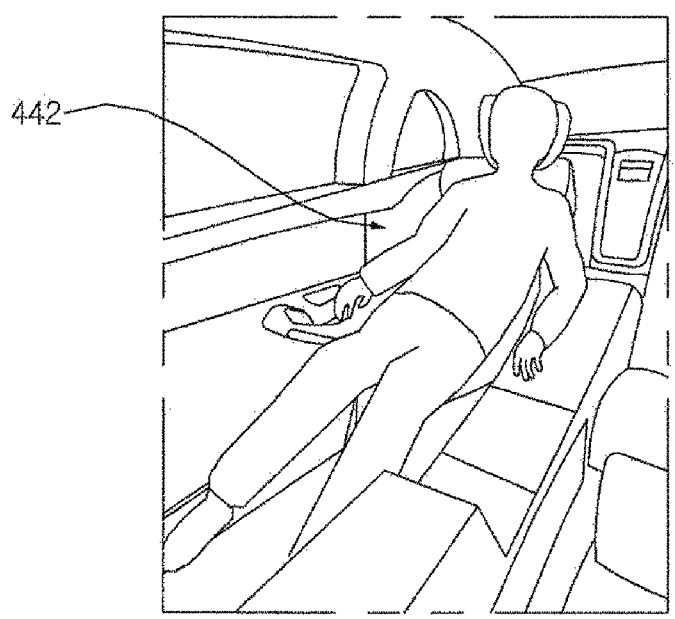

FIG. 59
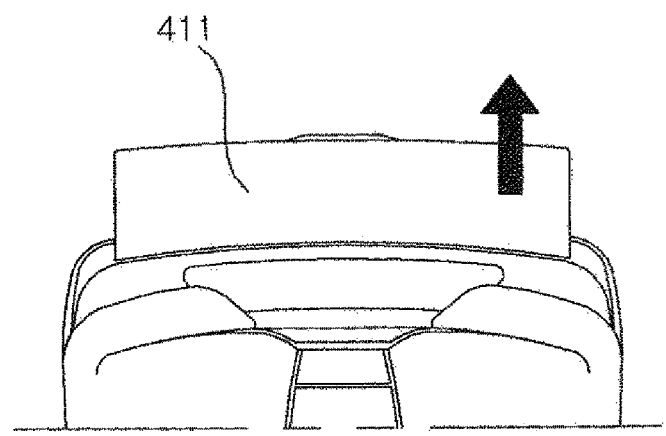
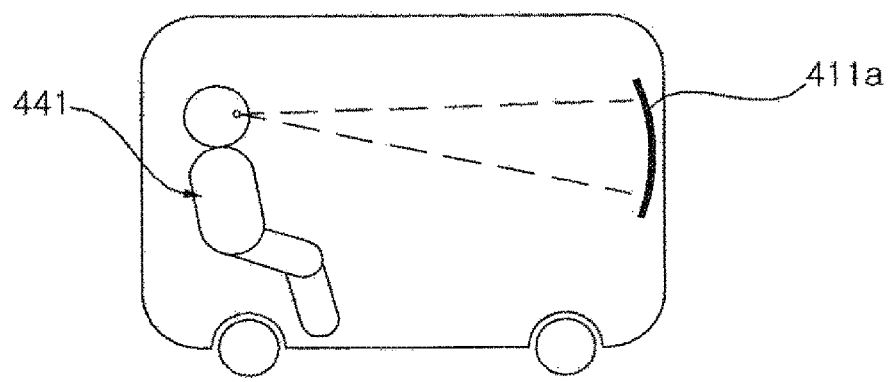
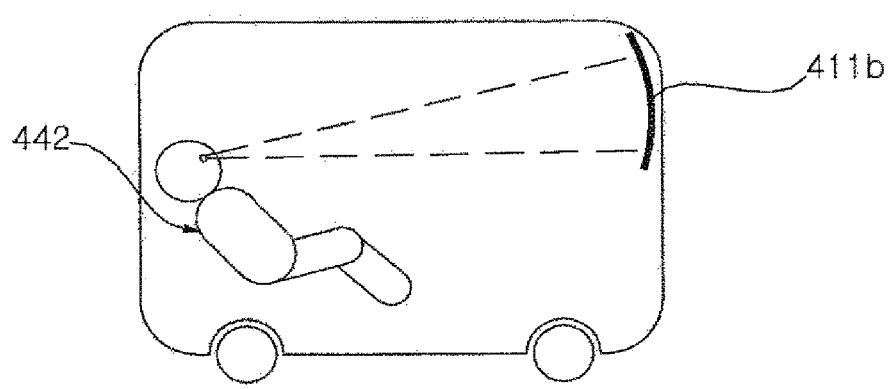

FIG. 61
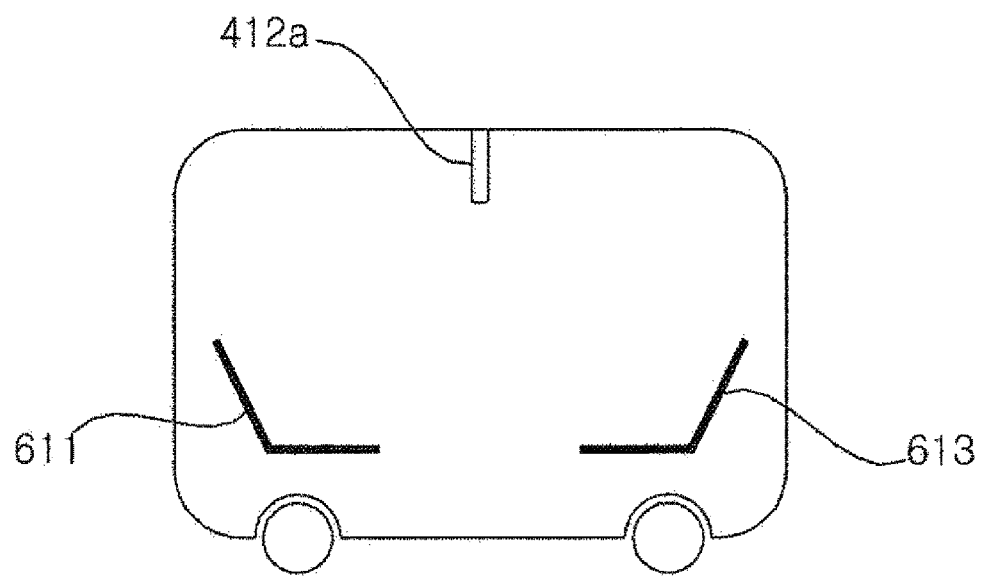
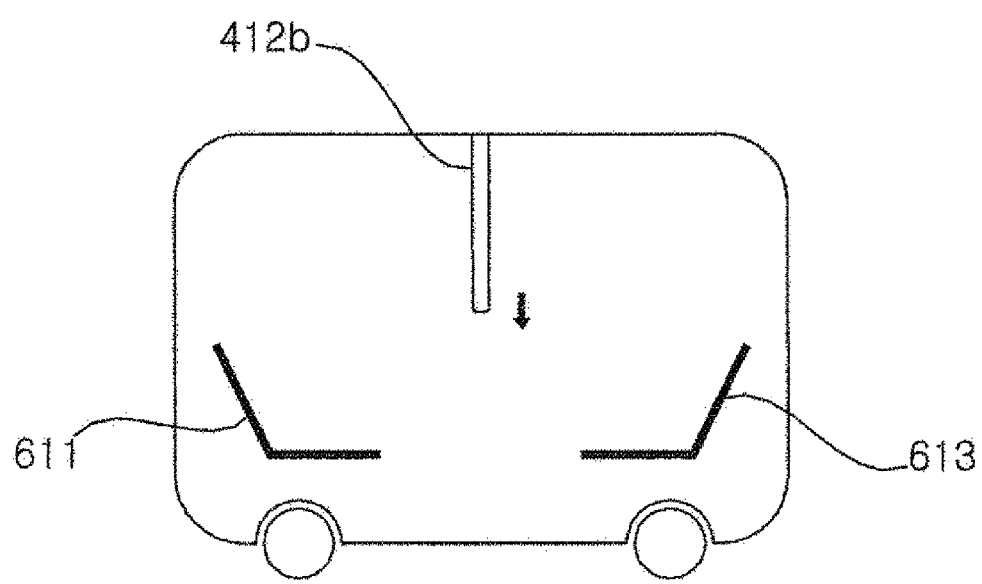

FIG. 62
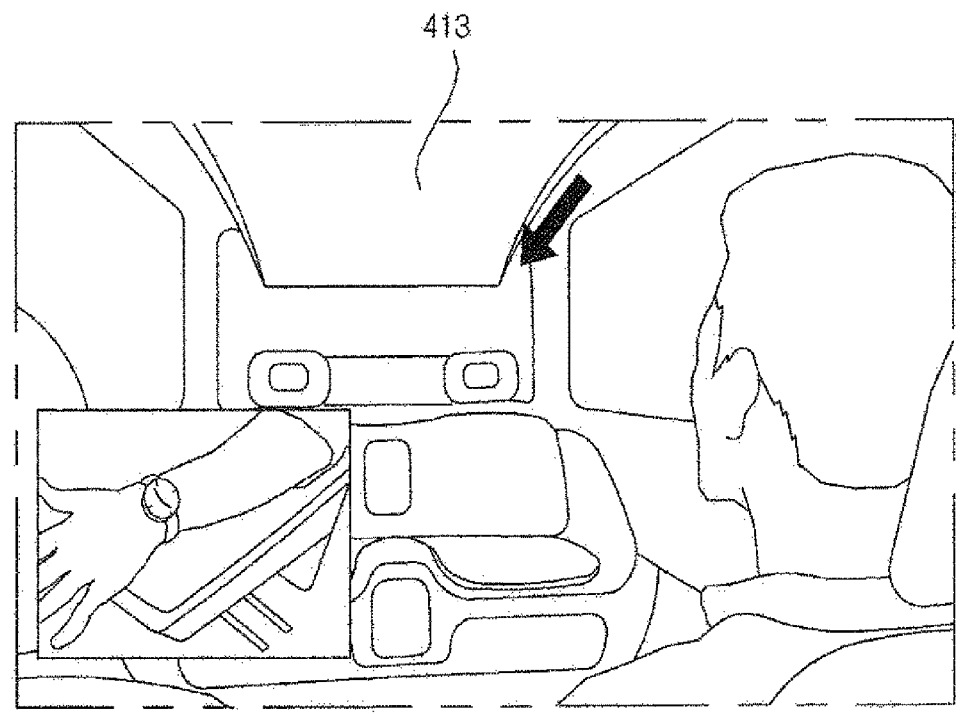
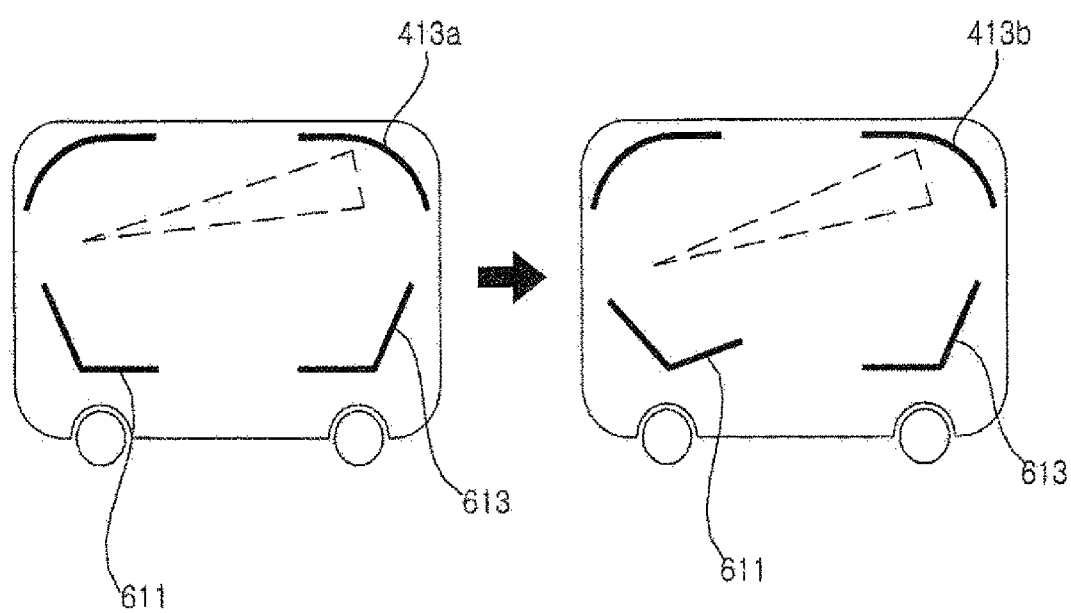

FIG. 65
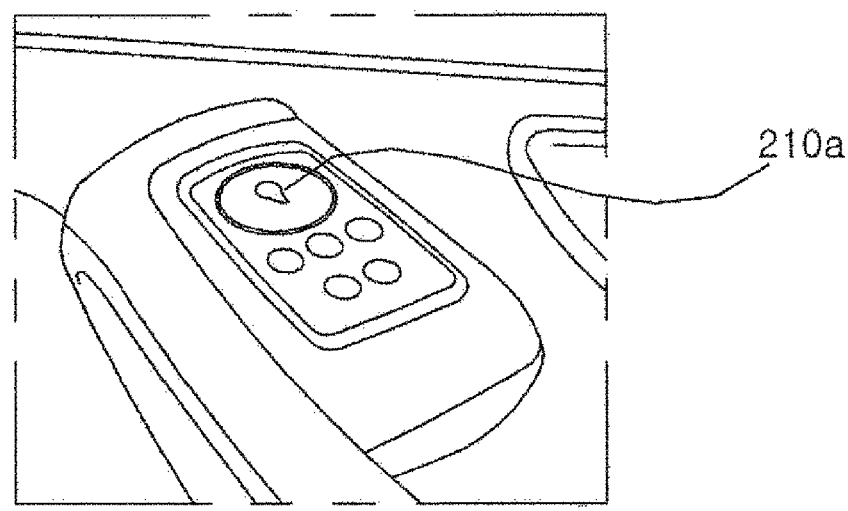
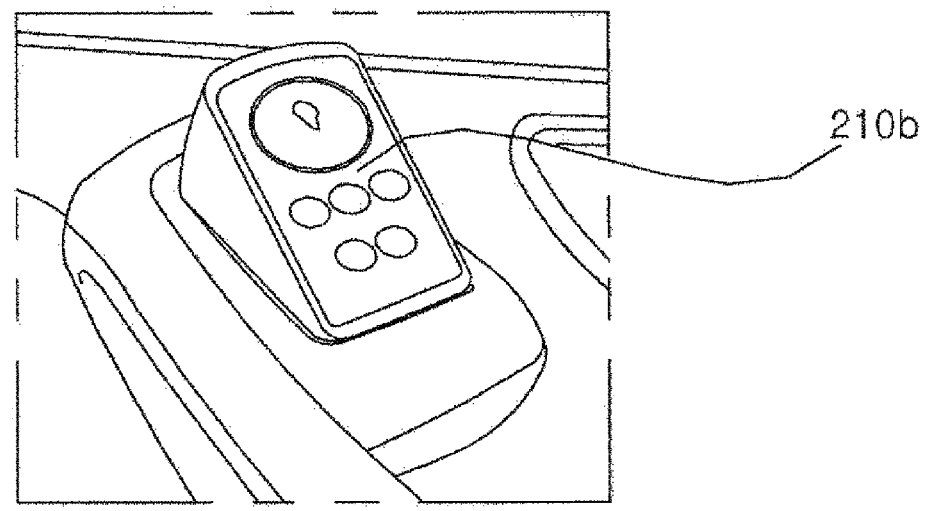

FIG. 71B
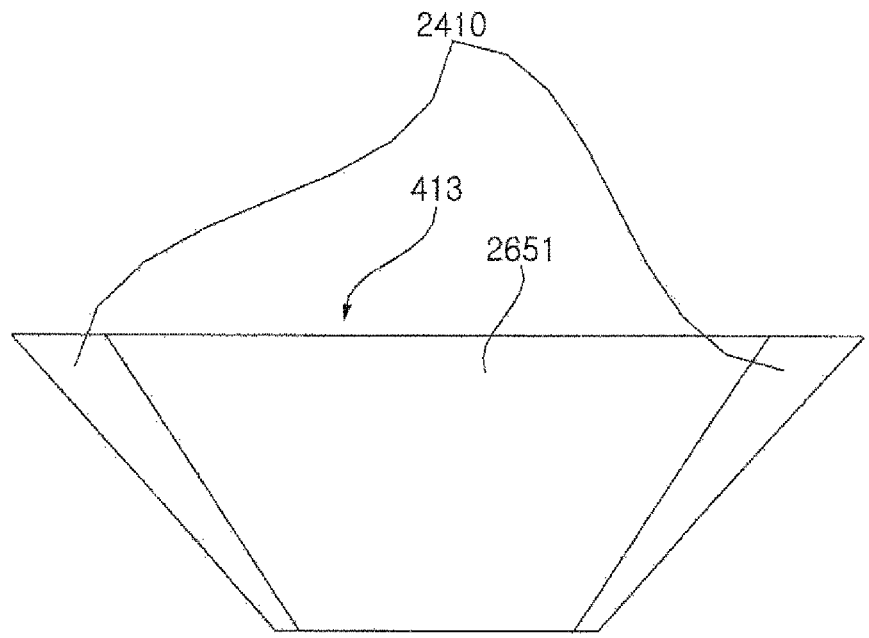
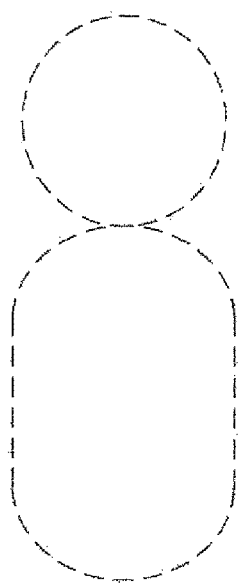

FIG. 72
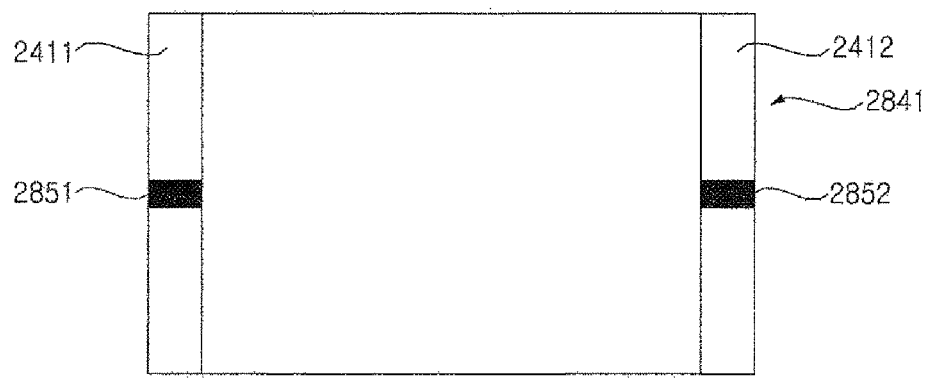
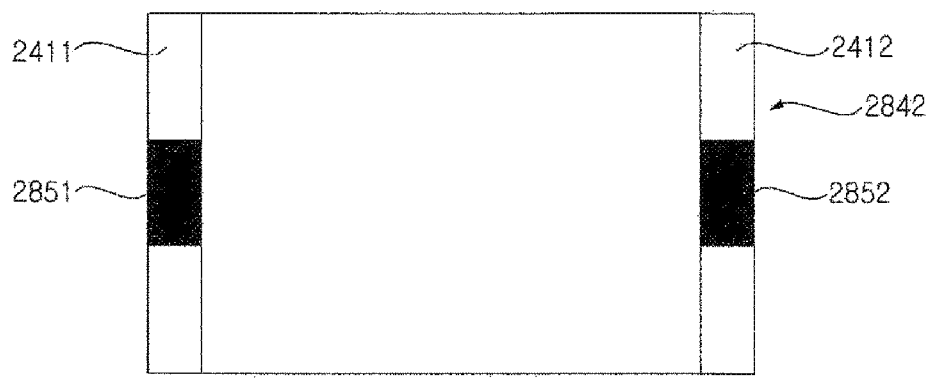
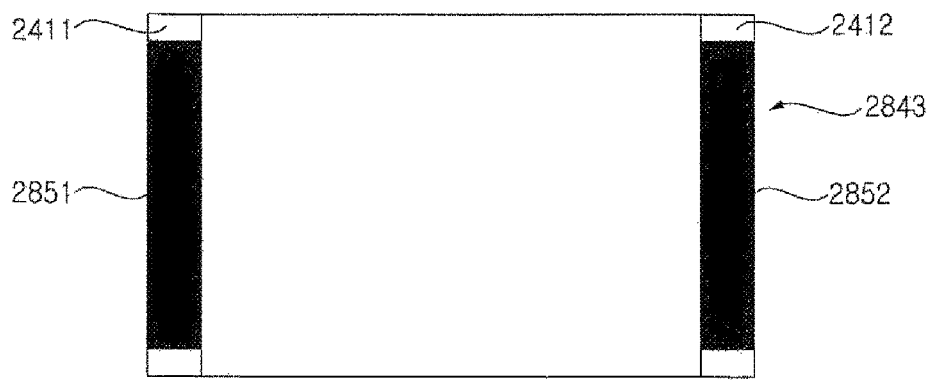

FIG. 73
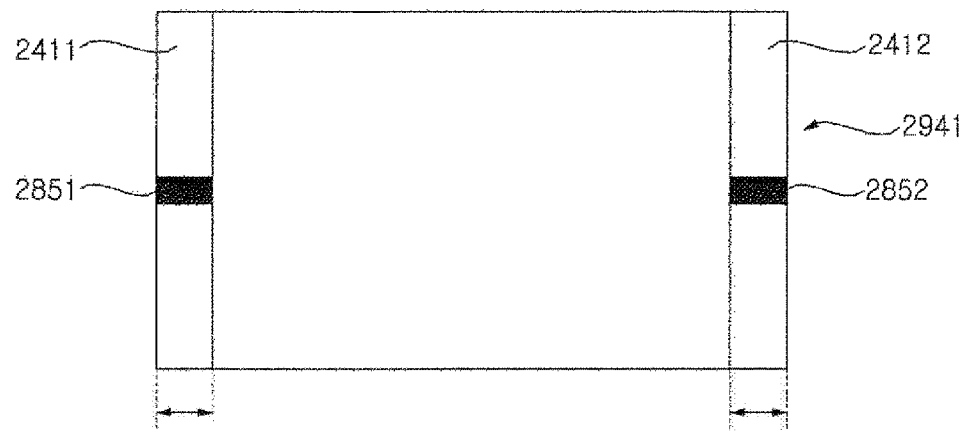
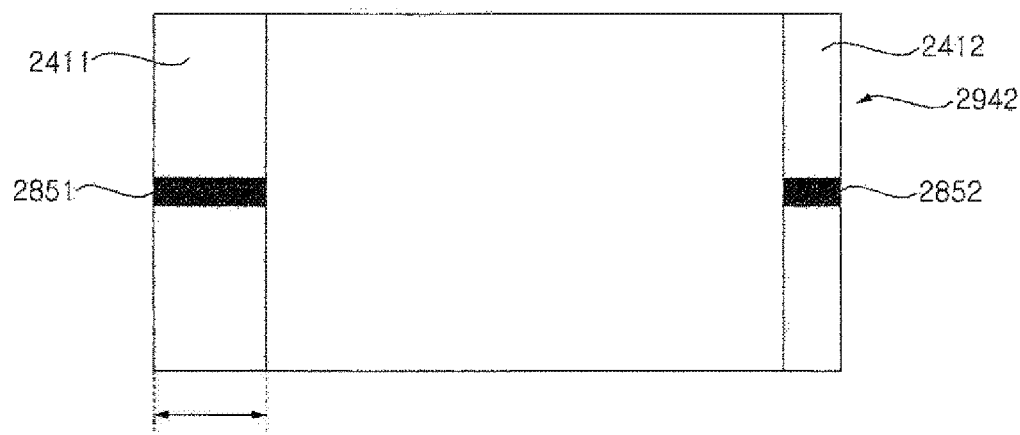
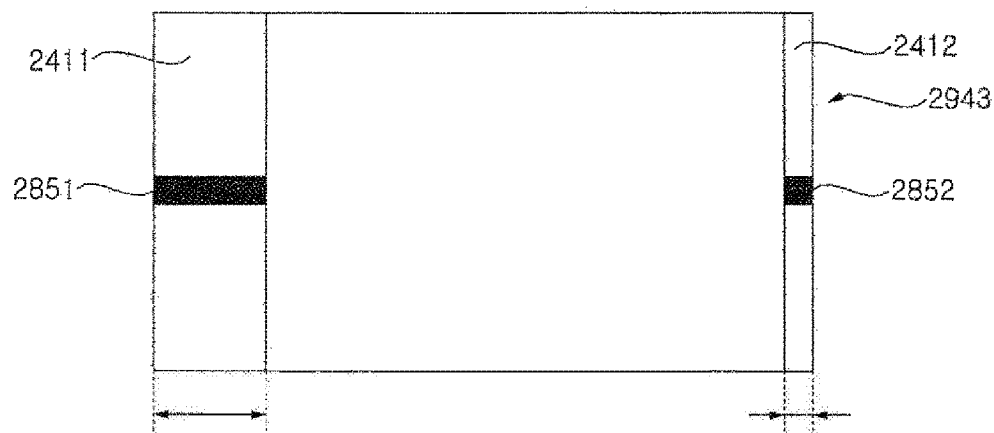

FIG. 74
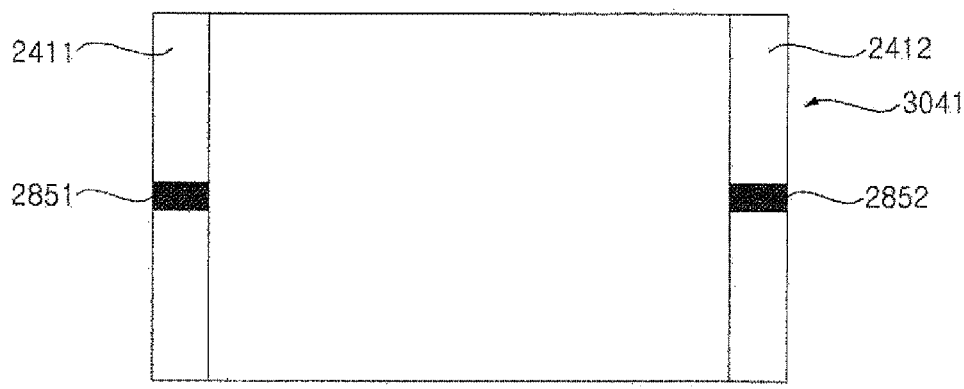
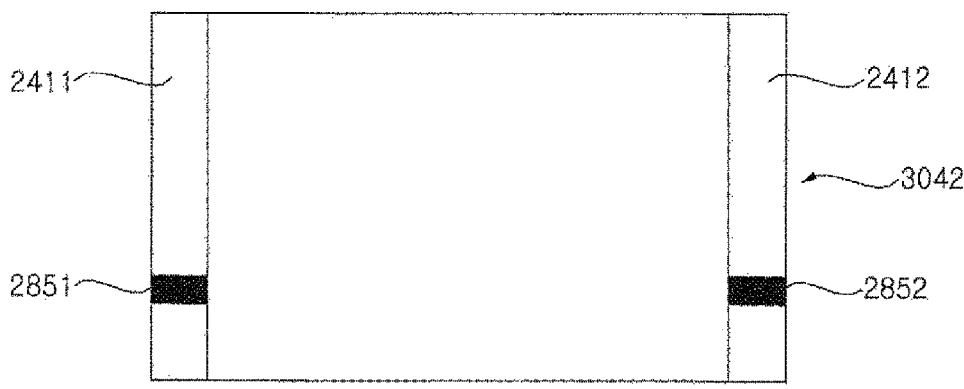
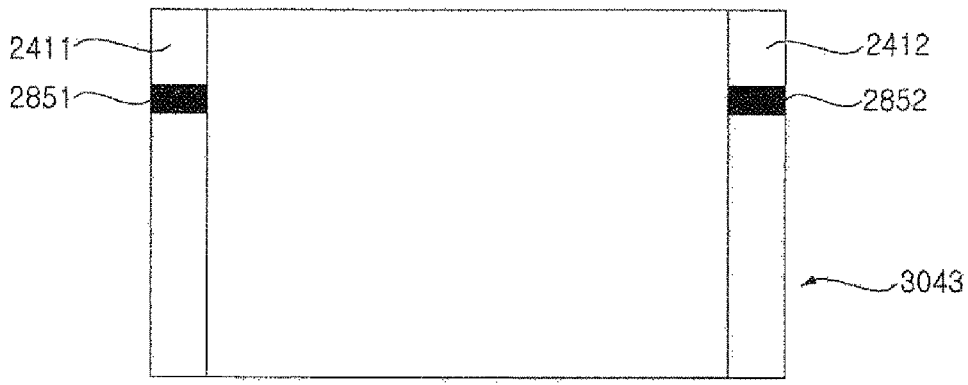

FIG. 75
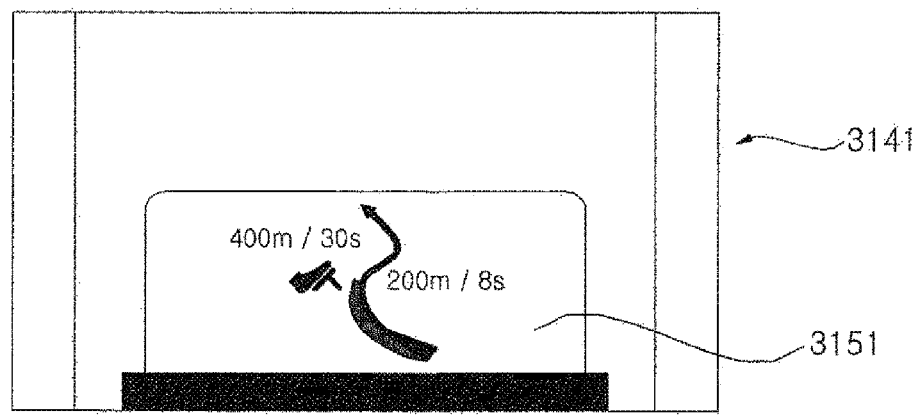
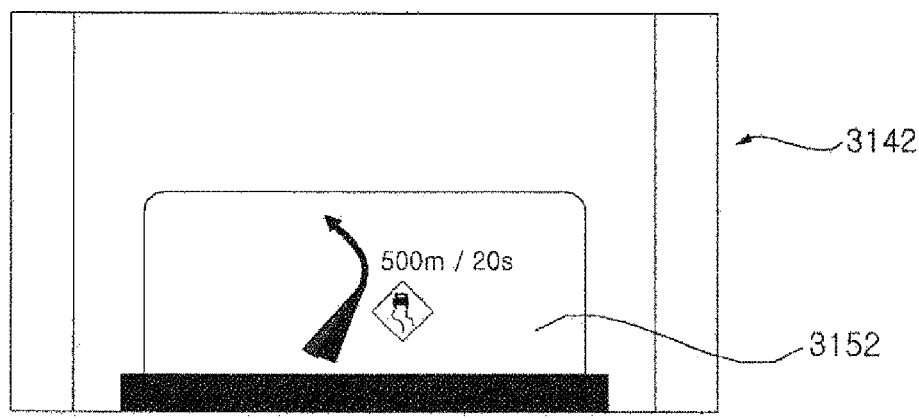

| Available service | A→B: Before use of service | | B→A': After use of service |
|---|---|---|---|
| | User data | Prior information of service | Post information of service |
| Hospital | •Basic patient medical information (for reception)<br>•Including current dosage information, Questionnaire<br>•In-vehicle health care sensing information: temperature/pulse /blood pressure, etc. | •Hospital reception status and waiting list<br>•Information about medical staff in charge | •Dosage information<br>•Confirmation of reception of medical supplies (linked to pharmacy)<br>•Provision of further information related to disease in question: nutrition guidance/care guidance<br>•Reservation of next visit to hospital |
| Department store/Grocery store | •Provision of basic body information (height/weight/size)<br>•SNS information<br>•Wish list products<br>•Membership particulars | •Provision of new product/seasonal fruit information<br>•Provision of popular product information<br>•Provision of sales information<br>•Advertising | •Information related to purchased product: recipe /coordinator recommendation<br>•Delivery service information |
| Airport | •Booked air ticket<br>•Passport number<br>•User biometric authentication<br>•Baggage information: weight and size | •Terminal/airline location /guidance<br>•Delayed arrival guidance<br>•Airport use guidance<br>•Provision of pre-check in | •Use satisfaction survey<br>•Provision of jet lag settlement environment (lighting/music, etc.) |
| Hotel | •Membership particulars<br>•Passport information (Nationality/Passport number/Name, etc.)<br>•User biometric authentication<br>•Fatigue/feeling<br>•Baggage information: weight and size<br>•Preference environment<br>•Fellow user information | •Provision of pre-check in<br>•Provision of available room<br>•Concierge connection service if necessary<br>•Guidance of linked service, such as tour<br>•Guidance of service by user group type (ex. Family/business /single, etc.) | •Use satisfaction survey<br>•Membership update content |
| Drive-thru café /restaurant | •Selected menu information<br>•Movement route information<br>•When route is changed, information is transmitted to same chain on changed route<br>•Payment information | •Menu information<br>•Preparation status<br>•Entry congestion information<br>•Expected waiting time | •Use satisfaction survey (Satisfaction is checkable based on expression of user when eating |

FIG. 90B

| Available service | A→B: Before use of service | | B→A': After use of service |
|---|---|---|---|
| | User data | Prior information of service | Post information of service. |
| Company | •Entrance authority proof (linked to ID card, etc.)<br>•Biometric authentication information | •Today's schedule<br>•Company-related news<br>•Company mail system access | •Next day schedule briefing |
| School | •Identification (student number/name) | •Prerequisite learning information<br>•Class timetable<br>•School supplies<br>•Home record<br>•Official announcement<br>•Extracurricular activity information | •Linked to home record<br>•Official announcement<br>•Study summary<br>•Extracurricular activity information<br>•Supplementary lesson information |
| Sports | •Body information: height/weight/biorhythm<br>•Wish list sport information<br>•SNS | •Guidance of provided sport service<br>•Instructor information<br>•Information about sports recommended by type | •Provision of information related to eating habits<br>•Supplementary sport information |
| Movie theater | •Booked movie information<br>•Wish list movie information<br>•Movie viewing particulars<br>•Fellow viewer information | •In-theater snack sales menu<br>•Guidance of theater location<br>•Movie-related advertising<br>•Recommended movie list (based on previous movie viewing data/by situation) | •Trailer of movie that will be released<br>•Preference booking of movie<br>•Movie grade |
| Service center | •Basic customer information<br>•Input of information about service-requested product<br>•Description of symptom | •Video communication with service engineer<br>•Simple measures by symptom | •Use satisfaction survey<br>•Reservation of revisit schedule |

US 11,537,214 B2

VEHICLE DISPLAY SYSTEM FOR VEHICLE

CROSS-REFERENCE TO RELATED APPLICATIONS

This application is a continuation of International Application No. PCT/KR2018/009210, filed on Aug. 10, 2018, and a continuation in part of International Application No. PCT/KR2018/009563, filed on Aug. 21, 2018, the disclosures of which are incorporated herein by reference in their entirety.

TECHNICAL FIELD

The present disclosure relates to a vehicle display system.

BACKGROUND

An autonomous vehicle is a vehicle designed to perform one or more driving operations on its own without a driver's manual operation. A shared autonomous vehicle is an autonomous vehicle that is designed to be shared by multiple users.

SUMMARY

In general, the subject matter described in this disclosure can be embodied in methods, apparatuses, and systems for generating cost charging data for a user.

One general aspect includes an electronic device configured to charge an occupant in a vehicle, the electronic device including: an interface unit configured to exchange signals with at least one internal camera configured to capture at least one image of an inside of a cabin of the vehicle. The electronic device also includes at least one processor; and at least one computer memory that is operably connectable to the at least one processor and that has stored thereon instructions which, when executed, cause the at least one processor to perform operations including: receiving, through the interface unit, image data that was generated based on processing the at least one image of the inside of the cabin captured by the at least one internal camera. The operations also include generating cost charging data based on a motion of a user detected from the received image data. Other embodiments of this aspect include corresponding computer systems, apparatus, and computer programs recorded on one or more computer storage devices, each configured to perform the actions of the methods.

Implementations may include one or more of the following features. The electronic device where the operations further include: specifying the user to be charged, based on the image data. The electronic device where the at least one image includes (i) at least one first image that was captured by the at least one internal camera before the user is onboard the vehicle, and (ii) at least one second image that was captured by the at least one internal camera after the user is onboard the vehicle. The electronic device where receiving the image data includes receiving, through the interface unit, (i) first image data that was generated based on processing the at least one first image, and (ii) second image data that was generated based on processing the at least one second image, and where the operations further include: processing, by the at least one processor, the first image data and the second image data to compare the first image data with the second image data. The electronic device where the operations further include: determining whether the motion of the user detected from the image data corresponds to at least one of (i) a contamination cause motion, (ii) a breaking motion, or (iii) a theft motion. The electronic device where the operations further include: determining that the motion of the user detected from the image data corresponds to (i) the contamination cause motion; receiving, via the interface unit, vehicle movement data regarding a movement of the vehicle; and based on a determination that the contamination cause motion of the user is related to the movement of the vehicle: determining not to generate the cost charging data or to generate the cost charging data at a discounted cost. The electronic device where the operations further include: determining that the motion of the user detected from the image data corresponds to (i) the contamination cause motion. The electronic device where the operations further include determining not to generate cost charging data or to generate cost charging data of a discounted cost, based on a determination that the contamination cause motion of the user is related to an item that was purchased in the cabin of the vehicle. The electronic device where the interface unit is further configured to (i) exchange signals with a plurality of internal cameras of the vehicle and (ii) receive a signal from a seat system based on a detection of the user sitting in the vehicle, and where the operations further include: based on receiving, from the seat system, the signal indicative of the detection of the user sitting in the vehicle: receiving the image data that was generated based on processing at least one image captured by at least one of the plurality of internal cameras that are associated with a seat of the vehicle in which the user is sitting. The electronic device where the interface unit is further configured to (i) exchange signals with a single internal camera of the vehicle and (ii) receive a signal from a seat system based on a detection of the user sitting in the vehicle, and where the operations further include: based on receiving, from the seat system, the signal indicative of the detection of the user sitting in the vehicle: perform processing to distinguish a region that corresponds to a seat of the vehicle in which the user is sitting, based on the image data that was generated based on processing at least one image captured by the single internal camera. The electronic device where the interface unit is configured to exchange signals with at least one external camera that is configured to capture an image of an outside of a vehicle, and where the operations further include. The electronic device may also include generating body profile data of the user based on at least one of (i) first image data that was generated based on processing at least one first image captured by the at least one internal camera, or (ii) second image data that was generated based on processing at least one second image captured by the at least one external camera. The electronic device where the operations may also include tracking the motion of the user based on the body profile data of the user. The electronic device where the operations further include: determining whether the user purchases an item in a cargo box in the vehicle, based on the motion of the user detected from the received image data. The electronic device where the operations further include: specifying a direction of a hand of the user reaching out to the item in the cargo box in the vehicle, based on the received image data. The electronic device where the operations may also include based on the direction of the hand of the user, specifying the user to be charged. The electronic device where determining whether the user purchases the item in the cargo box, based on the motion of the user detected from the received image data, includes: determining that the user purchases the item based on a detection, in the received image data, of (i) an item selecting motion of the user and (ii) an item opening motion of the user, and where generating the cost charging data includes: based on a determination that the user purchases the item, generating the cost charging data including price information of the purchased item. The electronic device where the operations further include: based on detecting, in the received image data, a change in lighting related to a particular storage area of the cargo box, determining that the specified user has selected the item provided in the particular storage area. The electronic device where the operations further include: based on detecting the item selecting motion of the user, providing a first signal to at least one other electronic device provided in the vehicle via the interface unit to output item selection information. The electronic device may also include based on detecting the item opening motion of the user, providing a second signal to the at least one other device via the interface unit to output item purchase information. The electronic device where the operations further include: based on detecting, in the received image data, the motion of the user (i) selecting the item and (ii) putting the item back into the cargo box: determining that a purchase of the item is canceled. The electronic device where the interface unit is further configured to exchange signals with a communication device, and where the operations further include: storing the received image data based on which the cost charging data is generated; and based on transmitting the cost charging data to a mobile terminal of the user via the interface unit and the communication device, transmitting the stored image data to the mobile terminal. The electronic device where generating the cost charging data is further based on at least one of (i) a vehicle travel operation or (ii) a service providing operation that is provided to the user. The electronic vehicle where the interface unit is further configured to exchange signals with a communication device, and where the operations further include transmitting the cost charging data to a payment server. The electronic device where the interface is further configured to exchange signals with at least one external camera that is configured to capture an image of an outside of a vehicle, and where transmitting the cost charging data to the payment server includes: transmitting the cost charging data to the payment server based on detecting an exit motion of the user from the vehicle, where detecting the exit motion of the user is based on at least one of (i) first image data that was generated based on processing at least one first image captured by the at least one internal camera, or (ii) second image data that was generated based on processing at least one second image captured by the at least one external camera. Implementations of the described techniques may include hardware, a method or process, or computer software on a computer-accessible medium.

Another general aspect includes an operation method of an electronic device provided in a vehicle, the method including: acquiring, by at least one processor, image data that was generated based on processing at least one image captured by at least one internal camera provided in a cabin of the vehicle. The operation method also includes monitoring, by the at least one processor, a motion of a user detected in the acquired image data. The operation method also includes generating, by the at least one processor, cost charging data based on the motion of the user. The operation method also includes transmitting, by the at least one processor and through an interface unit, a signal including the cost charging data.

Other embodiments of this aspect include corresponding computer systems, apparatus, and computer programs recorded on one or more computer storage devices, each configured to perform the actions of the methods.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a diagram illustrating an exterior of a vehicle according to an implementation of the present disclosure;

FIGS. 11 to 31 are diagrams referred to for explaining an operation of a cabin system according to an implementation of the present disclosure;

FIG. 56 illustrates an example of a user's sitting position according to an implementation of the present disclosure;

FIGS. 58 and 59 illustrate examples of a physical operation for adjusting a viewing angle of a first display according to an implementation of the present disclosure;

FIGS. 60 and 61 illustrates examples of a physical operation for adjusting a viewing angle of a second display according to an implementation of the present disclosure;

FIGS. 62 and 63 illustrate examples of a physical operation of adjusting a viewing angle of a third display according to an implementation of the present disclosure;

FIG. 65 illustrates an example of adjusting a tilting angle by a touch input unit according to an implementation of the present disclosure;

FIG. 68 illustrates an example of a first display and FIG. 69 illustrates an example of a third display;

FIGS. 71A and 71B are diagrams referred to for explaining a display and a light output region according to an implementation of the present disclosure;

FIGS. 72 to 74 are diagrams referred to for explaining a light output pattern in a light output region according to an implementation of the present disclosure;

FIG. 75 is a diagram referred to for explaining how to output a graphic object for alleviating car sickness according to an implementation of the present disclosure;

FIG. 84 is illustrates a flowchart of a user transportation system according to an implementation of the present disclosure;

FIGS. 90A and 90B illustrates examples of service information provided depending on a destination according to an implementation of the present disclosure.

DETAILED DESCRIPTION

Figure 2:
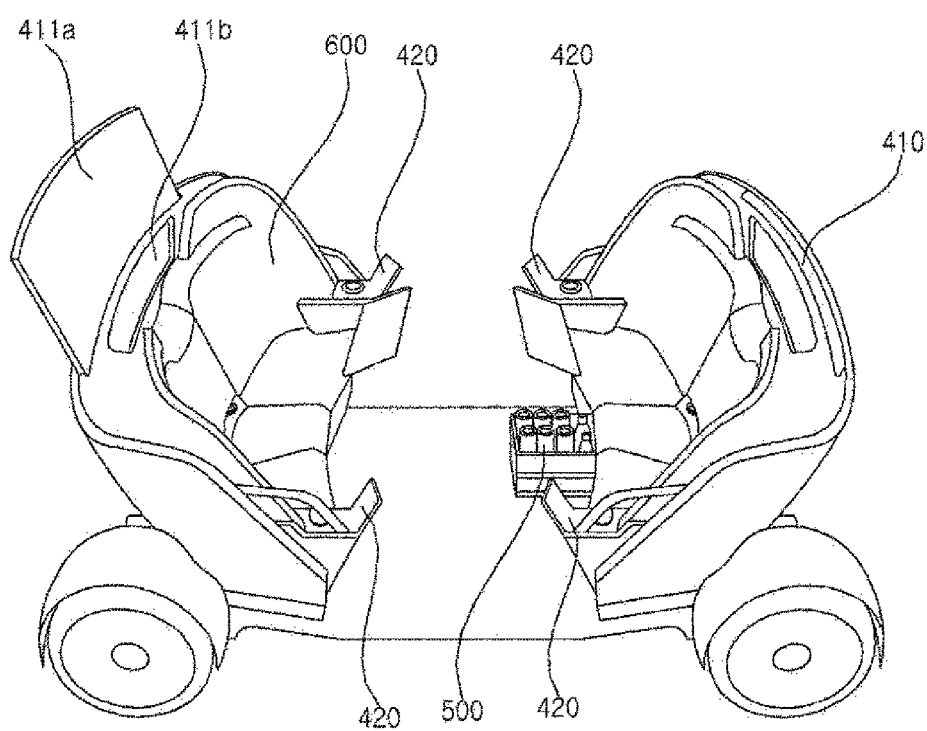
FIG. 2 is a diagram illustrating an interior of a vehicle according to an implementation of the present disclosure.

The present disclosure is directed to a variety of techniques and systems that may be implemented in user transportation. For example, implementations disclosed herein may be implemented as part of a door-to-door transportation system. Implementations disclosed herein describe systems and techniques that are directed to scenarios involving interactions between a vehicle and a user outside the vehicle, as well as scenarios involving interactions between a vehicle and a user inside the vehicle.

The various features provided by these systems and techniques provide improved convenience for a user who is interacting with the transportation vehicle (e.g., a door-to-door transportation vehicle), both outside and inside the vehicle.

In some implementations, the user transportation may be implemented by linking a shared vehicle with a personal mobility vehicle.

The details of other implementations are included in the following description and the accompanying drawings.

In some scenarios, implementations of the present disclosure has one or more effects as below.

First, implementations may enable transporting a user with a personal mobility vehicle in regions where shared vehicles are not allowed to travel. As such, the system may enable transporting the user from an initial start location to a final destination, thus enabling door-to-door service.

Second, implementations may enable providing a shared vehicle at a specified pick-up time at an estimated get-on location of a user, and also providing a personal mobility vehicle at a specified drop-off time at an estimated get-off location. In such scenarios, therefore, the user may be able to move from an initial start location to a final destination in a more efficient manner and in less time.

Third, implementations may enable a shared vehicle server to share information with a personal mobility vehicle server, and to enable various features, such as user authorization, to be performed just once when a user utilizes both a shared vehicle and a personal mobility vehicle.

Effects of the present disclosure are not limited to the aforementioned effects and other unmentioned effects will be clearly understood by those skilled in the art from the claims.

A vehicle as described in this disclosure may include an automobile, a motorcycle, or other suitable motorized vehicle. Hereinafter, a description will be given based on an example of an automobile.

In the following description, "the left side of the vehicle" refers to the left side in the forward driving direction of the vehicle, and "the right side of the vehicle" refers to the right side in the forward driving direction of the vehicle.

FIG. 1 is a diagram illustrating an exterior of a vehicle according to an implementation of the present disclosure.

Referring to FIG. 1, a vehicle 10 according to an implementation may be various types of transportation mechanisms. The vehicle 10 may be, for example, a car, a train, and a motorcycle. Hereinafter, the present disclosure will be described by exemplifying an autonomous vehicle that travels without a driver's manipulation. In some implementations, the autonomous vehicle may switch from an autonomous mode to a manual mode, or vice versa, based on a user input.

The vehicle 10 may include a power train drive unit for controlling a power train, a chassis drive unit for controlling a chassis, a door drive unit for controlling a door, a safety equipment drive unit for controlling a variety of safety equipment, a lamp drive unit for controlling a variety of lamps, and an air conditioner drive unit for controlling an air conditioning device. Each drive unit included in the vehicle 10 may be described as an electronic device. In some implementations, the vehicle 10 may further include other components in addition to the components described in the present disclosure, and may not include some of the components described in the present disclosure.

The vehicle 10 may include at least one object detection device for detecting an object located outside the vehicle 10. The object detection device may include at least one of a camera, a radar, a lidar, an ultrasonic sensor, or an infrared sensor. The object detection device may provide data on an object, which is generated based on a sensing signal generated by a sensor, to at least one electronic device. At least one object detection device included in the vehicle 10 may be described as an electronic device.

The vehicle 10 may include at least one communication device for exchanging a signal with a device located outside the vehicle 10. The communication device may exchange signals with at least one of infrastructure (for example, a server) or another vehicle. At least one communication device included in the vehicle 10 may be described as an electronic device.

The vehicle 10 may include an internal communication system. A plurality of electronic devices included in the vehicle 10 may exchange signals with each other via an internal communication system. The signal may include data. The internal communication system may use at least one communication protocol (for example, CAN, LIN, FlexRay, MOST, Ethernet)

The vehicle 10 may include a cabin system 100. The cabin system will be described with reference to FIGS. 2 and 3.

FIG. 2 is a diagram illustrating an interior of a vehicle according to an implementation of the present disclosure.

Figure 3:
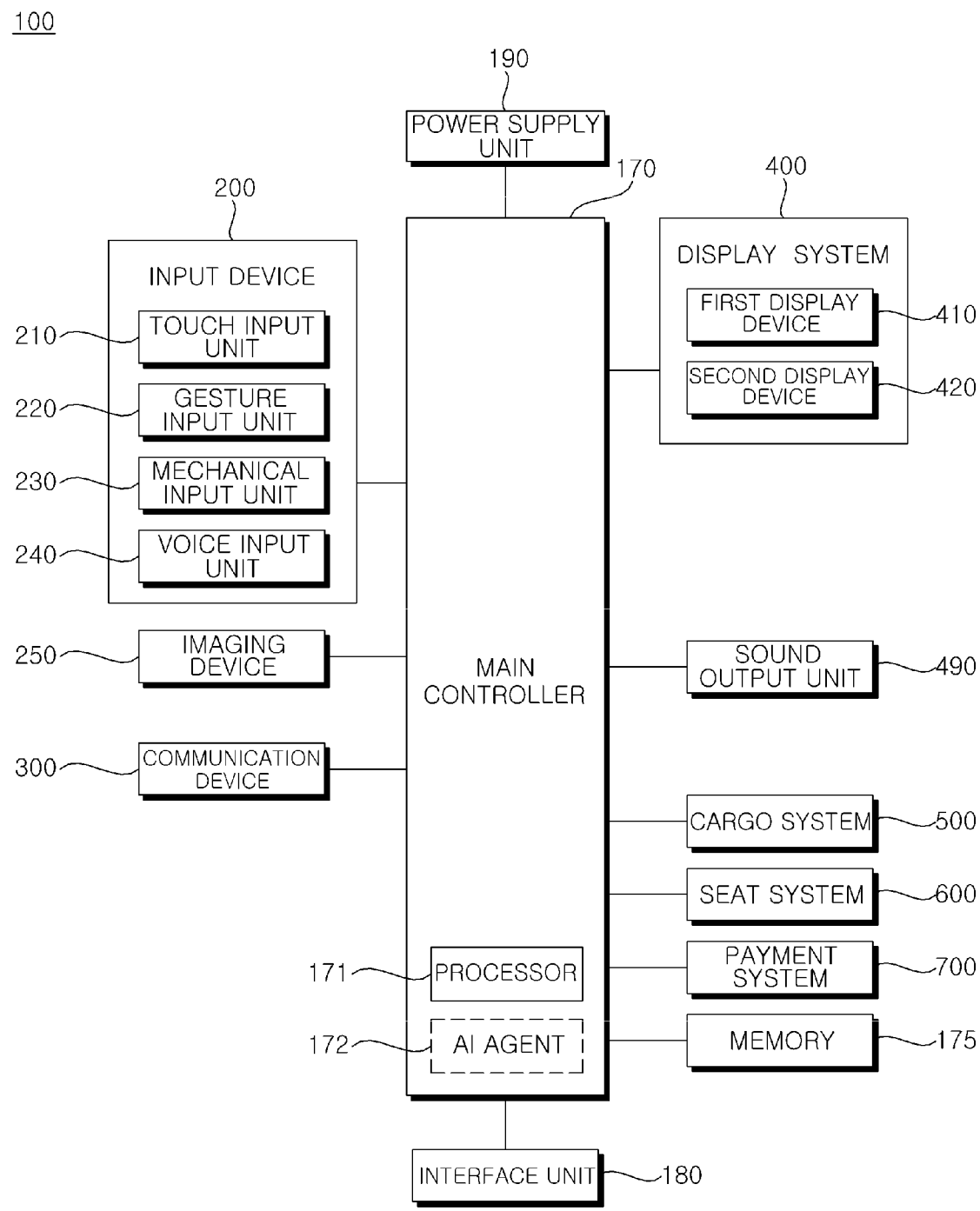
FIG. 3 is a block diagram referred to for explaining a vehicle cabin system according to an implementation of the present disclosure.

FIG. 3 is a block diagram referred to for explaining a vehicle cabin system according to an implementation of the present disclosure.

Figure 4A:
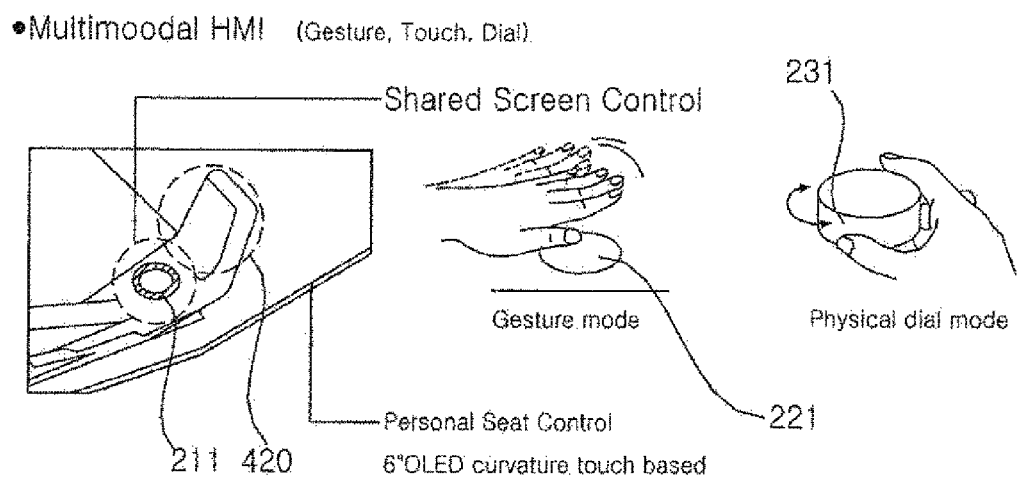
FIGS. 4A to 4C are diagrams referred to for explaining an input device according to an implementation of the present disclosure.
Figure 4B:
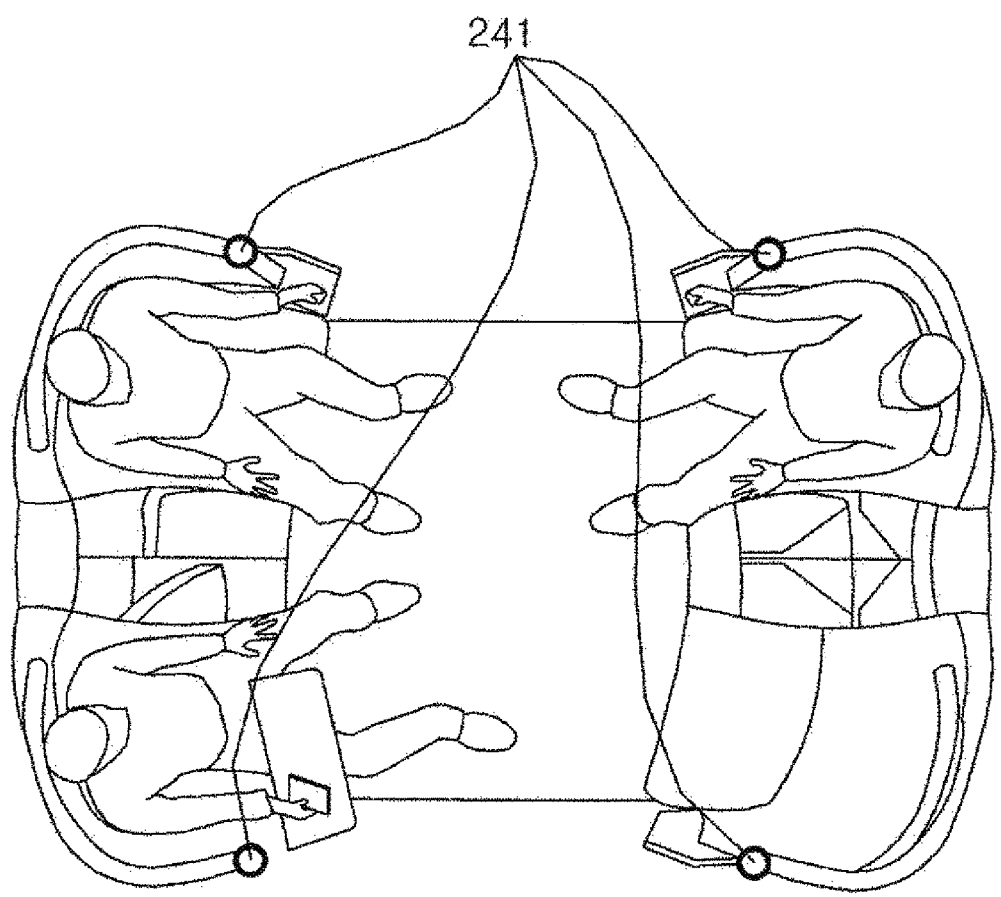
Figure 4C:
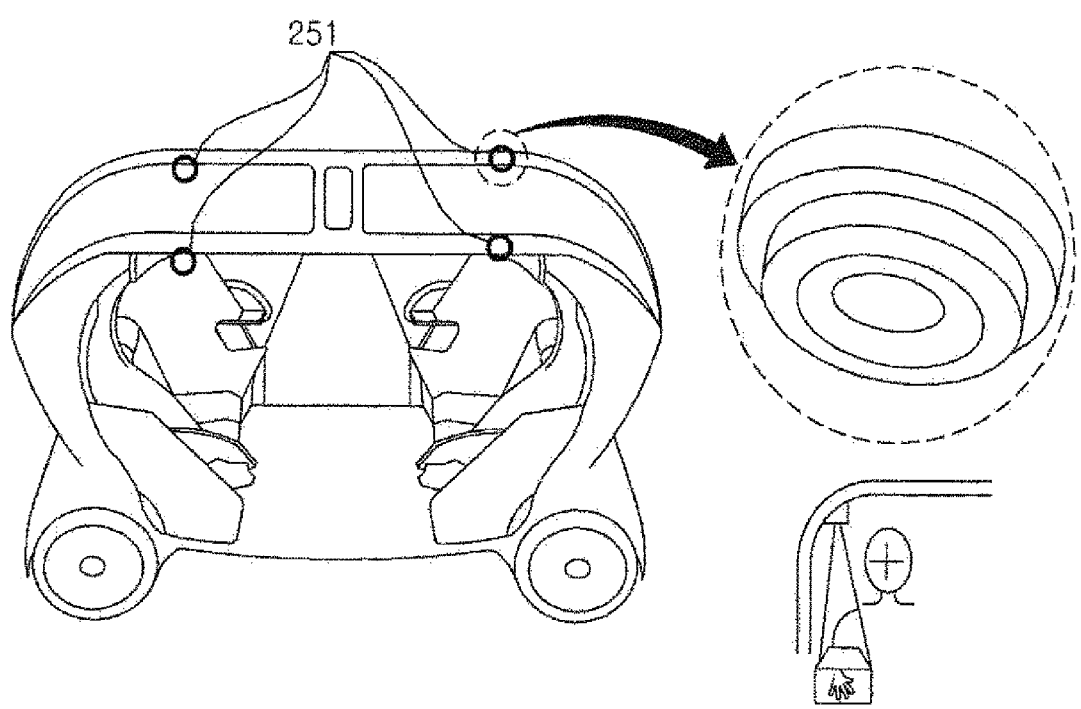

FIGS. 4A to 4C are diagrams referred to for explaining an input device according to an implementation of the present disclosure.

Figure 5:
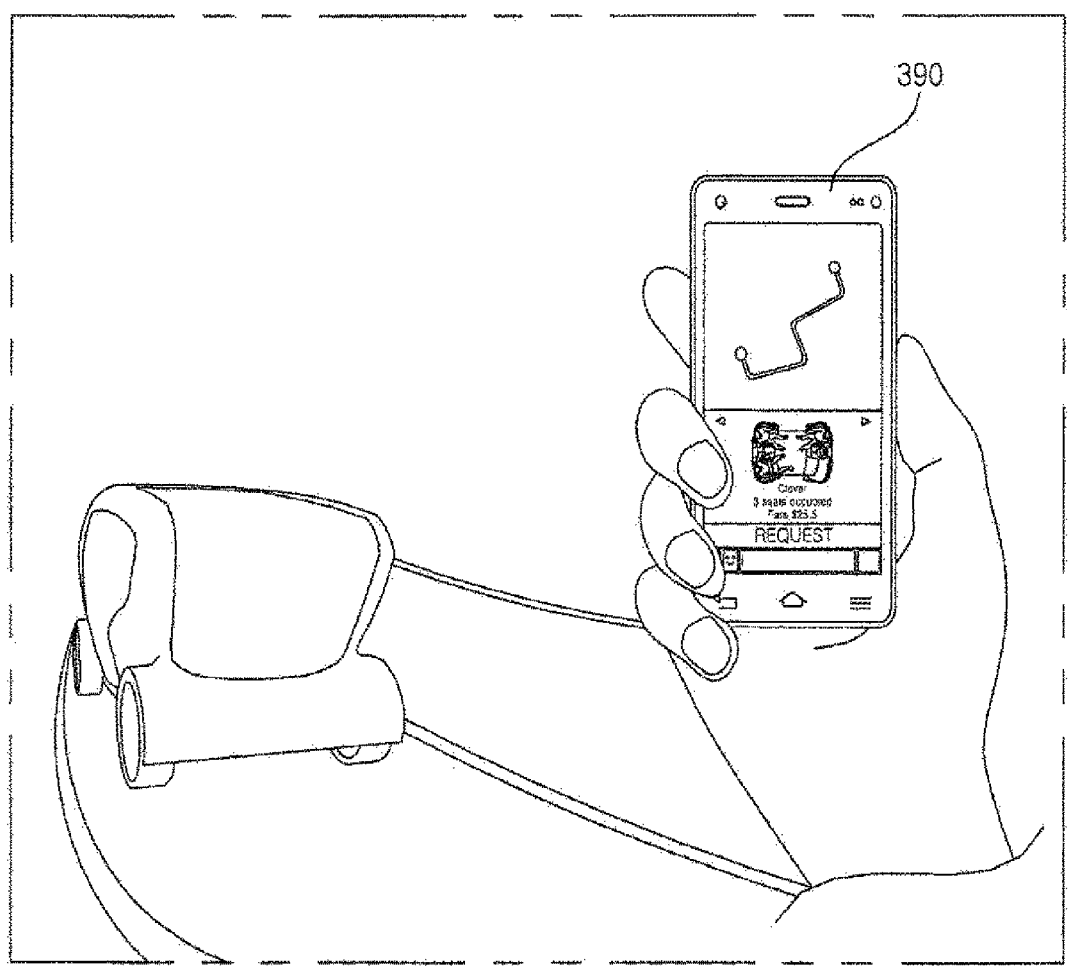
FIG. 5 is a diagram referred to for explaining communication between a communication device and a mobile terminal according to an implementation of the present disclosure.

FIG. 5 is a diagram referred to for explaining communication between a communication device and a mobile terminal according to an implementation of the present disclosure.

Figure 6:
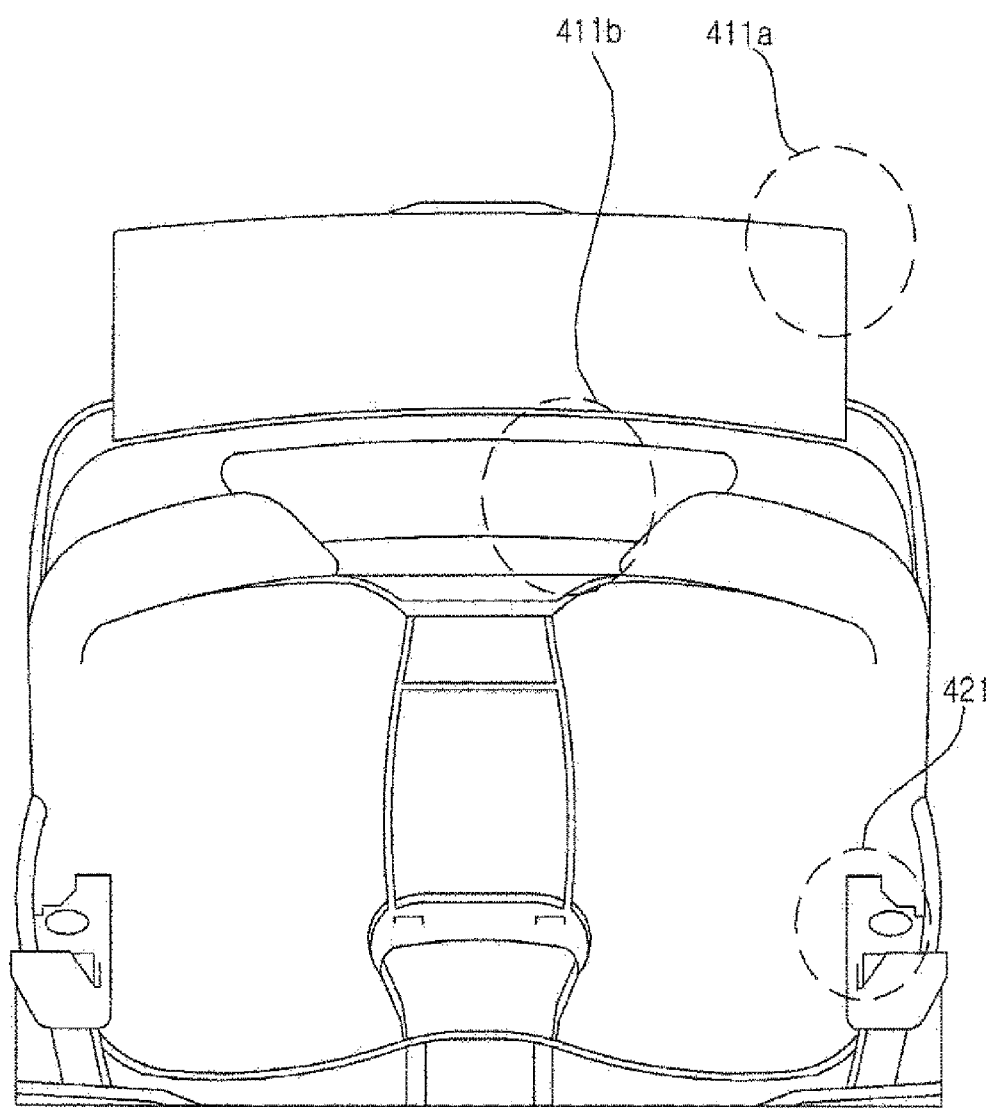
FIG. 6 is a diagram referred to for explaining a display system according to an implementation of the present disclosure.

FIG. 6 is a diagram referred to for explaining a display system according to an implementation of the present disclosure.

Figure 7:
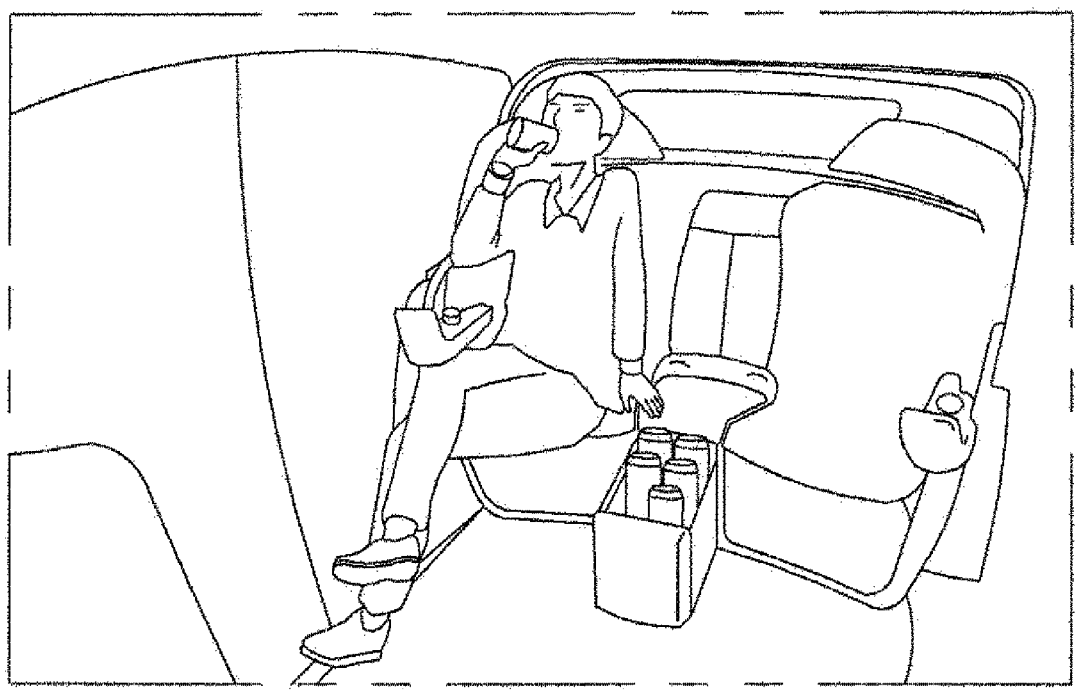
FIG. 7 is a diagram referred to for explaining a cargo system according to an implementation of the present disclosure.

FIG. 7 is a diagram referred to for explaining a cargo system according to an implementation of the present disclosure.

Figure 8:
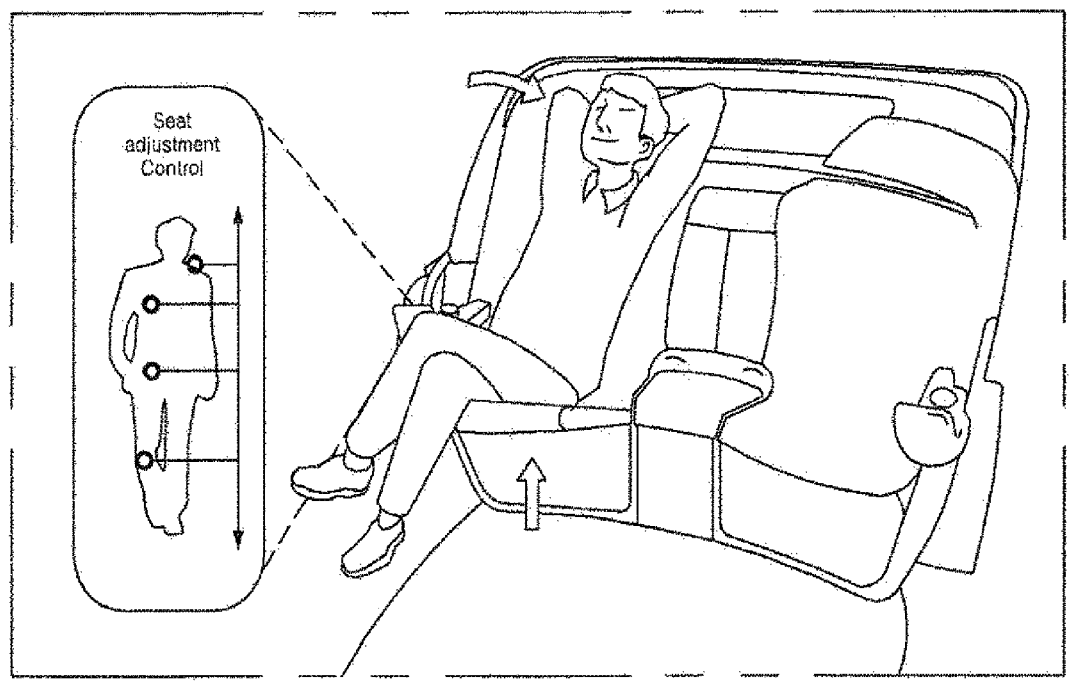
FIG. 8 is a diagram referred to for explaining a seat system according to an implementation of the present disclosure.

FIG. 8 is a diagram referred to for explaining a seat system according to an implementation of the present disclosure.

Figure 9:
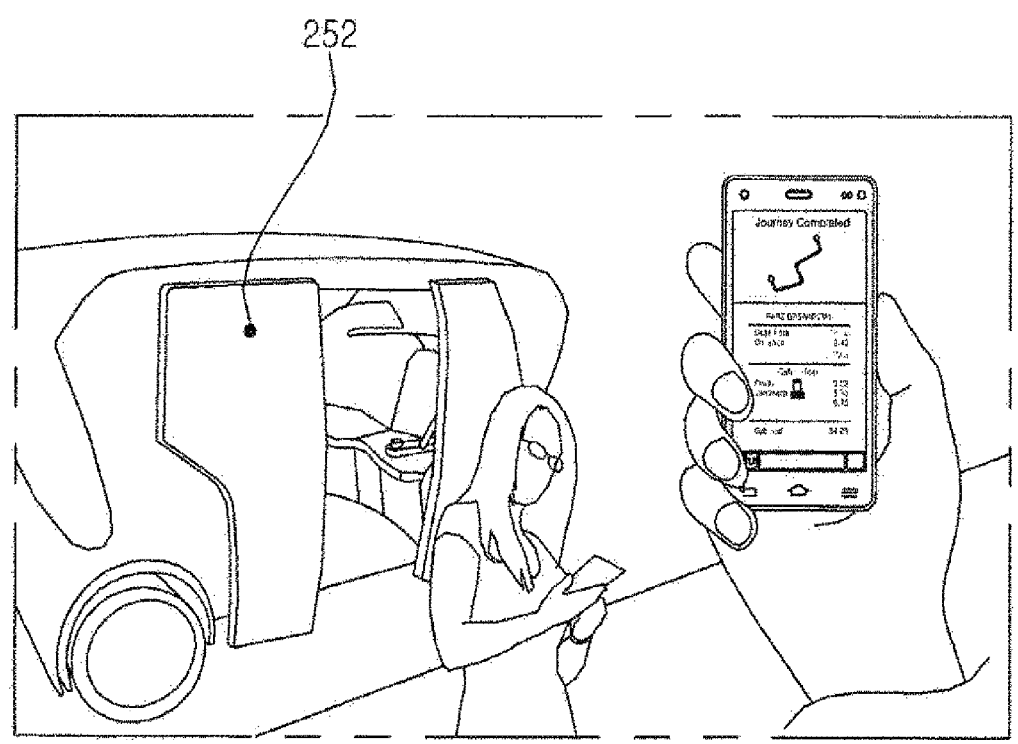
FIG. 9 is a diagram referred to for explaining a payment system according to an implementation of the present disclosure.

FIG. 9 is a diagram referred to for explaining a payment system according to an implementation of the present disclosure.

Referring to FIGS. 2 to 9, a vehicle cabin system (hereinafter, referred to as a cabin system) 100 may be defined as an assistance system for a user of the vehicle 10. The cabin system 100 may be the highest-level system that includes a display system 400, a cargo system 500, a seat system 600, and a payment system 700. The cabin system may include a main controller 170, a memory 175, an interface unit 180, a power supply 190, an input device 200, an imaging device 250, a communication device 300, a display system 400, a sound output unit 490, the cargo system 500, the seat system 600, and the payment system 700. In some implementations, the cabin system 100 may further include other components in addition to the components described in the present disclosure, and may not include some of the components described in the present disclosure.

The main controller 170 may be electrically connected with the input device 200, the communication device 300, the display system 400, the cargo system 500, the seat system 600, and the payment system 700, and exchange signals therewith. The main controller 170 may control the input device 200, the communication device 300, the display system 400, the cargo system 500, the seat system 600, and the payment system 700. The main controller 170 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The main controller 170 may include at least one sub-controller. In some implementations, the main controller 170 may include a plurality of sub-controller. Each of the plurality of sub-controller may individually control an individual group of devices and systems. Devices and systems included in the cabin system 100 may be grouped by functions or may be grouped by a seat.

The main controller 171 may include at least one processor 171. FIG. 3 illustrates an example in which the main controller 171 includes a single processor 171, but the main controller 171 may include a plurality of processors. The processor 171 may be classified as one of the above-described sub-controllers.

The processor 171 may acquire first information on a first user and second information on a second user through the communication device 300. A first mobile terminal of the first user may transmit the first information to the cabin system 100. A second mobile terminal of the second user may transmit the second information to the cabin system 100. The communication device 300 may receive the first information and the second information, and provide the received first information and the received second information to the processor 171.

The processor 171 may specify the first user and the second user based on image data that is received based on a processing of at least one image captured by at least one of an internal camera 251 or an external camera 252. In some implementations, the processor 171 may specify the first user and the second user by applying an image processing algorithm to the image data. For example, the processor 171 may specify the first user and the second user by comparing the first information, the second information, and the image data. For example, the first information may include at least one of route information, body information, co-occupant information, baggage information, location information, preferred content information, preferred food information, disability information, or use history information of the first user. For example, the second information may include at least one of route information, body information, co-occupant information, baggage information, location information, preferred content information, preferred food information, disability information, or use history information of the second user.

The processor 171 may provide a control signal to at least one of a display or a speaker based on an electrical signal generated by the input device 200, so that a content is provided to a user.

The processor 171 may determine a first seat for the first user from among a plurality of seats based on the first information. In some implementations, the processor 171 may determine a position of the first seat based on the first information. The processor 171 may determine a second seat for the second user from among a plurality of seats based on the second information. In some implementations, the processor 171 may determine a position of the second seat based on the second information.

The processor 171 may determine a service price based on an electrical signal received from at least one of the communication device 300, the internal camera 251, the external camera 252, the input device 200, a display of the display system 400, a speaker of the sound output unit 490, the cargo system 500, or a plurality of seats of the seat system 600. The processor 171 may provide a signal to the payment system 700 to charge the determined service price.

In some implementations, the main controller 170 may include an artificial intelligence agent 172. The artificial intelligent (AI) agent 172 may perform machine learning based on data acquired through the input device 200. The AI agent 172 may control at least one of the display system 400, the sound output unit 490, the cargo system 500, the seat system 600, or the payment system 700 based on a result of the machine learning.

In some implementations, the main controller 170 may be implemented as a vehicle electrode device. The electronic device 170 may include an interface unit and a processor 171. The electronic device 171 may exchange signals with at least one of the following: the communication device 300 for exchanging a signal with an external device; at least one internal camera 251 for capturing an image of the inside of the cabin; at least one external camera 252 for capturing an image of the outside of the vehicle; the input device 200 for converting a user input into an electrical signal; at least one display for outputting a visual content; at least one speaker for outputting an audible content; and a plurality of seats on which a plurality of users can respectively seat.

The processor 171 of the electronic device 170 may acquire first information on a first user and second information on a second user through the communication device, specify each of the first user and the second user based on image data received from at least one of the internal camera or the external camera, provide a control signal to at least one of the display and the speaker based on an electrical signal generated by the input device so as to provide a content to a user, determine a first seat for the first user from among the plurality of seats based on the first information, determine a second seat for the second user from among the plurality of seats based on the second information, set a position of the first seat based on the first information, and set a position of the second seat based on the second information.

The memory 175 is electrically connected with the main controller 170. The memory 175 may store basic data for each unit, control data for the operational control of each unit, and input/output data. The memory 175 may be implemented as at least one of a ROM, a RAM, an EPROM, a flash drive, or a hard drive. The memory 175 may store various data for the overall operation of the cabin system 100 such as programs for the processing or control of the main controller 170. In some implementations, the memory 175 may be integrally formed with the main controller 170, or may be implemented as a sub-component of the main controller 177.

The interface unit 180 may exchange signals with at least one electronic device in the vehicle 10 in a wired or wireless manner. The interface unit 180 may include at least one of a communication module, a terminal, a pin, a cable, a port, a circuit, an element, or a device.

The power supply 190 may supply power to the cabin system 100. The power supply 190 may be supplied with power from a power source (for example, a battery) included in the vehicle 10, and provide power to each unit of the cabin system 100. The power supply 190 may operate in accordance with a control signal from the main controller 170. For example, the power supply 190 may be implemented as a switched mode power supply (SMPS).

The cabin system 100 may include at least one printed circuit board (PCB). The main controller 170, the memory 175, the interface unit 180, and the power supply 190 may be embedded in at least one PCB.

The input device 200 may receive a user input. The input device 200 may convert the user input into an electrical signal. The electrical signal converted by the input device may be converted into a control signal and then provided to at least one of the display system 400, the sound output unit 490, the cargo system 500, the seat system 600, or the payment system 700. At least one processor included in the main controller 170 or the cabin system 100 may generate a control signal based on an electrical signal received from the input device 200.

The input device 200 may include at least one of a touch input unit 210, a gesture input unit 220, a mechanical input unit 230, or a voice input unit 240.

As illustrated in FIG. 4A, the touch input unit 210 may convert a user's touch input into an electrical signal. The touch input unit 210 may include at least one touch sensor 211 to sense the user's touch input. In some implementations, the touch input unit 210 is integrally formed with at least one display included in the display system 400 to implement a touch screen. Such a touch screen may provide an input interface and an output interface between the cabin system 100 and a user.

As illustrated in FIG. 4A, the gesture input unit 220 may convert a user's gesture input into an electrical signal. The gesture input unit 220 may include at least of an infrared sensor 221 or an image sensor to sense the user's gesture input. In some implementations, the gesture input unit 220 may sense a user's three-dimensional (3D) gesture input. To this end, the gesture input unit 220 may include a light output unit for outputting a plurality of infrared lights or a plurality of image sensors. The gesture input unit 220 may sense a user's 3D gesture input using a Time of Flight (TIF) scheme, a structured light scheme, or a disparity scheme.

As illustrated in FIG. 4A, the mechanical input unit 230 may convert a user's physical input (for example, press or rotation) applied through a mechanical device 231 into an electrical signal. The mechanical input unit 230 may include at least one of a button, a dome switch, a jog wheel, or a jog switch.

In some implementations, the gesture input unit 220 and the mechanical input device 230 may be integrally formed with each other. For example, the input device 200 may include a gesture sensor and a jog dial device, which is formed retractably from one portion of a neighboring structure (for example, at least one of a seat, an arm rest, or a door). When the jog dial device forms a flat state with the neighboring structure, the jog dial device may function as the gesture input unit 220. When the jog dial device protrudes further than the neighboring structure, the jog dial device may function as the mechanical input device 230.

As illustrated in FIG. 4B, the voice input unit 240 may convert a user's voice input into an electrical signal. The voice input unit 240 may include at least one microphone 241. The voice input unit 240 may include a beam foaming MIC.

The imaging device 250 may include at least one camera. The imaging device 250 may include at least one of the internal camera 251 or the external camera 252. The internal camera 251 may capture an image of the inside of the cabin. The external camera 252 may capture an image of the outside of the vehicle.

As illustrated in FIG. 4C, the internal camera 251 may acquire an image of the inside of the cabin. The imaging device 250 may include at least one internal camera 251. It is preferable that the imaging device 250 includes at least one internal camera 251 corresponding to a capacity of occupants. The imaging device 250 may provide an image acquired by the internal camera 251. At least one processor included in the main controller 170 or the cabin system 100 may detect a user's motion based on the image acquired by the internal camera 251, generate a signal based on the detected motion, and provide the signal to at least one of the display system 400, the sound output unit 490, the cargo system 500, the seat system 600, or the payment system 700.

The external camera 251 may acquire an image of the outside of the vehicle. The imaging device 250 may include at least one external camera 252. For example, in some implementations the imaging device 250 includes at least one external camera 252 corresponding to the number of passenger doors. The imaging device 250 may provide an image acquired by the external camera 252. At least one processor included in the main controller 170 or the cabin system 100 may acquire user information based on the image acquired by the external camera 252. At least one processor included in the main controller 170 or the cabin system 100 may authorize a user based on the user information or may acquire body information (e.g., height information, weight information, etc.), co-occupant information, and baggage information of a user.

FIG. 3 illustrates an example in which the input device 200 is connected directly to the main controller 170, but the input device 200 may be connected to the main controller 170 via the interface unit 180.

The communication device 300 may wirelessly exchange signals with an external device. The communication device 300 may exchange signals with the external device directly or via a network. The external device may include at least one of a server, a mobile terminal, or another vehicle. As illustrated in FIG. 5, the communication device 300 may exchange signals with at least one mobile terminal 390.

The communication device 300 may include at least one of an antenna, a Radio Frequency (RF) circuit implementable by at least one communication protocol, or an RF device to perform communication. In some implementations, the communication device 300 may use a plurality of communication protocols. The communication device 300 may change a communication protocol depending on a distance to a mobile terminal.

FIG. 3 illustrates an example in which the communication device 300 is connected directly to the main controller 170, but the communication device 300 may be connected to the main controller 170 via the interface unit 180.

As illustrated in FIGS. 2 and 6, the display system 400 may display a graphic object. The display system 400 may include a first display device 410, and a second display device 420.

The first display device 410 may include at least one display 411 for outputting a visual content. The display 411 included in the first display device 410 may be implemented as at least one of a flat display, a curved display, a rollable display, or a flexible display.

For example, the first display device 410 may include a first display 411 disposed at rear of a seat and configured to be retractable in the cabin, and a first mechanism for moving the first display 411. The first display 411 may be retractably disposed in a slot formed in a seat main frame. In some implementations, the first display device 410 may further include a flexible region adjusting mechanism. The first display may be configured to be flexible, and a flexible region of the first display may be adjusted.

For example, the first display device 410 may include a second display that is disposed at a ceiling of the cabin and that is configured to be rollable, and a second mechanism configured to wind or unwind the second display. The second display may be formed such that a screen output is allowed on both surfaces of the second display.

For example, the first display device 410 may include a third display disposed at a ceiling of the cabin and formed flexible, and a third mechanism for bending or unbending the third display.

In some implementations, the display system 400 may further include at least one processor for providing a control signal to at least one of the first display device 410 or the second display device 420. At least one processor included in the display system 400 may generate a control signal based on a signal received from at least one of the main controller 170, the input device 200, the imaging device 250, or the communication device 300.

A display region of a display included in the display device 410 may be divided into a first region 411a and a second region 411b. The first region 411a may be defined as a content display region. For example, the first region 411a may display at least one of an entertainment content (e.g., movie, sports, shopping, music, etc.), a video conference, a food menu, and a graphic object corresponding to an augmented reality screen. The first region 411a may display a graphic object corresponding to driving situation information. The driving situation information may include at least one of information on an object located outside the vehicle 10, navigation information, or vehicle state information.

The information regarding an object located outside the vehicle 10 may include, for example, at least one information regarding at least one of a presence of the object, a location of the object, a distance between the vehicle 10 and the object, or a relative speed between the vehicle 10 and the object.

The navigation information may include, for example, at least one of map information, information regarding a set destination, information regarding a route to the set destination, information regarding various objects on the route, lane information, or information regarding the current location of the vehicle 10.

The vehicle state information may include, for example, at least one of vehicle attitude information, vehicle speed information, vehicle tilt information, vehicle weight information, vehicle direction information, vehicle battery information, vehicle fuel information, tire pressure information, vehicle steering information, in-vehicle temperature information, in-vehicle humidity information, pedal position information, or engine temperature information.

In some implementations, the second region 411b may be defined as a user interface region. For example, the second region 411b may display an AI agent picture. In some implementations, the second region 411b may be positioned in a region which is divided by seat frames. In this case, a user is able to see a content displayed on the second region 411b between multiple seats.

In some implementations, the first display device 410 may provide a hologram content. For example, the first display device 410 may provide a hologram content for each user, so that only a user who has requested the hologram content is allowed to view the hologram content.

The second display device 420 may include at least one display 421. The second display device 420 may provide a display 421 at a location such that only an occupant positioned corresponding to the location of the display 421 is allowed to view a content of the display 421. For example, the display 421 may be disposed at an arm rest of a seat. The second display device 420 may display a graphic object corresponding to a user's personal information. The second display device 420 may include one or more displays 421 corresponding to a capacity of occupants. The second display device 420 may form an inter-layered structure with a touch sensor or formed integrally therewith to implement a touch screen. The second display device 420 may display a graphic object for receiving a user input regarding seat adjustment or indoor temperature adjustment.

FIG. 3 illustrates an example in which the display system 400 is connected directly to the main controller 170, but the display system 400 may be connected to the main controller 170 via the interface unit 180.

The sound output unit 490 may convert an electrical signal into an audio signal. The sound output unit 490 may include at least one speaker for outputting an audible content. For example, the sound output unit 490 may include a plurality of speakers respectively provided in seats.

As illustrated in FIG. 7, the cargo system 500 may provide an item to a user in response to the user's request. The cargo system 500 may operate based on an electrical signal generated by the input device 200 or the communication device 300. The cargo system 500 may include a cargo box, which may be various types of storage areas of the vehicle.

For example, the cargo box may be a storage area that is designed to be loaded with various items, and may be hidden in a space below a seat. In such an example, when an electrical signal based on a user input is received, the cargo box may be exposed in a space of the cabin. A user may select a desired one of items loaded in the cargo box. To expose the cargo box in response to a user input, the cargo system 500 may include a sliding moving mechanism, and an item pop-up mechanism. The cargo system 500 may include a plurality of cargo boxes to provide a variety of items. The cargo box may be embedded with a weight sensor to determine whether or not each item is provided.

FIG. 3 illustrates an example in which the cargo system 500 is connected directly to the main controller 170, but the cargo system 500 may be connected to the main controller 170 via the interface unit 180.

As illustrated in FIG. 8, the seat system 600 may provide a seat customized for a user. The seat system 600 may operate based on an electrical signal generated by the input device 200 or the communication device 300. The seat system 600 may adjust at least one element of a seat based on acquired user body data. The seat system 600 may include a user detection sensor (e.g., a pressure sensor) for determining sitting of a user.

The seat system 600 may include a plurality seats respectively for a plurality of users. One of the plurality of seats may be disposed to face at least one another. At least two users in the cabin may sit facing each other.

FIG. 3 illustrates an example in which the seat system 600 is connected directly to the main controller 170, but the seat system 600 may be connected to the main controller 170 via the interface unit 180.

As illustrated in FIG. 9, the payment system 700 may provide a payment service to a user. The payment system 700 may operate based on an electrical signal generated by the input device 200 and the communication device 300. The payment system 700 may calculate a price for at least one service used by a user, and request the user to pay the calculated price.

FIG. 3 illustrates an example in which the payment system 700 is connected directly to the main controller 170, but the payment system 700 may be connected to the main controller 170 via the interface unit 180.

In some implementations, the cabin system 100 may further include a mobile terminal 390 as a constituent element.

Figure 10:
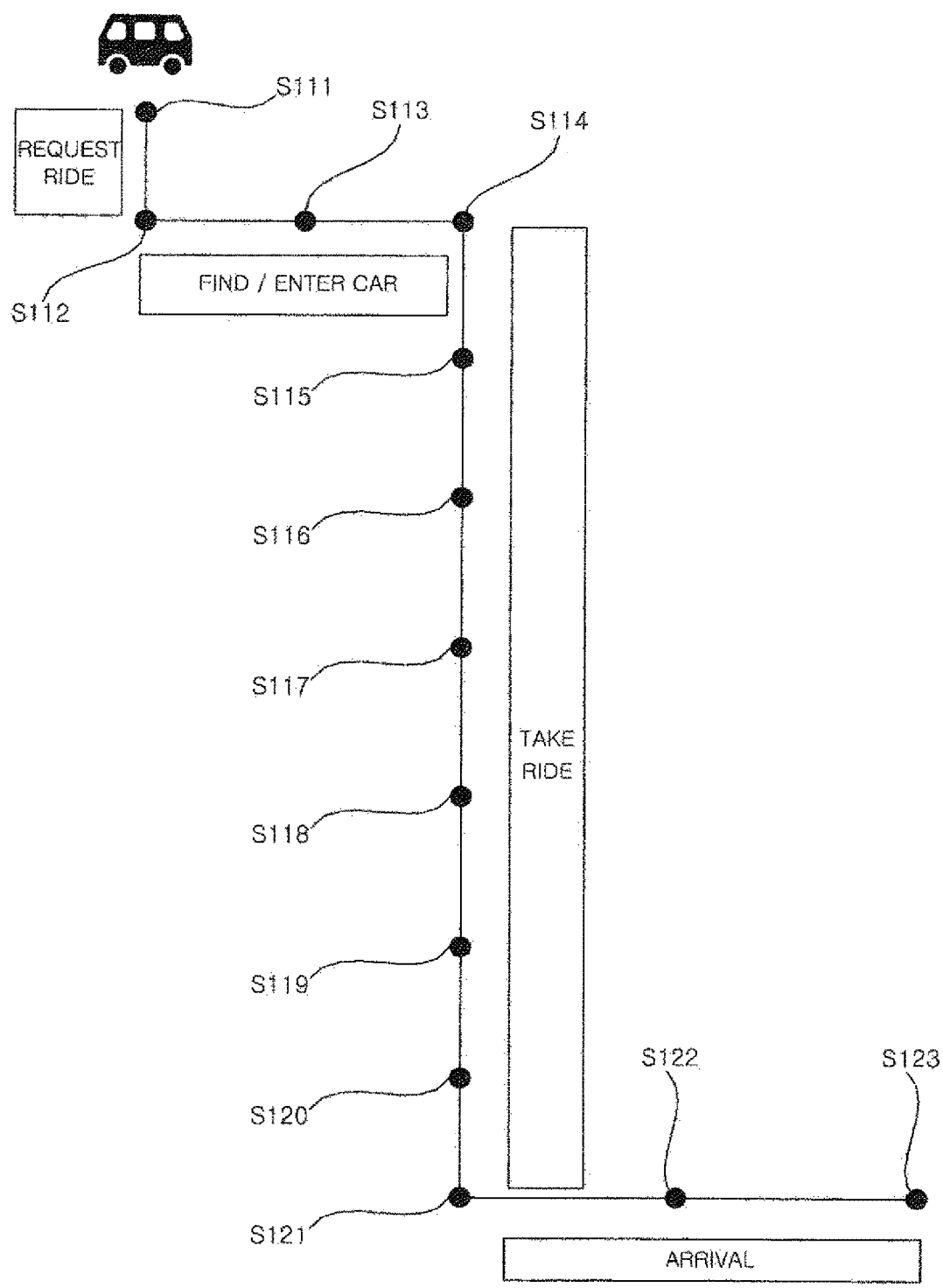
FIG. 10 is a diagram referred to explaining usage scenarios according to an implementation of the present disclosure.

FIG. 10 is a diagram referred to explaining usage scenarios according to an implementation of the present disclosure.

A first scenario S111 is a scenario for destination anticipation. An application linked with the cabin system 100 may be installed in the mobile terminal 390. Using the application, the mobile terminal 390 may anticipate a user's destination based on the user's contextual information. Using the application, the mobile terminal 390 may provide information on an empty seat in the cabin.

A second scenario S112 is a scenario for cabin interior layout preparation. The cabin system 100 may further include a scanning device for acquiring data on a user located outside the vehicle 10. By scanning the user, the scanning device may acquire the user's body data and baggage data. The user's body data and baggage data may be used to set a layout. The user's body data and baggage data may be used for user authorization. The scanning device may include at least one image sensor. The image sensor may acquire the user's image using a visible or infrared light.

The seat system 600 may set the layout of the cabin based on at least one of the body data or the baggage data. For example, the seat system 600 may provide a space for baggage or a space for installation of a car seat.

A third scenario S113 is a user welcoming scenario. The cabin system 100 may further include at least one guide light. The guide light may be disposed at the bottom in the cabin. When boarding of a user is detected, the cabin system 100 may output guide light so as to guide the user to sit on a preset seat from among a plurality of seats. For example, the main controller 170 may realize moving light, by sequentially turning on a plurality of light sources over time from an opened door to a preset user seat.

A fourth scenario S114 is a scenario for seat adjustment service. The seat system may adjust, based on the acquired body information, at least one element of a seat matching with the user.

A fifth scenario S115 is a scenario for personal content provision. The display system 400 may receive user personal data through the input device 200 or the communication device 300. The display system 400 may provide a content corresponding to the user personal data.

A sixth scenario S116 is a scenario for item provision. The cargo system 500 may receive user data through the input device 200 or the communication device 300. The user data may include a user's preference data and destination data. The cargo system 500 may provide an item based on the user data.

A seventh scenario S117 is a payment scenario. The payment system 700 may receive data necessary to calculate a price from at least one of the input device 200, the input device 300, or the cargo system 500. The payment system 700 may calculate a price for using the vehicle, based on the received data. The payment system 700 may request the user (e.g., the user's mobile terminal) for payment of the calculated price.

An eighth scenario S118 is a scenario for display system control. The input device 200 may receive a user input in at least one form, and convert the user input into an electrical signal. Based on the electrical system, the display system 400 may control a content to be displayed.

A ninth scenario S119 is a scenario for multi-channel artificial intelligence (AI) for multiple users. The AI agent 172 may distinguish a user input of each of the multiple users. Based on an electrical signal converted from a user input of each of the multiple users, the AI agent 172 may control at least one of the display system 400, the sound output unit 490, the cargo system 500, the seat system 600, or the payment system 700.

A tenth scenario S120 is a scenario for multi-media content provision for multiple users. The display system 400 may provide a content that every user is allowed to watch. In this case, the sound output unit 490 may provide the same sound to each of the multiple users through a speaker provided in each seat. The display system 400 may provide a content that each of the multiple user is allowed to watch individually. In this case, the sound output unit 490 may provide individual sound through a speaker provided in each seat.

An eleventh scenario S121 may be a scenario for user safety. When information on a nearby object possibly putting a user at risk is acquired, the main controller 170 may perform control to output alarm on the nearby object through at least one of the display system 400 or the sound output unit 490.

A twelfth scenario S122 is a scenario for prevention of belonging missing. The main controller 170 may acquire data on a user's belonging through the input device 200. The main controller 170 may acquire the user's motion data through the input device 200. Based on the data on the belonging and the motion data, the main controller 170 may determine whether the user gets off the vehicle with a belonging left behind. The main controller 170 may perform control to output an alarm about the belonging based on at least one of the display system 400 or the sound output unit 490.

A thirteenth scenario S123 is an offboard report scenario. The main controller 170 may receive, through the input device 200, data regarding a user's exiting from the vehicle. After the user exits the vehicle 10, the main controller 170 may provide report information on the user's exit to the user's mobile terminal. The report data may include data on a total bill for usage in the vehicle 10.

Figure 11:
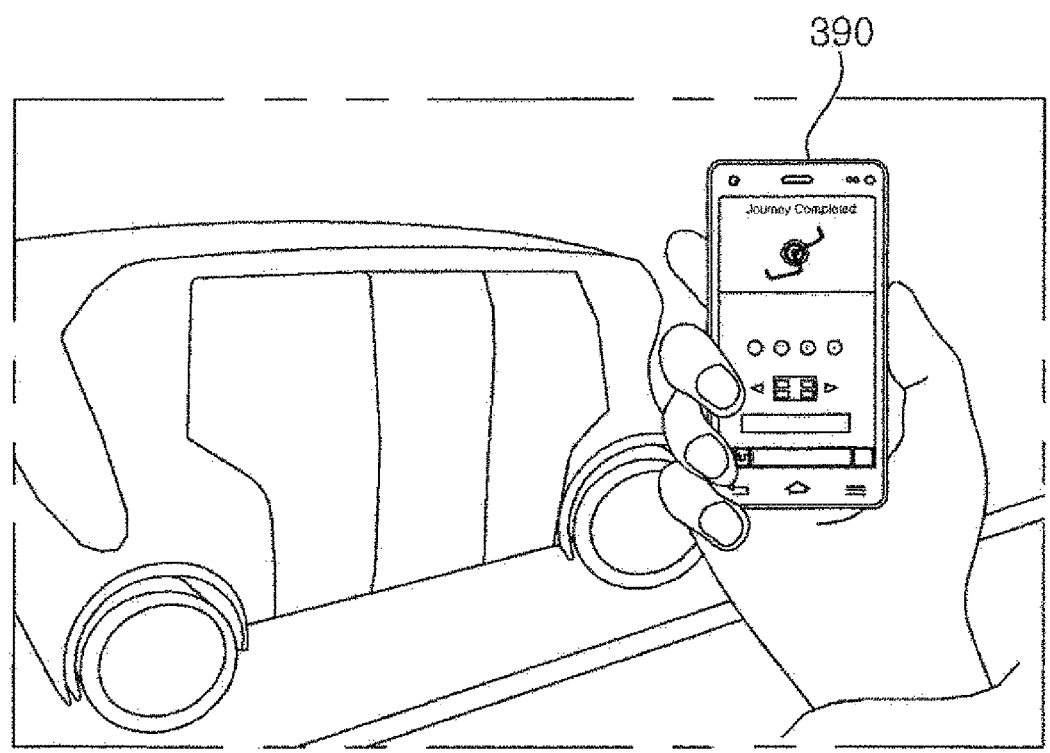

FIG. 11 is a diagram referred to for explaining an operation of a cabin system according to an implementation of the present disclosure.

Referring to FIG. 11, the processor 171 may acquire image data on the inside of the cabin from the internal camera 251. Based on the image data on the inside of the cabin, the processor 171 may generate information on the number of occupants in the cabin. The processor 171 may provide the information on the number of the occupants in the cabin through the communication device 300. The mobile terminal 390 may display the information on the number of the occupants. When making a reservation to use the cabin system 100, a user may determine whether or not to get on, by considering the presence of a co-occupant.

FIG. 12 is a diagram referred to for explaining a cabin system according to an implementation of the present disclosure.

Referring to FIG. 12, the processor 171 may set layouts of multiple seats based on first information and second information. The multiple seats may be formed as a module type. Each of the multiple seats may be formed transformable. Each of the multiple seats may be formed movable. The seat system 600 may include at least one drive device. The drive device may provide power for transformation or movement of each of the multiple seat.

As illustrated with reference numeral 1210, based on information on a user's baggage 1213, the processor 171 may provide a control signal to transform or move at least one seat 1211 out of the multiple seats so as to secure a space for keeping the baggage in the cabin. As illustrated with reference numeral 1222, based on usage information, the processor 171 may provide a control signal to transform at least one seat 1221 out of the multiple seats so as to secure a space for fixing a car seat in the cabin. In some implementations, a user's car seat usage information may be included in the first information or the second information.

For example, as illustrated with reference numeral 1230, based on business-class seat request information, the processor 171 may provide a business-class seat for a user by moving or transforming at least one seat 1232 or 1233 out of the multiple seats. In this case, the processor 171 may provide a control signal to set up a wall 1234 so as to separate a space around the business-class seat from other space in the cabin. In some implementations, the business-class seat request information may be included in the first information or in the second information.

Figure 13:
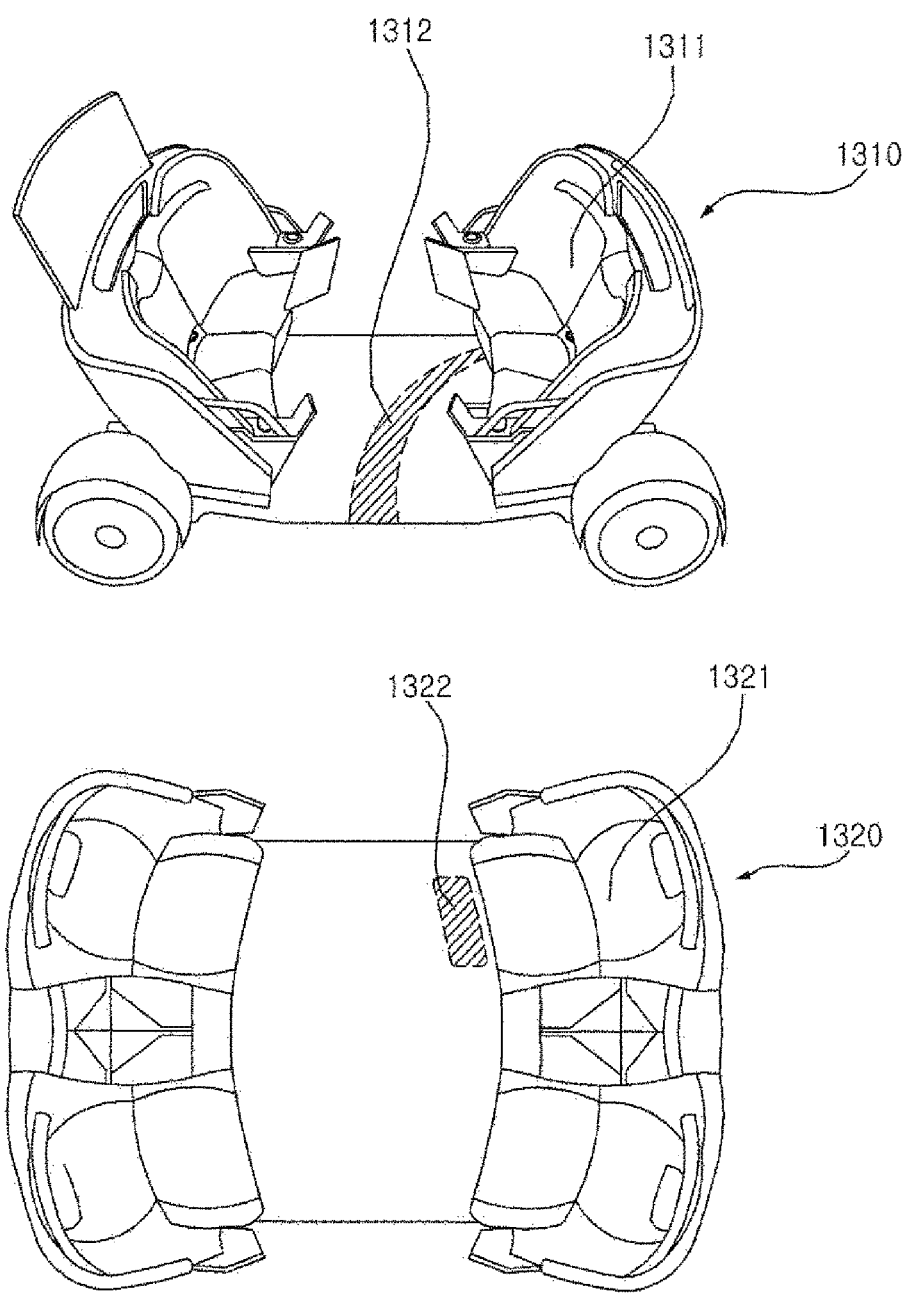

FIG. 13 is a diagram referred to for explaining an operation of a cabin system according to an implementation of the present disclosure.

Referring to FIG. 13, the cabin system 100 may further include guide lighting 1312 and 1322. The guide lighting 1312 and 1322 may be disposed at least one of a floor, a ceiling, a door, or a seat in the cabin. The processor 171 may detect boarding of a first user. The processor 171 may detect the boarding of the first user based on image data received from the internal camera 251 and/or the external camera 252. As illustrated with reference numeral 1310, when boarding of a first user is detected, the processor 171 may provide a control signal to the guide lighting 1312 to output guide light from a door to a first seat. In some implementations, the guide lighting 1312 may include a plurality of light sources to guide a user from a door to the first seat 1311. The processor 171 may apply an animation effect by controlling the guide lighting 1312 to turn on the plurality of light sources.

As illustrated with reference numeral 1320, when the boarding of the first user is detected, the processor 171 may control the guide lighting 1322 to turn on a light source disposed in vicinity of a first seat 1321.

Figure 14:
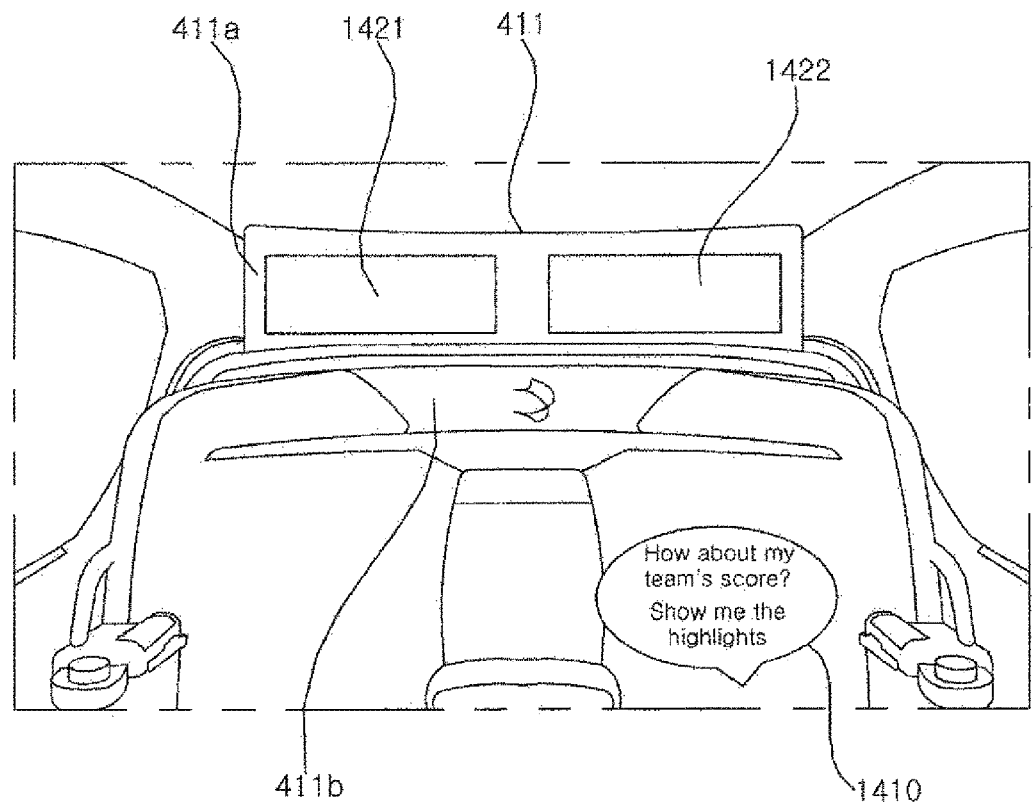

FIG. 14 is a diagram referred to for explaining an operation of a cabin system according to an implementation of the present disclosure.

Referring to FIG. 14, the processor 171 may provide a control signal to at least one of a display or a speaker such that a first content corresponding to first information is output. For example, when a first user inputs a request 1410 for a highlight video, the processor 171 may display, on at least one display 411, a highlight video of a team preferred by the first user. The first user's preferred team may be included in first information.

When a plurality of users is present in the cabin, the processor 171 may divide a display region of the display 411. The processor 171 may divide the display region of the display 411 into a first region 1421 and a second region 1422. The processor 171 may perform control such that a first content corresponding to first information is displayed on the first region 1421 of the display 411. The processor 171 may perform control such that a second content corresponding to second information is displayed on the second region 1422 of the display 411. If the second content is identical to the first content, the processor 171 may display the first content on the entire region of the display 141.

In some implementations, the processor 141 may divide the display 411 a plurality of regions according to a default setting. The processor 171. The processor 141 may divide the display 411 into a content display region 1420 and a user interface region 1430. The processor 171 may display the aforementioned user requested content on the content display region 1420. The content display 1420 may be divided into the first region 1421 and the second region 1422. The user interface region 1430 may be a display region which responds to a user request. The processor 171 may output a user interface screen on the user interface region 1430. The user interface region 1430 may output an AI screen on the user interface region 1430. For example, when the input device 200 receives a user input, the processor 171 may change a first graphic object into a second graphic object in response to reception of the user input. The first graphic object and the second graphic object may be implemented in the form of an animation.

Figure 15:
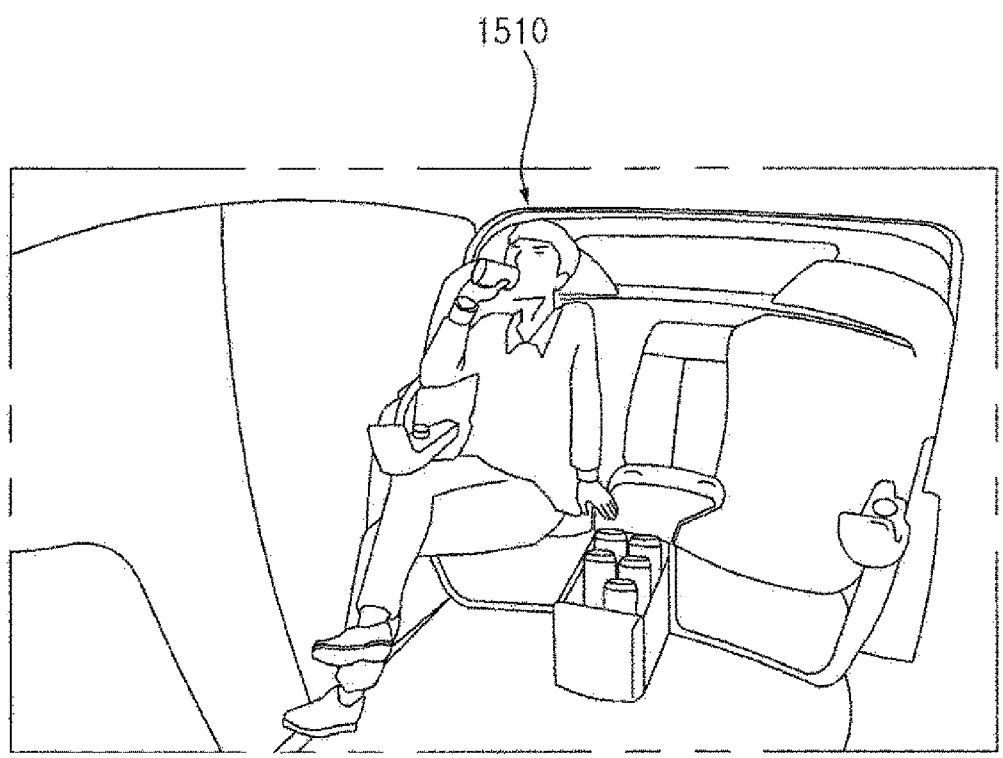

FIG. 15 is a diagram referred to for explaining an operation of a cabin system according to an implementation of the present disclosure.

Referring to FIG. 15, the processor 171 may select an item based on an electrical signal received from at least one of the communication device 300, the internal camera 251, or the input device 300. For example, whether or not a user wishes to select an item may be converted into an electrical signal through at least one of the mobile terminal 390, the communication device 300, the internal camera 251, or the input device 300. The processor 171 may provide a signal to the cargo system 500 so as to provide the selected item. The cargo system 500 may open a cargo box where the selected item is stored, and provide the selected item.

The input device 200 may receive a user input and convert the user into a first electrical signal. A touch sensor included in the touch input unit 210 may convert a user's touch input into an electrical signal. A gesture sensor 221 included in the gesture input unit 220 may convert a user's gesture input into an electrical signal. A jog dial 231 included in the mechanical input unit 230 may convert a user's mechanical input into an electrical signal. The microphone 241 included in the voice input unit 240 may convert a user's voice input into an electrical signal.

The display system 400 may display, on at least one display, an item menu based on an electrical signal converted by the input device 200. While the item menu is displayed on the display, the input device may receive a user input for selection of an item. The input device 200 may convert a user input for selection of a first item into a second electrical signal.

Based on the second electrical signal, the cargo system 500 may control a sliding mechanism so as to move a box out into a space of the cabin. Based on the second electrical signal, the cargo system 500 may control a lifting mechanism for exposing the first item out into the space of the cabin.

In some implementations, the cargo button 549 may convert a user input into an electrical signal. Based on the electrical signal, the cargo system 500 may control the sliding mechanism so as to move a box out into a space in the cabin. Based on the electrical signal, the cargo system 500 may control the lifting mechanism so as to expose multiple items out into the space of the cabin.

In some implementations, the sliding mechanism may operate in accordance with a control signal received from the processor 171. The sliding mechanism may allow a cargo box to slide. The sliding mechanism may allow a cargo box to slide out from within a hidden space inside a seat, and out into a space in the cabin. The sliding mechanism may include a drive unit, a power conversion unit, and a power transfer unit. The drive unit may convert electrical energy into kinetic energy. The drive unit may generate power. The drive unit may include at least one of a motor, an actuator, or a solenoid. The power conversion unit may convert the generated power into power suitable for moving the cargo box. For example, the power conversion unit may convert power of rotational movement into power of linear movement. The power transfer unit may provide the converted power to the cargo box. The sliding mechanism may further include a rail. The cargo box may be able to slide using the rail based on power transferred by the power transfer unit.

In some implementations, the lifting mechanism may operate in accordance with a control signal received from the processor 171. The lifting mechanism may lift a shelf disposed in the cargo box. The lifting mechanism may include a drive unit, a power conversion unit, and a power transfer unit. The drive unit may convert electrical energy into kinetic energy. The drive unit may generate power. The drive unit may include at least one of a motor, an actuator, or a solenoid. The power conversion unit may convert the generated power into power suitable for moving a shelf. For example, the power conversion unit may convert power of rotational movement into power of linear movement. The power transfer unit may provide the converted driving fore to the shelf. The shelf may be lifted based on the power transferred by the power transfer unit.

Figure 16:
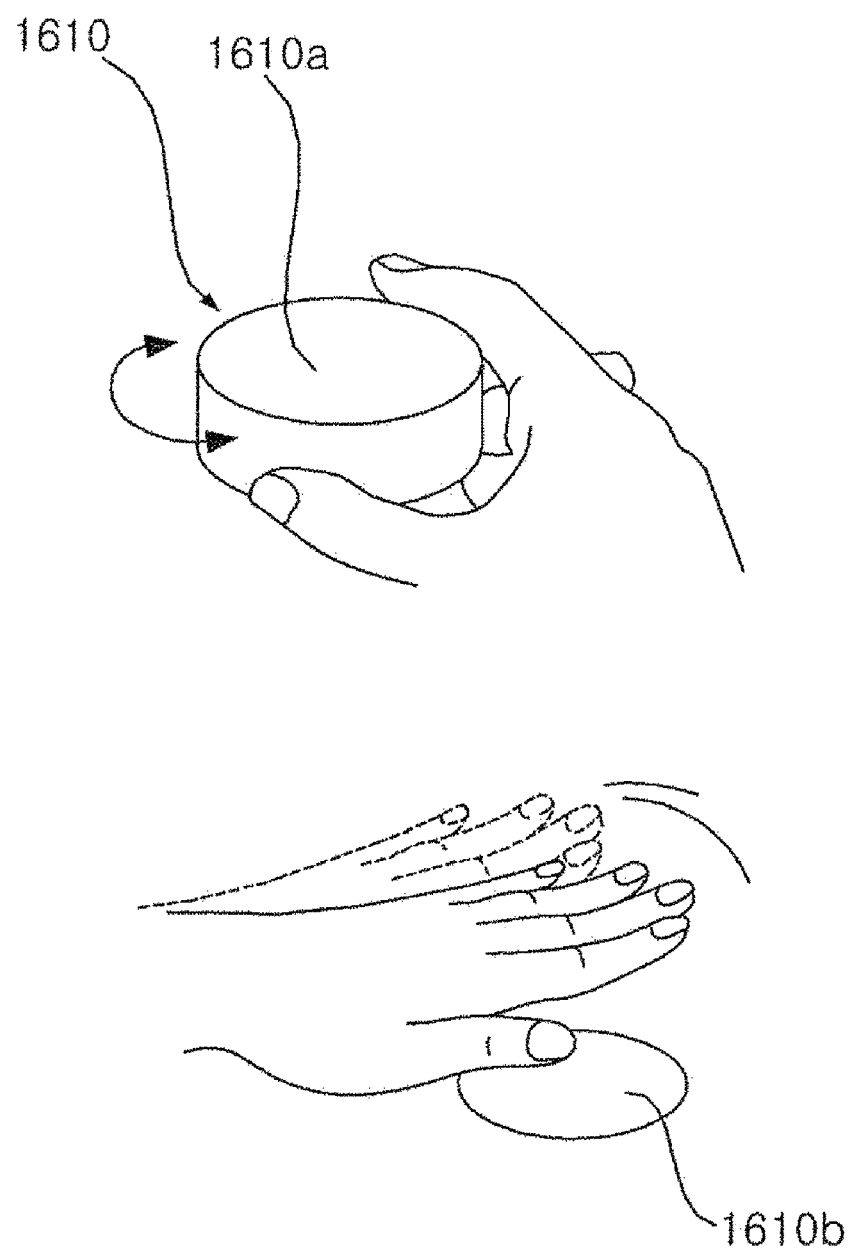

FIG. 16 is a diagram referred to for explaining an operation of a cabin system according to an implementation of the present disclosure.

Referring to FIG. 16, the input device 200 may further include a jog dial device 1610. The jog dial device 1610 may include a gesture sensor formed in at least one portion, the sensor configured to convert a user's gesture input into an electrical signal. The jog dial device 1610 may be retractable from at least one of a seat, an arm rest, or a door.

The jog dial device 1610 may receive a mechanical input in a state 1610a of protruding from the arm rest. In this case, the jog dial device 1610 function as the mechanical input unit 230. In a state 1610b in which the jog dial device 1610 is pressed into the arm rest, the jog dial device 1610 may receive a gesture input. In this case, the jog dial device 1610 may function as the gesture input unit 220.

The input device 300 may further include an elevating (raising and lowering) mechanism. The elevating mechanism may operate in accordance with a control signal from the processor 171. The elevating mechanism may include a drive unit, a power conversion unit, and a power transfer unit. The drive unit may generate power. For example, the drive unit may include at least one of a motor, an actuator, or a solenoid. The power conversion unit may convert the generated power into power suitable for moving the jog dial device. The power transfer unit may transfer the converted power to the jog dial device.

In response to a sitting position, the processor 171 may provide a control signal so as to raise or lower the jog dial device. When data on a first sitting position is acquired, the processor 171 may provide a control signal to the elevating mechanism such that the jog dial device forms a flat state with a neighboring structure (e.g., a seat, an arm rest, a door, etc.). The elevating mechanism may raise the jog dial device. In this case, the jog dial device may be in a first state 1610a. In the first state 1610a, the jog dial device may function as the mechanical input device 230. When data on a second sitting position is acquired, the processor 171 may provide a control signal to the elevating mechanism such that the jog dial device protrudes compared to a neighboring structure. The elevating mechanism may lower the jog dial device. In this case, the jog dial device may be in a second state 1610b. In the second state 1610b, the jog dial device may function as the gesture input unit 220.

In some implementations, when the sitting position is lowered (e.g., when the first sitting position is switched to the second sitting position), the processor 171 may provide a control signal such that a manipulation guidance image displayed on the upper surface of the jog dial device is displayed on the side surface of the jog dial device.

In some implementations, a user's sitting position may be classified into a first sitting position and a second sitting position. The first sitting position may be defined as a position indicating that the user sits on a seat, and the second sitting position may be defined as a position indicating that the user lies on a seat. The first sitting position may be a position relatively higher than the second sitting position, and the second sitting position may be a position relatively lower than the first sitting position.

FIG. 17 is a diagram referred to for explaining an operation of a cabin system according to an implementation of the present disclosure.

Referring to FIG. 17, the processor 171 may provide a disabled user interface based on first information. As illustrated with reference numeral 1710, the processor 171 may implement a haptic interface for a disabled user on one surface of a jog dial device. For example, the processor 171 may three-dimensionally implement manipulation guidance on one surface of a jog dial.

As illustrated with reference numeral 1720, the cabin system 100 may include a turn table 1721. The processor 171 may acquire information on a wheel chair through the imaging device 250. When it is determined that a wheel chair is placed on the turn table 1721, the processor 171 may rotate the turn table 1721 in a direction toward a seat for a user in the wheel chair.

Figure 18:
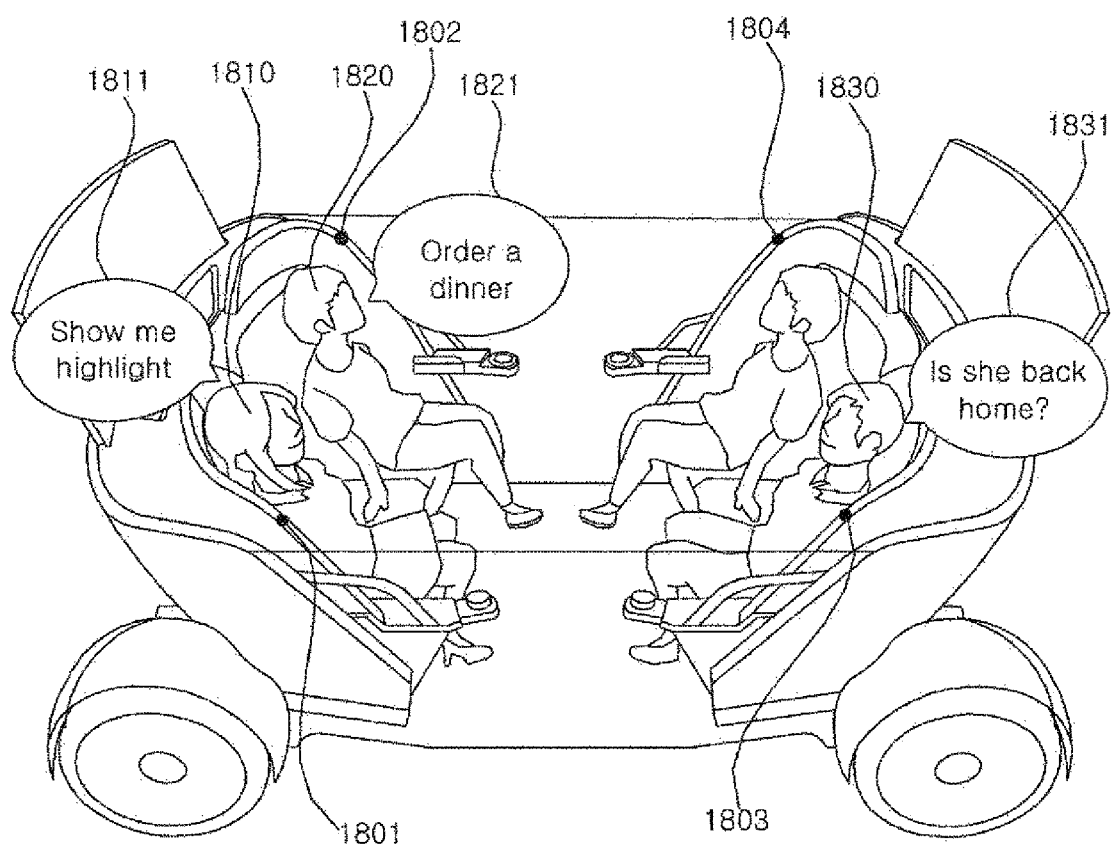

FIG. 18 is a diagram referred to for explaining an operation of a cabin system according to an implementation of the present disclosure.

Referring to FIG. 18, the input device 200 may include at least one beam forming microphone (MIC) 1801, 1802, 1803, or 1804. The processor 171 may identify a voice input through the beam forming MIC 1801, 1802, 1803, or 1804 as a first user's voice or a second user's voice. For example, the input device 200 may include multiple beam forming MICs 1801, 1802, 1803, and 1804 respectively disposed at multiple seats. The number of the multiple MICs 1801, 1802, 1803, and 1804 may correspond to the number of multiple seats. For example, the input device 200 may include a single beam forming MIC.

As illustrated in FIG. 18, the first beam forming MIC 1801 may receive a first voice 1811 of a first user 1810. The first beam forming MIC 1801 may receive a second voice 1821 of a second user 1820. The first beam forming MIC 1801 may receive a first voice 1831 of a third user 1830. The processor 171 may identify the first user 1810, the second user 1820, and the third user 1830 based on a speaker's location determined based on two MICs included in the beamforming MICs. The processor 171 may identify the first voice 1811, the second voice 1821, and the third voice 1831 based on the respective locations of the first user 1810, the second user 1820, and the third user 1830. The processor 171 may generate a control signal based on an identified voice input of each of the multiple user.

Figure 19:
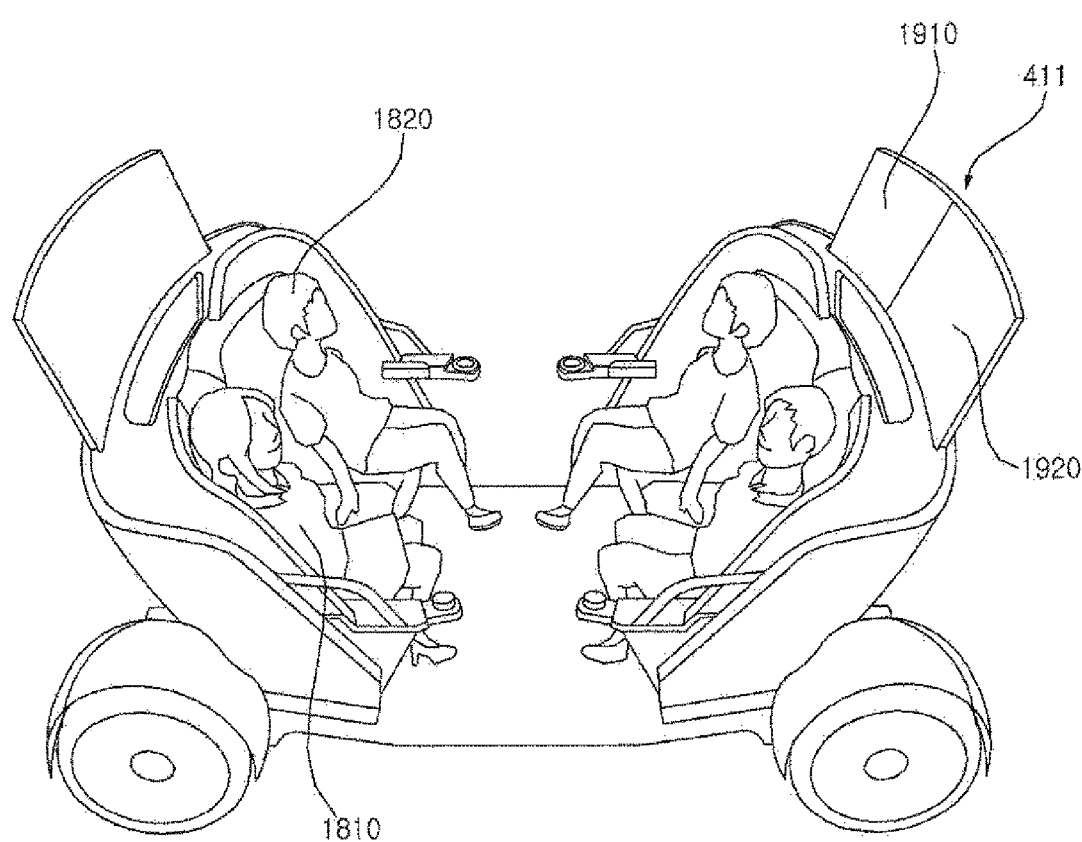

FIG. 19 is a diagram referred to for explaining an operation of a cabin system according to an implementation of the present disclosure.

Referring to FIG. 19, the input device 200 may receive a first input of a first user 1810, and a second input of a second user 1820. The first input and the second input may be inputs for requesting output of a content.

The first input and the second input may correspond to different contents, respectively. The first input may be an input for requesting output of a first content, and the second input may be an input for requesting output of a second content. In this case, the processor 171 may divide a display region of the display 411 into a first region 1910 and a second region 1920. The processor 171 may display the first content corresponding to the first input in the first region 1910, and the second content corresponding to the second input in the second region 1920.

Both the first input and the second input may correspond to the first content. The first input and the second input may be inputs that request outputting the first content. In this case, the processor may display the first content in the entire display region of the display 411.

Figure 20:
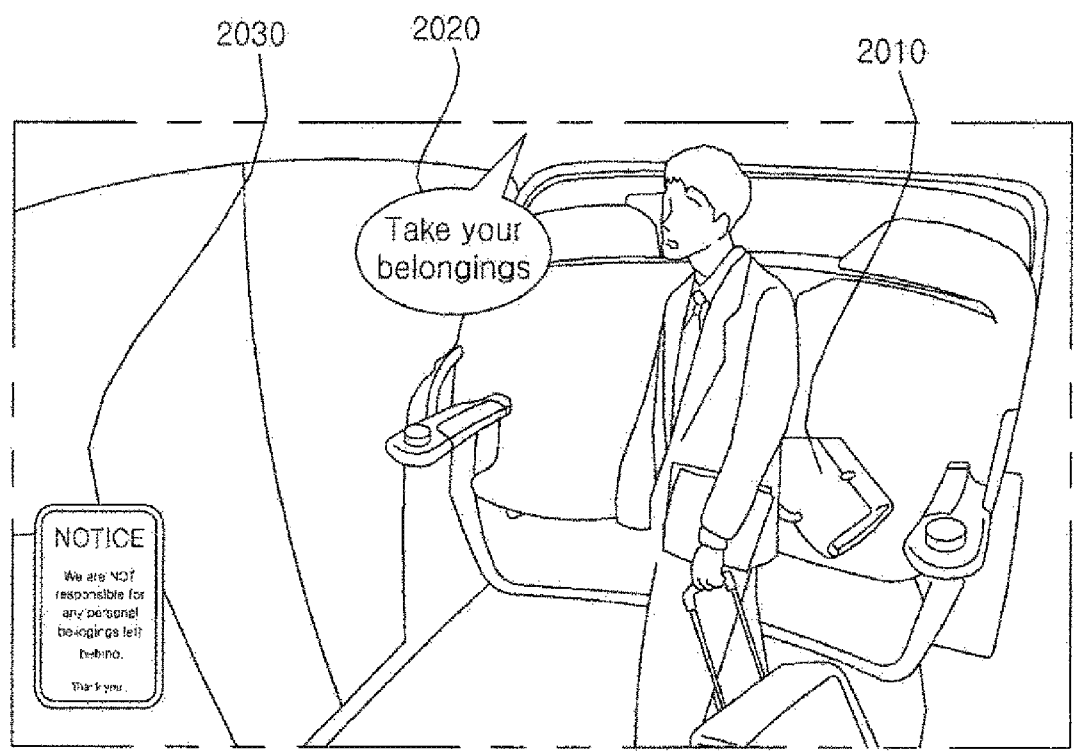

FIG. 20 is a diagram referred to for explaining an operation of a cabin system according to an implementation of the present disclosure.

Referring to FIG. 20, the processor 171 may detect a belonging 2010 of a first user from an image of the inside of the cabin. The processor 171 may receive image data from the internal camera 251. The processor 171 may detect the belonging 2010 of the first user based on the image data. For example, the processor 171 may detect the belonging 2010 by detecting an increase in volume caused by the presence of the belonging 2010.

Based on the image of the inside of the cabin, the processor 171 may determine whether the first user is exiting the vehicle with a belonging left behind. Based on the image data acquired by the internal camera 251, the processor 171 may detect the belonging 2010 placed on a seat or on the floor and an exiting motion of the first user. When it is determined that the first user is exiting with the belonging 2010 left behind, the processor 171 may output an alarm 2010 or 2030 through at least one of a display of the display system 400 or the sound output unit 490.

Figure 21:
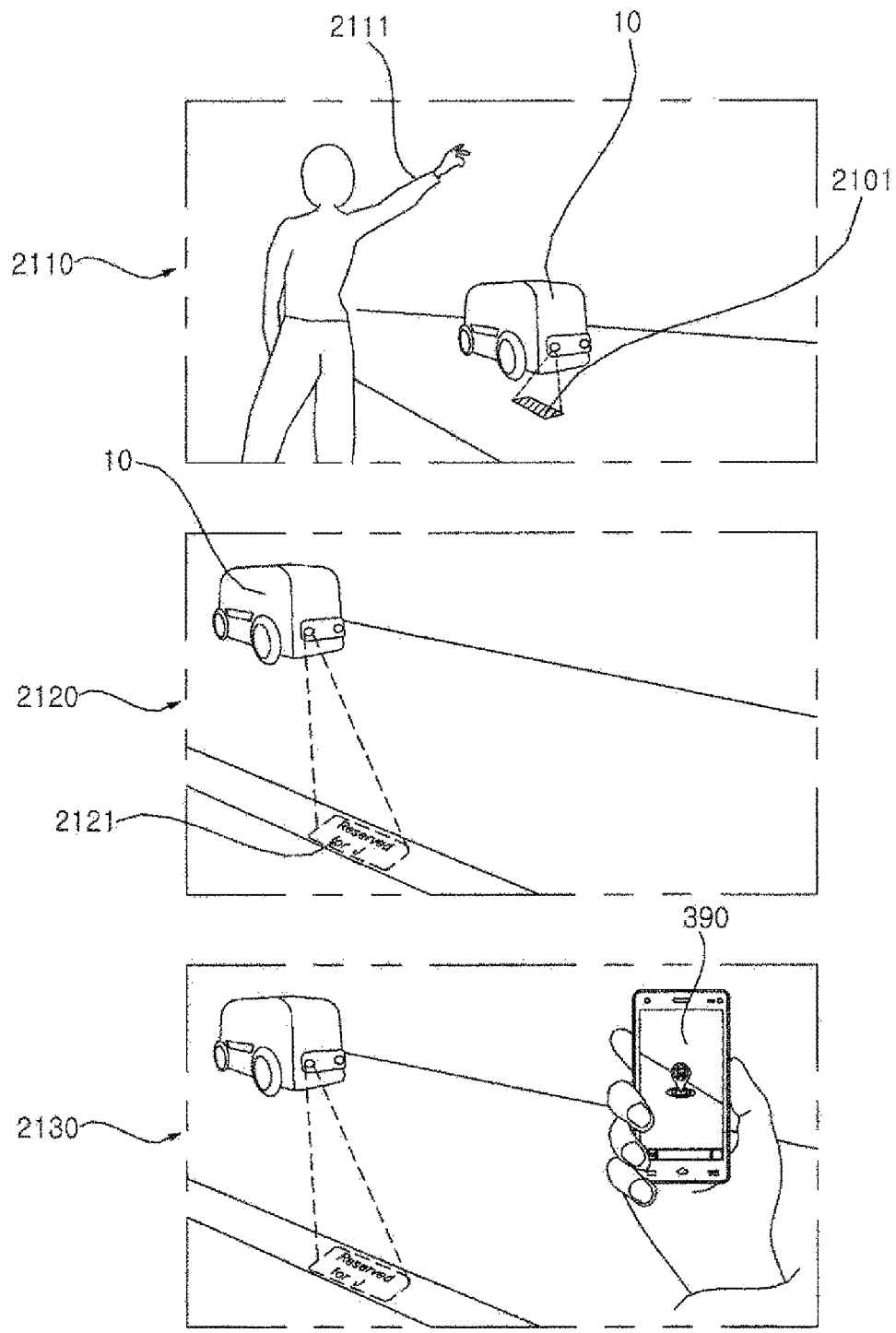

FIG. 21 is a diagram referred to for explaining an operation of a cabin system according to an implementation of the present disclosure.

Referring to FIG. 21, the vehicle 10 may operate in accordance with a gesture motion of a user located outside the vehicle 10. For example, as illustrated with reference numeral 2110, the vehicle 10 may detect the user's waving motion 2111 through a camera included in the object detection device. In this case, using a light output device, the vehicle 10 may output first light 2101 to a road surface in a direction toward the user. The first light 2101 may be understood as a light used to notify another vehicle or a pedestrian that the vehicle 10 is approaching the user. As illustrated with reference numeral 2120, using a light output device, the vehicle 10 may output a second light 2121 in the surroundings of the user. The second light 2121 may be understood as a light used to notify a boarding location to the user. As illustrated with reference numeral 2130, the vehicle 10 may transmit boarding location information to a mobile terminal 390 of the user. The mobile terminal 390 may display the boarding location information by using augmented reality. In doing so, the user is allowed to use the vehicle 10 without making a reservation.

Figure 22:
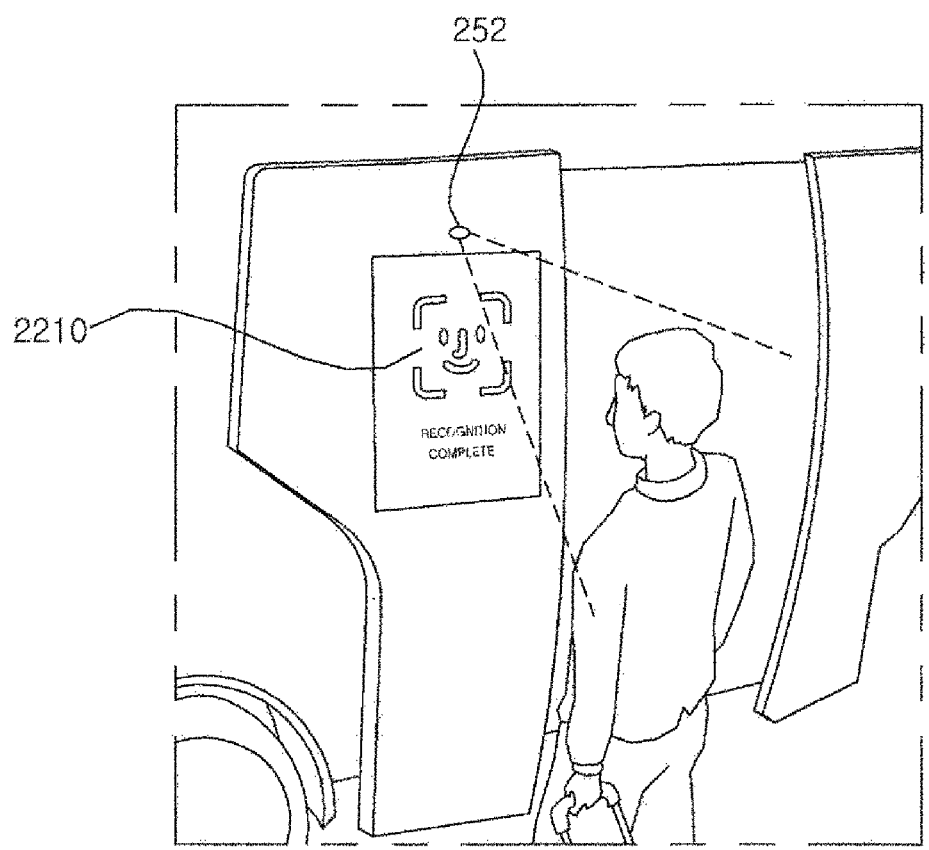

FIG. 22 is a diagram referred to for explaining an operation of a cabin system according to an implementation of the present disclosure.

Referring to FIG. 22, the external camera 252 may capture an image of a user. The processor 171 may acquire the user's information based on image data acquired by the external camera 252. For example, the processor 171 may acquire the user's body information, baggage information, and co-occupant information based on the image data acquired by the external camera 252. The processor 171 may specify the user based on the image data acquired by the external camera 252.

The cabin system 100 may further include an external display 2210. The external display 2210 may be classified as a sub-element of the display system 400. The external display 2210 may be disposed at one portion external to a door. The processor 171 may provide a prior boarding screen through the external display 2210. For example, the processor 171 may display a user information authorization screen or a user recognition completion screen on the external display 2210.

Figure 23:
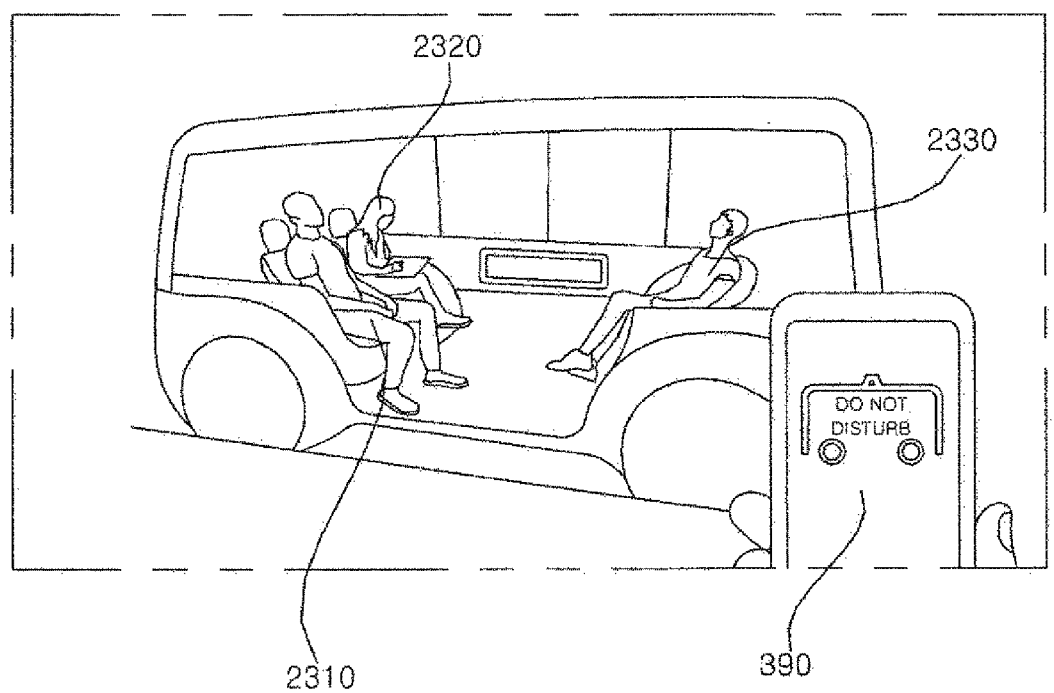

FIG. 23 is a diagram referred to for explaining an operation of a cabin system according to an implementation of the present disclosure.

Referring to FIG. 23, the cabin system 100 may provide various onboard modes to a user. The processor 171 may provide a user with a mode selected based on a user input. Mode selection may be carried out using the mobile terminal 390 before the user gets on the vehicle 10. Alternatively, mode selection may be carried out using the input device by a user in the cabin.

The cabin system 100 may further include a light output device. The light output device may include multiple light sources disposed to correspond to multiple seats, respectively. For example, the processor 171 may provide a sleep mode 2310 in accordance with an input for sleep mode selection. When the sleep mode 2310 is selected, the processor 171 may control the light output so as not output light toward the user. For example, the processor 171 may provide a reading mode 2320 in accordance with an input of reading mode selection. When the reading mode 2320 is selected, the processor 171 may control the light output device to output light toward the user.

For example, the processor 171 may provide a multi-media mode 2330 in accordance with an input for multi-media selection. When the multi-media mode is selected, the processor 171 may provide a multi-media content to a user. For example, the processor 171 may provide at least one of a drama, a movie, a TV program, or a music video. In this case, the processor 171 may provide a content whose running time corresponds to a user's moving time. In some implementations, the processor 171 may provide a game content. The processor 171 may provide a game interface to multiple users so that the multiple users enjoy the same game.

Figure 24:
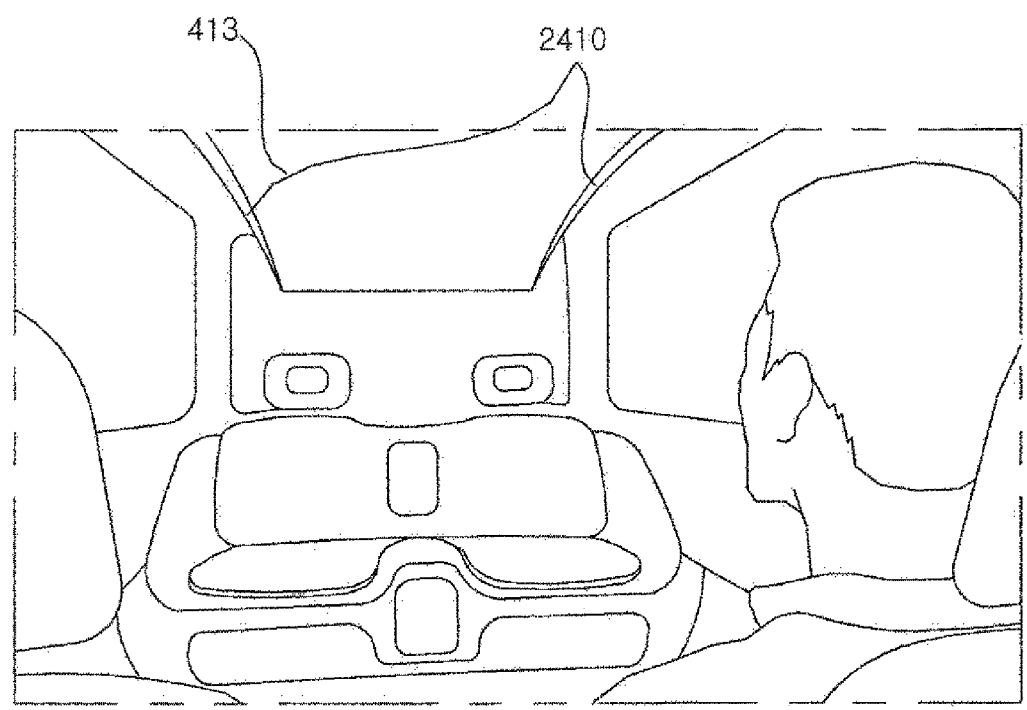

FIG. 24 is a diagram referred to for explaining an operation of a cabin system according to an implementation of the present disclosure.

Referring to FIG. 24, the cabin system 100 may further include a light output region 2410. The light output region 2410 may be disposed around a display 413 of the display system 400. The light output region 2410 may be disposed at both lateral side of the boundary of the display 413. The processor 171 may control a light output pattern of the light output region disposed at both lateral side of the display 413 of the display system 400. The processor 171 may perform control so as to change light to be output from each part of the light output region 2410.

The processor 171 may receive, through the interface unit 180, speed data of the vehicle from at least one electronic device installed at the vehicle 10. Based on the speed data, the processor 171 may control a light output pattern of the light output region 2410. For example, based on the speed data, the processor 171 may control a speed at which light is output from each part of the light output device 2410. In doing so, a user watching a content output from the display 413 may recognize movement of the vehicle 10 and thus avoid car sickness.

Figure 25:
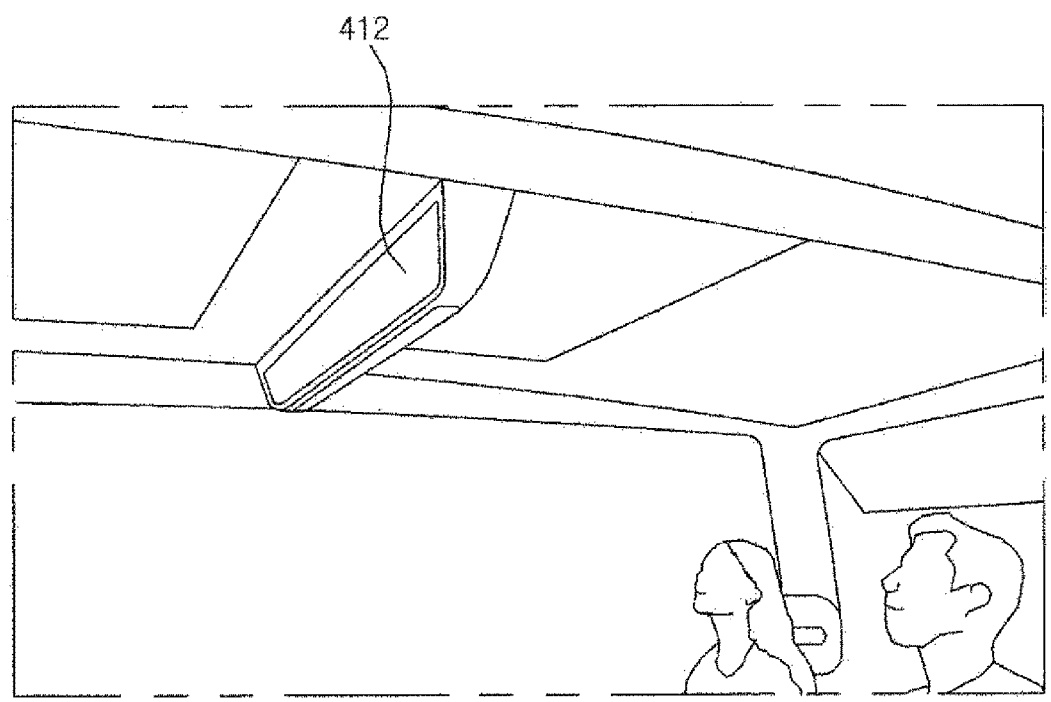

FIG. 25 is a diagram referred to for explaining an operation of a cabin system according to an implementation of the present disclosure.

Referring to FIG. 25, the processor 171 may display, on a display 412 of the display system 400, information on a geographical feature around the vehicle 10. The processor 171 may perform control such that a content displayed on the display 412 of the display system 400 is displayed in link with the geographical feature around the vehicle 10. For example, the processor 171 may receive, from at least one electronic device installed at the vehicle 10 through the interface unit 180, data indicating whether or not the vehicle 10 is going to go over a corresponding bump. Based on data on the corresponding bump, the processor 171 may change a location of a content display region. In doing so, a user watching a content output on the display 413 may be able to recognize movement of the vehicle 10 and thus avoid car sickness.

FIG. 26 is a diagram referred to for explaining an operation of a cabin system according to an implementation of the present disclosure.

As illustrated with reference numeral 2610, the display system 400 may further include a window screen 2613 and 2614. The window screen may be provided in at least one region of a vehicle window 1611 and 2612. The window screen may be implemented as a transparent display. The processor 171 may provide a control signal to the window screen. The window screen 2613 and 2614 may be provided as multiple windows 2611 and 2612 respectively disposed in the vicinity of multiple seats. The processor 171 may display a content requested by each of the multiple users on a corresponding window screen out of the multiple window screens. The processor 171 may display a content requested by a user on a window screen 2613 or 2614 closest to the user. For example, the processor 171 may display a first content requested by a first user 2616 on a first window screen 2613 closest to the first user 2616. In addition, the processor 171 may display a second content requested by a second user 2617 on a second window screen 2614 closest to the second user 2617. A user is able to watch a content displayed on the window screen 2613 or 1614 while looking over the window 2611 or 2612.

As illustrated with reference numeral 2620, a window screen 2622 may implement a window blind function. For example, the window screen 2622 may adjust an amount of light to be irradiated to a window 2621. The processor 171 may control a window screen 2622 based on a user input. Based on a user's touch or gesture 2623 on the window screen 2622, the processor 171 may control the window screen 2622 such that at least a partial region 2624 of the window blind region is removed, allowing the user to see through the partial region 2624.

Figure 27:
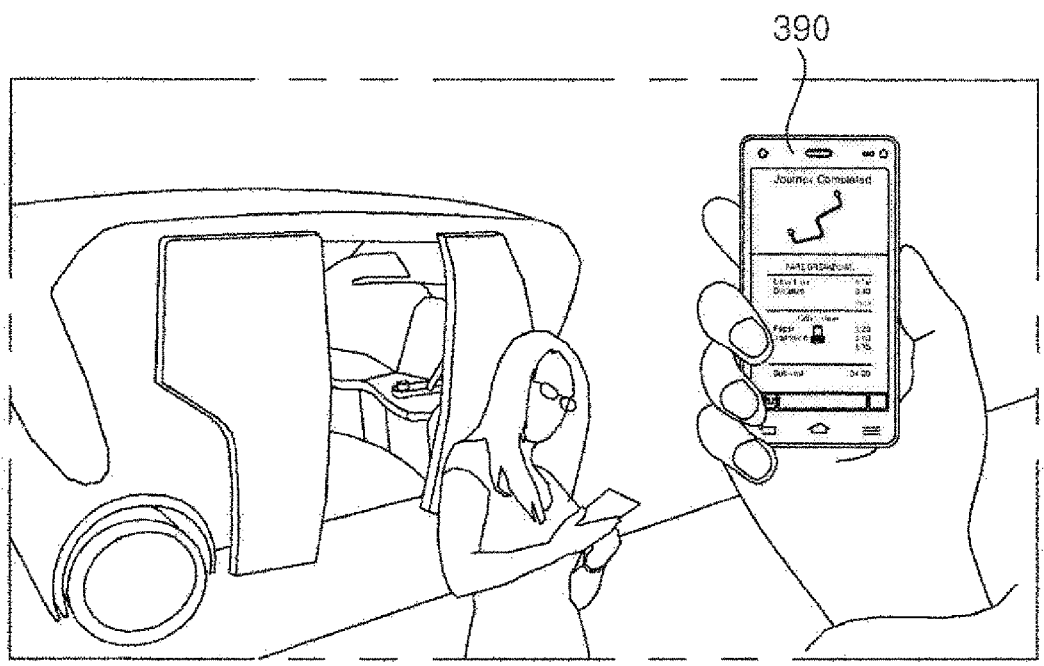

FIG. 27 is a diagram referred to for explaining an operation of a cabin system according to an implementation of the present disclosure.

Referring to FIG. 27, when a user's exiting information is acquired, the processor 171 may transmit data related to the user's usage of the cabin system to the mobile terminal 390 through the communication device 300. For example, the processor 171 may transmit, to the mobile terminal 390, information on the user's route, information on a function used by the user, and information on a cost charge for the use by the user. The mobile terminal 390 may display the data related to the usage of the cabin system.

Figure 28:
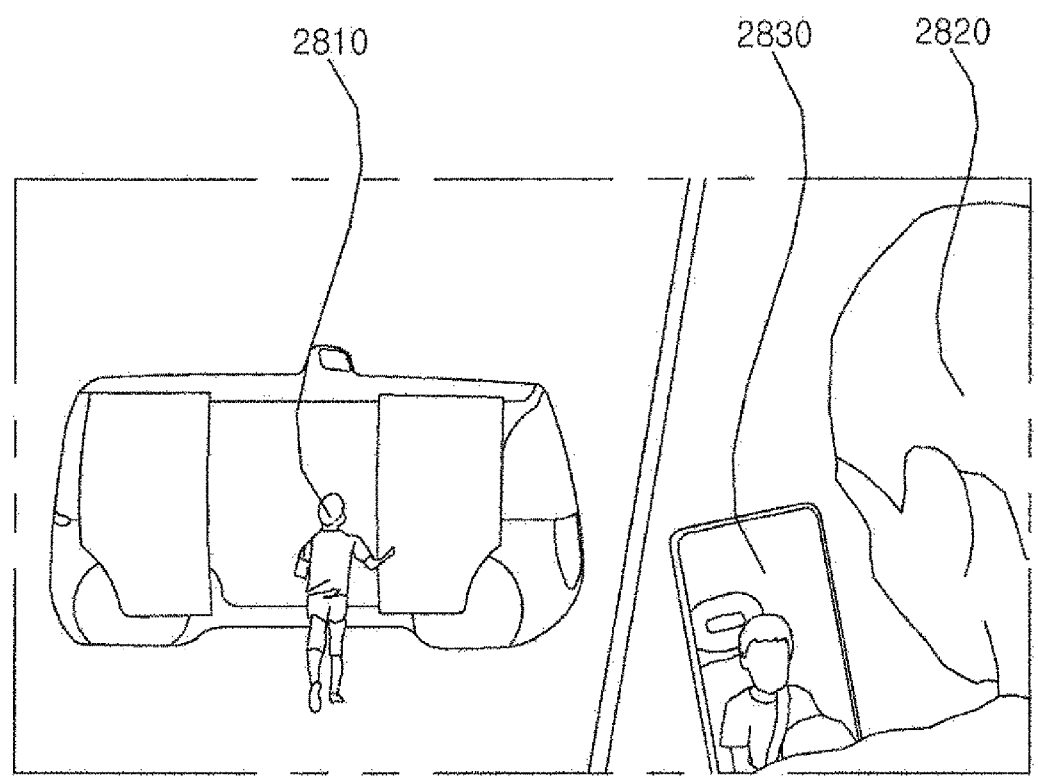

FIG. 28 is a diagram referred to for explaining an operation of a cabin system according to an implementation of the present disclosure.

Referring to FIG. 28, the cabin system 100 may provide a guardian alarm function. The processor 171 may transmit information on a situation of an occupant 2810 to a terminal 2830 of a user 2820. The user 2820 may be a guardian of the occupant 2810.

The user 2820 may reserve the vehicle 10 for the occupant 2810 and request information on the occupant 2820. The processor 272 may transmit getting-on information, location information, and getting-off information of the occupant 2810. The processor 171 may transmit images of the occupant 2810, captured by the internal camera 251 and the external camera 252, to the terminal 2830 of the user 2820. The terminal 2830 may display information provided from the cabin system.

FIG. 29 is a diagram referred to for explaining an operation of a cabin system according to an implementation of the present disclosure.

Referring to FIG. 29, the cabin system 100 may provide a shopping function and a hotel reservation function. As illustrated with reference numeral 2910, the processor 171 may display a shopping content 2911 and 2914, received from a shopping server, on a display of the display system 400. The processor may receive an item purchase input 2912 or 2913 associated with the shopping content 2911 or 2914 through the input device 200. The processor 171 may transmit a user's item purchase input data to the shopping server through the communication device 300. In some implementations, the shopping content 2911 or 2914 may be about an item relating to an item provided by the cargo system 500. When a user's purchase input on an item relating to an item provided by the cargo system 500, the processor 171 may transmit purchase input data including discounted price data to the shopping server.

As illustrated with reference numeral 2920, the processor 171 may display a hotel reservation content 2921, received from a hotel server, through a display of the display system 400. The processor 171 may receive a hotel reservation input through the input device 200. The processor 171 may transmit hotel reservation input data to the hotel server through the communication device 300.

Figure 30:
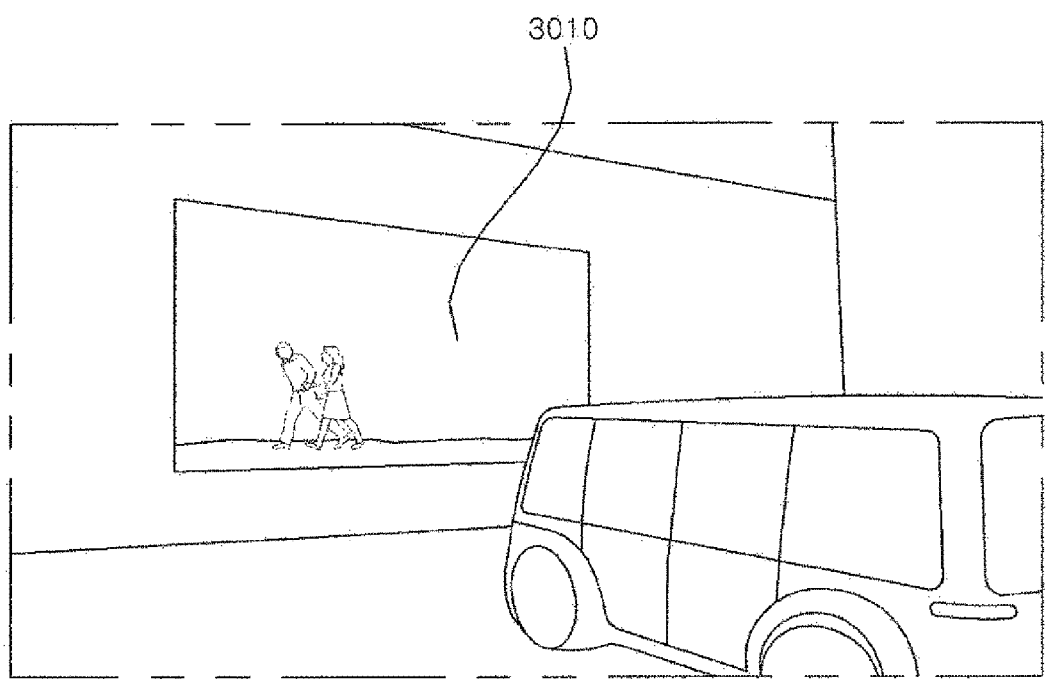

FIG. 30 is a diagram referred to for explaining an operation of a cabin system according to an implementation of the present disclosure.

Referring to FIG. 30, the cabin system 100 may provide a function of playing a movie on an external screen. The processor 171 may provide a control signal to an external light output device. The processor 171 may provide a control signal such that a selected content is projected onto the external screen by the external light output device.

FIG. 31 is a diagram referred to for explaining an operation of a cabin system according to an implementation of the present disclosure.

Referring to FIG. 31, the cabin system 100 may provide a function of alarming potential collision with an external object. As illustrated with reference numeral 3110, the processor 171 may receive data on an object located around the vehicle 10 from an external object detection device. The processor 171 may acquire data on whether or not a user is about to get off, from at least one of the input device 200, the imaging device 250, the communication device 300, the seat system 600, or the memory 175. When a risky object exists around the vehicle 10 while the data on whether or not a user is about to get off is acquired, the processor 171 may output an alarm 3112. In this case, the processor 171 may output an image of a region around the vehicle 10.

As illustrated with reference numeral 3120, the display system 400 may further include an external display. The external display may be disposed at one portion of the exterior of the vehicle 10. When data on whether a user is about to get off is acquired, the processor 171 may output an alarm 3121 on the external display. The processor 170 may receive data on an operation of the vehicle 10 from at least one electronic device, provided in the vehicle, through the interface unit 180. The processor 171 may display a content on the external display based on the data on the operation of the vehicle 10. When data on stopping of the vehicle 10 is acquired, the processor 171 may display the alarm 3121 on the external display.

Figure 32:
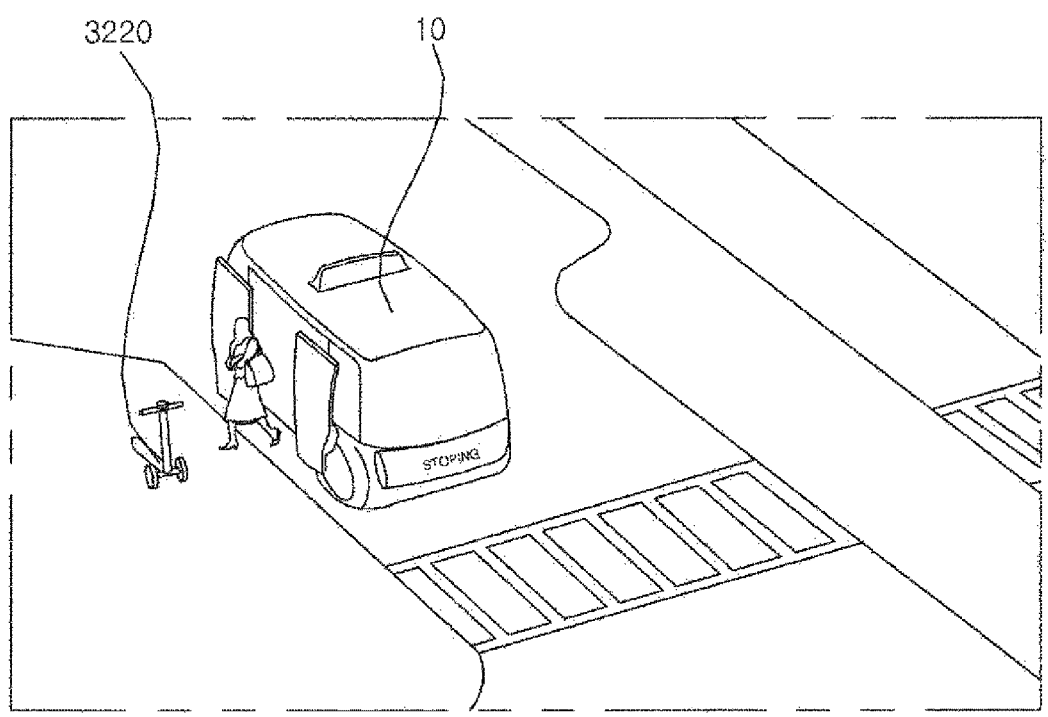
FIGS. 32 to 36 are diagrams illustrating an operation of a cabin system according to an implementation of the present disclosure

FIG. 32 is a diagram illustrating an operation of a cabin system according to an implementation of the present disclosure.

Referring to FIG. 32, the cabin system 100 may provide a function that interworks with a personal mobility vehicle 3220. The processor 171 may exchange signals with a management server via the communication device 300. The processor 171 may receive information on an available personal mobility vehicle 3220 from the management server. Based on destination information, the processor 171 may request the management server so that the personal mobility vehicle 3220 is assigned to a get-off location. The processor 161 may provide information on the available personal mobility vehicle 3220 via at least one of the display system 400 or the sound output unit 490. Alternatively, the processor 171 may provide information on the available personal mobility vehicle 3220 via the communication device 300 and the mobile terminal 390. The information on the mobility vehicle 3220 may include at least one of location information, availability information, remaining energy information, and movable distance information of the mobility vehicle 3220.

Figure 33:
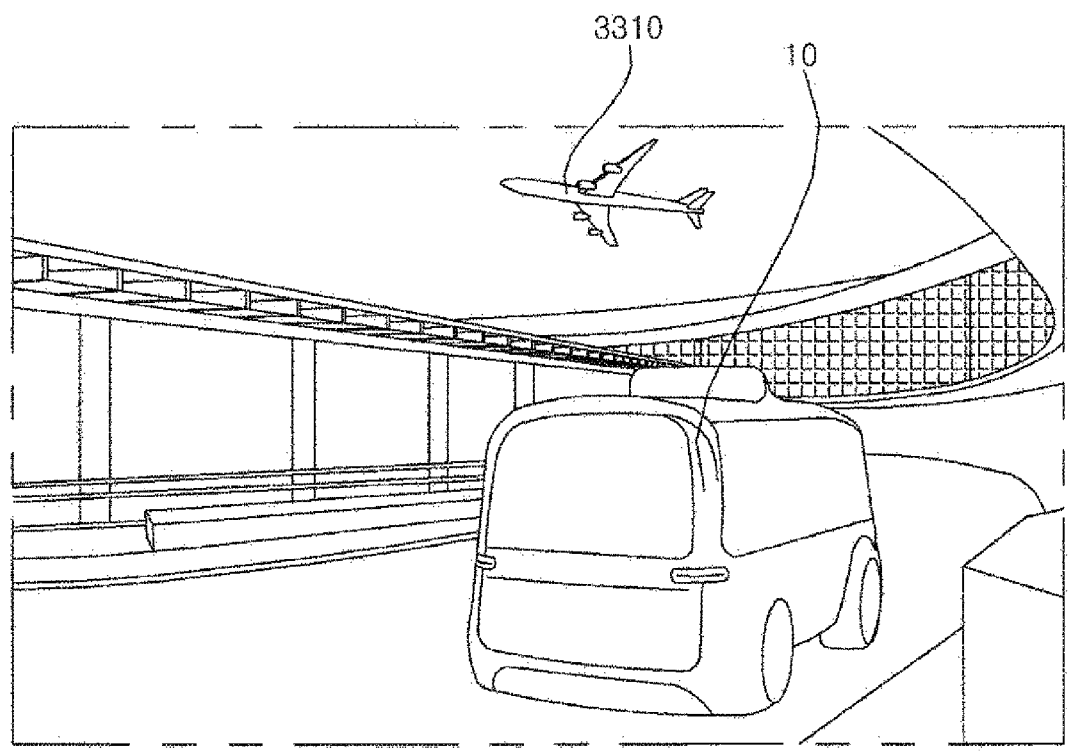

FIG. 33 is a diagram illustrating an operation of a cabin system according to an implementation of the present disclosure.

Referring to FIG. 33, the cabin system 100 may provide a function that interworks with an aviation service. The processor 171 may exchange signals with a management server. The processor 171 may receive at least one of anticipated departure information or anticipated arrival information of an airplane 3310 from the management server. The processor 171 may set an airport arrival time based on at least one of the anticipated departure information or the anticipated arrival information of the airplane 3310. The processor 171 may provide a control signal such that the vehicle 10 arrives at the airport at the set arrival time.

Figure 34:
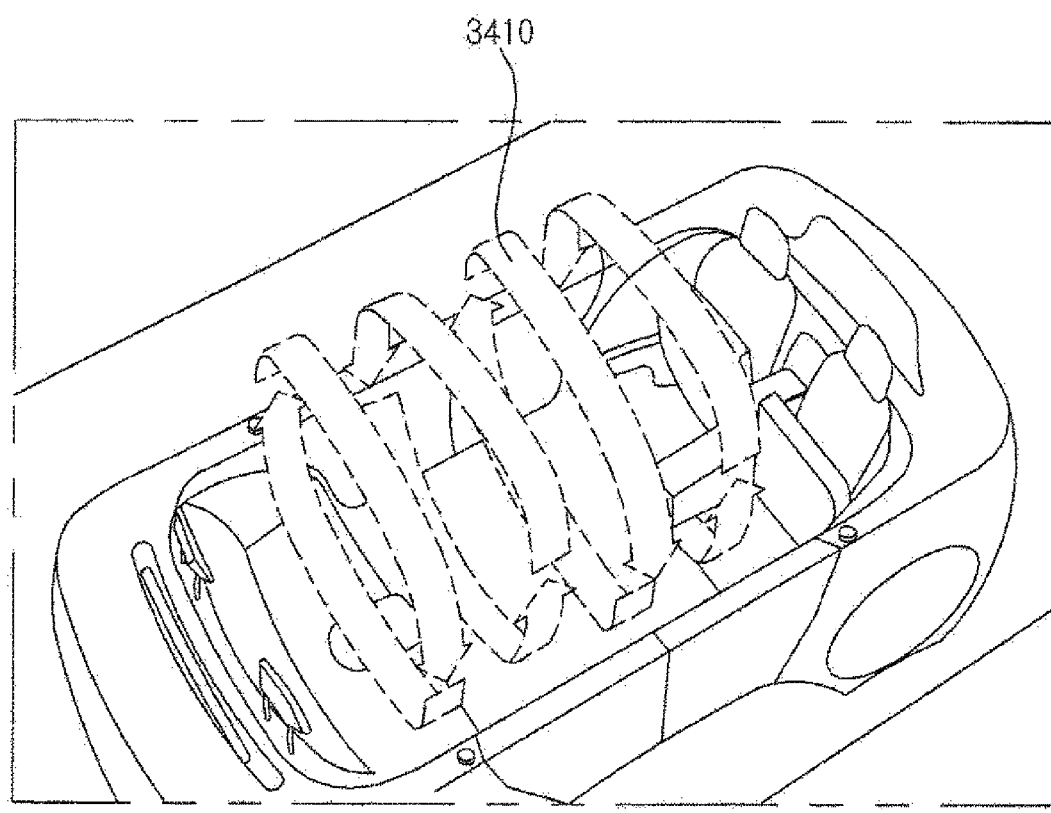

FIG. 34 is a diagram illustrating an operation of a cabin system according to an implementation of the present disclosure.

Referring to FIG. 34, the cabin system 100 may provide a cleaning function. The cabin system 100 may further include an automatic cleaning system. The processor 171 may provide a control signal to an automatic cleaning system such that an automatic cleaning operation is performed during a downtime of the cabin system 100. The processor 171 may manage a sanitary condition of the interior of the cabin by irradiating ultraviolet light 3410 in the cabin.

Figure 35:
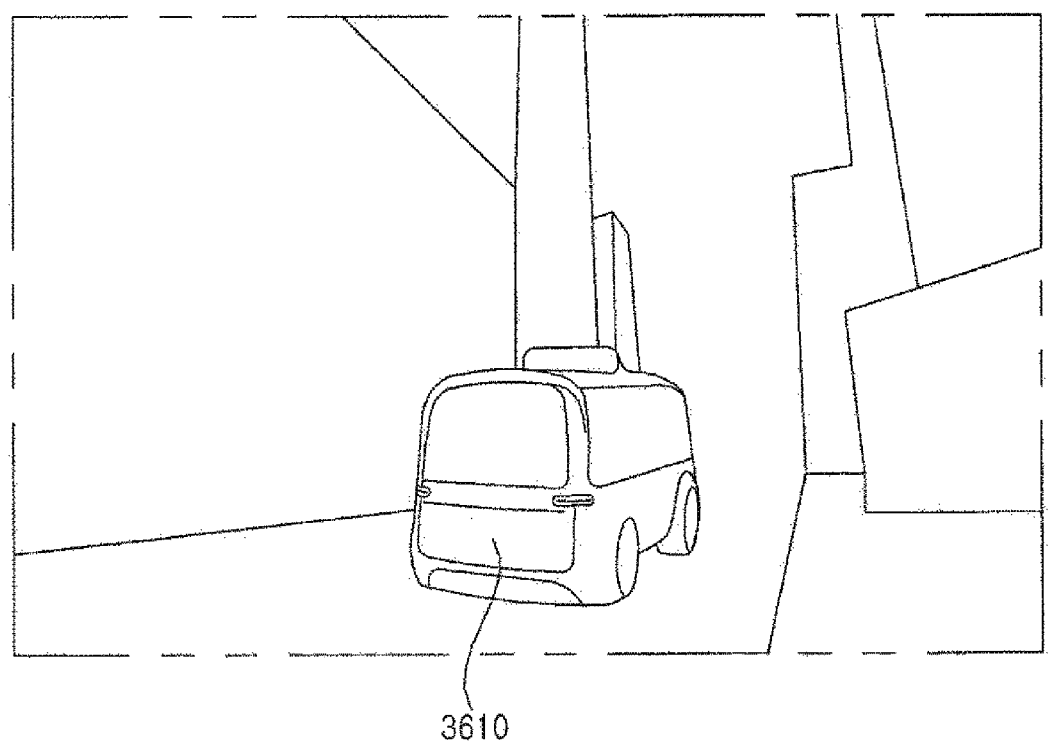

FIG. 35 is a diagram illustrating an operation of a cabin system according to an implementation of the present disclosure.

Referring to FIG. 35, the cabin system 100 may provide an advertising function using an external display 3610. The display system 400 may further include the external display 3610. The processor 171 may receive advertisement data from an advertisement server via the communication device 300. The processor 171 may provide a control signal such that a content based on the advertisement data is displayed on the external display 3610.

Figure 36:
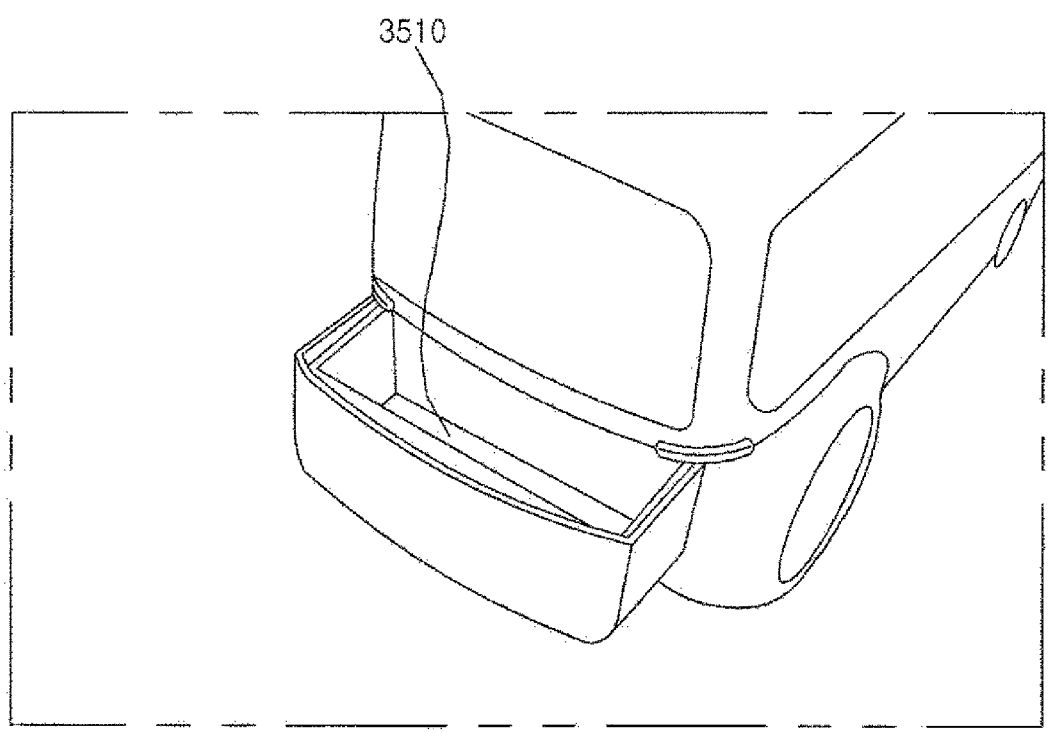

FIG. 36 is a diagram illustrating an operation of a cabin system according to an implementation of the present disclosure.

Referring to FIG. 36, the cabin system 100 may further include a trunk 3510. The trunk 3510 may be in a module form. The trunk in the module form may be replaced depending user information. For example, a supplementary battery package may be provided in a first trunk. As another example, a cargo box loaded with items may be provided in a second trunk. As another example, a clothing care styler may be provided in a third trunk. A space formed in the vehicle 10 may accommodate the module-type trunk 3510. As the module-type trunk 3510 suitable for user information is provided, it is possible to provide an appropriate function in response to a user request.

Figure 37:
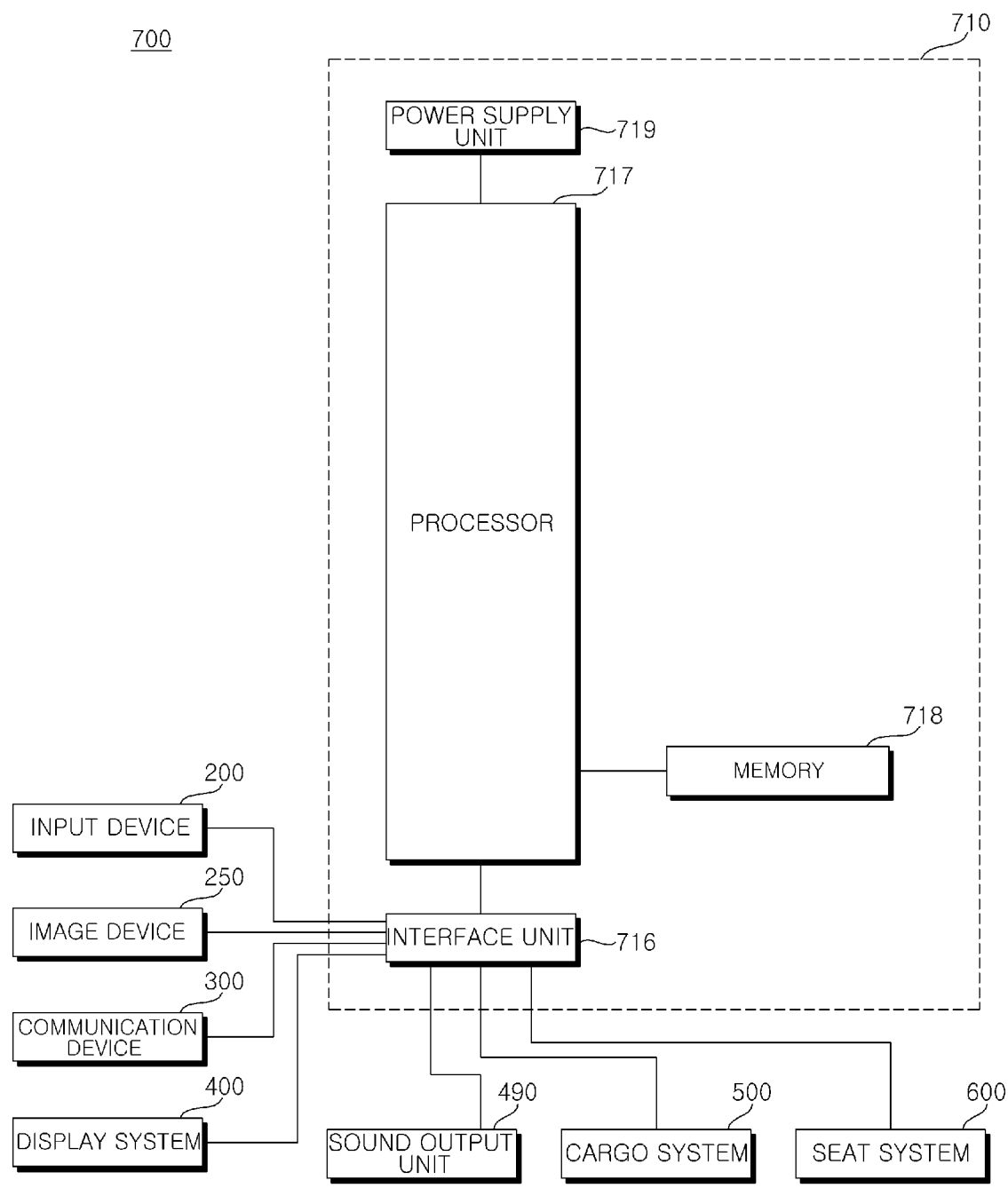
FIG. 37 is a control block diagram of a payment system according to an implementation of the present disclosure.

FIG. 37 is a control block diagram of a payment system according to an implementation of the present disclosure.

Referring to FIG. 37, the payment system 700 may include an input device 200, an imaging device 250, a communication device 300, a display system 400, a sound output unit 490, a cargo system 500, a seat system 600, and an electronic device 710. In some implementations, the payment system 700 may omit some of the aforementioned components, or may further include another component.

The description provided with reference to FIGS. 1 to 37 may apply to the input device 200, the imaging device 250, the communication device 300, the display system 400, the sound output unit 490, the cargo system 500, and the seat system 600.

The electronic device 710 may perform operations associated with implementation of the present disclosure, such as charging a vehicle occupant a particular cost for items in the vehicle, based on data acquired by sensors of the vehicle (e.g., based on image data acquired by processing one or more images detected by image sensors, such as imaging device 250). To this end, the electronic device 710 may include at least one interface unit 716, at least one processor 717, at least one memory 718, and a power supply 719.

The interface unit 716 may exchange signals with at least one electronic device installed in the vehicle 10. In a wired or wireless manner, the interface unit 716 may exchange signals with at least one electronic device provided in the cabin system 100. The interface unit 716 may exchange signals with at least one of the input device 200, the communication device 300, the display system 400, the sound output device 490, the cargo system 500, or the seat system 600. The interface unit 716 may be electrically connected to the processor 171 and provide a received signal to the processor 171. The interface unit 716 may be at least one of a communication module, a terminal, a pin, a cable, a port, a circuit, an element, or a device.

The interface unit 716 may exchange signals with at least one internal camera 251 for capturing an image of the interior of the cabin. The internal camera 251 may be provided as a plurality of cameras. For example, the internal camera 251 may be provided as a plurality of cameras for capturing images of a plurality of users in a plurality of seats. The interface unit 716 may exchange signals with the plurality of internal cameras 251. The internal camera 251 may be a single camera. For example, the internal camera 251 may be disposed at a ceiling to capture images of a plurality of users. The interface unit 716 may exchange signals with the single internal camera 251.

The interface unit 716 may receive a signal from the seat system 600 in response to detection of a user's sitting on a seat. The seat system 600 may include a sensor (e.g., a weight sensor) for sensing the user's sitting on the seat. The interface unit 716 may receive a signal from the sensor of the seat system 600 in response to the user's sitting on the seat.

The interface unit 716 may exchange signals with at least one external camera 252 for capturing an image of the outside of the vehicle 10.

The processor 171 may control overall operation of each unit of the electronic device 710. The processor 171 may be electrically connected to the interface unit 716, the memory 718, and the power supply 719. The processor 171 may be one of sub-controllers included in the main controller 171. The processor 171 may operate by power provided from the power supply 719.

The processor 717 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 171 may receive image data from at least one internal camera 251 via the interface unit 716. The image data may be an image of the interior of the cabin. The processor 171 may detect a user based on the image data. The processor 171 may detect the user's motion based on the image data.

In some implementations, when a signal indicative of detection of the user's sitting on a seat is received from the seat system 600, the processor 171 may receive image data from at least one internal camera that is associated with (e.g., assigned to) the seat of the specified user, from among a plurality of internal cameras.

In some scenarios, when the signal indicative of detection of the user's sitting on the seat is received from the seat system 600, the processor 171 may perform processing by distinguishing an image of a region corresponding to the seat for the specified user in the image data that is received from the at least one internal camera that is associated with that seat.

The processor 717 may generate cost charging data based on a detected motion of a user. The cost charging data may be data for charging the user a particular cost for items in the vehicle. The cost charging data may include, at least one of user information, information on a used service, price information, and payment type information.

The processor 717 may specify a user to be charged, based on image data acquired by the internal camera 251. For example, based on the image data, the processor 717 may specify one of a plurality users as a user to be charged. In some implementations, based on image data acquired by the external camera 251, the processor 171 may specify a user to be charged. The processor 171 may receive a signal from the seat system 600 via the interface unit 716 in response to detection of the user's setting on a seat. The processor 171 may specify a user to be charged, further based on the signal indicative of the detection of the user's sitting on the seat.

In some implementations, the processor 171 may compare image data that was acquired before a user is onboard the vehicle and image data that was acquired after the user is onboard the vehicle. For example, the image data may include (i) first image data that was generated based on a processing of at least one first image captured by the at least one internal camera before the user is onboard the vehicle, and (ii) second image data that was generated based on a processing of at least one second image captured by at least one internal camera after the user is onboard the vehicle. The processor 171 may track the user's motion by comparing these two image data.

In some implementations, the processor 717 may determine whether a detected motion of a user corresponds to at least one of a contamination cause motion, a breaking motion, or theft motion. The processor 171 may track a motion of a specified user by performing computer image processing. Based on the motion being tracked, the processor 717 may determine whether the motion of the specified user corresponds to at least one of a contamination cause motion, a breaking motion, or a theft motion. The contamination cause motion may relate to a contamination of the vehicle by the user, the breaking motion may relate to a breakage of items in the vehicle by the user, and the theft motion may relate to a theft of items in the vehicle by the user.

In some scenarios, the processor 171 may receive vehicle movement data via the interface unit 716. By comparing a time of a contamination cause motion of a user and a time of a vehicle motion, the processor 171 may determine whether the contamination cause motion of the user is based on the vehicle motion. For example, the processor 171 may determine whether a beverage spilling motion of a user happens when the vehicle 10 moves over a road-surface object (e.g., a bump). If it is determined that the contamination cause motion of the user is based on the vehicle motion, the processor 717 may not generate cost charging data or may generate cost charging data of a discounted price.

In some scenarios, the processor 717 may determine whether a contamination cause motion of a user is due to an item purchased by the user in the cabin. For example, the processor 717 may determine whether a contamination cause motion of a user is based on the user's exiting of the vehicle with a beverage container left in the cabin. If it is determined that the contamination cause motion of the user is due to the item purchased by the user in the cabin, then the processor 717 may not generate cost charging data or may generate cost charging data with a discounted price.

The processor 717 may, in some implementations, receive image data from at least one of the internal camera 251 or the at least one external camera 252. The processor 717 may then generate body profile data of a user based on the image data received from at least one of the internal camera(s) 251 or the external camera(s) 252. For example, the image data may include at least one of (i) first image data that was generated based on processing at least one first image captured by at least one internal camera 251, or (ii) second image data that was generated based on processing at least one second image captured by at least one external camera 252.

The body profile data may include, for example, at least one of the user's body size information or the user's body characteristic information (e.g., the user's body shape information, and information whether the user is the disabled). Based on the body profile data of the user, the processor 717 may track the user's motion. Based on a motion being tracked, the processor 717 may determine whether a motion of a specified user corresponds to at least one of a contamination cause motion, a breaking motion, or a theft motion.

Based on a user's motion, the processor 717 may determine whether an item in a cargo box is purchased. The cargo box may be any suitable storage area that is provided in the cabin to provide an item for the user. For example, a cargo box loaded with a plurality of items may be retractable from at least one portion of a seat.

In some implementations, the processor 717 may specify, from image data, a direction of the user's hand reaching for an item in the cargo box. The processor 717 may specify a user to be charged, based on the direction of the hand reaching. For example, when it is determined that a direction of a hand is reaching the cargo box from a first seat, the processor 717 may specify an occupant in the first seat as a user to be charged.

Additionally or alternatively, the processor 717 may detect an item selecting motion of a user and an item opening motion of a user who is specified from image data. When the item selecting motion and the item opening motion is detected from the image data, the processor 717 may determine that the specified user has purchased an item. The processor 717 may generate cost charging data including price information of the purchased item.

In addition or as an alternative to processing image data from cameras, the processor 717 may also process data that was captured by other types of sensors, in order to determine whether a user has purchased an item.

For example, in some implementations, the processor 717 may receive sensing data via the interface unit 716 from a weight sensor for the cargo box. Based on the received sensing data (e.g., indicating whether there has been a change in a weight of the cargo box), the processor 717 may determine whether or not a user has purchased an item.

As another example, in some implementations, the cargo box may include a light emitting device. The light emitting device may include at least one light source whose output corresponds to a plurality of items (e.g., there may be a plurality of light sources that correspond to the plurality of items). In response to a signal corresponding to selection of one of the plurality of items, the light emitting device may change output light from the at least one light source (e.g., by outputting light from one of the plurality of light sources). For example, the cargo box may include a plurality of storage areas (e.g., pockets), and when a change in light around a particular pocket of the cargo box is detected from image data, then the processor 717 may determine that a specified user purchases an item kept in the particular pocket of the cargo box.

In some implementations, the processor 717 may communicate with other electronic devices in the vehicle 10 based on detecting a motion of the user that indicates a purchase of an item.

For example, when an item selecting motion of the user is detected, the processor 717 may provide, to at least one another electronic device provided in the vehicle 10, a signal to output item selection information. Based on a provided signal, at least one of the display system 400 or the sound output unit 490 may output item selection information. Based on a signal provided via the communication device 300, the mobile terminal 390 of a user may output item selection information.

As another example, when an item opening motion is detected, the processor 717 may provide, to at least one another electronic device provided in the vehicle 10, a signal to output item purchase information. Based on a provided signal, at least one of the display system 400 or the sound output unit 490 may output item purchase information. Based on a signal provided via the communication device 300, the mobile terminal 390 of a user may output item purchase information.

In some implementations, the processor 717 may detect that a motion of the user indicates a cancellation of an attempted purchase of an item. For example, when a motion of selecting an item and then putting the item back to the cargo box is detected from image data, the processor 717 may determine that a purchase of the item is canceled.

The processor 717 may store image data, which is the basis of cost charging, in the memory 718. The processor 717 may transmit cost charging data to the mobile terminal 390 of a user via the interface unit 716 and the communication device 300. In this case, via the interface unit 716 and the communication device 300 may transmit the stored image data together with the cost charging data to the mobile terminal 390 of the user. By checking an image received in the mobile terminal 390, the user is able to know the reason for the cost charging.

In some implementations, generating the cost charging data may be based on various other actions of the user and the vehicle, in addition to the user purchasing items. For example, the processor 717 may generate cost charging data based on at least one of a vehicle travel motion or a service provision motion.

For example, the cost charging data may be generated based on a vehicle travel operation. In such scenarios, a price based on the vehicle travel motion may be defined a fare for a vehicle's travelling from a start location where a specified user gets on to an end location where the specified user gets off.

As another example, the cost charging data may be generated based on a service provided to the user. In such scenarios, a price based on the service provision motion may be fees for a service that includes, for example, at least one of a seat massage function provision service, an in-vehicle air-conditioning/heating service, a content provision service provided using the display system 400, or a private space provision service.

The processor 717 may transmit cost charging data to one or more payment servers. The payment server may charge a specified user based on the cost charging data. For example, the cost charging data include card data of a user. The payment server may charge based on the card data. For example, the cost charging data may include mobile terminal data of a user. The payment server may charge using a mobile terminal.

The processor 717 may receive cost charging process result data from the payment server via the interface unit 716 and the communication device 300. The processor 717 may provide a signal to the display system 400 such that cost charging result information is displayed based on the cost charging process result data.

The processor 717 may detect an exiting motion of a user from the vehicle, for example based on image data received from at least one of the internal camera 251 or the external camera 252. When the exiting motion of the user is detected, the processor 717 may transmit cost charging data to the payment server.

The memory 718 is electrically connected with the processor 717. The memory 718 may store basic data for each unit, control data for the operational control of each unit, and input/output data. The memory 718 may store data processed by the processor 717. The memory 718 may be implemented as at least one of a ROM, a RAM, an EPROM, a flash drive, or a hard drive. The memory 718 may store various data for the overall operation of the electronic device 710 such as programs for the processing or control of the processor 717. In some implementations, the memory 718 may be integrally formed with the processor 717. The memory 718 may be driven by power supplied from the power supply 719.

The power supply 719 may supply power to the electronic device 710. The power supply 719 may be supplied with power from a power source included in the vehicle 10, and supply power to each unit of the electronic device 710. The power supply 719 may operate in accordance with a control signal from the processor 717. For example, the power supply 719 may be implemented as a switched-mode power supply (SMPS).

The electronic device 710 may include at least one PCB. The interface unit 716, the processor 717, the memory 718, and the power supply 719 may be mounted on at least one PCB.

Figure 38:
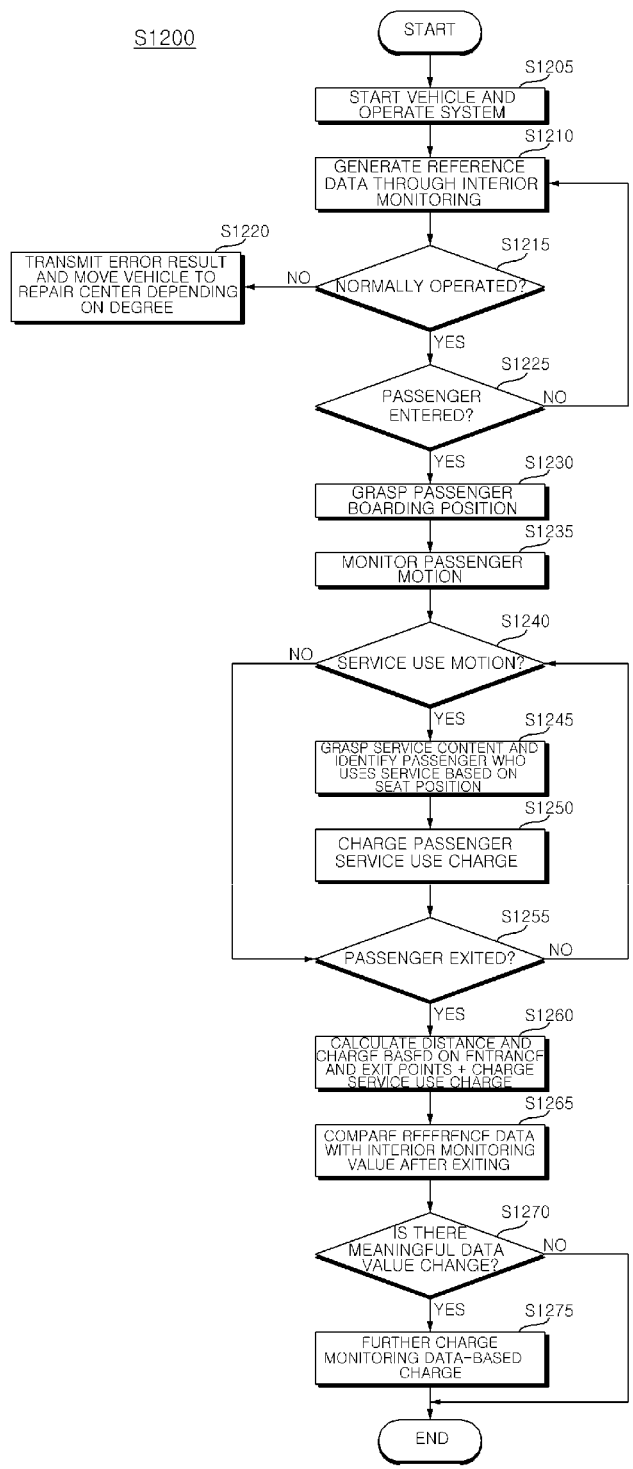
FIG. 38 is a flowchart illustrating an operation of a payment system according to an implementation of the present disclosure.

FIG. 38 is a flowchart illustrating an operation of a payment system according to an implementation of the present disclosure.

Referring to FIG. 38, when the vehicle 10 is powered-on, the payment system 700 operates (S1205).

The processor 717 may generate reference data through interior monitoring (S1210). Via the interface unit 716, the processor 717 may receive various types of data from various electronic devices in the cabin. The processor 717 may generate reference data based on the received data. For example, the processor 717 may acquire image data from at least one of the internal camera 251 or the external camera 252. The processor 717 may generate reference data based on the reference data. For example, the processor 717 may generate reference data for at least one of seat position data of a seat, basic volume data of a seat, data on a contamination level of a seat, data on the current operation status of a device in the cabin, data on breakage of any device in the cabin, or storage data of the cargo box.

The processor 717 may determine whether the cabin system 100 operates properly (S1215). Based on received data, the processor 717 may determine whether the cabin system 100 operates properly.

When the cabin system 100 does not operate properly, the processor 717 may transmit an error result to a management server, and provide a control signal to an Electronic Control Unit (ECU) of the vehicle such that the vehicle 10 moves to a repair center (S1220).

When the cabin system 100 operates properly, the processor 717 may determine whether a user (e.g., a passenger) is onboard, based on received data (S1225). For example, the processor 717 may determine whether a user is onboard, based on image data received from at least one of the internal camera 251 or the external camera 252. When it is determined that the user is not onboard, the processor 717 returns back to step S1210.

When it is determined that the user is onboard, the processor 717 may determine an onboard location of the user based on received data (s1230). For example, the processor 717 may determine an onboard location of the user based on image data received from the internal camera 251. By determining the onboard location of the user, the processor 717 may specify the user.

The processor 717 may monitor a motion of the user (S1235). For example, the processor 717 may monitor a motion of the user based on image data received from the internal camera 251.

The processor 717 may determine whether the user's motion is a service using motion (s1240). For example, the processor 727 may determine whether the user's motion is a motion of using a seat massage function, a motion of using a content of the display system 400, a motion of using a business seat (e.g., a motion of using a private space service), or a motion of purchasing an item in the cargo box.

When it is determined that the user's motion is a service using motion, the processor 717 may specify a service content and a service user (S1245). For example, the processor 717 may specify service content and a service user based on image data received from the internal camera 251. For example, the processor 717 may specify a service user based on sensing data received from the seat system 600.

The processor 717 may charge a price corresponding to a service used by a specified user (S1225). The processor 717 may generate first cost charging data based on a detected motion of the user. The first cost charging data may include at least one of information on the specified specific user, information on a used service, price information, and payment type information.

The processor 717 may determine whether a passenger is about to get off, based on received data (S1255). For example, the processor 717 may determine whether a passenger is about to get off based on image data received from at least one of the internal camera 251 or the external camera 252.

When it is determined that a passenger is about to get off, the processor 717 may generate second cost charging data, based on a price for a travel operation of vehicle 10 (S1260).

The second cost charging data may include at least one of information on a getting-on location and a getting-off location of a user, moving distance information, moving time information, price information, or payment type information. The processor 717 may compare the reference data generated in the step S1210 and image data acquired after the user gets off the vehicle 10 (S1265).

The processor 717 may determine whether there is a difference between the reference data and the image data acquired after the user gets off the vehicle 10 (S1270). For example, by comparison, the processor 717 may determine at least one of contamination of a seat, breakage of any device in the cabin, theft of any item in the cabin, or malfunction of any device in the cabin.

When it is determined that there is such a difference, the processor 717 may generate third cost charging data based on the difference (S1275). The third cost charging data may include at least one of information on the specified user, cost charging reason information, price information, or payment type information.

Then, the processor 717 may transmit a signal including cost charging data to the payment server via the interface unit 716 and the communication device 300. The cost charging data may include at least one of the first cost charging data, the second cost charging data, or the third cost charging data.

Figure 39:
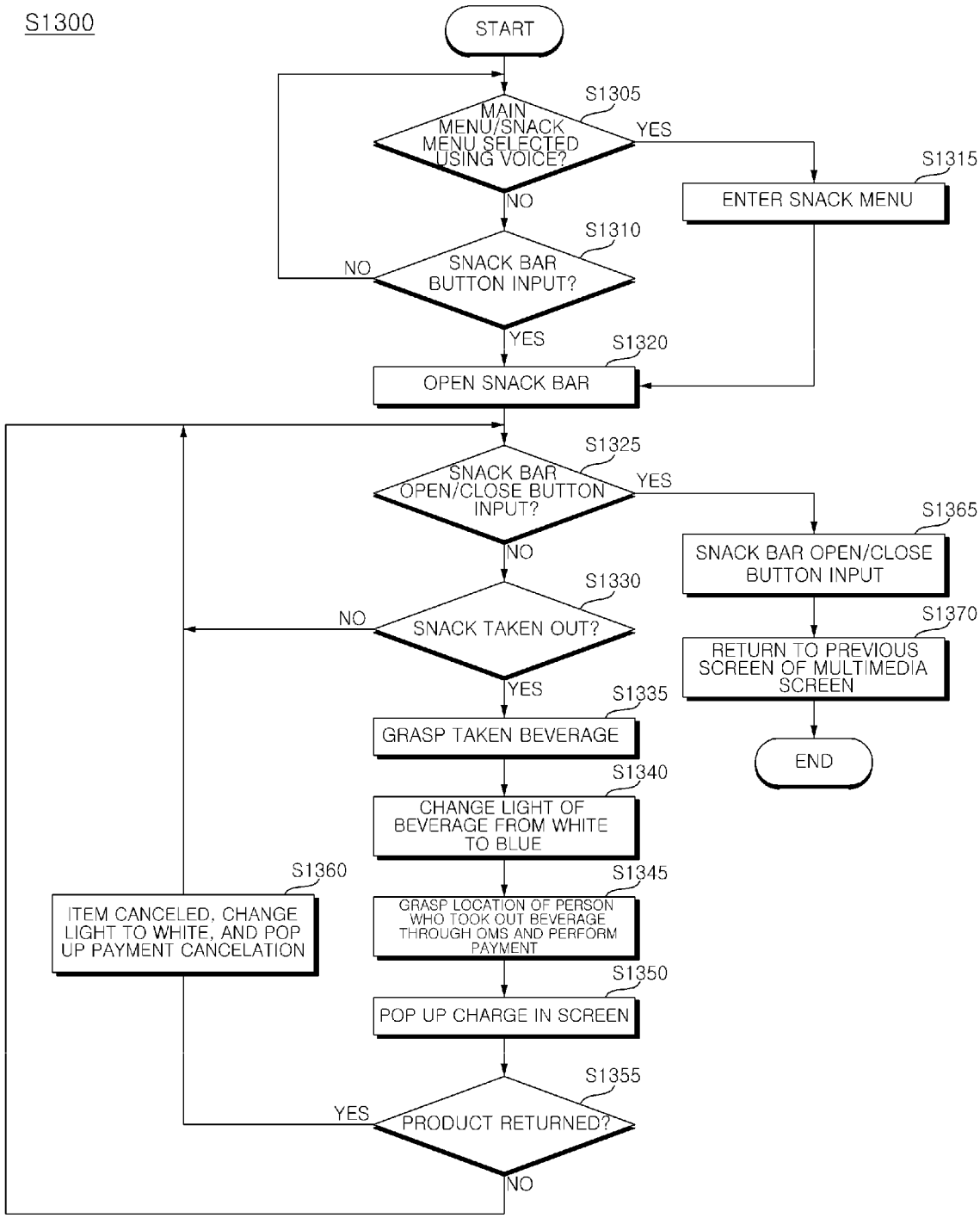
FIG. 39 is a flowchart illustrating an operation of a payment system according to an implementation of the present disclosure.

FIG. 39 is a flowchart illustrating an operation of a payment system according to an implementation of the present disclosure.

Referring to FIG. 39, when the input device 300 receives a snack menu selection input of a user (S1305), the processor 717 may enter a snack menu (S1315) and provide a signal to the cargo system 500 to open a snack bar (S1320). The snack bar may be understood as the aforementioned cargo box.

Even without the snack menu selection input of the user, when a snack bar button is pressed (S1310), the processor 717 may provide a signal to the cargo system 500 to open the snack bar (S1320). In some implementations, the snack bar button may be understood as a button that is disposed in at least one region of the cargo box to generate a signal indicative of entrance/exit of the cargo box.

When the snack bar button is pressed again while the snack bar is opened (S1325 and S1365), the processor 717 may provide a signal to the display system 400 so as to return back to a screen previous to a multi-media screen (S1370). If there is no previous screen, the display system 400 may output a main menu.

While the snack bar is opened, the processor 717 may determine whether any snack is taken out of the snack bar (S1330). A snack may be understood as one of items provided through the aforementioned cargo box. Based on at least one of sensing data received from a weight sensor included in the cargo box or image data received from the internal camera 251, the processor 717 may determine whether any snack is taken out of the snack bar. The processor 717 may specify the taken-out snack (S1335). The processor 717 may provide a signal such that a color of output light of a light source corresponding to a pocket where the taken-out snack was kept switches from a first color to a second color (S1340).

The processor 717 may specify a user who has taken the snack out of the snack bar, and generate cost charging data (S1345). For example, based on image data received from the internal camera 251, the processor 717 may specify a user who has taken the snack out of the snack bar. The processor 717 may generate cost charging data including at least one of information on the specified user, price information on the selected snack, or payment type information.

The processor 717 may provide a signal to the display system 400 such that information on cost charging data is displayed (s1350). The display system 400 may output the information on the cost charging data based on the received information.

The processor 717 may determine whether the selected item returns back to the snack bar (S1355). Based on image data received from the internal camera 251, the processor 717 may determine whether the selected item returns back to the snack bar.

When it is determined that the item returns back to the snack bar, the processor 717 may cancel a cost charging process. The processor 717 may provide a signal such that a color of output light of a light source corresponding to a pocket where the snack has returned switches from the second color to the first color. The processor 717 may provide a signal to the display system 400 so as to output payment cancellation information (s1360).

Figure 40:
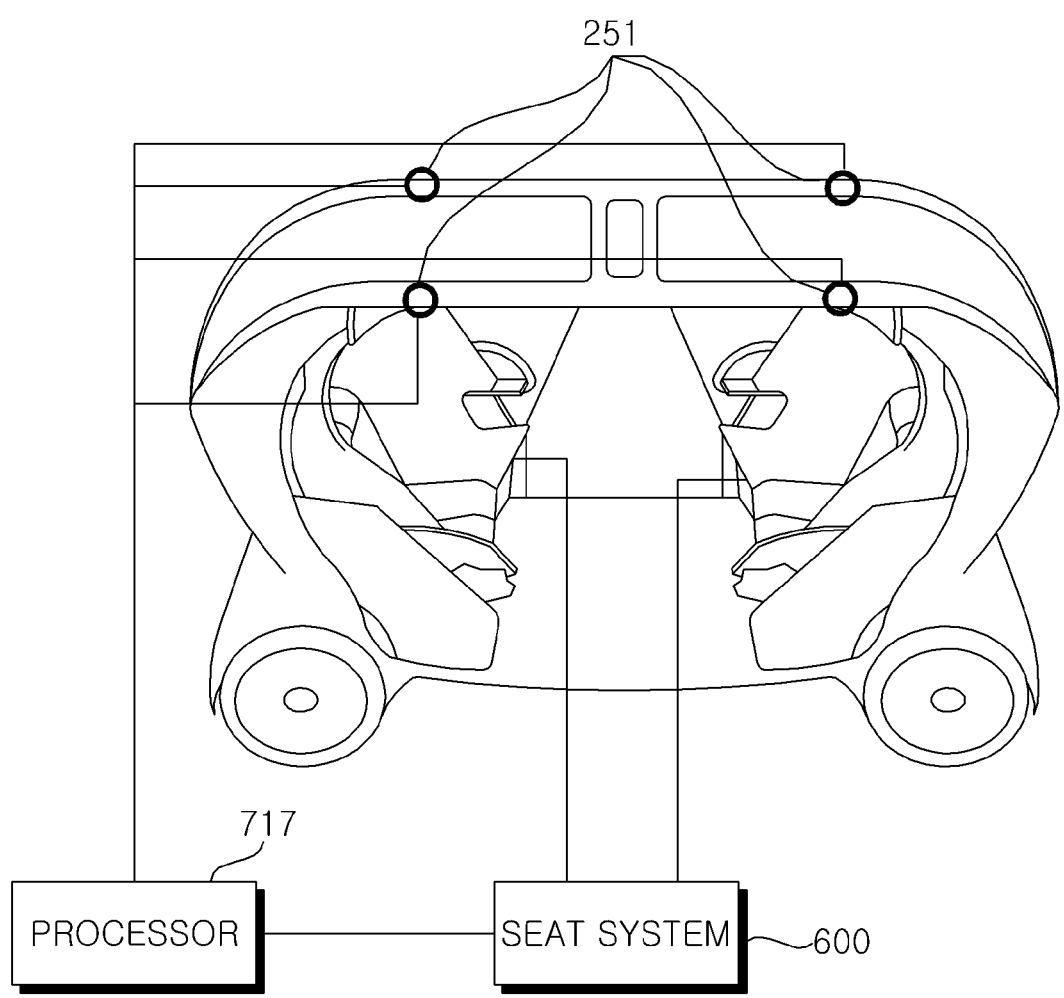
FIG. 40 is a diagram referred to for explaining an image data acquisition scenario according to an implementation of the present disclosure.

FIG. 40 is a diagram referred to for explaining an image data acquisition scenario according to an implementation of the present disclosure.

Referring to FIG. 40, the processor 717 may exchange signals with seat system 600, which controls a plurality of seats, via the interface unit 716. The seat system 600 may include sitting detection sensors disposed at the plurality of seats, respectively. The processor 717 may receive a sitting detection signal from the seat system 600.

The imaging device 250 may include a plurality of cameras 251, the number of which corresponds to the number of the plurality of seats. The plurality of cameras 251 may be disposed at locations allowed to capture of images of the plurality of seats. Alternatively, the plurality of cameras 251 may be disposed at locations allowed to capture images of users sitting in the plurality of seats, respectively. For example, a first camera among the plurality of cameras may be disposed at a location corresponding to a first seat among the plurality of seats. Via the interface unit 716, the processor 717 may exchange signals with the plurality of internal cameras 251.

The processor 717 may receive, from the seat system 600, a signal corresponding to a detection signal generated by a sitting detection sensor disposed in the first seat. In this case, the processor 717 may receive image data from a first camera corresponding to the first seat. Based on the image data received from the first camera, the processor 717 may detect a motion of a user sitting in the first seat, and perform a cost charging operation based on the motion of the user.

Figure 41:
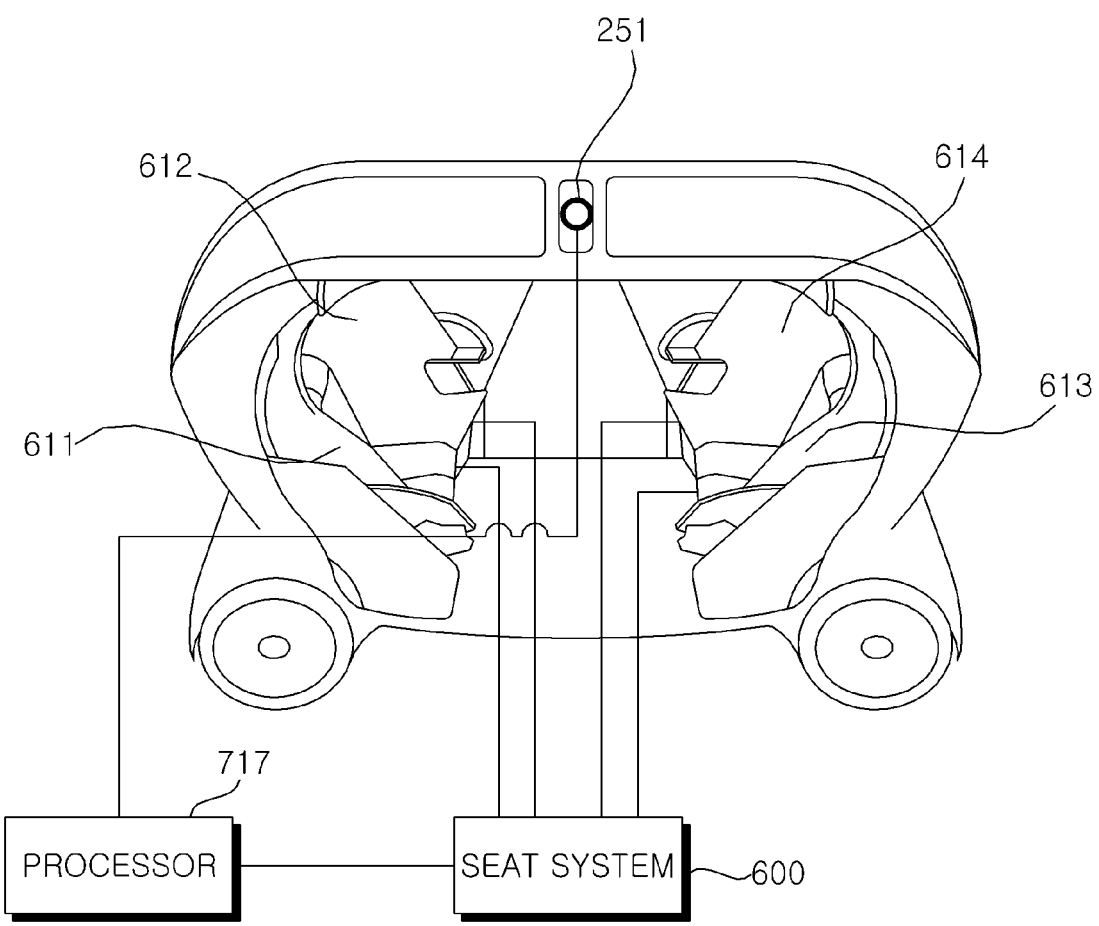
FIG. 41 is a diagram referred to for explaining an image data acquisition scenario according to an implementation of the present disclosure.

FIG. 41 is a diagram referred to for explaining an image data acquisition scenario according to an implementation of the present disclosure.

Referring to FIG. 41, the processor 717 may exchange signals with the seat system 600, which controls a plurality of seats, via the interface unit 716. The seat system 600 may include sitting detection sensors disposed in a plurality of seats 611, 612, 613, and 614, respectively. The processor 717 may receive a sitting detection signal from the seat system 600.

The imaging device 250 may include one camera 251. The camera 251 may be disposed at a location allowed to capture all of the seats. For example, the camera 251 may be disposed at one portion of a ceiling. The processor 717 may exchange signals with the camera via the interface unit 716.

The processor 717 may receive, from the seat system 600, a signal corresponding to a detection signal generated by a sitting detection sensor disposed in a first seat. In this case, the processor 717 may perform processing by distinguishing an image of a first region corresponding to the first seat in the entire region of an image acquired from the camera 251. The processor 717 may detect a motion of a user detected in the first region, and perform a cost charging operation based on the motion of the user.

Figure 42:
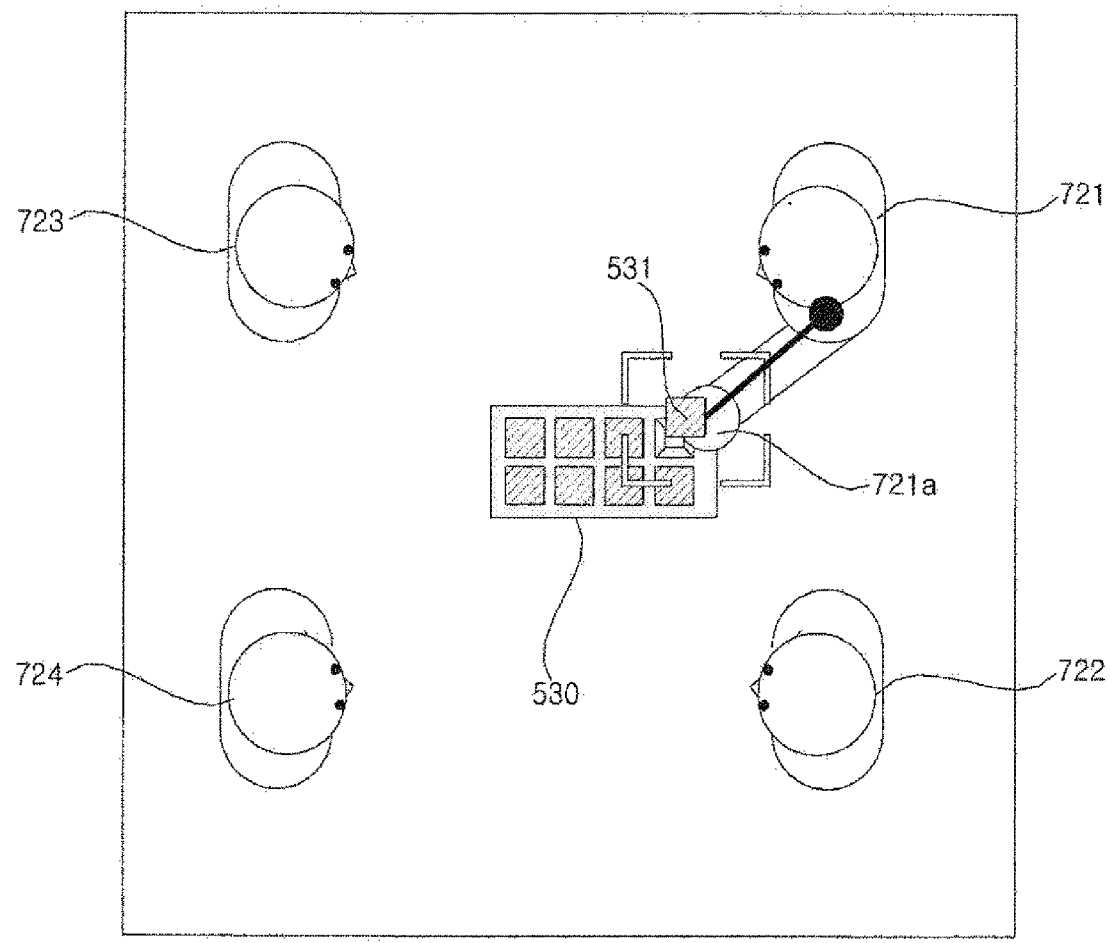
FIGS. 42 and 43 are diagrams illustrating an item selecting motion and an item opening motion according to an implementation of the present disclosure.
Figure 43:
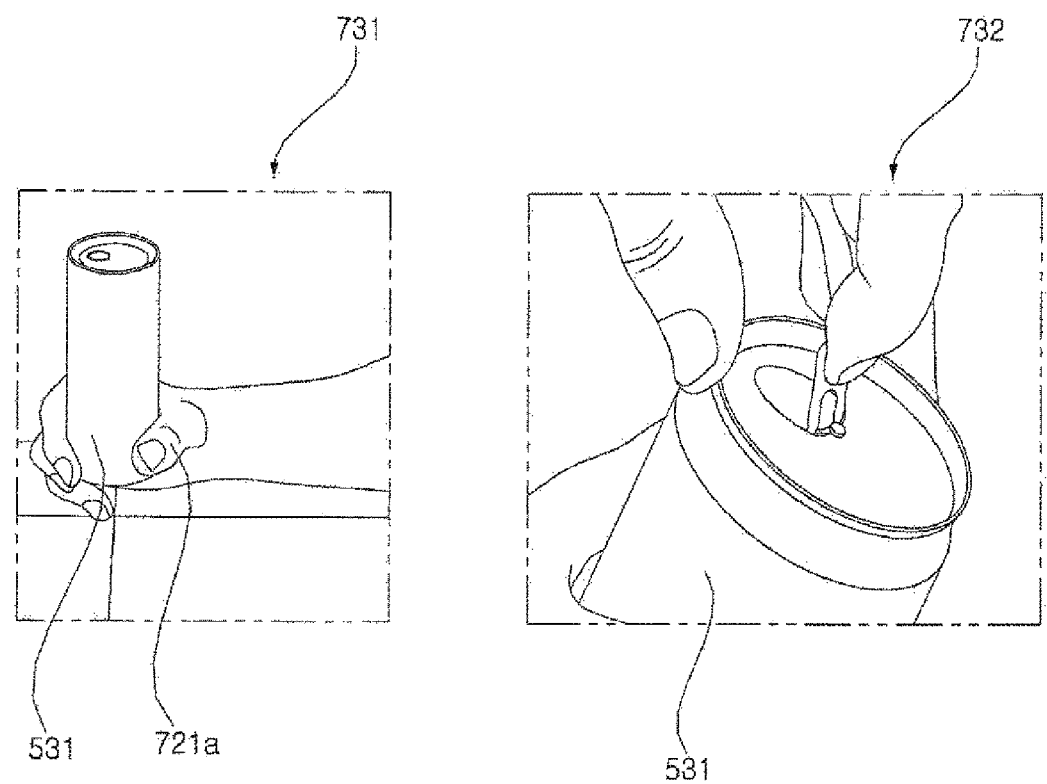

FIGS. 42 and 43 are diagrams illustrating an item selecting motion and an item opening motion according to an implementation of the present disclosure.

Referring to FIG. 42, the processor 717 may select an item-selecting user based on image data acquired by the internal camera 251. For example, the processor 717 may detect, from the image data, a motion of picking up a first item 531 positioned inside a cargo box 530. Based on the motion of picking up the first item 531 by a first user 721, the processor 717 may specify the first user 721 as a purchaser of the first item 531. For example, the processor 717 may detect a hand 721a of the user 721 who picks up the first item 531. Based on a motion trajectory of the hand 721, the processor 717 may specify the first user 721 as a purchaser of the first item 531.

Referring to FIG. 43, the processor 717 may detect a hand 721 of a first user 721 who grabs a first item 531. Based on the hand 721 grabbing the first item 531, the processor 717 may determine selection 731 of the first item 531 by the first user 731. The processor 717 may detect a motion 732 of opening the first item 531. Based on the motion 732 of opening the first item 531, the processor 717 may determine whether the first user 731 purchases the first item 531. When it is determined that the first user 721 selects and purchases the first item 531, the processor 717 may generate cost charging data.

The processor 717 may detect a motion of putting the first item 531 back to the cargo box 530 by the first user 721. Based on the motion of putting the first item back to the cargo box 530, the processor 717 may determine cancellation of purchase of the first item 531 by the first user 721.

Figure 44:
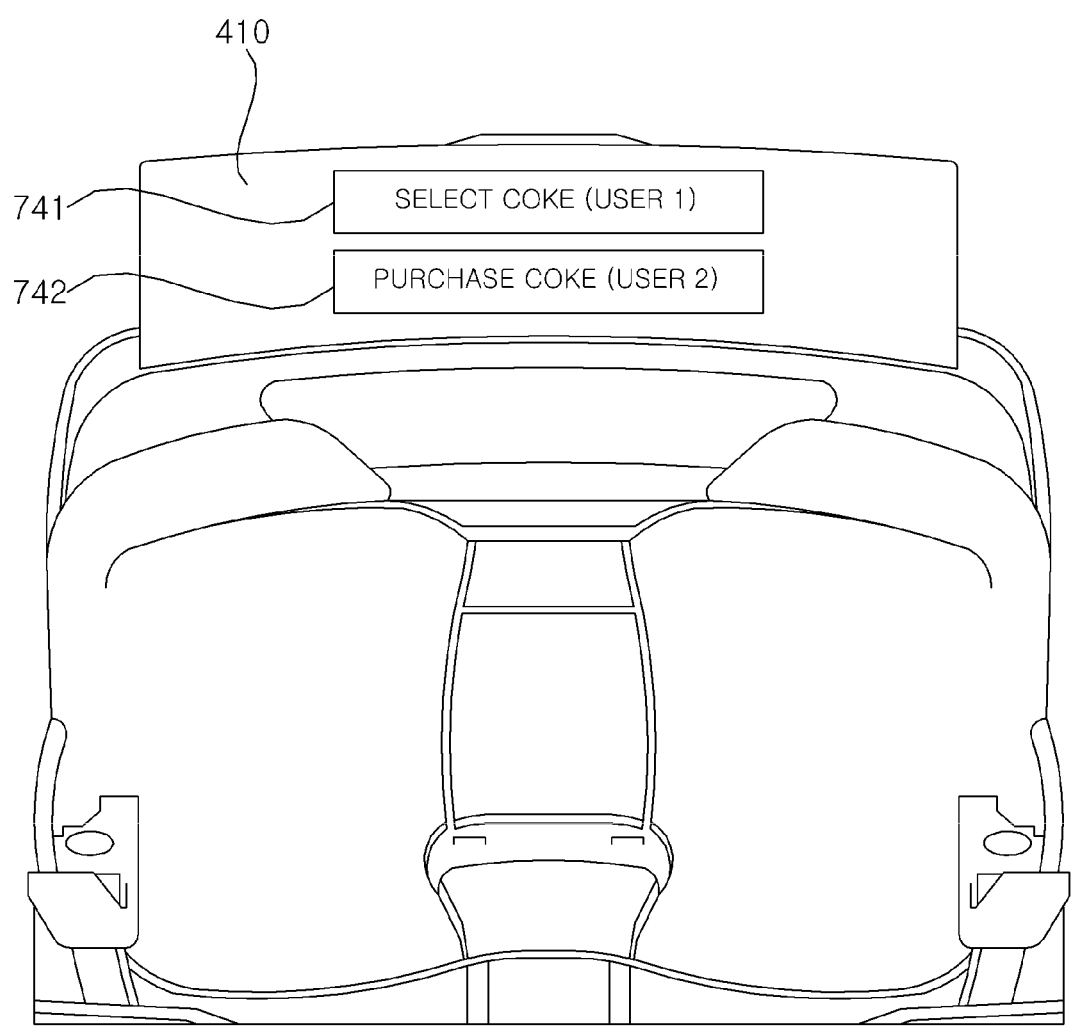
FIG. 44 is a diagram referred to for explaining how to information according to an implementation of the present disclosure.

FIG. 44 is a diagram referred to for explaining how to display information according to an implementation of the present disclosure.

Referring to FIG. 44, the processor 717 may exchange signals with at least one of the display system 400 or the sound output unit 490 via the interface unit 716.

The processor 717 may determine purchase of an item based on a determination as to whether the item is selected and a determination as to whether the item is opened.

When a motion of selecting a first item by a first user is detected, the processor 717 may provide, to the display system 400, a signal corresponding to information on the selection of the first item by the first user. Based on a received signal, the display system 400 may output first item selection information 741 via at least one display. The processor 717 may provide a signal corresponding to the first item selection information 741 to the sound output unit 490. Based on a received signal, the sound output unit 490 may output the first item selection information 741 via at least one speaker. In doing so, the first user may be allowed to recognize the selection of the first item.

When a motion of opening the first item by the first user is detected, the processor 717 may provide, to the display system 400, a signal corresponding to purchase of the first item by the first user. Based on a received signal, the display system 400 may output first item purchase information 742 via at least one display. The processor 717 may provide a signal corresponding to the first item purchase information to the sound output unit 490. Based on a received signal, the sound output unit 490 may output the first item purchase information 742 via at least one speaker. In doing so, the first user may be allowed to recognize the purchase of the first item.

Figure 45:
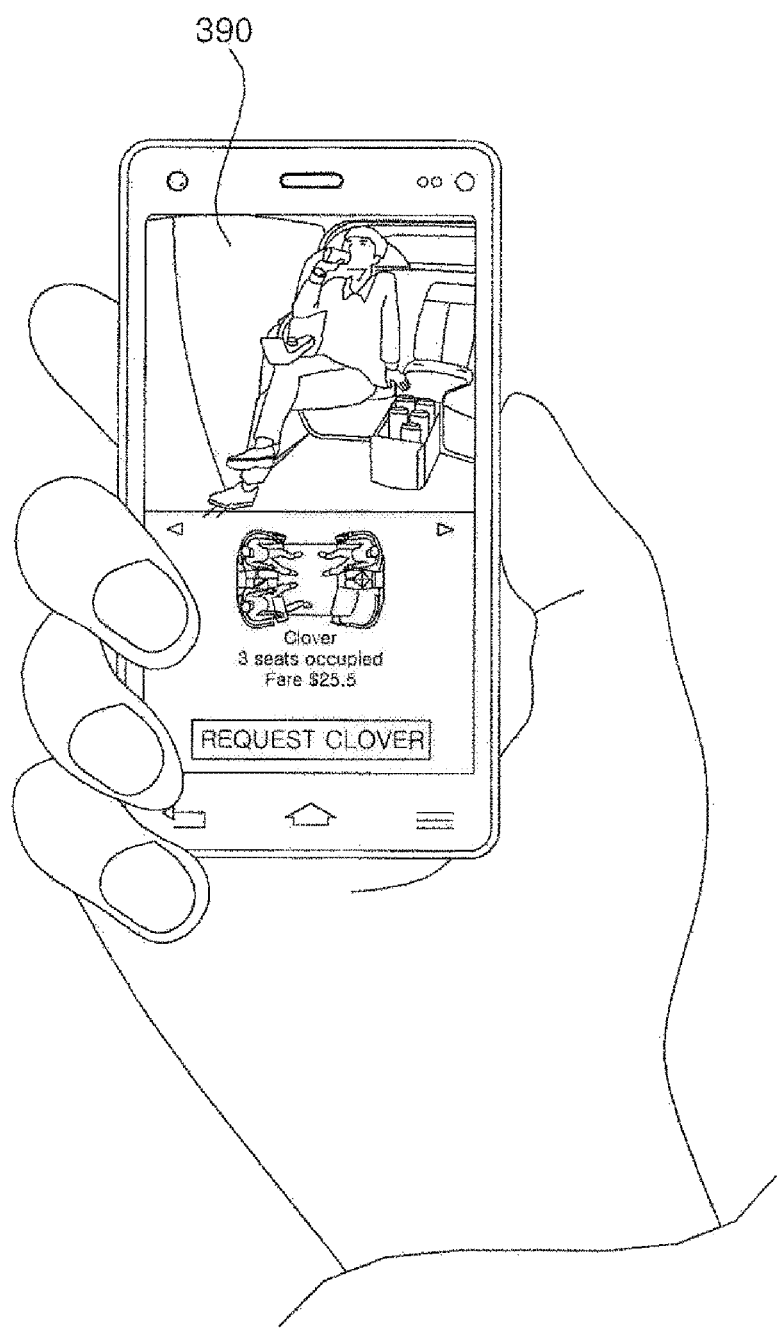
FIG. 45 is a diagram referred to for explaining how to provide information to a mobile terminal according to an implementation of the present disclosure.

FIG. 45 is a diagram referred to for explaining how to provide information to a mobile terminal according to an implementation of the present disclosure.

Referring to FIG. 45, the payment system 700 may further include the mobile terminal 390.

The processor 717 may exchange signals with the mobile terminal 290 via the interface unit 716 and the communication device 300. The processor 717 may transmit cost charging data to the mobile terminal 390. The cost charging data may include at least one of user information, cost charging reason information, charge price information, or payment type information. The processor 717 may transmit image data, which is the basis of cost charging operation, together with the cost charging data to the mobile terminal 390. The mobile terminal 390 may output cost charging information based on the cost charging data. The mobile terminal 390 may output the image data, which is the basis of cost charging operation, together with the cost charging data. The mobile terminal 390 may proceed to payment based on the cost charging data.

When a user purchases an item, the processor 717 may transmit item purchase information to the mobile terminal 390. When selection of a first item by a first user is detected, the processor 717 may transmit a signal corresponding to information on the selection of the first item by the first user to the mobile terminal 390. The mobile terminal 390 may output the information on the selection of the first item by the first user. When a motion of opening the first item by the first user is detected, the processor 717 may transmit a signal corresponding to information on purchase of the first item by the first user to the mobile terminal 390. The mobile terminal 390 may output the information on the purchase of the first item by the first user.

Figure 46:
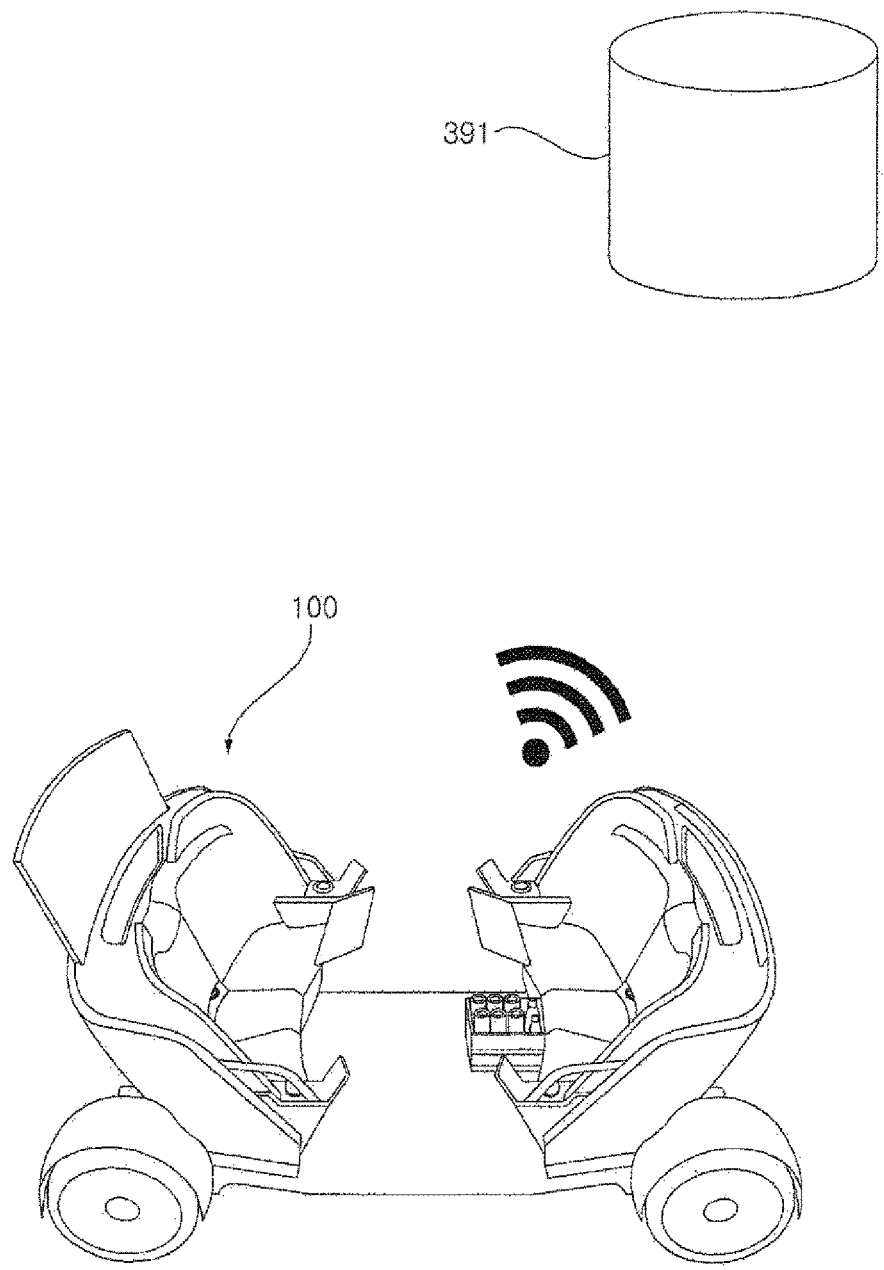
FIG. 46 is a diagram referred to explaining how to proceed to payment according to an implementation of the present disclosure.

FIG. 46 is a diagram referred to explaining how to proceed to payment according to an implementation of the present disclosure.

Referring to FIG. 46, the payment system 700 may further include a payment server 391.

The processor 717 may exchange signals with the payment server 391 via the interface unit 716 and the communication device 300. The processor 717 may transmit cost charging data to the payment server 391. The payment server 391 may proceed to payment based on the cost charging data.

Figure 47:
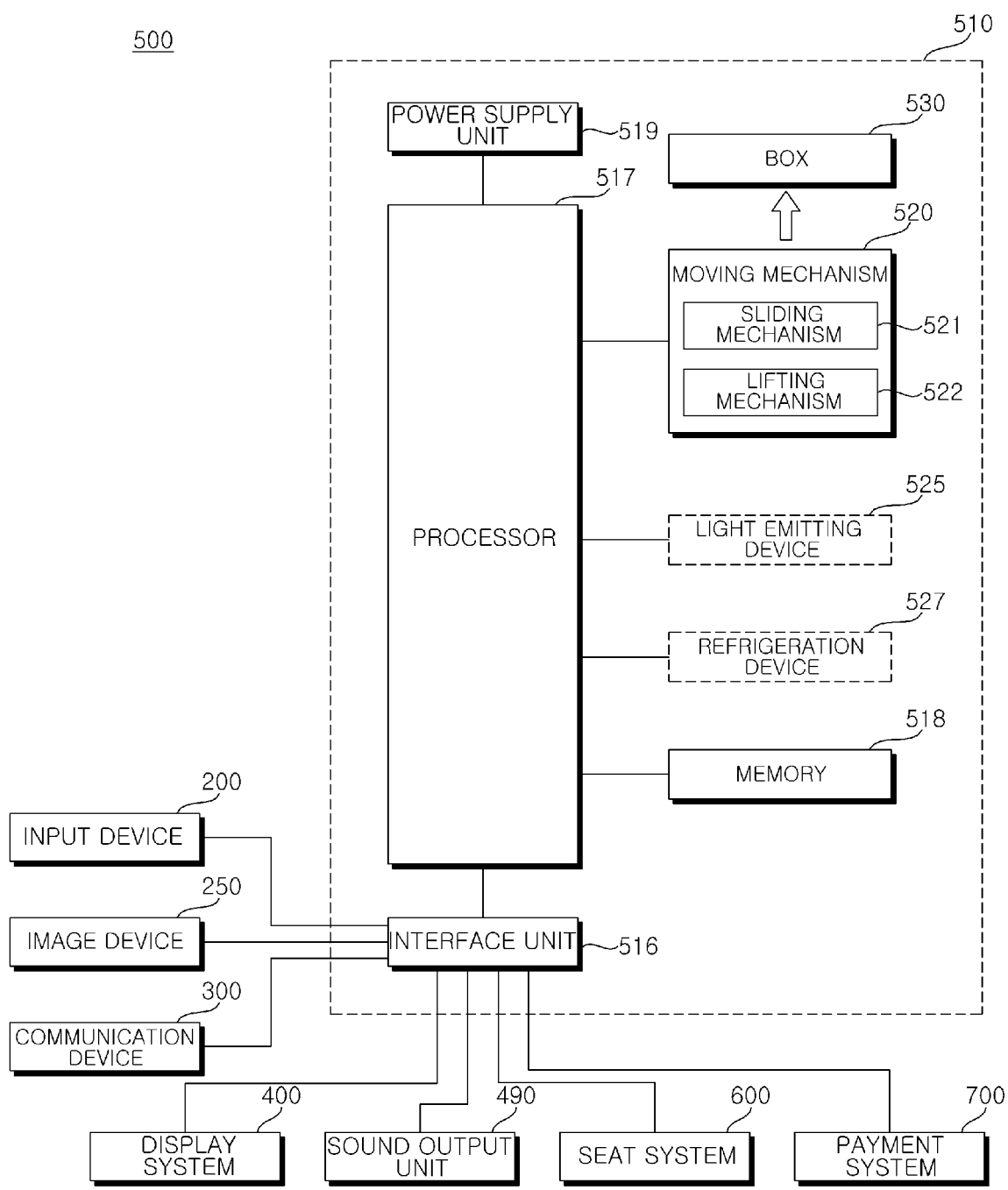
FIG. 47 is a control block diagram of a cargo system according to an implementation of the present disclosure.

FIG. 47 is a control block diagram of a cargo system according to an implementation of the present disclosure.

Referring to FIG. 47, the cargo system 500 may include an input device 200, an imaging device 250, a communication device 300, a display system 400, a sound output device 490, a cargo system 500, a seat system 600, a payment system 700, and an item providing device 510. In some implementations, the cargo system 500 may omit some of the aforementioned components, or may further include another component.

The description provided with reference to FIGS. 1 to 47 may apply to the input device 200, the imaging device 250, the communication device 300, the display system 400, the sound output device 490, the cargo system 500, and the seat system 600.

The item providing device 510 may be installed in at least one portion of the vehicle 10. The item providing device 510 may be referred to as a vehicle item providing device 510 for a vehicle. The item providing device may provide an item kept in the cabin to a user. To this end, the item providing device 510 may include at least one box 530, at least one interface unit 516, at least one processor 517, at least one memory 518, a power supply 519, and a moving mechanism 520. In some implementations, the item providing device 510 may further include a light emitting device and a refrigeration device 527 individually or in combination.

The box 530 loaded with a plurality of items may be retractable from at least one portion of a seat. The box 530 may be hidden below between a plurality of seats. For example, the box 530 may be hidden below between a first seat and a second seat. The box 530 may have at least one surface formed of a transparent material. The box 530 will be described from FIG. 49.

The interface unit 516 may exchange signals with at least one electronic device installed in the vehicle 10. In a wired or wireless manner, the interface unit 516 may exchange signals with at least one electronic device installed in the cabin system 100. The interface unit 516 may exchange signals with at least one of the input device 200, the imaging device 250, the communication device 300, the display system 400, the sound output device 490, the cargo system 500, or the seat system 600. The interface unit 516 may be at least one of a communication module, a terminal, a pin, a cable, a port, a circuit, an element, or a device.

The interface unit 516 may receive a signal, converted from a user input, from at least one of the input device 200, the imaging device 250, or the communication device. The interface unit 516 may receive a user's destination data from a navigation device of the vehicle 10. The interface unit 516 may receive location data of the vehicle 10 from the navigation device.

The processor 517 may control overall operation of each unit of the item providing device 510. The processor 517 may electrically connect to the interface unit 516, the memory 518, and the power supply 519. The processor 517 may be one of sub-controllers included in the main controller 170. The processor 517 may be driven by power provided from the power supply 519.

The processor 517 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 517 may receive a user input-based signal. The processor 517 may receive the user input-based signal from at least one of the input device 200, the imaging device 250, or the communication device 300. The processor 517 may receive the user input-based signal from a button provided in at least one surface of the box 530.

When a user input-based signal is received, the processor 517 may provide a control signal such that one of a plurality of items is exposed out into a space of the cabin. When a signal is received from at least one electronic device installed in the vehicle 10, the processor 517 may provide a control signal. For example, the processor 517 may provide a control signal such that at least one portion of the box 530, which is integrally formed with a seat and hidden, is exposed out into a space of the cabin. The processor 517 may provide a control signal to the moving mechanism 520 so as to move the box 530. The moving mechanism 520 may move the box 530 in accordance with the control signal.

The processor 517 may provide a control signal to the moving mechanism. According to a first condition, the processor 517 may provide a control signal to the moving mechanism 520 to hide the box 530 exposed out into the space of the cabin. The first condition may be a condition in which a motion of selecting an item by a user is not detected for a predetermined period of time. The processor 517 may determine whether the first condition is satisfied, based on user motion data detected from image data acquired by the internal camera 251.

According to a second condition, the processor 517 may provide a control signal so as to expose the box 530, hidden at least inside a seat, in the space of the cabin again. The second condition may be a condition in which a user's approach toward the box 530 is detected or a condition in which a touch on the box 530 is detected. The processor 517 may determine whether the second condition is satisfied, based on user motion data detected from image data acquired by the internal camera 251. The processor 517 may determine whether the second condition is satisfied, based on sensing data received from a touch sensor provided in at least one surface of the box 530.

The processor 517 may provide a control signal to a sliding mechanism 521. The sliding mechanism 521 may cause the box 530 to slide in accordance with the control signal. The processor 517 may provide a control signal to a lifting mechanism 522. The lifting mechanism 522 may lift a shelf in the box 530 in accordance with the control signal. The box 530 may include at least one shelf. The box 530 may include a first shelf on which a first item is seated. When a signal corresponding to selection of the first item is received, the processor 517 may provide a control signal to the lifting mechanism 522 so as to lift the first shelf.

The processor 517 may provide a control signal to the light emitting device 525. A plurality of items may include a first item. The light emitting device 525 may include a first light source that is formed to surround at least one portion of the first item. When the signal corresponding to the selection of the first item is received, the processor 517 may provide a control signal to the light emitting device 525 so as to switch a color of output light of a first light source from a first color to a second color.

The box 530 may be provided as a plurality of boxes. When a signal is received while the plurality of boxes is hidden in a space outside the cabin of the vehicle 10, the processor 517 may provide a control signal to expose an item kept in a box which corresponds to the signal from among the plurality of boxes. For example, the processor 517 may receive a signal including a user's destination data from at least one electronic device installed in the vehicle 10. The processor 517 may provide a control signal to expose an item kept in a box that corresponds to the destination data from among the plurality of boxes.

The processor 517 may provide a control signal to the refrigeration device 527. The processor 517 may receive location data of the vehicle 10 via the interface unit 516 from at least one electronic device installed in the vehicle 10. The processor 517 may control driving of the refrigeration device 527 based on location data. For example, the processor 517 may control driving the refrigeration device 527 based on data on a distance to a user anticipated to get on the vehicle 10, the data which is computed based on location data of the vehicle 10. The processor 517 may provide a control signal such that refrigerating performance increases if the distance between the vehicle 10 and the user decreases. For example, if the vehicle 10 is an electric vehicle, the processor 517 may control driving of the refrigeration device 527 based on data on a distance between the vehicle 10 and a battery cost charging station, the data which is computed based on location data of the vehicle 10. If the distance between the vehicle 10 and the battery cost charging station is equal to or smaller than a reference value when remaining battery power is equal to or smaller than a reference value, the processor 517 may reduce refrigerating performance.

The memory 518 is electrically connected with the processor 517. The memory 518 may store basic data for each unit, control data for the operational control of each unit, and input/output data. The memory 518 may store data processed by the processor 517. The memory 718 may be implemented as at least one of a ROM, a RAM, an EPROM, a flash drive, or a hard drive. The memory 518 may store various data for the overall operation of the item providing device 510 such as programs for the processing or control of the processor 517. In some implementations, the memory 518 may be integrally formed with the processor 5717. The memory 518 may be driven by power supplied from the power supply 519.

The power supply 519 may supply power to the item providing device 510. The power supply 519 may be supplied with power from a power source included in the vehicle 10, and supply power to each unit of the item providing device 510. The power supply 519 may operate in accordance with a control signal from the processor 517. For example, the power supply 519 may be implemented as a switched-mode power supply (SMPS).

The item providing device 510 may include at least one PCB. The interface unit 516, the processor 517, the memory 518, and the power supply 519 may be mounted on at least one PCB.

The moving mechanism 520 may operate in accordance with a control signal received from the processor 517. The moving mechanism 520 may move the box 530 from out of a hidden space into a space of the cabin. The moving mechanism 520 may move the box 530 in accordance with a control signal from the processor 517. The moving mechanism 520 may include a drive unit (e.g., a motor, an actuator, and a solenoid) for providing power, and a power transfer unit for transferring power to the box 530. In some implementations, the moving mechanism 520 may further include a power conversion unit for converting power into a moving force of the box 530. The moving mechanism 520 may hide the box 530, exposed out in the space of the cabin, into a seat in accordance with a control signal from the processor 517. The moving mechanism 520 may expose the box 530, which was retracted inside the seat, out into the space of the cabin again in accordance with a control signal from the processor 517. The moving mechanism 520 may include the sliding mechanism 521 and the lifting mechanism 522.

The sliding mechanism 521 may operate in accordance with a control signal received from the processor 517. The sliding mechanism 521 may cause the box 530 to slide. The sliding mechanism 521 may cause the box 530 to slide from a hidden space inside a seat to a space of the cabin.

The lifting mechanism 522 may operate in accordance with a control signal received from the processor 517. The lifting mechanism 522 may lift a shelf disposed in the box 530. The lifting mechanism 522 may individually lift a plurality of shelves, which is disposed in the box 530 to provide different items, respectively.

The light emitting device 525 may operate in accordance with a control signal received from the processor 517. The light emitting device 525 may be disposed in the box 530. The light emitting device 525 may include a plurality of light sources disposed to correspond to a plurality of items, respectively. The light emitting device 525 may change output light of one of the plurality of light sources in accordance with a signal corresponding to selection of one of the plurality of items.

The refrigeration device 527 may operate in accordance with a control signal received from the processor 517. The refrigeration device 527 may absorb heat of the inside the box 530. For example, the refrigeration device 527 may absorb heat of the inside of the box 530 in accordance with a control signal from the processor 517, such that refrigerating performance increases if a distance between the vehicle 10 and a user decreases. For example, in the case where the vehicle 10 is an electric vehicle, if a distance between the vehicle and a battery cost charging station is equal to or greater than a reference value when remaining battery power is equal to or smaller than a reference value, the refrigeration device 527 may absorb heat of the inside the box 530 in accordance with a control signal from the processor 517 so as to reduce refrigerating performance.

Figure 48:
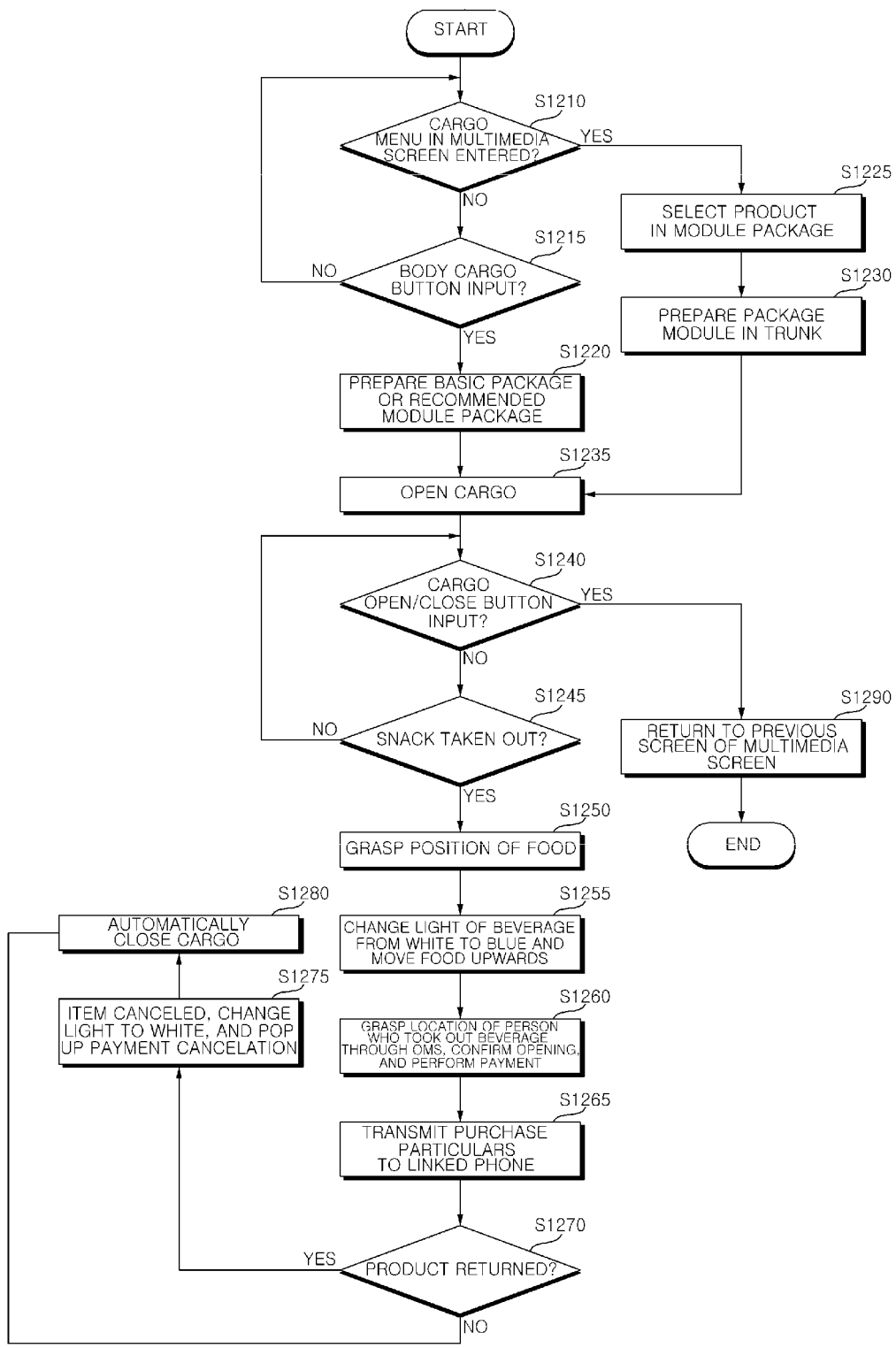
FIG. 48 is a flowchart illustrating an operation of a cargo system according to an implementation of the present disclosure.

FIG. 48 is a flowchart illustrating an operation of a cargo system according to an implementation of the present disclosure.

Referring to FIG. 48, when a cargo menu is entered on a screen of the display system 400 (S1210) when a user input of selecting an item is received (S1225), the processor 517 may select a box which keeps the selected box from among a plurality of boxes in a trunk (s1230).

If a cargo button is pressed (S1215) even when the cargo menu is not entered on the screen of the display system 400, the processor 517 may select a box (s1220). The processor 517 may select a box which stores a basic package item or a box which stores a recommended package item. In some implementations, the cargo button may be understood as a button that is disposed in at least one region of a box to generate a signal to enter/exit the box.

The processor 517 may provide a control signal to the moving mechanism 520 so as to open the box 530 (S1235). The moving mechanism 520 may move the box 530 so as to open the box 530.

When the cargo button is pressed (S1240) while the box 530 is opened, the processor 517 may hide the box 530 (S1285) and return a display screen of the display system 400 back to a previous screen (S1290).

The processor 517 may determine whether a first item is selected from among a plurality of items (S1245). For example, the processor 517 may determine whether the first item is selected, based on image data acquired from the internal camera 251. For example, the processor determine whether the first item is selected, based on sensing data generated by a weight sensor provided in the box 530. When the first item is selected, the processor 517 may determine a location of the selected first item based on at least one of image data or sensing data (s1250).

The processor 517 may change a color of output light of a first light source corresponding to the first item from a first color to a second color (S1255).

The payment system 700 or the processor 517 may specify a first user, who selects the first item, based on image data acquired by the internal camera 251, and then may detect a motion of opening the first item. In this case, the payment system 700 or the processor 517 may generate cost charging data on the first item of the first user (S1260). When the processor 517 specifies the first user and generates cost charging data by detecting a motion of opening the first item, the processor 517 may transmit the cost charging data to the payment system 700.

The payment system 700 or the processor 517 may transmit a signal including the cost charging data to the mobile terminal 390 of the first user (S1265).

The processor 517 may determine whether the first item returns back (S1270). For example, the processor 517 may determine whether the first item returns back, based on at least one of image data acquired by the internal camera or sensing data acquired by a weight sensor.

When the first item returns back, the processor 517 may change the color of output light of the first light source from the second color to the first color. The processor 517 may cancel a cost charging process (S1275).

The processor 517 may provide a control signal to the moving mechanism 520 such that the box 530 is hidden into a seat (s1280).

Figure 49:
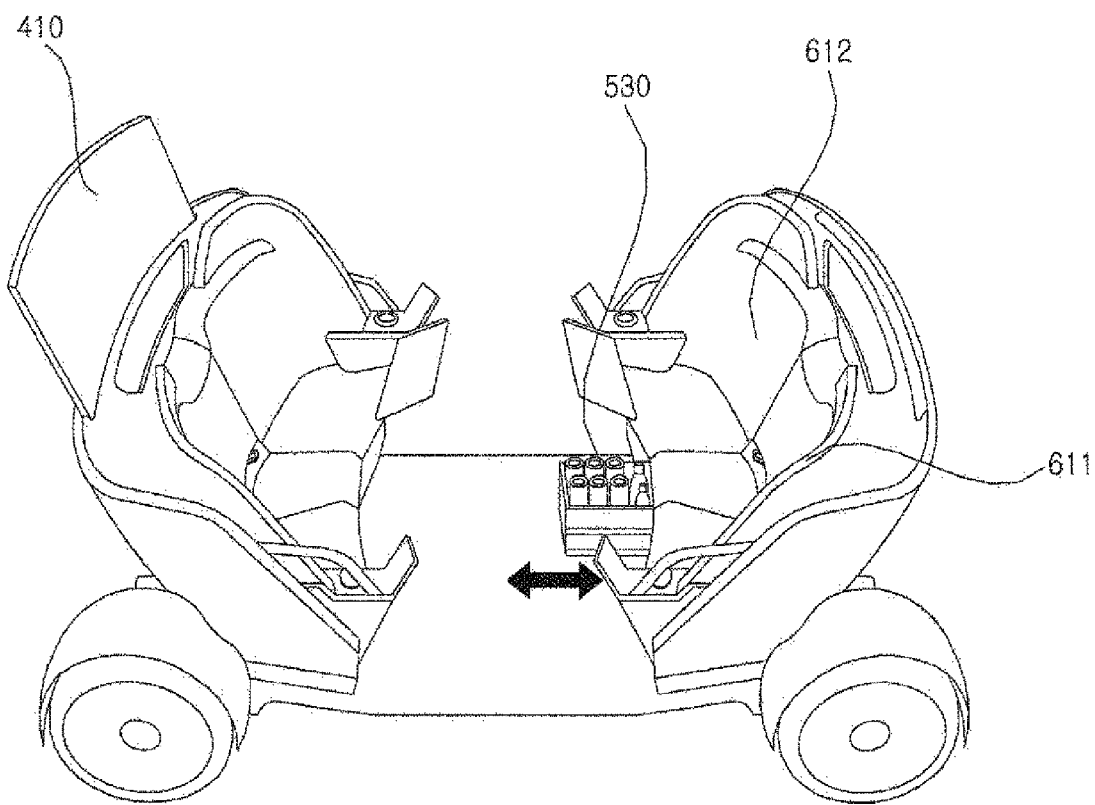
FIG. 49 is a diagram schematically illustrating a cabin according to an implementation of the present disclosure.
Figure 50:
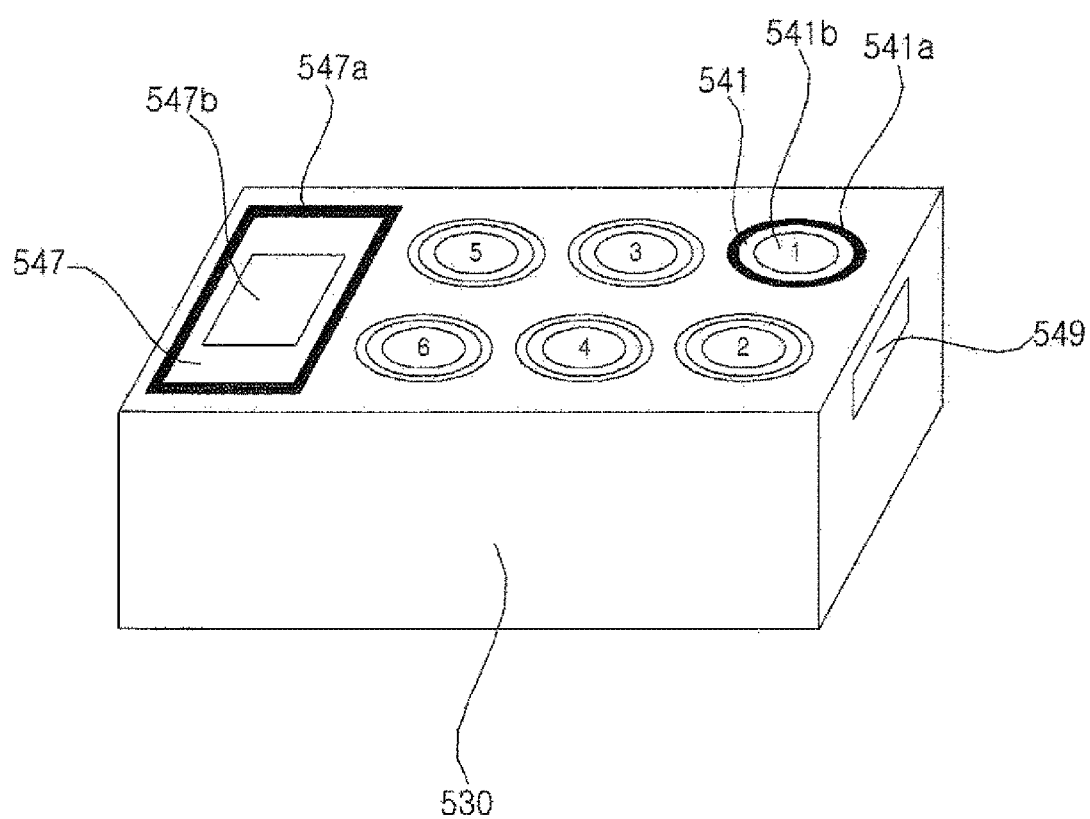
FIG. 50 is a diagram illustrating a box according to an implementation of the present disclosure.

FIG. 49 is a diagram schematically illustrating a cabin according to an implementation of the present disclosure. FIG. 50 is a diagram illustrating a box according to an implementation of the present disclosure.

Referring to FIGS. 49 and 50, the item providing device 510 may include at least one box 530. The box 530 may be referred to as a cargo box.

The box 530 loaded with a plurality of items may be retractable from at least one portion of a seat 611 or 622. By a force provided from the moving mechanism 520, the box 530 may move from the inside of the seat to a space of the cabin (e.g., extend from out of the seat) or from the space of the cabin into the inside of the seat (e.g., retract into the seat). By the force provided by the moving mechanism 520, the box 530 may be exposed in the space of the cabin. By the force provided by the moving mechanism 520, the box 530 may be hidden into the inside of the seat 611 or 612. In the seat 611 or 612, a space for accommodating the box 530 may be formed.

The box 530 may be implemented in various locations. For example, the box 530 may be hidden into an inner space of at least one seat. The box 530 may be hidden in a space below and between a plurality of seats. The box 530 may be hidden below between a first seat 611 and a second seat 612. While being hidden, the box 530 may be integral with a seat. At least one surface (e.g., a surface exposed toward the space of the cabin) of the box 530 may be formed of a material having the same color as that of a seat.

At least one surface of the box 530 may be formed of a transparent material. For example, a surface exposed toward the space of the cabin among a plurality of surfaces defining the box 530 may be formed of a transparent material.

A button 549 may be disposed on at least one surface of the box 530. For example, the button 549 may be disposed on a surface exposed toward the space of the cabin among a plurality of surfaces defining the box 530. The button 549 may convert a user input into an electric signal. The electric signal may be transmitted to the processor. In accordance with the electric signal, the processor 517 may open or close the box 530.

The box 530 may be loaded with a plurality of items 541b and 547b. An item may be food, such as beverage, snack, pasta, hamburger, or may be a leisure item such as a golf ball and a golf glove. However, types of the item are not limited thereto.

The box 530 may include a plurality of storage areas, such as pockets 541 and 547. A plurality of items may be seated in the plurality of pockets 541 and 547, respectively. Side surfaces of the plurality of pockets 541 and 547 may be formed of a transformable material. Sensor (e.g., weight sensors) for detecting presence of an item may be disposed below the plurality of pockets 541 and 547. Bottoms of the plurality of pockets 541 and 547 may be in contact with a shelf. When the shelf is raised by the lifting mechanism 522, the side surfaces of the plurality of pockets 541 and 547 may be pressed and accordingly at least a part of each of the items 541b and 547b to be exposed in the space of the cabin. A plurality of light sources 541a and 547a may be disposed around openings of the plurality of pockets 541 and 547, respectively. Each of the light sources 541a and 547a may be formed to surround an edge of an opening of a corresponding pocket. The light sources 541a and 547a may be a sub-element of the aforementioned light emitting device 525, and may be controlled by the processor 517. When one of the plurality of items 541b and 547b is selected, output light of a light source 541a or 547a around a pocket 541 or 547 accommodating the selected item may be changed.

The box 530 may include a first pocket 541. The first item 541b may be seated in the first pocket 541. A side part of the first pocket 541 may be formed of a transformable material. A sensor for detecting presence of the first item 541b may be disposed below the first pocket 541. A bottom of the first pocket 541 may be in contact with a shelf. When the shelf is raised by the lifting mechanism 522, a side part of the first pocket 541 may be pressed and accordingly at least a part of the first item 541b may be exposed in the space of the cabin. A first light source 541 may be disposed around an opening of the first pocket 541. The first light source 541 may be formed to surround an edge of the opening of the first pocket 541. When the first item 541 is selected, the color of output light of the first light source 541a around the first pocket 541 accommodating the first item 541 may be changed from a first color to a second color.

Figure 51:
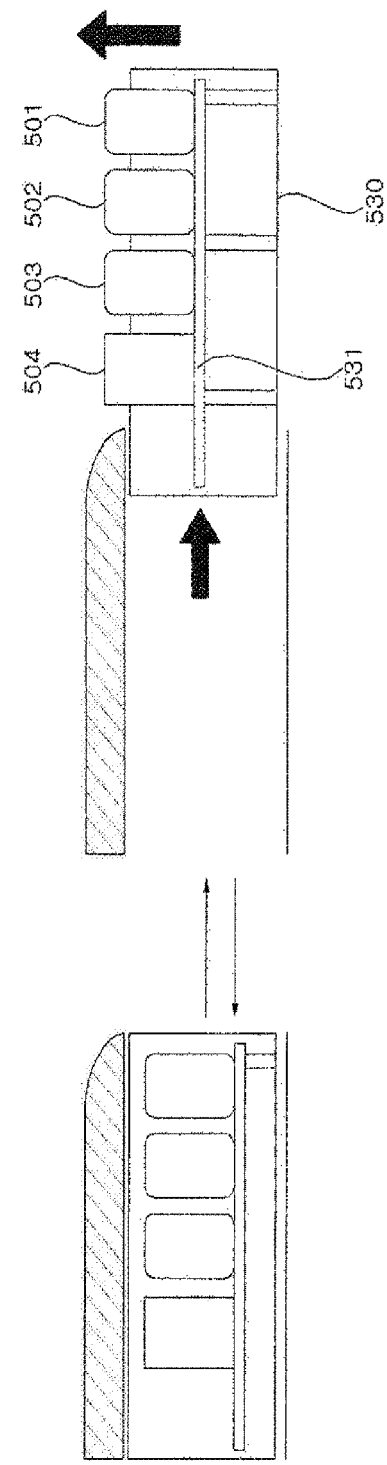
FIGS. 51 and 52 are diagrams referred to for explaining a moving mechanism according to an implementation of the present disclosure.
Figure 52:
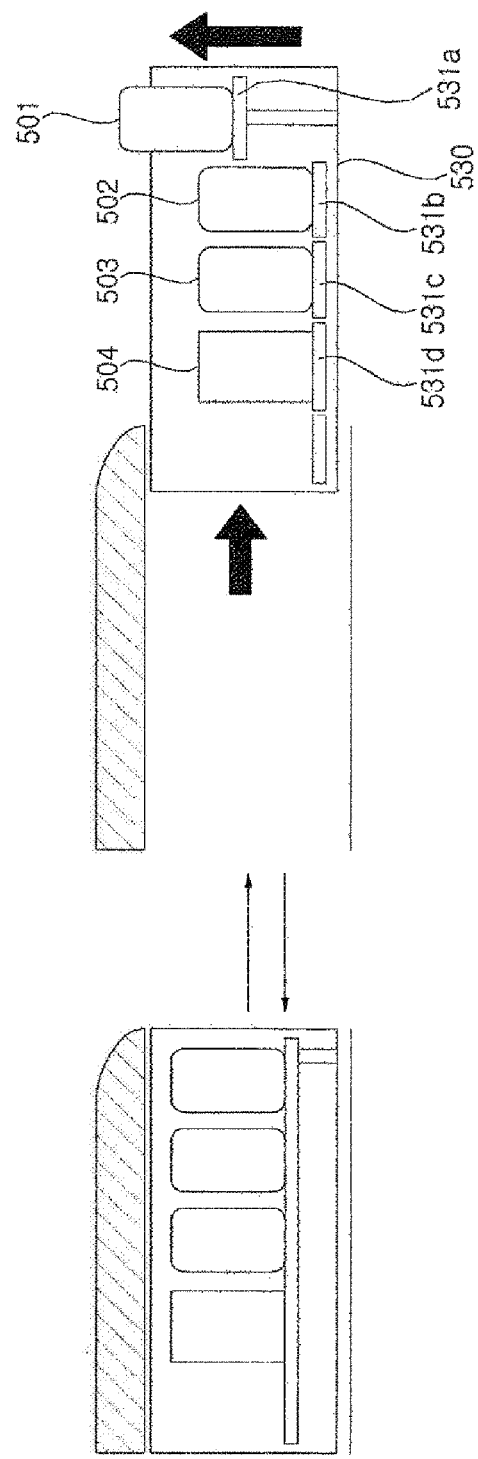

FIGS. 51 and 52 are diagrams referred to for explaining a moving mechanism for a storage area in a vehicle, according to an implementation of the present disclosure.

Referring to FIG. 51, the moving mechanism may include a sliding mechanism 521 and a lifting mechanism 522. The sliding mechanism 521 may include a drive unit, a power conversion unit, and a power transfer unit. The drive unit may convert electrical energy into kinetic energy. The drive unit may generate power. The drive unit may include at least one of a motor, an actuator, or a solenoid. The power conversion unit may convert the generated power into power suitable for moving the box 530. For example, the power conversion unit may convert power of rotational movement into power of linear movement. The power transfer unit may provide the converted power to the box 530. The sliding mechanism 521 may further include a rail. The box 530 may be able to slide using the rail based on power transferred by the power transfer unit.

The lifting mechanism 522 may include a drive unit, a power conversion unit, and a power transfer unit. The drive unit may convert electrical energy into kinetic energy. The drive unit may generate power. The drive unit may include at least one of a motor, an actuator, or a solenoid. The power conversion unit may convert the generated power into power suitable for moving the shelf 531. For example, the power conversion unit may convert power of rotational movement into power of linear movement. The shelf 531 may be lifted by the power transferred from the power transfer unit.

In some implementations, the shelf 531 may be classified as a sub-element of the box 530. The shelf 531 may allow at least one item 501, 502, 503, or 504 to be seated thereon. As illustrated in FIG. 51, the shelf 531 may be in the one body form. When the shelf 531 is in the one body form, a plurality of items 501, 502, 503, and 504 may be exposed all together in a space of the cabin by power provided from the lifting mechanism 522. As illustrated in FIG. 52, the shelf 531 may be in a separated form. The shelf 531 may allow the plurality of items 501, 502, 503, and 504 to be seated thereon. For example, the shelf 531 may include a plurality of shelves 531a, 531b, 531c, and 531d. A first item 501 may be seated on a first shelf 531a, and a second item 502 may be seated on a second 531b. The plurality of shelves 531a, 531b, 531c, and 531d may be lifted individually. For example, in accordance with a signal for selecting the first item 501, the first shelf 531a may be lifted by power provided from the lifting mechanism 522. In this case, only the first item 501 may be exposed in the space of the cabin.

Figure 53:
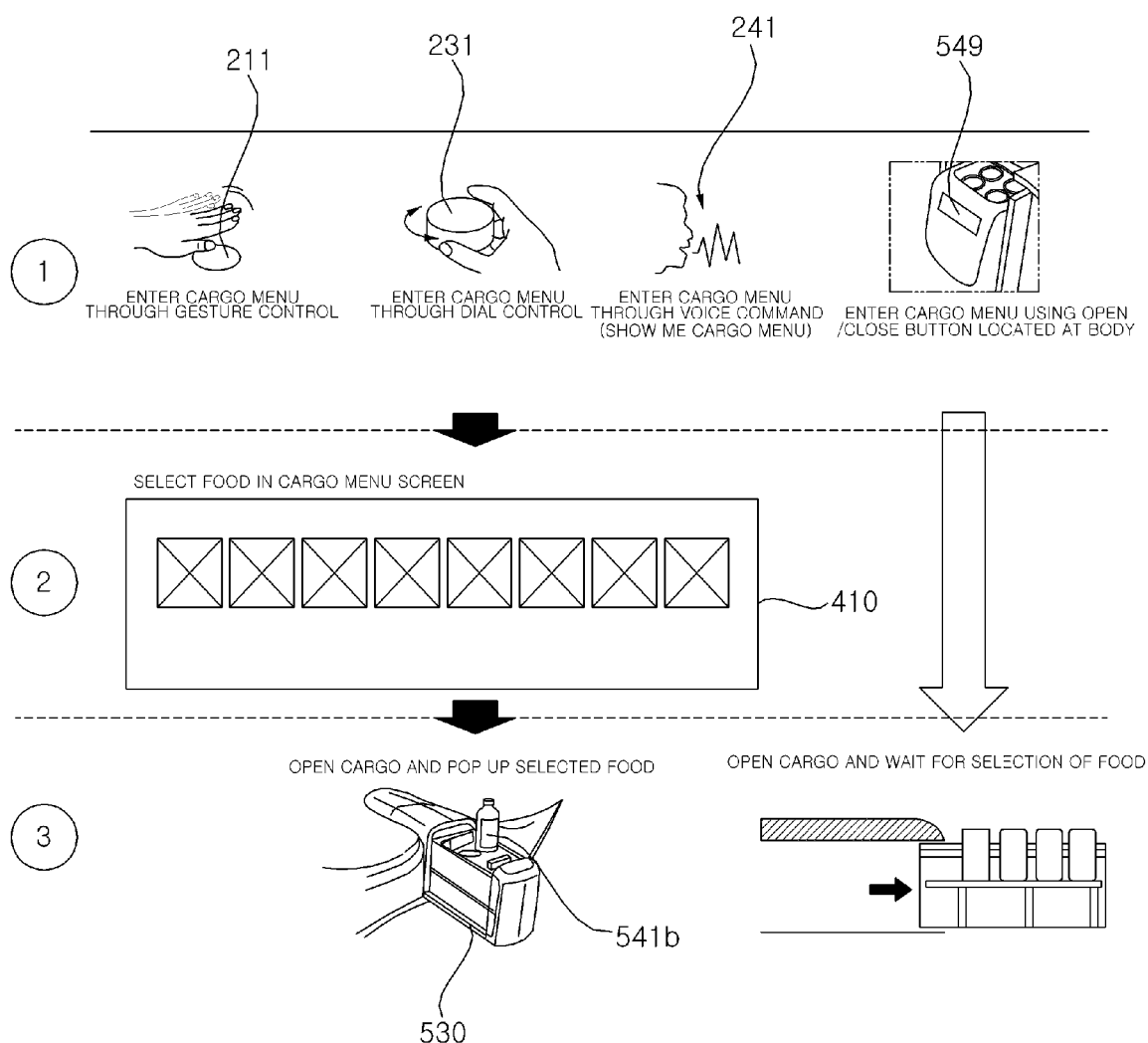
FIG. 53 is a diagram referred to for explaining how to expose an item in response to a user input according to an implementation of the present disclosure.

FIG. 53 is a diagram referred to for explaining how to expose an item in response to a user input according to an implementation of the present disclosure.

Referring to FIG. 53, the input device may receive a user input and convert the received user input into a first electrical signal. A touch sensor included in the touch input unit 210 may convert a user's touch input into an electrical signal. A gesture sensor 221 included in the gesture input unit 220 may convert a user's gesture input into an electrical signal. A jog dial included in the mechanical input unit 230 may convert a user's mechanical input into an electrical signal. The microphone 241 included in the voice input unit 240 may convert a user's voice input into an electrical signal.

The display system 400 may display an item menu on at least one display on the basis of an electrical signal converted by the input device 200. While the item menu is displayed on a display, the input device 200 may receive a user input of selecting an item. The input device 200 may convert a user input of selecting a first item into a second electrical signal.

Based on the second electrical signal, the processor 517 may control the sliding mechanism 521 to cause a box to move to a space of the cabin. Based on the second electrical signal, the processor 517 may control the lifting mechanism 522 to cause the first item to be exposed in the space of the cabin.

In some implementations, the cargo button 549 may convert a user input into an electrical signal. Based on the electrical signal, the processor 517 may control the sliding mechanism 521 to cause a box to move to the space of the cabin. Based on the electrical signal, the processor 517 may control the lifting mechanism 522 to cause a plurality of items to be exposed in the space of the cabin.

Figure 54:
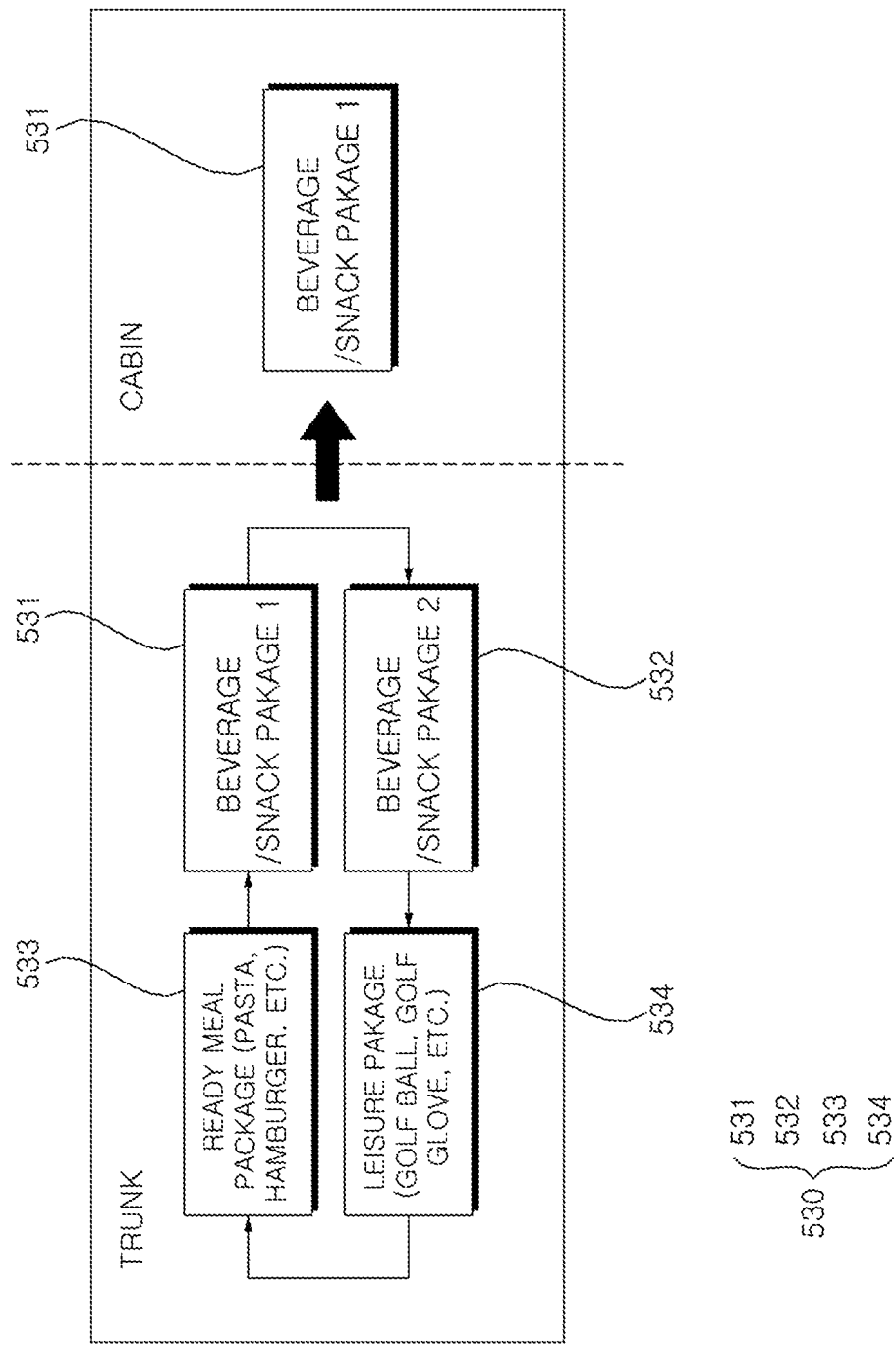
FIG. 54 is a diagram referred to for explaining how to open only a box selected from among a plurality of boxes according to an implementation of the present disclosure.

FIG. 54 is a diagram referred to for explaining how to open only a box selected from among a plurality of boxes according to an implementation of the present disclosure.

Referring to FIG. 54, the item providing device 510 may include a plurality of boxes 531, 532, 533, and 534. The plurality of boxes 531, 532, 533, and 534 may be disposed in a space outside the cabin. For example, the plurality of boxes 531, 532, 533, and 534 may be disposed in a trunk. In some implementations, the inside of the cabin may communicate with the trunk and accordingly the plurality of boxes 531, 532, 533, and 534 may be able to move from the trunk to the inside of the cabin or from the inside of the cabin to the trunk. In the trunk, a mechanism for circulating the plurality of boxes 531, 532, 533, and 534 may be provided.

A first box 531 may be selected according to one or more predetermined conditions. For example, the first box 531 may be selected by default setting. For example, the first box 531 may be selected from among the plurality of boxes in response to a user input. For example, the first box 531 may be selected based on a plurality of user preference data. For example, the first box 531 may be selected from among the plurality of boxes based on user purchase history data. For example, the first box 531 may be selected from among the plurality of boxes based on user destination data. The selected first box 531 may move from trunk to the inside of the cabin by the moving mechanism 520.

Figure 55:
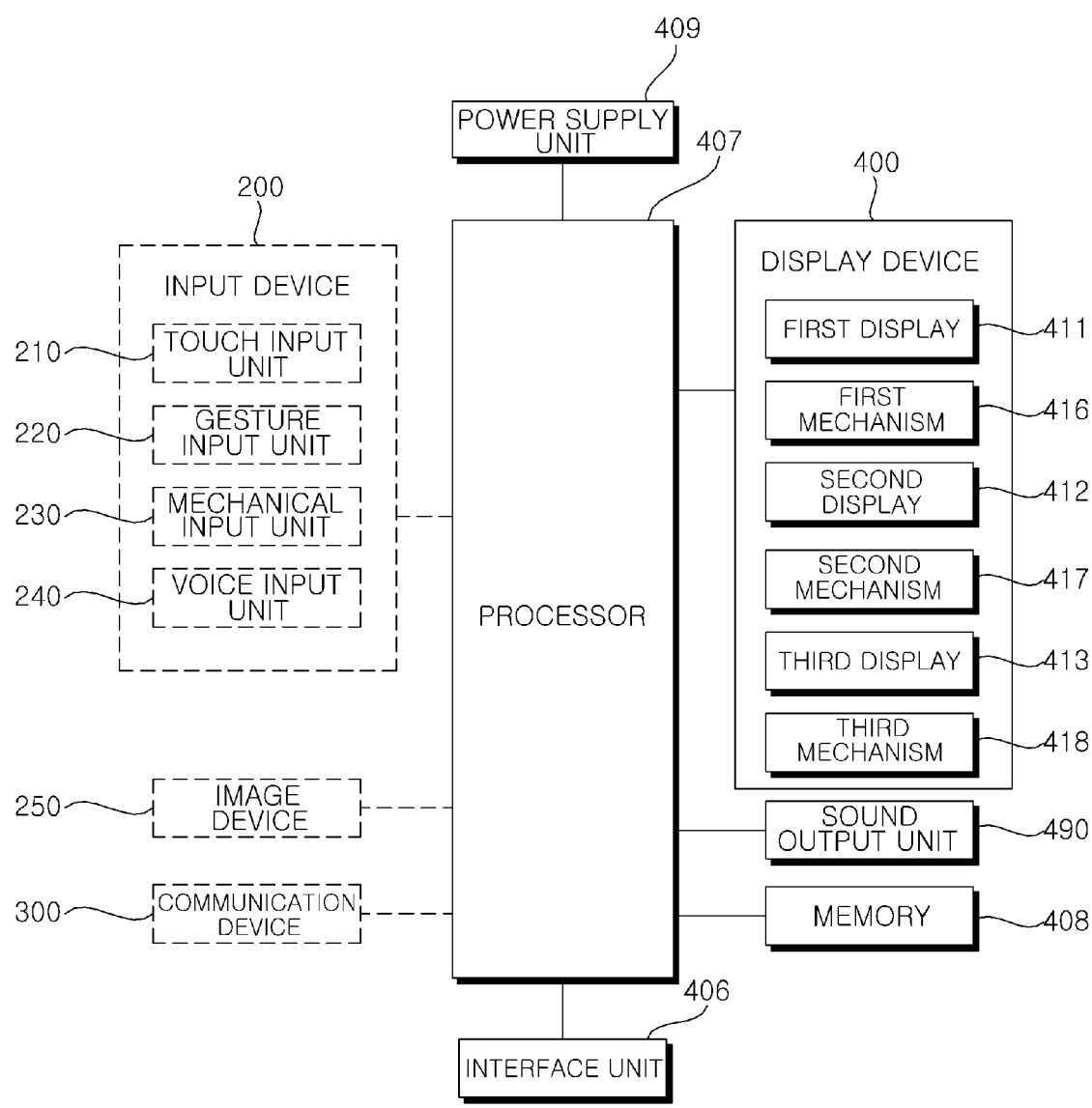
FIG. 55 is a control block diagram of a display system according to an implementation of the present disclosure.

FIG. 55 is a control block diagram of a display system according to an implementation of the present disclosure.

Referring to FIG. 55, the display system 400 may include an interface unit 406, a processor 407, a memory 408, a power supply 409, a display device 406, and a sound output unit 490. In some implementations, the display system 400 may include an input device 200, an imaging device 250, and a communication device 300 individually or in combination.

The description provided above with reference to FIGS. 1 to 55 may apply to the input device 200, the imaging device 250, the communication device, and the display device 410. Hereinafter, description not redundant with the description of FIGS. 1 to 55 will be provided primarily.

The input device 200 may receive a user input for manipulating the display device 410 and converts the user input into an electrical signal. The imaging device 250 may acquire an image for detecting a user's motion. The communication device 300 may receive, from at least one of an external server, a mobile terminal, or another vehicle a content to be output through the display device 410 and the sound output unit 490. In FIG. 55, the input device 200, the imaging device 250, and the communication device 300 are depicted as exchanging signals directly with the processor 407, but the input device 200, the imaging device 250, and the communication device 300 may also exchange signals with the processor via the interface unit 406.

The display system 400 may be installed in the vehicle 10. The display system 400 may be referred to as a vehicle display system. The display system 400 may provide a menu, a multi-media content, a video conference, driving situation information, etc. to a user in the cabin.

The interface unit 406 may exchange signals with at least one electronic device installed in the vehicle 10. In a wired or wireless manner, the interface unit 406 may exchange signals with at least one electronic device installed in the vehicle 10. The interface unit 406 may exchange signals at least one of the input device 200, the imaging device 250, the communication device 300, the cargo system 500, the seat system 600, or the payment system 700. The interface unit 406 may be electrically connected to the processor 407 and provide a received signal to the processor 407. The interface unit 406 may be at least one of a communication module, a terminal, a pin, a cable, a port, a circuit, an element, or a device.

The interface unit 406 may exchange signals with at least one of the input device 200, the imaging device 250, or the communication device 300. The interface unit 406 may exchange signals with the internal camera 251. The interface unit 406 may receive image data from the internal camera 251.

The processor 407 may control overall operation of each unit of the display system 400. The processor 407 may be electrically connected to the interface unit 406, the memory 408, and the power supply 409. The processor 407 may be one of sub-controllers included in the main controller 171. The processor 407 may operate by power provided from the power supply 409.

The processor 407 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 407 may receive a user input-based signal. The processor 407 may receive the user input-based signal from at least one of the input device 200, the imaging device 250, or the communication device. The processor 407 may provide a control signal to at least one of the display device 410 or the sound output unit 490.

The processor 407 may acquire various types of data regarding a user within the vehicle. For example, the processor 407 may acquire data regarding a user's sitting position. In some implementations, the processor 407 may receive the sitting position data from at least one electronic device installed in the vehicle 10. For example, the processor 407 may receive a user's sitting position data from the seat system 600. The seat system 600 may include a sitting position sensor. The processor 407 may receive sensing data generated by the sitting position sensor. For example, the processor 407 may receive sitting position data from a sensor such as imaging device 250. As a particular example, the processor 407 may receive sitting position data that is detected through image processing of image data of an internal camera (e.g., internal camera 251 in FIG. 4C, 40, 41, or 57).

Based on a user's sitting position, the processor 407 may provide a control signal to adjust a viewing angle of a display within the vehicle, such as display 411, 412, or 413. In some implementations, the processor 407 may provide a control signal so as to adjust a viewing angle of the display 411, 412, or 413 in accordance with a sitting position. The processor 407 may provide a control signal to at least one of a first display 411, a second display 412, or a third display 413. To control the viewing angle of these displays, the processor 407 may provide a control signal to at least one of a first mechanism 416, a second mechanism 417, or a third mechanism 418, for example.

In some implementations, the processor 407 may detect that a user has changed a sitting position within the vehicle. For example, the processor 407 may receive seat change data from the seat system 600 via the interface unit 406. In this case, the processor 407 may receive a user's gaze data (e.g., from the internal camera 251) via the interface unit 406. Based on the user's gaze data, the processor 407 may transmit a control signal to adjust a viewing angle of the display 411, 412, or 413.

In response to a user's sitting position, the processor 407 may provide a control signal to adjust a position of the display 411, 412, or 413. Adjusting the position of the display 411, 412, or 413 may be implemented by various mechanisms. For example, as discussed further below, adjusting the position of display 411, 412, or 413 may include (i) raising/lowering the display, (ii) rolling up/down the display, and/or (iii) changing a curvature of the display, just as some examples.

For example, based on a user's sitting position, the processor 407 may provide a control signal to a first mechanism 416 to raise or lower the first display 411. Based on the control signal, the first mechanism 416 may raise or lower the first display 411. As another example, based on a user's sitting position, the processor 407 may provide a control signal to a second mechanism 417 to roll up or down the second display 412. Based on the control signal, the second mechanism 417 may roll up or down the second display 412. As yet another example, based on a user's sitting position, the processor 407 may provide a control signal to a third mechanism 418 to change a curvature of the third display 413. Based on the control signal, the third mechanism 418 may change the curvature of the third display 413.

In some implementations, a display region location within a display 411, 412, or 413 may be adjusted based on a user's sitting position. For example, based on a user's sitting position, the processor 407 may provide a control signal to the display device 410 to change a location of a display region in the display 411, 412, or 413. Based on the control signal, the display device 410 may change a location of the display region in the display 411, 412, or 413 in at least one of an upward direction or a downward direction.

In some implementations, a viewing angle of a display may be adjusted based on a user's sitting position. For example, based on data received from at least one electronic device installed in the vehicle 10, the processor 407 may provide a control signal to adjust a viewing angle of the display 411, 412, or 413.

As a particular example, the processor 407 may receive image data including a user image from the internal camera 251. The processor 407 may detect a user's gaze and finger from the image data. The processor 407 may determine whether a virtual line connecting the user's gaze and finger meets a space where the display 411, 412, or 413 is allowed to be positioned. When it is determined that the virtual line meets the space where the display 411, 412, or 413 is allowed to be positioned, the processor 407 may output a user control availability notifying content. The processor 407 may display a graphic object or output a sound content. The processor 407 may track a motion of the finger of the user in the user image. Depending on the motion of the finger of the user, the processor 407 may provide a control signal to adjust a viewing angle of a display. In doing so, a user is allowed to adjust a viewing angle intuitively.

In some implementations, a position of an input device may be adjusted based on a user's sitting position. For example, based on a user's sitting position data, the processor 407 may provide a control signal to adjust a position of the input device 200. The processor 407 may provide a control signal so as to adjust the position of the input device 200 in accordance with a user's sitting position.

As a particular example, the processor 407 may provide a control signal to control a tilting angle of the touch input unit 210 in accordance with a user's sitting position. The processor 407 may provide a control signal to raise or lower the jog dial device in accordance with a user's sitting position. When a user's sitting position is lowered, the processor 407 may provide a control signal such that a manipulation guidance image displayed on an upper surface of the jog dial device is displayed on a side surface of the jog dial device.

In some implementations, one or more displays may be adjusted in various ways based on a number of occupants in the vehicle. The processor 407 may receive data on the number of occupants. The processor 407 may receive the data on the number of onboard users from at least one electronic device installed in the vehicle 10. For example, the processor 407 may receive data on the number of occupants from the seat system 600. The processor 407 may receive data on the number of occupants based on sitting sensors included in the seat system 600. For example, the processor 407 may receive data on the number of occupants from the imaging device 250. The processor 407 may acquire data on the number of occupants from at least one of the internal camera 251 or the external camera 252.

Based on data on the number of occupants, various types of display properties of display 411, 412, or 413 may be adjusted. Just as one example, the processor 407 may provide a control signal to divide a display region of the display 411, 412, or 413. Depending on the number of occupants, the processor 407 may provide a control signal to the display device 410 so as to divide a display region of the display 411, 412, or 413.

In some implementations, computer memory 408 may be electrically connected with the processor 407. The memory 408 may store various types of data, such as basic data for each unit, control data for the operational control of each unit, and input/output data. The memory 408 may be implemented as at least one of a ROM, a RAM, an EPROM, a flash drive, or a hard drive. The memory 408 may store various data for the overall operation of the display system 400 such as programs for the processing or control of the processor 407. In some implementations, the memory 408 may be integrally formed with the processor 407. The memory 408 may be driven by power supplied from the power supply 409.

The power supply 409 may supply power to the cabin system 100. The power supply 409 may be supplied with power from a power source (for example, a battery) included in the vehicle 10, and provide power to each unit of the display system 400. The power supply 409 may operate in accordance with a control signal from the processor 407. For example, the power supply 409 may be implemented as a switched mode power supply (SMPS).

The display system 400 may include at least one PCB. The interface unit 406, the processor 407, the memory 408, or the power supply 409 may be mounted onto at least one PCB.

The display device 410 may display at least one graphic object. By displaying a graphic object, the display device 410 may provide a menu, a multi-media content, a video conference, driving situation information, etc. to a user in the cabin. The description about the first display device 410 with reference to FIGS. 1 to 10 may apply to the display device 410.

The display device 410 may include at least one display 411, 412, or 413. In the example of FIG. 55, the display device 410 is depicted as including four displays, but the number of displays in the display device 410 may be any suitable number.

The display device 410 may include all of the first display 411, the first mechanism 416, the second display 412, the second mechanism 417, the third display 413, and the third mechanism, or may selectively include some of them.

As an example, the display device 410 may selectively include the first display 411 and the first mechanism 416. The first display 411 may be disposed in the rear of a seat and may be retractable in the cabin. The first mechanism 416 may move the first display 411.

As another example, the display device 410 may selectively include the second display 412 and the second mechanism 417. The second display 12 may be disposed at a ceiling in the cabin, and may be configured to be rollable. The second mechanism 417 may roll up and down the second display 412.

As yet another example, the display device 410 may selectively include the third display 413 and the third mechanism 418. The third display 413 may be disposed at a ceiling in the cabin and may be configured to be flexible. The third mechanism may bend or unbend the third display 413.

FIG. 56 illustrates an example of a user's sitting position according to an implementation of the present disclosure.

Referring to FIG. 56, a sitting position 441 or 442 of a user may be determined as a position of a user indicating that the user is sitting on a seat. A user's sitting position may be determined by various types of systems/devices and in various ways, as discussed below.

In some implementations, the seat system 600 may generate a user's sitting position data based on a sitting position sensor. For example, the seat system 600 may include a tilt sensor disposed at a backrest of a seat. The seat system 600 may generate a user's sitting position data based on sensing data generated by the tilt sensor.

In some implementations, the imaging device 250 may generate a user's sitting position data based on image processing. The imaging device 250 may include at least one processor to implement an image processing algorithm. The imaging device 250 may acquire a user image through the internal camera 251. For example, while a user is sitting on a seat, the imaging device 250 may generate the user's sitting position data based on a height of a head of the user. For example, the imaging device 250 may generate a user's sitting position data based on a tilt angle of the user's upper body or lower body relative to a bottom surface of the cabin.

In some implementations, a user's sitting position may be further classified into various types of sitting positions. For example, in the example of FIG. 56, a user's sitting position may be classified into a first sitting position 441 and a second sitting position 442. The first sitting position 441 may be defined as a position indicating that the user sits on a seat, and the second sitting position 442 may be defined as a position indicating that the user reclines or lies back on a seat. For example, the first sitting position 441 may be detected as a position relatively higher than the second sitting position 442, and the second sitting position 442 may be detected as a position relatively lower than the first sitting position 441.

Figure 57:
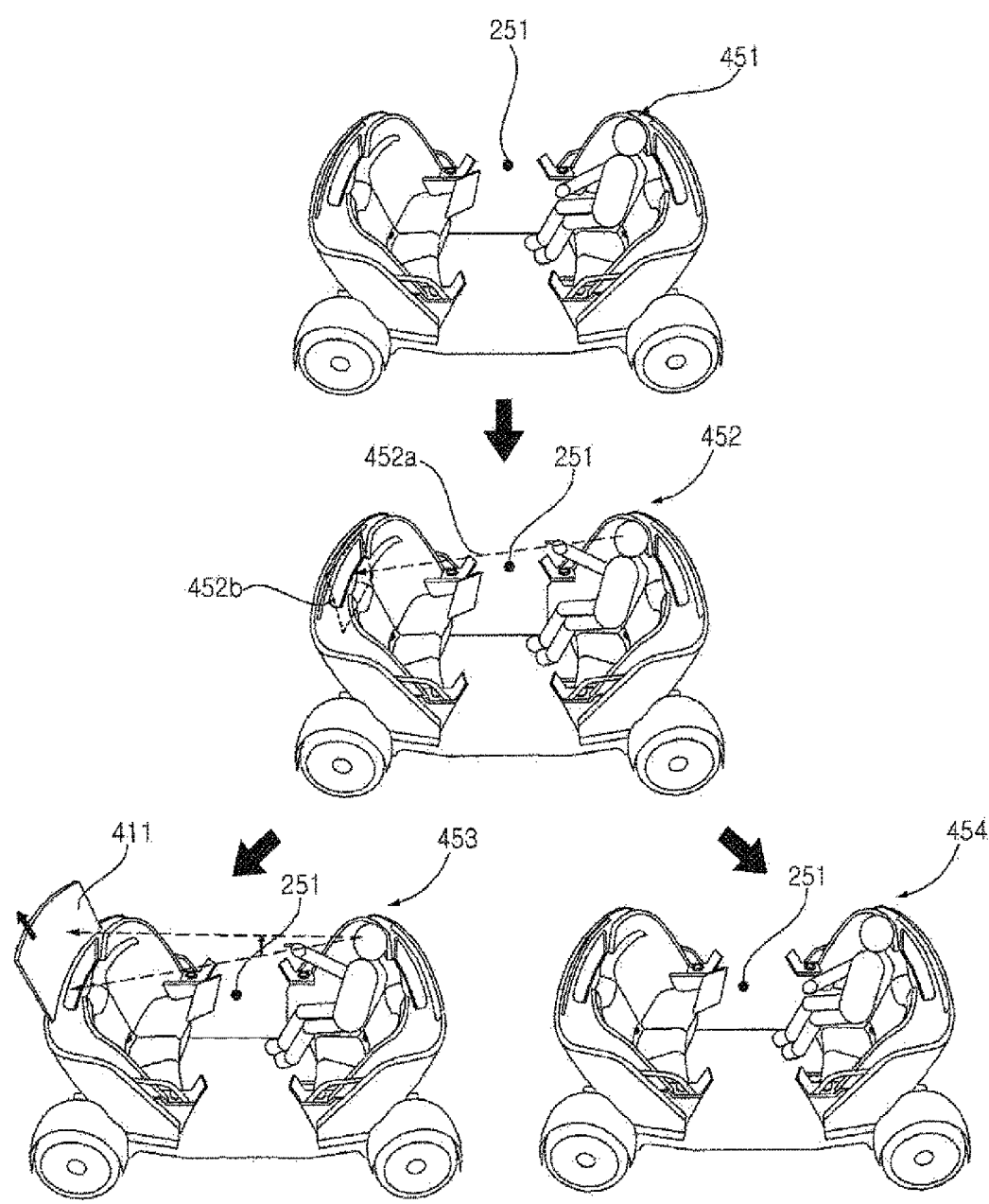
FIG. 57 illustrates an example of a user input for adjusting a display viewing angle according to an implementation of the present disclosure.

FIG. 57 illustrates an example of a user input for adjusting a display viewing angle according to an implementation of the present disclosure.

In some implementations, a user's input may be detected in various ways to control one or more displays in the vehicle.

For example, as illustrated with reference numeral 451, at least one processor (e.g., processor 407 in FIG. 55) may receive image data including a user image from the internal camera 251. Based on this image data, as illustrated with reference numeral 452, the processor 407 may detect a user's gaze and finger from the image data using a predetermined image processing algorithm.

As an example, based on the image data, the processor 407 may determine whether a virtual line 452*a* connecting the user's gaze and finger meets a space 452*b* where the display 411 is allowed to be positioned. When it is determined that the display 411 is positioned on the virtual line 452*a*, the processor 407 may output, via at least one of the display device 410 or the sound output unit 490, a content for notifying that a location of a display is controllable based on a user's motion.

As illustrated with reference numeral 453, the processor 407 may track a motion of a finger of a user and provide a control signal for adjusting a viewing angle of the display 411 based on the motion of the finger. For example, when a finger moving upward is tracked, the processor 407 may provide a control signal to move the first display 411 upwardly. For example, when a finger moving downward is tracked, the processor 407 may provide a control signal to move the display 411 downwardly. As illustrated with reference numeral 454, when a the user puts down his/her arm thus user's finger pointing at the display 411 is not detected, the processor 407 may terminate a display control process.

Figure 58:
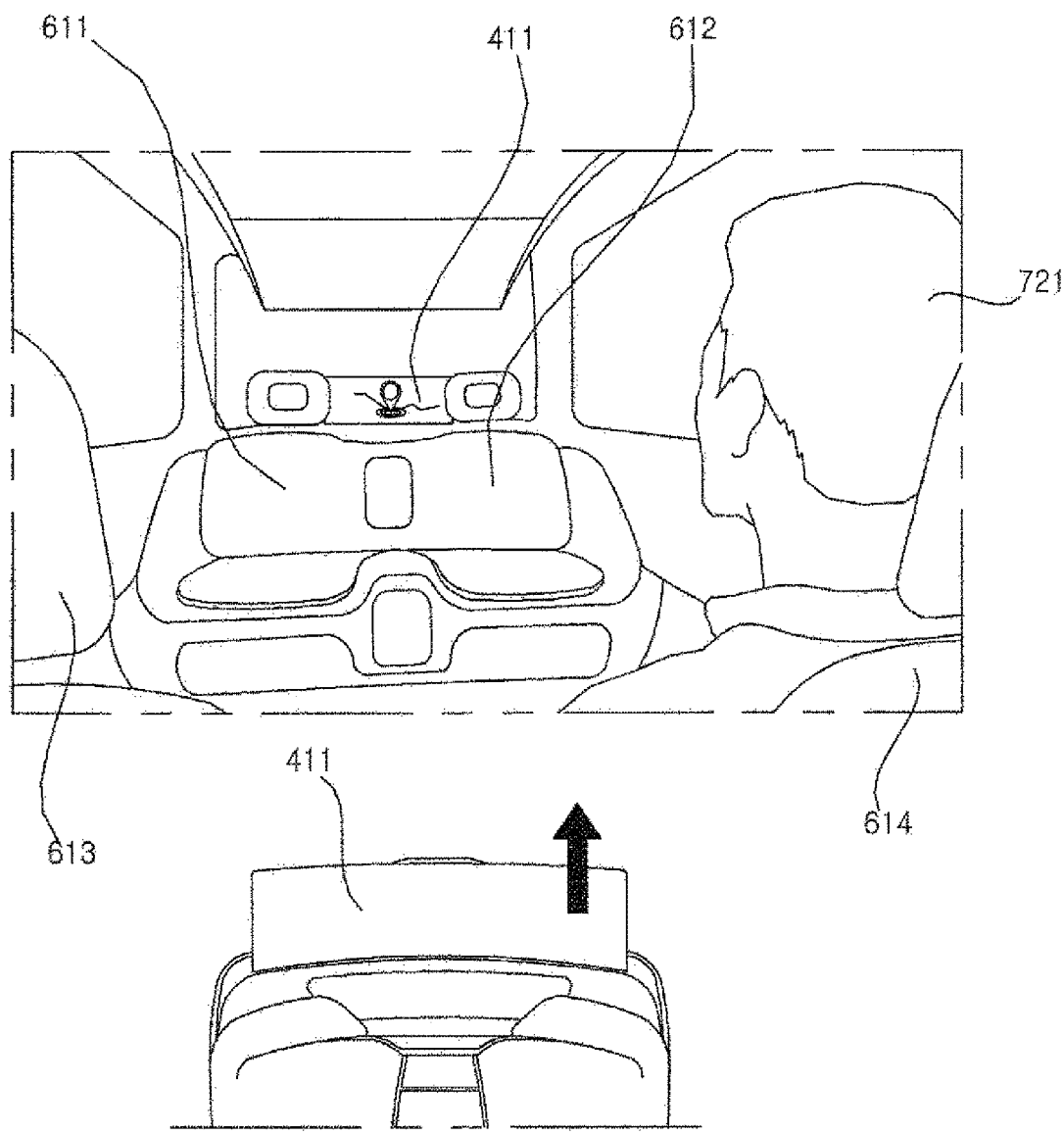

FIGS. 58 and 59 illustrate examples of a physical operation for adjusting a viewing angle of a first display according to an implementation of the present disclosure.

Referring to FIGS. 58 and 59, the first display 411 may be disposed at the back of at least one seat 611 or 612. For example, the first display 411 may be disposed at the rear of a first seat 611 and a second seat 612. In this case, the first display 411 may face a third seat and a fourth seat. A user sitting on the third seat or the fourth seat is able to view a content displayed on the first display 411. For example, the first display may be disposed at the rear of the third seat and the fourth seat. In this case, the first display 411 may face the first seat 611 and the second seat 612. A user sitting on the first seat 611 or the second seat 612 is able to view a content displayed on the first display 411.

The first display 411 may be retractable in the cabin. The first display 411 may be disposed in a slot formed in a seat frame. The first display 411 may be retractable from the slot to a space of the cabin or from the space of the cabin into the slot by a first mechanism. The first mechanism may allow at least a part of the first display 411 to move out of the slot to the space of the cabin or from the space of the cabin into the slot.

A first mechanism 416 may adjust a viewing angle by physically moving the first display 411. The first mechanism 416 may operate based on a control signal from at least one processor (e.g., processor 407 in FIG. 55). The first mechanism 416 may include a drive unit, a power conversion unit, and a power transfer unit. The drive unit may convert electrical energy into kinetic energy. The drive unit may generate power. The drive unit may include at least one of a motor, an actuator, or a solenoid. The power conversion unit may convert the generated power into power suitable for moving the first display 411. The power transfer unit may transfer the converted power to the first display 411.

At least one processor (e.g., processor 407 in FIG. 55) may provide a control signal to the first mechanism 416 so as to raise or lower the first display 411 in accordance with a user's sitting position.

For example, when data on a first sitting position 441 is acquired, the processor 407 may provide a control signal to the first mechanism 416 such that at least a part of the first display 411 comes out in the space of the cabin. As such, the first mechanism 416 may cause at least a part of the first display 411 to move into the space of the cabin from the slot. In this case, the first display 411 may be in a first state 411a.

As another example, when data on a second sitting position 422 is acquired, the processor 407 may provide a control signal to the first mechanism 416 such that at least a part of the first display 411 moves into the slot. The first mechanism 416 may cause at least a part of the first display 411 to move from the space of the cabin into the slot. In this case, the first display 411 may be in a second state 411b. The second state 411b may be understood as a state in which the first display 411 has an exposed region smaller than in the first state 411a.

In some implementations, the display device 410 may further include a flexible region adjusting mechanism. The flexible region adjusting mechanism may operate in accordance with a control signal from at least one processor (e.g., processor 407 in FIG. 55), for example, to adjust a display to be oriented in various directions, such as toward a user.

For example, the flexible region adjusting mechanism may include a first rail, a second rail, a post, a connector, and a driving unit. The first rail may be attached onto one surface of the first display 411. The first rail may be formed of a flexible material. The first rail may restrain one end of the connector in an overall-height direction. The first rail may guide the connector to slide in an overall-width direction.

The second rail may be attached to the bottom of the cabin or one portion of a seat frame. The second rail may retrain one end of a post in the overall-length direction. The second rail may guide the post to slide in the overall-width direction.

The post may extend in the overall-height direction. One end of the post may be inserted into the second rail and slide along the second rail in the overall-width direction. The connector may connect the post and the first display 411. One end of the connector may be inserted into the first rail. One end of the connector may be connected to the first rail, while bending one region of the first display 411 in a first direction.

The drive unit may provide power so as to enable the post to slide. The drive unit may include at least one of a motor, an actuator, or a solenoid. If the post slides along the second rail, the connector may slide along the first rail. In response to movement of the connector, a flexible region of the first rail may be changed, and, in response to the change of the flexible region of the first rail, the flexible region of the display 411 may be changed.

The flexible region adjusting mechanism may include a post extending in an upward-downward direction (e.g., the overall-width direction), and a connector connecting the post and the first display 411.

The first display 411 may be flexible in the left-right direction (e.g., the overall-width direction).

At least one processor (e.g., processor 407 in FIG. 55) may provide a control signal to the flexible region adjusting mechanism such that the first display 411 is oriented toward a user. The processor 407 may provide a control signal to the flexible region adjusting mechanism so as to adjust a flexible region of the first display 411 in response to a user's location.

Figure 60:
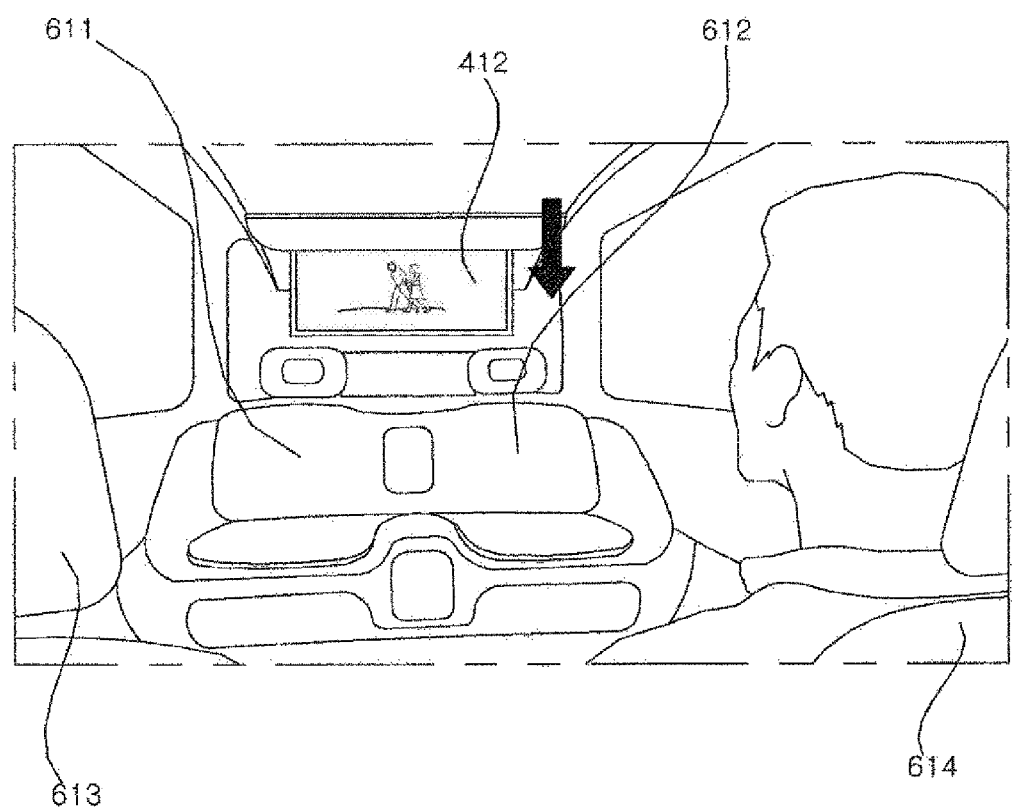

FIGS. 60 and 61 illustrates examples of a physical operation for adjusting a viewing angle of a second display according to an implementation of the present disclosure.

Referring to FIGS. 60 and 61, the second display 412 may be disposed at a ceiling in the cabin. The second display 412 may be rollable, for example, to rollably extend from or contract into the ceiling. In some implementations, the second display 412 may be implemented in a scroll-like mechanism, which controls the second display 412 to roll upwards or downwards.

For example, as shown in FIGS. 60 and 61, the second display 412 may be disposed between a region corresponding to the first seat 611 and a region corresponding to the third seat 613 facing the first seat 611 at the ceiling of the cabin. As another example, the second display 412 may be disposed between a region corresponding to the second seat 612 and a region corresponding to the fourth seat 614 facing the second seat 612 at the ceiling of the cabin.

In a rolled-up state, the second display 412 may be disposed in the overall-width direction at the ceiling. For example, in the rolled-up state, the second display 412 may roll upwards towards the ceiling, so as to not protrude or to protrude by a smaller amount from the ceiling.

In some implementations, the second display 412 may be formed such that a screen output is allowed on both surfaces of the second display 412. In such scenarios, users sitting on the first and second seats 611 and 612, and users sitting on the third and fourth seats 613 and 614 are all able to view a content displayed on the second display 412.

The second display 412 may be rolled down or up in the cabin by various mechanisms. For example, in some implementations, the second mechanism 417 may roll up or down the second display 412 using a scrolling-type mechanism. In such implementations, the second display 412 may be flexible, and may be rolled up or rolled down based on a scrolling operation in alternate directions.

The second mechanism 417 may adjust a viewing angle by physically moving the second display 412. The second mechanism 417 may operate based on a control signal from at least one processor (e.g., processor 407 in FIG. 55). The second mechanism 417 may include a drive unit, a power conversion unit, and a power transfer unit. The drive unit may convert electrical energy into kinetic energy. The drive unit may generate power. The drive unit may include at least one of a motor, an actuator, or a solenoid. The power conversion unit may convert the generated power into power suitable for moving the second display 412. The power transfer unit may transfer the converted power to the second display 412.

At least one processor (e.g., processor 407 in FIG. 55) may provide a control signal to the second mechanism 417 so as to roll up or down the second display 412 in accordance with a user's sitting position.

For example, when data on a first sitting position 441 is acquired, the processor 407 may provide a control signal to the second mechanism 417 such that at least a part of the second display 412 is rolled up. The second mechanism 417 may cause at least a part of the second display 412 to roll up at least a part of the second display 412. In this case, the second display 412 may be in a first state 412*a*.

As another example, when data on a second sitting position 422 is acquired, the processor 407 may provide a control signal to the second mechanism 417 such that at least a part of the second display 412 is rolled down. In this case, the second display 412 may be in a second state 412*b*. The second state 412*b* may be understood as a state in which the second display 412 has an exposed region greater than in the first state 412*a*.

Figure 63:
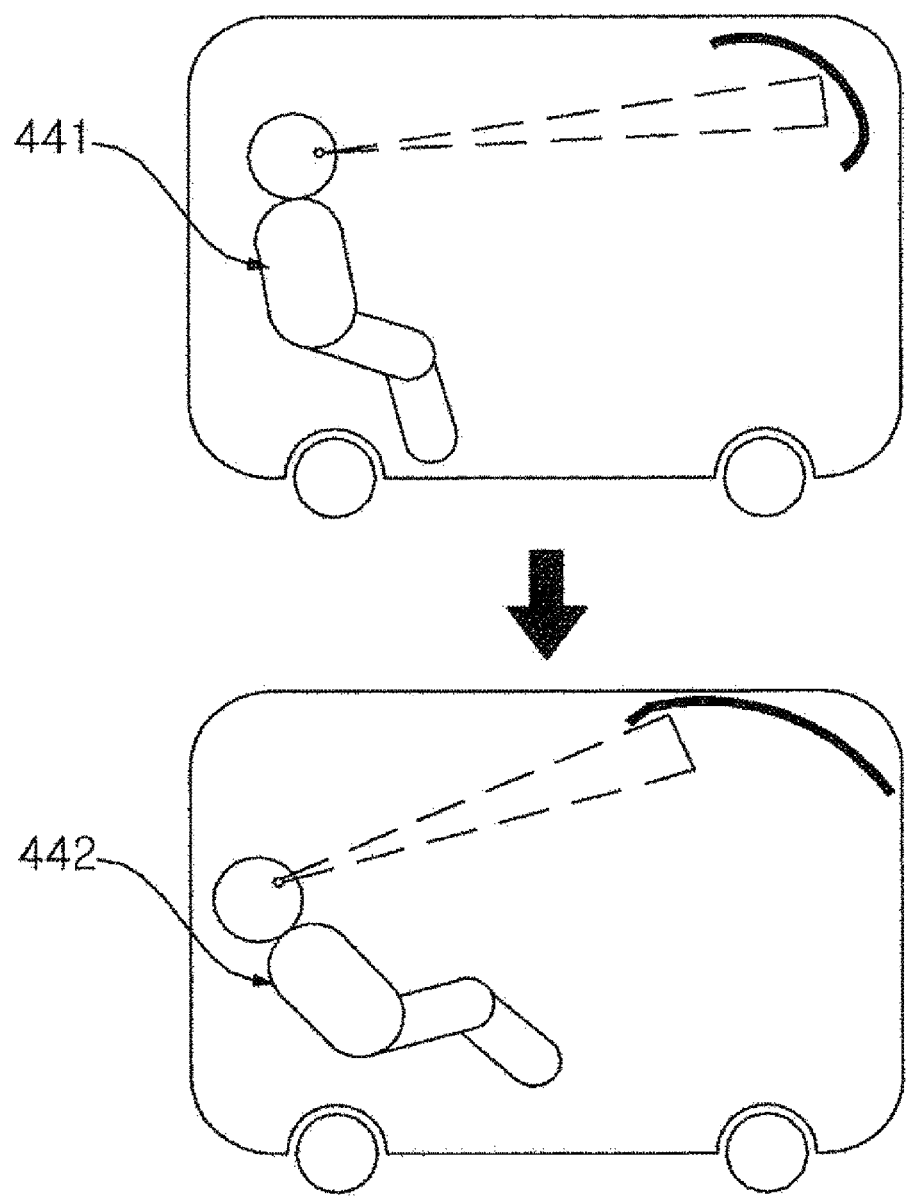

FIGS. 62 and 63 illustrate examples of a physical operation of adjusting a viewing angle of a third display according to an implementation of the present disclosure. In these examples, the third display 413 may have a curved or bent display that can be adjusted based on a user's sitting position.

In some implementations, the third display 413 may be disposed at the ceiling in the cabin. The third display 413 may be flexible. The third display 413 may be disposed at a location on the ceiling of the cabin, which faces the third seat 613 and the fourth seat 614. The third display 413 may be disposed at a location on the ceiling of the cabin, which faces the first seat 611 and the second seat 612. The third display 413 may be bent or unbent.

The third mechanism 418 may adjust a viewing angle by physically moving specific portions of the third display 413 to change a bending or curvature of the third display 413. The third mechanism may operate based on a control signal from at least one processor (e.g., processor 407 in FIG. 55). The third mechanism 418 may include a drive unit, a power conversion unit, and a power transfer unit. The drive unit may convert electrical energy into kinetic energy. The drive unit may generate power. The drive unit may include at least one of a motor, an actuator, or a solenoid. The power conversion unit may convert the generated power into power suitable for moving the third display 413. The power transfer unit may transfer the converted power to the third display 413.

At least one processor (e.g., processor 407 in FIG. 55) may provide a control signal to the third mechanism 418 so as to change a curvature of the third display 413 in accordance with a sitting position. As examples, the curvature of the third display 413 may be changed depending on whether a user is in a reclined or upright sitting position, so as to provide a suitable viewing angle.

For example, as shown in FIGS. 62 and 63, when data on a first sitting position 441 is acquired and indicates the user is in an upright position, the processor 407 may provide a control signal to the third mechanism 418 such that an upper part of the third display 413 is bent in a direction opposite to a direction toward the space of the cabin (e.g., away from a user). Additionally or alternatively, the lower part of the third display 413 may be bent in a direction toward the space of the cabin (e.g., toward the user). In this case, the third display 413 may be in a first state 413*a*.

As another example, when data on a second sitting position 422 is acquired and indicates the user is in a reclined position, the processor 407 may provide a control signal to the third mechanism 418 such that a lower part of the third display 413 is bent in the direction opposite to the direction toward the space of the cabin (e.g., away from the user). Additionally or alternatively, the upper part of the third display 413 may be bent in a direction opposite to a direction toward the space of the cabin (e.g., away from the user). In this case, the third display 413 may be in a second state 413*b*. As such, the second state 413*b* may be a state in which an area of the third display 413 facing the bottom of the cabin is greater than in the first state 413*a*, thus providing an appropriate viewing angle for a user in a more reclined sitting position.

Figure 64:
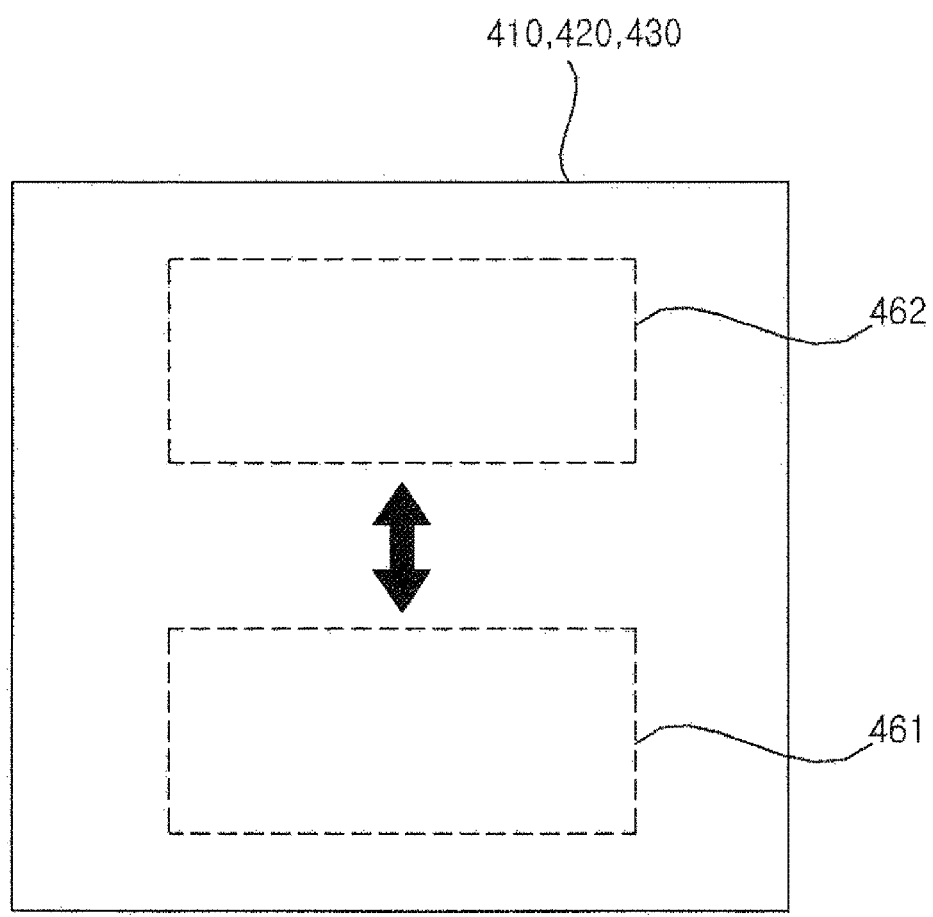
FIG. 64 is an example of adjusting a viewing angle in response to change in a location of a display region of a display according to an implementation of the present disclosure.

FIG. 64 is an example of adjusting a viewing angle in response to change in a location of a display region of a display according to an implementation of the present disclosure.

Referring to FIG. 64, while a region of a display (e.g., display 411, 412, or 413 in FIG. 55) is exposed to the space of the cabin, a display region of the display may be changed depending on a user's sitting position. At least one processor (e.g., processor 407 in FIG. 55) may change a location of the display region of the display (e.g., display 411, 412, or 413 in FIG. 55) in accordance with the user's sitting position.

For example, if a user's sitting position changes from a first sitting position (e.g., first sitting position 441 in FIG. 56) to a second sitting position (e.g., second sitting position 442 in FIG. 56), then the processor 407 may change a display region of the display from a first region 461 to a second region 462, as shown in FIG. 64.

As another example, if a user's sitting position changes from the second sitting position (e.g., 442 in FIG. 56) to the first sitting position (e.g., 441 in FIG. 56), then the processor 407 may change a display region of the display from the second region 462 to the first region 461. As such, the first region 461 may be a region of the display positioned lower than the second region 462.

FIG. 65 illustrates an example of adjusting a tilting angle by a touch input unit according to an implementation of the present disclosure.

Referring to FIG. 65, an input device (e.g., input device 200 in FIG. 55) may include a touch input unit (e.g., touch input unit 210 in FIG. 55) for converting a user's touch input into an electrical signal. The touch input unit may be integrally formed with a private display device (e.g., display device 420 in FIGS. 2 and 6) to implement a touch screen. The touch input unit may be disposed in at least one of a seat, an arm rest, or a door.

The input device 200 may further include a tilting mechanism. The tilting mechanism is able to physically move. The tilting mechanism may operate based on a control signal from at least one processor (e.g., processor 407 in FIG. 55). The tilting mechanism may include a drive unit, a power conversion unit, and a power transfer unit. The drive unit may generate power. The drive unit may include at least one of a motor, an actuator, or a solenoid. The power conversion unit may convert the generated power into power suitable for moving the touch input unit 210. The power transfer unit may transfer the converted power to the touch input unit 210.

At least one processor (e.g., processor 407 in FIG. 55) may provide a control signal to adjust a tilting angle of the touch input unit 210 in accordance with a sitting position.

For example, when data on a first sitting position 441 is acquired, at least one processor (e.g., the processor 407 in FIG. 55) may provide a control signal to the tilting mechanism such that the touch input unit 210 forms a flat state with a neighboring structure (e.g., a seat, an arm rest, and a door). In this case, a tilting angle may be a relatively small angle of tilt (e.g., 0 degrees). In this case, the touch input unit 210 may be in a first state 210*a*.

As another example, when data on a second sitting position 442 is acquired, at least one processor (e.g., processor 407 in FIG. 55) may provide a control signal to the tilting mechanism such that the touch input 210 is tilted. The tilting mechanism may tilt the touch input unit 210. In this case, the tilting angle may be a relatively larger angle of tilt (e.g., equal to or greater than 1 degree and equal to or smaller than 90 degrees). The touch input unit 210 may be in a second state 210b. As such, the second state 210b may be a state in which the touch input unit 210 is tilted greater than in the first state 210a.

Figure 66:
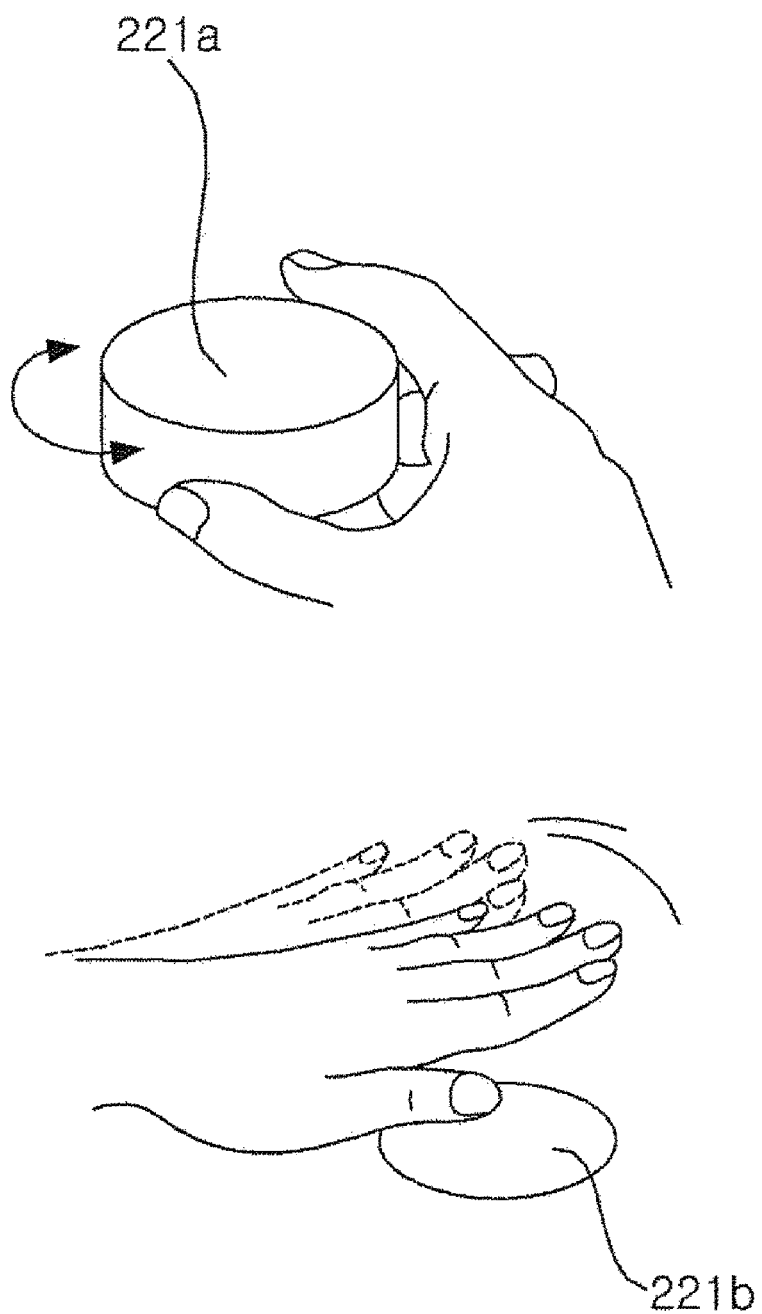
FIG. 66 illustrates an example of raising and lowering a jog dial device according to an implementation of the present disclosure.

FIG. 66 illustrates an example of raising and lowering a jog dial device according to an implementation of the present disclosure.

Referring to FIG. 66, an input device (e.g., input device 200 in FIG. 55) may include a jog dial device which includes a gesture sensor, and which is retractable from at least one portion of a seat, an arm rest, or a door. In some implementations, on an upper surface of the jog dial device, a manipulation guidance image may be displayed. The manipulation guidance image may be removed in accordance with a control signal from at least one processor (e.g., processor 407 in FIG. 55). On a side surface of the jog dial device, a manipulation guidance image may be displayed. The manipulation guidance image may be removed in accordance with a control signal from the processor 407.

The input device 200 may further including an escalating (raising and lowering) mechanism. The escalating mechanism may operate based on a control signal from at least one processor (e.g., processor 407 in FIG. 55). The escalating mechanism may include a drive unit, a power conversion unit, and a power transfer unit. The drive unit may generate power. The drive unit may include at least one of a motor, an actuator, or a solenoid. The power conversion unit may convert the generated power into power suitable for moving the jog dial device. The power transfer unit may transfer the converted power to the jog dial device.

The processor 407 may provide a control signal so as to raise or lower the jog dial device in accordance with a sitting position.

For example, when data on a first sitting position (e.g., first sitting position 441 in FIG. 56) is acquired, at least one processor (e.g., processor 407 in FIG. 55) may provide a control signal to the escalating mechanism such that the jog dial device forms a flat state with a neighboring structure (e.g., a seat, an arm rest, and a door). The escalating mechanism may raise the jog dial device. In this case, the jog dial device may be in a first state 221a. In the first state 221a, the jog dial device may function as the mechanical input unit 230.

As another example, when data on a second sitting position (e.g., second sitting position 442 in FIG. 56) is acquired, at least one processor (e.g., processor 407 in FIG. 55) may provide a control signal to the escalating mechanism such that the jog dial device protrudes compared to a neighboring structure. The escalating mechanism may lower the jog dial device. In this case, the jog dial device may be in a second state 221b. In the second state 221b, the jog dial device may function as the gesture input unit 220.

In some implementations, when a sitting position is lowered (e.g., when the first sitting position 441 is changed to the second sitting position 442), the processor 407 may provide a control signal such that a manipulation guidance image displayed on the upper surface of the jog dial device is displayed on the side surface of the jog dial device.

Figure 67:
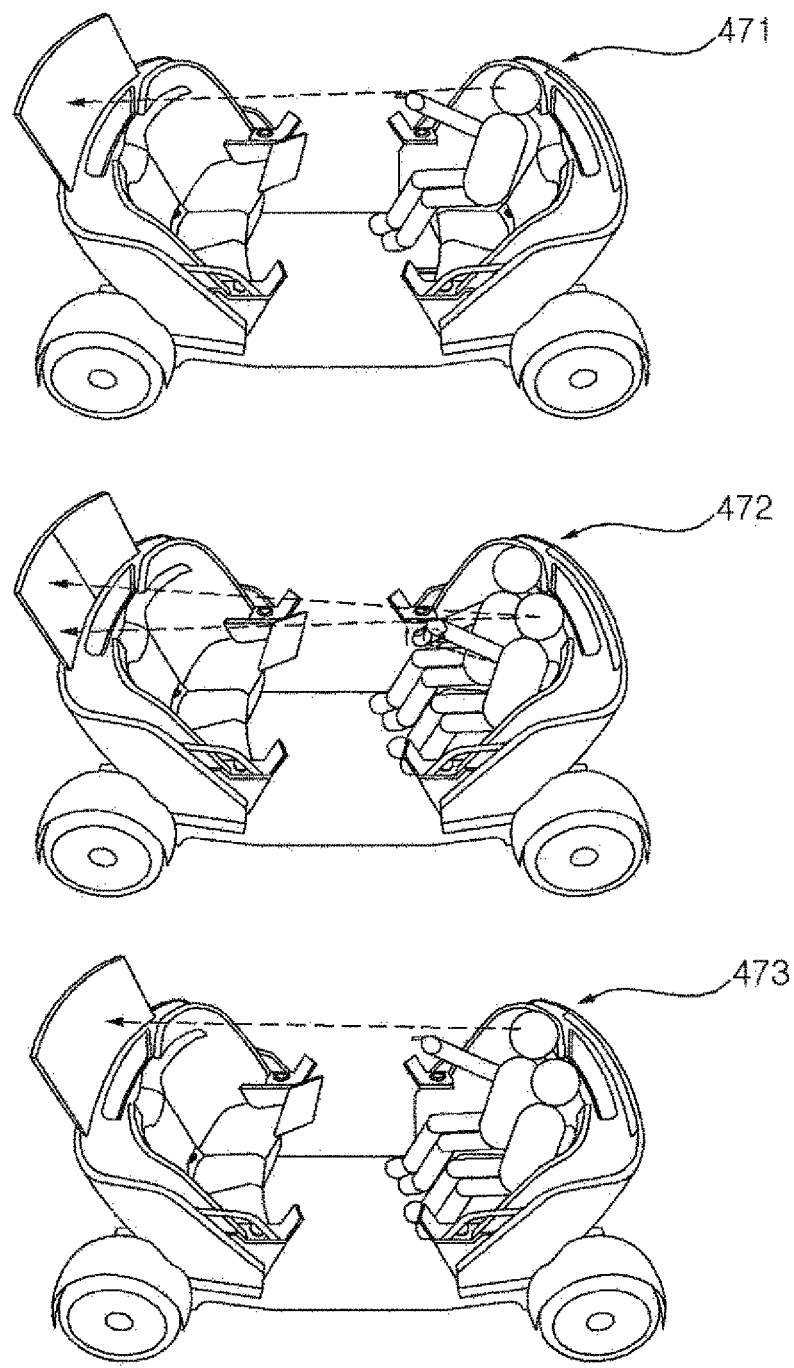
FIG. 67 illustrates an example of dividing a display region of a display based on the number of occupants according to an implementation of the present disclosure.

FIG. 67 illustrates an example of dividing a display region of a display based on the number of occupants according to an implementation of the present disclosure.

Referring to FIG. 67, the processor 407 may provide a control signal to the display device (e.g., display device 410 in FIG. 55) to divide a display region of the display (e.g., display 411, 412, or 413 in FIG. 55) based on the number of occupants.

For example, as illustrated with reference numeral 471 in FIG. 67, when one user is onboard, at least one processor (e.g., processor 407 in FIG. 55) may display a content in the entire region of the display. As illustrated with reference numeral 472, when a first user and a second user are onboard, the processor 407 may divide the display 411, 412, or 413 into a first region and a second region. Then, the processor 407 may display a first content for the first user in the first region and a second content for the second user in the second region. As illustrated with reference numeral 473, when the first user and the second user request the same content, the processor 407 may display the same content in the entire region of the display 411, 412, or 413.

Figure 68:
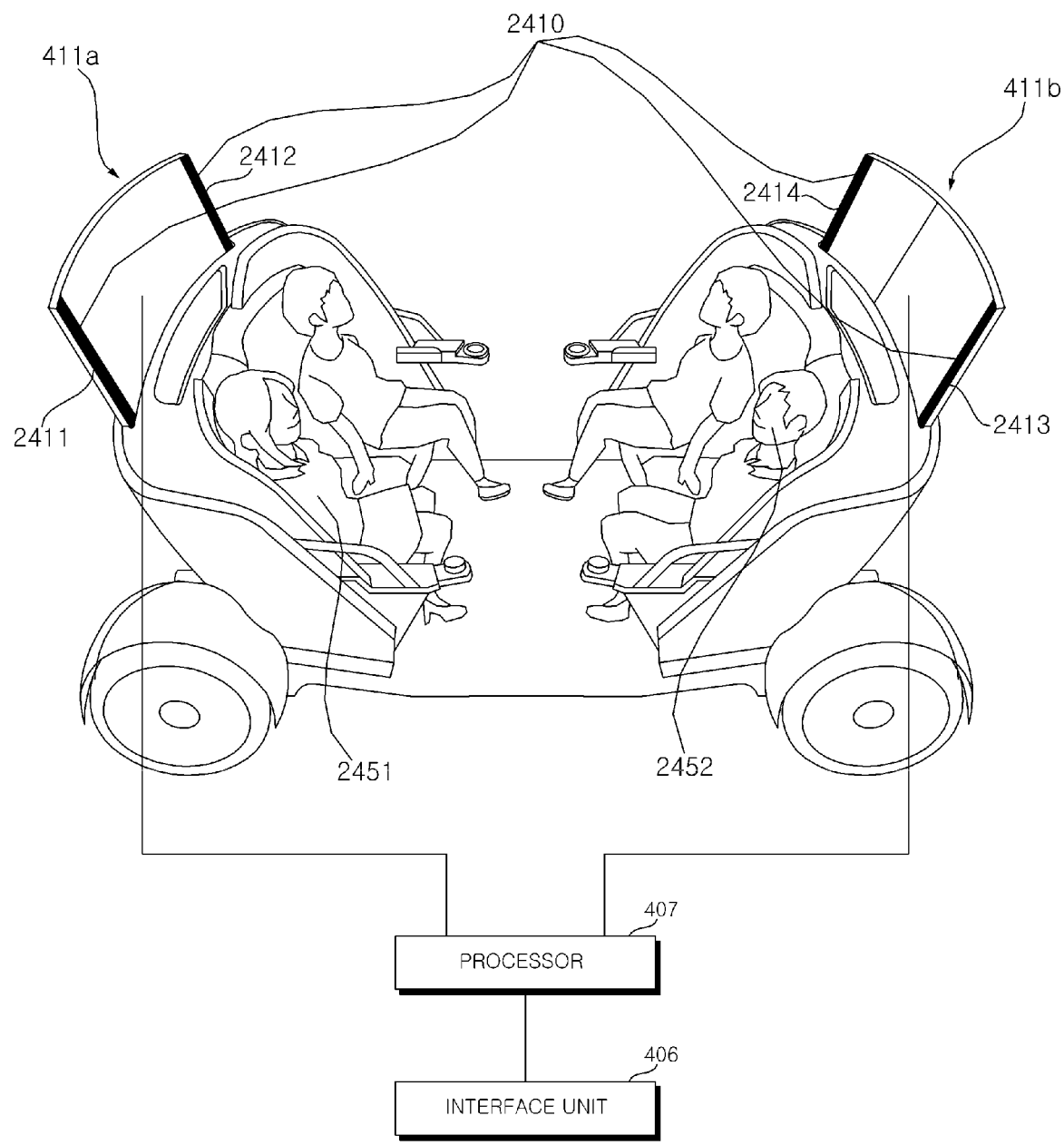
FIGS. 68 and 69 are diagrams referred to for explaining a vehicle car-sickness alleviating system according to an implementation of the present disclosure.
Figure 69:
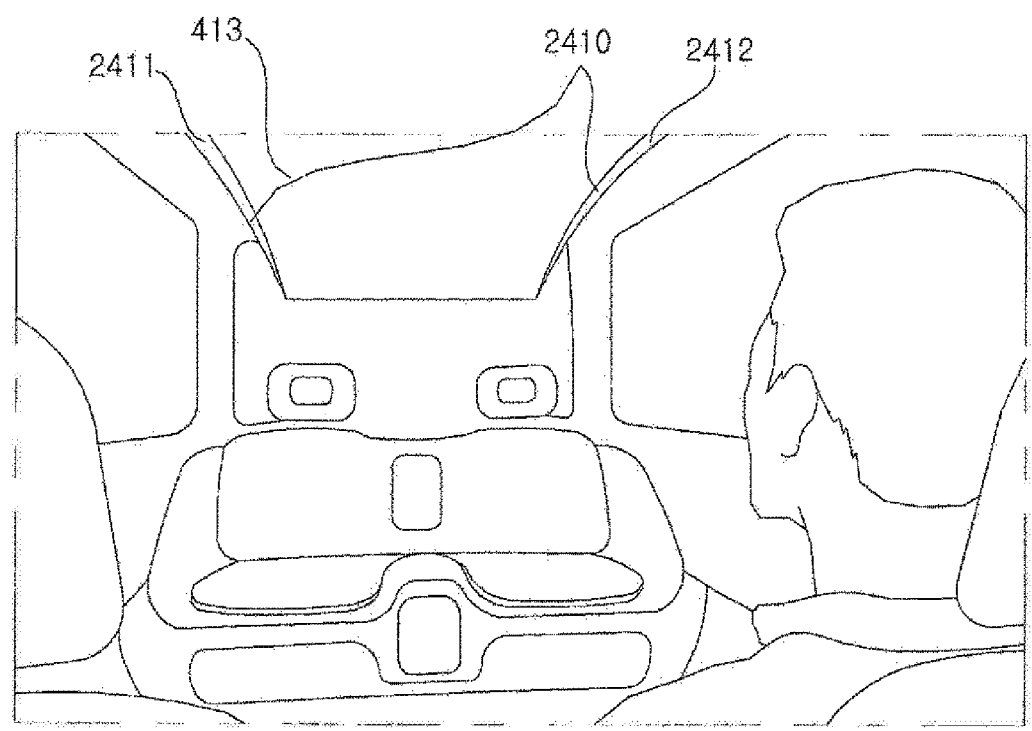

FIGS. 68 and 69 are diagrams referred to for explaining a vehicle car-sickness alleviating system according to an implementation of the present disclosure. FIG. 68 illustrates an example of a first display, and FIG. 69 illustrates an example of a third display.

Referring to FIGS. 68 and 69, in some implementations, a display system (e.g., display system 400 in FIG. 55) may operate as a vehicle car-sickness alleviating system. In such implementations, the display system 400 performing a car-sickness alleviating operation may be referred to as the car-sickness alleviating system 400.

The car-sickness alleviating system 400 may include an interface unit 406, at least one light output region 2410, and at least one processor 407. The car-sickness alleviating system 400 may further include at least one of an input device 200, an imaging device 250, a communication device 300, a sound output unit 490, a memory 408, or a power supply 409. The description provided with reference to FIGS. 55 to 67 may apply to description about each component of the car-sickness alleviating system 400.

The interface unit 406 may exchange signals with at least one electronic device installed in the vehicle 10. The interface unit 406 may receive information on a state of the vehicle 10 from at least one sensor installed in the vehicle 10. The interface unit 406 may receive information on a state of the vehicle from at least one Electronic control Unit (EUC) installed in the vehicle 10.

For example, from at least one electronic device, the interface unit 406 may receive at least one of the following: information on a stopped state of the vehicle 10, information on a driving speed of the vehicle 10, information on a steering direction of the vehicle 10, information on an upward or downward movement of the vehicle 10, and information on a heading direction of the vehicle 10. The interface unit 406 may receive driving situation information of the vehicle 10 from at least one electronic device. For example, the interface unit 406 may receive, from at least one electronic device, information on a geographical feature of a road on which the vehicle 10 is traveling.

In some implementations, the interface unit 406 may exchange signals with the seat system 600. The interface unit 406 may exchange signals with a seat position adjusting mechanism included in the seat system 600. The seat position adjusting mechanism may adjust a position of a seat based on a signal from the processor 407.

The interface unit 406 may exchange signals with the communication device 300 that performs wireless communication with the mobile terminal 390.

The at least one light output region 2410 may be disposed around at least one display screen. The at least one light output region 2410 may be mechanically integral with a display screen. Together with at least one display screen, the at least one light output region 2410 may forms at least one of the displays 411, 412, and 413 of the display device 410.

In this case, the at least one light output region 2410 may be implemented in at least one region of the displays 411, 412, and 413.

In some implementations, the at least one light output region 2410 may be mechanically detachable from a display screen. The at least one light output region 2410 may include at least one light source. The light source may operate based on a control signal generated by the processor 407. It is preferable that the light source is a surface light source.

In some implementations, a rear seat may be defined as a seat on which a user sits toward a forward direction of travel of the vehicle 10. A front seat may be defined as a seat on which a user sits in a rearward direction of travel of the vehicle 10.

In some implementations, at least one display 411 may include a rear seat display 411*a* and a front seat display 411*b*. Although FIG. 68 illustrates only the first rear seat display 411*a* and the front seat display 411*b* included in the first display 411, even each of the second display 412 and the third display 413 may include a rear seat display and a front seat display.

The rear seat display 411*a* may face a direction that is opposite to the forward direction of travel of the vehicle 10. The rear seat display 411*a* may be disposed to allow a user in a rear seat 2452 to view a corresponding screen. The at least one light output region 2410 may include: a first light output region 2411 disposed on the left side of the rear seat display 411*a* with reference to the forward direction of the travel of the vehicle 10; and a second light output region 2412 disposed on the right side of the rear seat display 411*a* with reference to the forward direction of travel of the vehicle 10.

The front seat display 411*b* may face the forward direction of travel of the vehicle 10. The front seat display 411*b* may be disposed to allow a user in the front seat 2451 to view a corresponding screen. The at least one light output region 2410 may include: a third light output region 2413 disposed on the left side of the front seat display 411*b* with reference to the forward direction of travel of the vehicle; and a fourth light output region 2414 disposed on the right side of the front seat display 411*b* with reference to the forward direction of travel of the vehicle 10.

The processor 407 may receive information on a state of the vehicle 10 from an electronic device via the interface unit 406. Based on the information on a state of the vehicle 10, the processor 407 may provide a control signal to the light output region 2410 so as to change a pattern of light emitting from the light output region 2410. By changing a pattern of light to be output, it is possible to allow a user to recognize movement of the vehicle. Accordingly, car sickness occurs when the user views a display screen may be alleviated.

The processor 407 may receive information on a stopped state of the vehicle 10 from an electronic device. Based on the information on a stopped state of the vehicle 10, the processor 407 may provide a control signal such that changing a pattern of light emitting from the light output region 2410 is stopped. In some implementations, based on information on a stopped state of the vehicle 10, the processor 407 may provide a control signal such that a pattern of light emitting from the light output region 2410 is changed at a predetermined speed. While the vehicle 10 remains in a stopped state, the processor 407 may stop changing a pattern of light or may change the pattern of light at a predetermined speed so as to allow a user to recognize the stopped state of the vehicle 10.

The processor 407 may receive information on a driving speed of the vehicle 10 from an electronic device. Based on the information on a driving speed of the vehicle 10, the processor 407 may adjust a speed of changing a pattern of light emitted from the light output region 2410. For example, the processor 407 may adjust a light pattern changing speed in proportion to the driving speed of the vehicle 10. Based on information on a change in the driving speed of the vehicle 10, the processor 407 may adjust a speed of changing a pattern of light emitted from the light output region 2410. For example, the processor 407 may adjust a light pattern changing speed in proportion to a change in the driving speed of the vehicle 10.

The processor 407 may receive a driving speed of the vehicle 10 from an electronic device. Based on information on the driving speed of the vehicle 10, the processor 407 may adjust a length of a light emitting region in the light output region 2410. For example, the processor 407 may adjust the length of the light emitting region in the light output region 2410 in proportion to a driving speed value of the vehicle 10.

The processor 407 may receive information on steering of the vehicle 10 from an electronic device. Based on information on a steering direction and a degree of steering of the vehicle 10, the processor 407 may adjust a width of a light emitting region in the light output region 2410.

In some implementations, depending on a steering direction of the vehicle 10, the processor 407 may select at least one of a light output region disposed on the left side of a screen or a light output region disposed on the right side of the screen.

In some implementations, the processor 407 may adjust a width of a light emitting region of the selected light output region in proportion to a degree of steering of the vehicle 10.

For example, when information on steering to the left is received, the processor 407 may increase a width of a first light output region 2411 disposed in the rear seat display 411*a*. In this case, the processor 407 may decrease or maintain a width of a second light output region 2412 disposed in the vicinity of the rear seat display 411*a*.

As another example, when information on steering to the right is received, the processor 407 may increase a width of the second light output region 2412 disposed on the right side of the rear seat display 422*a*. In this case the processor 407 may decrease or maintain a width of the first light output region 2411 disposed in the vicinity of the rear seat display 411*a*.

As another example when information on steering to the left is received, the processor 407 may increase a width of a fourth light output region 2414 disposed on the right side of the front seat display 411*b*. In this case the processor 407 may decrease or maintain a width of a third light output region 2413 disposed on the left side of the front seat display 411*b*.

As another example, when information on steering to the right is received, the processor 407 may increase a width of the third light output region 2413 disposed on the left side of the front seat display 411*b*. In this case, the processor 407 may decrease or maintain a width of the fourth light output region 2414 disposed on the right side of the front seat display 411*b*.

The processor 407 may receive information on upward or downward movement of the vehicle 10 from an electronic device. Based on the information on upward or downward movement of the vehicle 10, the processor 407 may change a location of a light emitting region of a light output region. The processor 407 may change the location of the light emitting region in a direction opposite to a direction of the upward or downward movement of the vehicle 10.

For example, when a front wheel of the vehicle 10 is raised by a road surface object (e.g., a bump) and accordingly information on raised movement of the vehicle 10 is received, the processor 407 may change a location of a light emitting region 2410 in the light output region 2410 downwardly. For example, when a front wheel of the vehicle 10 is lowered by a road surface object and accordingly information on lowered movement of the vehicle 10 is received, the processor 407 may change a location of a light emitting region in the light output region upwardly.

The processor 407 may receive information on a geographical feature of a road from an electronic device. The processor 407 may display, on at least one region of a display screen, a graphic object corresponding to the information on the geographical feature of the road. By displaying the graphic object corresponding to the information on the geographical feature of the road, it is possible to allow a user to recognize the geographical feature and to anticipate movement of the vehicle 10 caused by the geographical feature, thereby alleviating the user's car sickness.

The processor 407 may receive information on at least one of acceleration, deceleration, or steering in response to a geographical feature of a road from an electronic device. The processor 407 may display, on at least one region of a display screen, a graphic object corresponding to information on at least one of acceleration, deceleration, or steering. By displaying the graphic object corresponding to the information on at least one of acceleration, deceleration, or steering, it is possible to allow a user to recognize movement of the vehicle 10, thereby alleviating the user's car sickness.

While displaying a graphic object related to a video conference on at least one region of a display screen, the processor 407 may provide a control signal so as to change a pattern of light emitted from a light output region.

The processor 407 may transmit data on change of a pattern of light emitted from a light output region to the mobile terminal 390 via the interface unit 406 and the communication device 300. When the mobile terminal 390 is positioned in the cabin 100 and a user viewing the mobile terminal 390 is detected, the processor 407 may transmit data on change of a pattern of light to the mobile terminal 390. By changing a pattern of light, the mobile terminal 390 may alleviate car sickness of the user.

The processor 407 may receive information on a state of the vehicle 10 from an electronic device. Based on the information on the state of the vehicle 10, the processor 407 may provide a control signal to a seat position adjusting mechanism via the interface unit 406 to adjust a position of a seat in a direction different from a direction of an inertial force of the vehicle 10. The processor 407 may provide a control signal to the seat position adjusting mechanism via the interface unit 406 to keep a seat horizontal. When it is determined that a user is viewing a display screen, the processor 407 may provide a control signal to adjust a position of a seat. In doing so, the user may feel as if the vehicle 10 is not moving, and thus the user's car sickness may be alleviated.

Figure 70A:
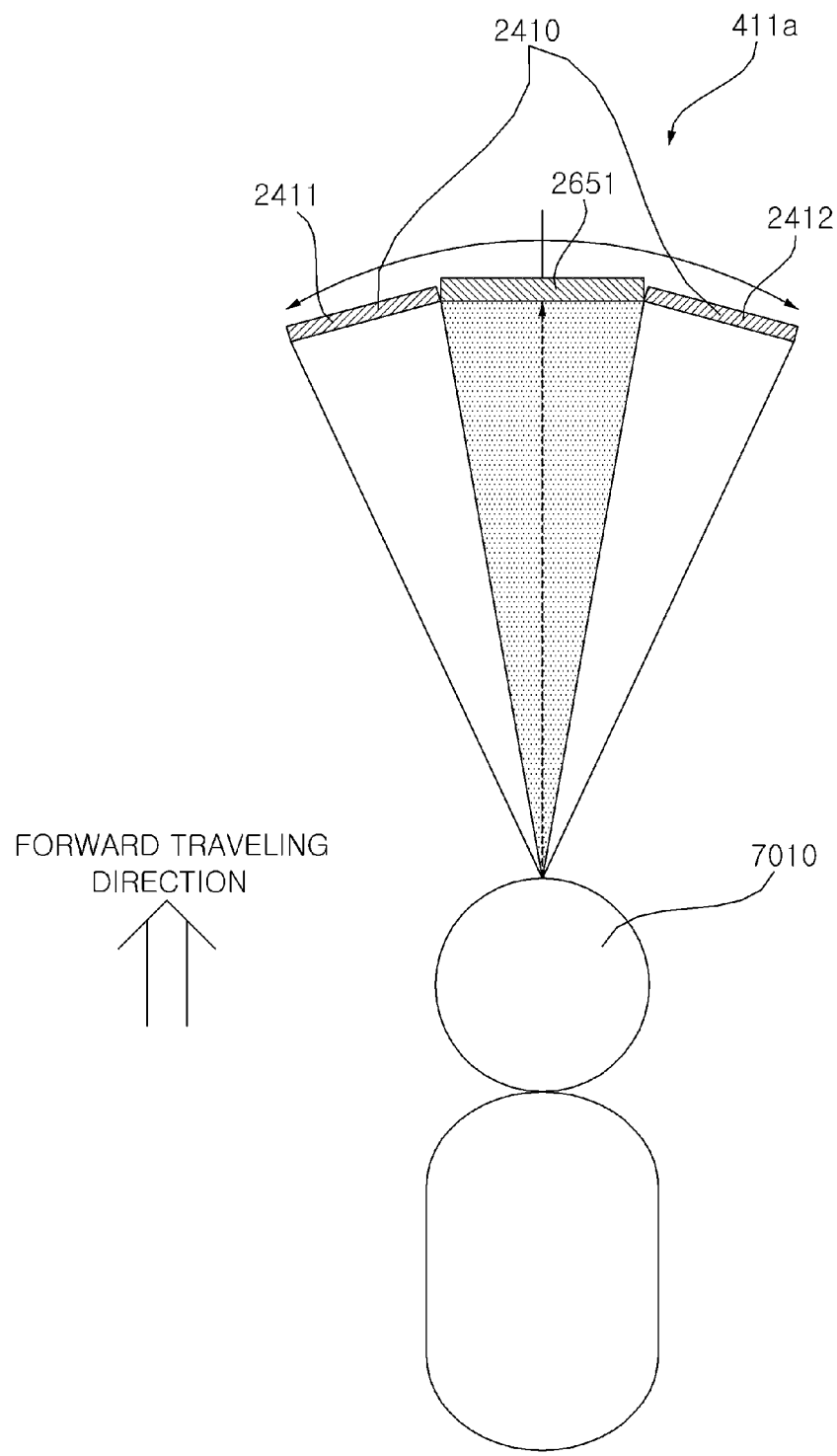
FIGS. 70A to 70C are diagrams referred to for explaining a light output region according to an implementation of the present disclosure.
Figure 70B:
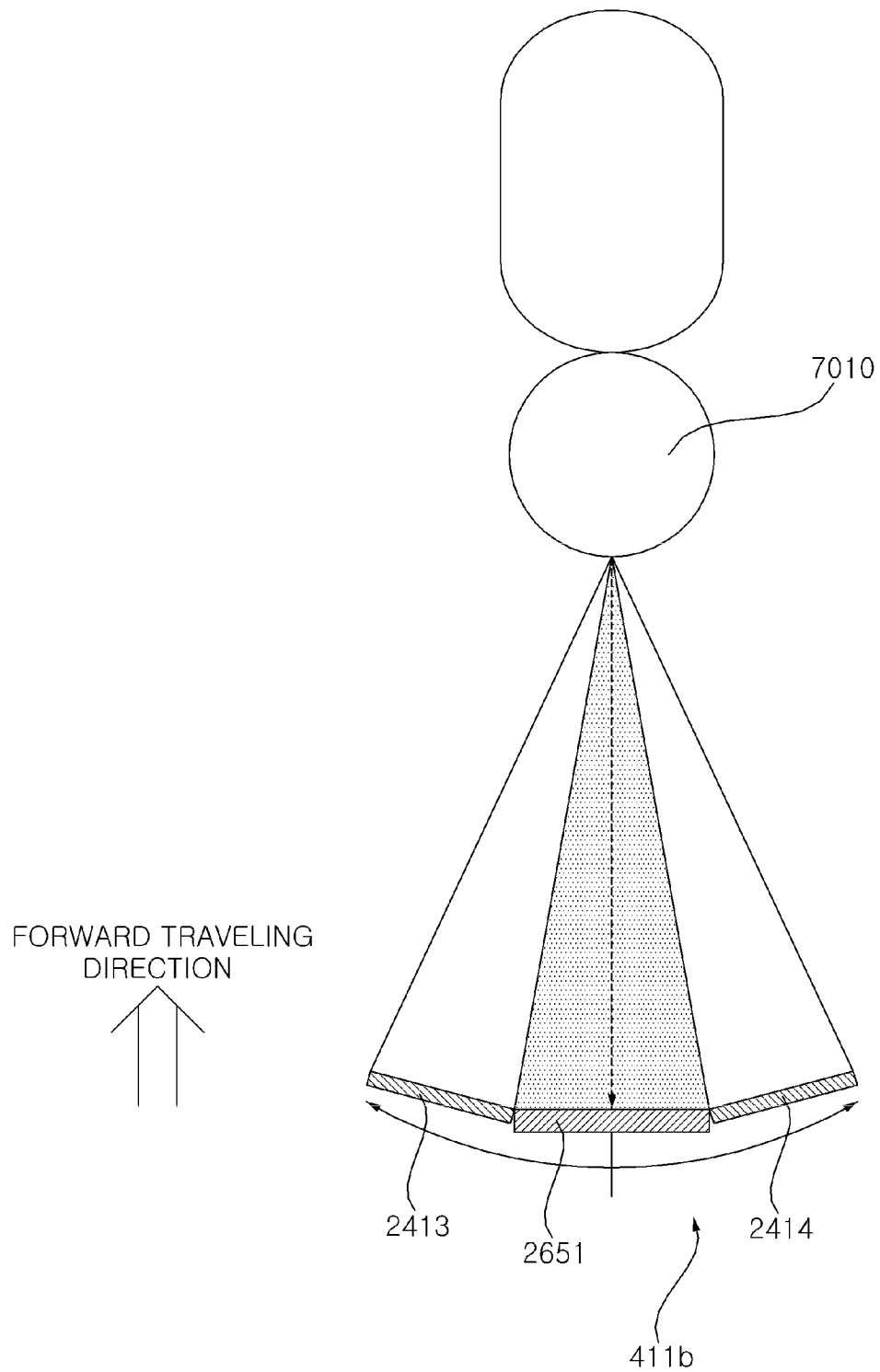
Figure 70C:
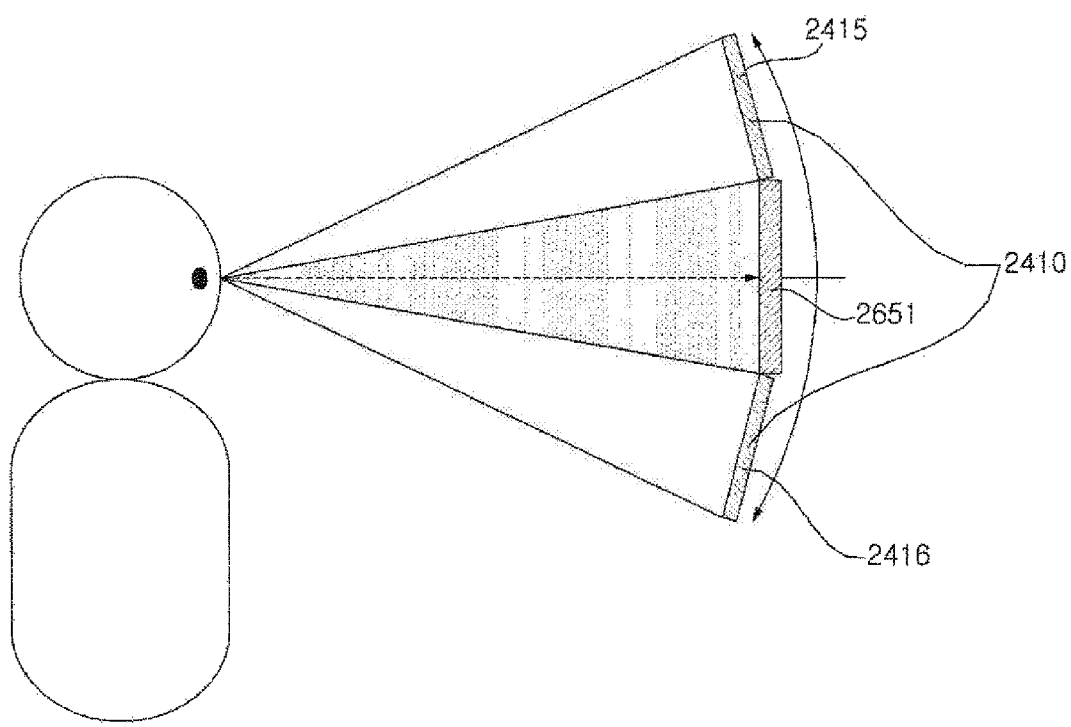

FIGS. 70A to 70C are diagrams referred to for explaining a light output region according to an implementation of the present disclosure.

Referring to FIG. 70A, at least one light output region 2410 may include a first light output region 2411 and a second light output region 2412. The first light output region 2411 may be disposed on the left side of a display screen 2651 of a rear seat display 411a with reference to a forward direction of travel of the vehicle. Alternatively, when a user 7010 is viewing the screen 2651, the first light output region may be disposed on the left side of the display screen 2651 with reference of the user 7010. The second light output region 2412 may be disposed on the right side of the display screen 2651 of the rear seat display 411a with reference to the forward direction of travel of the vehicle 10. Alternatively, when the user is viewing the screen 2651, the second light output region 2412 may be disposed on the right side of the display screen 2651 with reference to the user 7010. The display screen 2651 may be disposed toward the center of the user, and the light output region 2410 is disposed in the vicinity of the user.

Referring to FIG. 70B, the at least one light output region 2410 may include a third light output region 2413 and a fourth light output region 2414. The third light output region 2413 may be disposed on the left side of the display screen 2651 of a front seat display 411b with reference to the forward direction of travel of the vehicle 10. Alternatively, when the user is viewing the screen 2651, the third light output region 2413 may be disposed on the right side of the display screen 2651 with reference to the user 7010. The fourth light output region 2414 may be disposed on the right side of the display screen 2651 of the front seat display 411b. Alternatively, when the user 7010 is viewing the screen 2651, the fourth light output region 2414 may be disposed on the left side of the display screen 2651 with reference to the user 7010. The display screen 2651 may be disposed at the center of the user, and the light output region 2410 is disposed in the periphery of the user.

Referring to FIG. 70C, the at least one light output region may include a fifth light output region 2415 and a sixth light output region 2416. The fifth light output region 2415 may be disposed above the display screen 2651 of the rear seat display 411a or the front seat display 411b. The sixth light output region 2416 may be disposed below the display screen 2651 of the rear seat display 411a or the front seat display 411b. The display screen 2651 may be disposed at the center of the user, and the light output region 2410 is disposed in the periphery of the user.

Figure 71A:
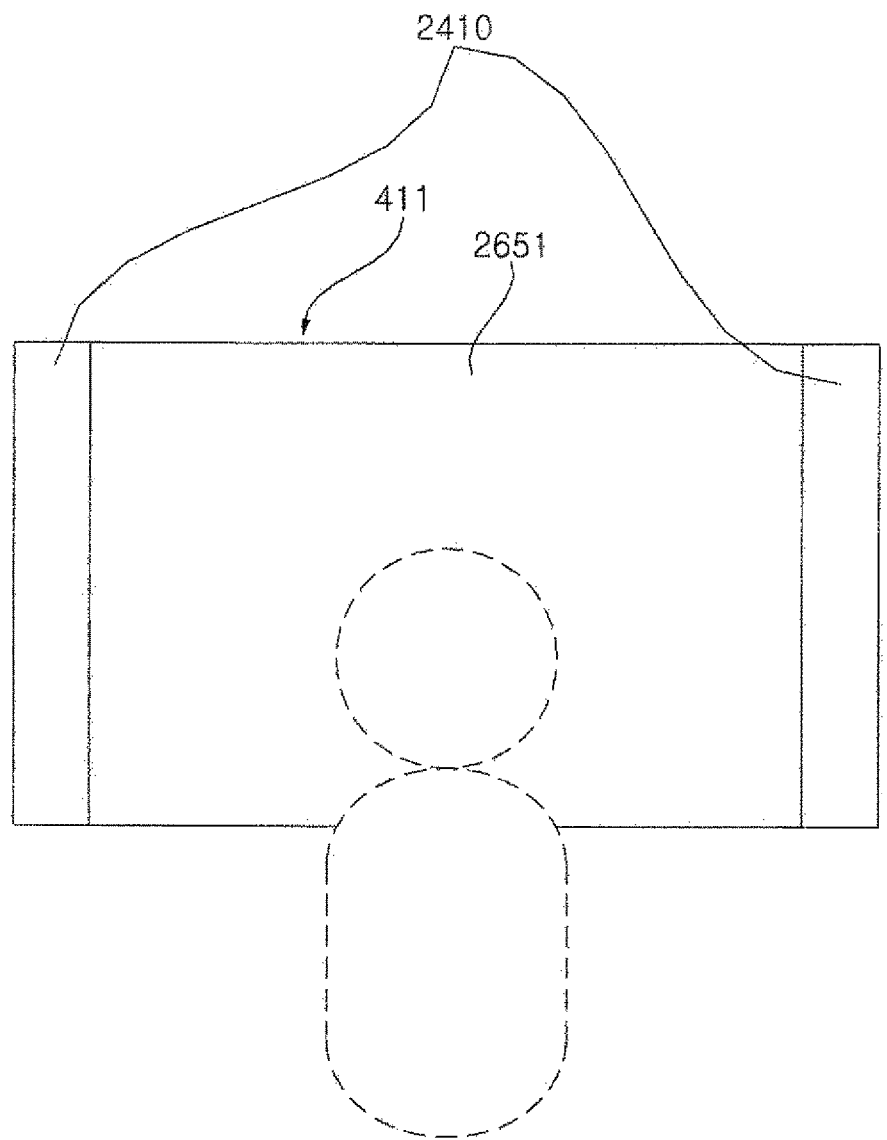

FIGS. 71A and 71B are diagrams referred to for explaining a display and a light output region according to an implementation of the present disclosure.

Referring to FIG. 71A, the first display 411 may be divided into a first display for a rest seat and a first display for a front seat. The first display for the rear seat may be disposed to allow a user in the rear seat to view a screen. The first display for the rear seat may be disposed between a front windshield and the front seat. The first display for the front seat may be disposed to allow a user in the front seat to view a screen. The first display for the front seat may be disposed between a rear glass and the rear seat.

The light output region 2410 may be disposed in the vicinity of the first display 411. The light output region 2410 may be described as at least one region of the first display 411. In this case, the first display 411 may include a content display region 2651 and the light output region 2410. The light output region 2410 may include at least one light source physically distinguishable from the first display 411. In this case, the at least one light source may be disposed in the vicinity of the first display 411. It is preferable that the at least one light source is disposed on both side surfaces of the first display 411.

Referring to FIG. 71b, the third display 413 may be divided into a third display for a rear seat and a third display for a front seat. The third display for the rear seat may be disposed to allow a user in the rear seat to view a screen. The third display for the rear seat may be disposed at a ceiling of the cabin 100 to be close to a front windshield. The third display for the front seat may be disposed to allow a user in the front seat to view a display. The third display for the front seat may be disposed at a ceiling of the cabin 100 to be close to the rear glass.

FIGS. 72 to 74 are diagrams referred to for explaining a light output pattern in a light output region according to an implementation of the present disclosure.

In the following, only the first display 411a for the rear seat is described, but the same description about the light output region 2410 may apply even to the first display 411b for the front seat, a second display, and a third display.

The processor 407 may adjust a length of a light emitting region of the light output region 2410 based on information on a driving speed of the vehicle 10.

As illustrated with reference numeral 2841 in FIG. 72, based on a first speed value of the vehicle 10, the processor 407 may provide a control signal such that one region 2851 of a first light output region 2411 emits light. The light emitting region 2851 may have a first length value. The processor 407 may provide a control signal such that one region 2852 of a second light output region 2412 emits light. The light emitting region 2852 may have the first length value.

As illustrated with reference numeral 2842, based on a second speed value greater than the first speed value, the processor 407 may adjust the length value of the light emitting region 2851 of the first light output region 2411 to a second length value. Based on the second speed value, the processor 407 may adjust the length value of the light emitting region 2852 of the second light output region 2412 to the second length value.

As illustrated with reference numeral 2843, based on a third speed value greater than the second speed value, the processor 407 may adjust the length of the light emitting region 2851 of the first light output region 2411 to a third length value. Based on the third speed value, the processor 407 may adjust the length of the light emitting region 2852 of the second light output region 2412 to the third length value. The processor 407 may adjust a width of a light emitting region in the light output region 2410 based on information on a steering direction and a degree of steering of the vehicle 10.

As illustrated with reference numeral 2941 in FIG. 73, when the vehicle 10 is not steered neither to the left nor to the right, the processor 407 may maintain a width of the first light output region 2411 to be identical to a width of the second output region 2412.

As illustrated with reference numeral 2942, when information on steering to the left is received, the processor 407 may increase the width of the first light output region 2411 to be wider than the second light output region 2412. When information on steering to the left is received, the processor 407 may increase the width of the light emitting region 2851 of the first light output region 2411 to be wider than the light emitting region 2852 of the second light output region 2412.

As illustrated with reference numeral 2942 or 2943, when information on steering to the left is received, the processor 407 may maintain or decrease the width of the second light output region 2412. When information on steering to the left is received, the processor 407 may maintain or decrease the light emitting region 2852 of the second light output region 2412.

In some implementations, when the vehicle 10 is steered to the right, the first light output region 2411 and the second light output region 2412 may be controlled in a manner opposite to the above decryption.

The processor 407 may change a location of a light emitting region in a light output region based on information on upward or downward movement of the vehicle 10. The processor 407 may change a location of the light emitting region in a direction opposite to a direction of the upward or downward movement of the vehicle 10.

As illustrated with reference numeral 3041 in FIG. 74, when there is no upward or downward movement of the vehicle 10, the processor 407 may provide a control signal such that a central region 2851 of the first light output region 2411 and a central region 2852 of the second light output region 2412 emit light.

As illustrated with reference numeral 3042, when information on raised movement of the vehicle 10 is received, the processor 407 may change a location of the light emitting region 2851 of the first light output region 2411 in a downward direction. When the information on the raised movement of the vehicle 10 is received, the processor 407 may change a location of the light emitting region 2852 of the second light output region 2412 in the downward direction. The processor 407 may adjust a speed of change of the light emitting region 2851 or 2852 in proportion to a speed of raising of the vehicle 10. The processor 407 may adjust a displacement of the light emitting region 2851 or 2852 in proportion to a raised displacement of the vehicle 10.

As illustrated with reference numeral 3043, when information on lowered movement of the vehicle 10 is received, the processor 407 may change a location of the light emitting region 2851 of the first light output region 2411 in an upward direction. When the information on the lowered movement of the vehicle 10 is received, the processor 407 may change a location of the light emitting region 2852 of the second light output region 2412 in the upward direction. The processor 407 may adjust a speed of change of the light emitting region 2851 or 2852 in proportion of a speed of lowering of the vehicle 10. The processor 407 may adjust a displacement of the light emitting regions 2851 and 2852 in proportion of a lowered displacement of the vehicle 10.

FIG. 75 is a diagram referred to for explaining how to output a graphic object for alleviate car sickness according to an implementation of the present disclosure.

Referring to FIG. 75, the processor 407 may receive information on a geographical feature of a road from an electronic device. The processor 407 may display, on at least one region of a display screen, a graphic object corresponding to the information on the geographical feature of the road.

As illustrated with reference numerals 3141 and 3142, the processor 407 may receive information on a curve from an electronic device. The processor 407 may display, on at least one region 3151, an image corresponding to the curve. The processor 407 may display, on the at least one region 3151 in the display screen, a distance and a time remaining until reaching the curve.

The processor 407 may display, on at least one region of a display screen, a graphic object corresponding to information on at least one of acceleration, deceleration, or steering in response to a geographical feature of a road. For example, the processor 407 may display, on at least one region of a display screen, at least one of an acceleration pedal image, a brake pedal image, or a steering wheel image.

Figure 76:
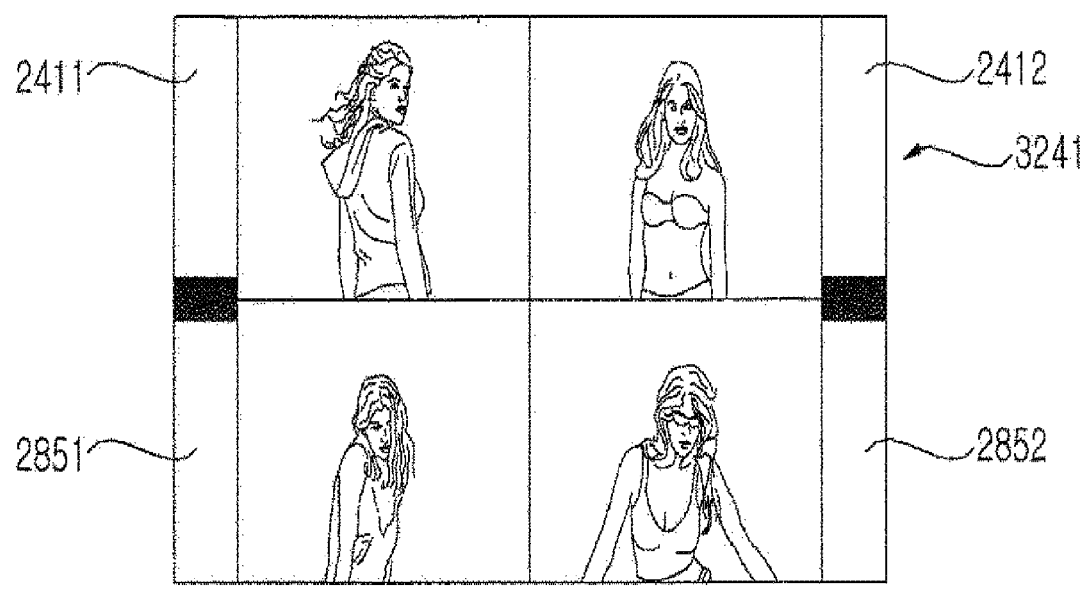
FIG. 76 is a diagram referred to for explaining how to alleviate car sickness during a video conference according to an implementation of the present disclosure.

FIG. 76 is a diagram referred to for explaining how to alleviate car sickness during a video conference according to an implementation of the present disclosure.

Referring to FIG. 76, the processor 407 may display a video conference-related graphic object on a display. While displaying the video conference-related graphic object, the processor 407 may provide a control signal to a first light output region 2411 and a second light output region 2412. While displaying a video conference content, the processor 407 may provide a control signal to change a light emitting region 2851 in the first light output region 2411 and a light emitting region 2852 in the second light output region 2412.

Figure 77:
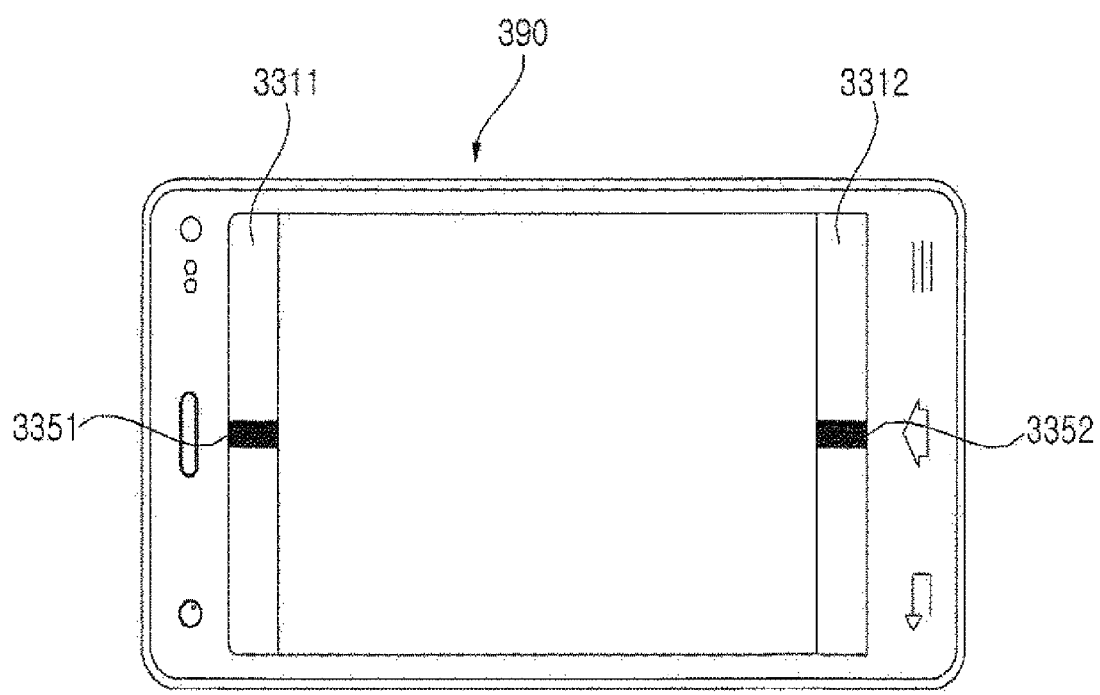
FIG. 77 is a diagram referred to for explaining how to alleviate a user's car sickness when the user is viewing a content with a mobile terminal according to an implementation of the present disclosure.

FIG. 77 is a diagram referred to for explaining how to alleviate a user's car sickness when the user is viewing a content with a mobile terminal according to an implementation of the present disclosure.

Referring to FIG. 77, the processor 407 may transmit data on change of a pattern of light from a light output region to the mobile terminal 390 via the interface unit 406 and the communication device 300. The mobile terminal 390 may display a light output region 3311 or 3312. The mobile terminal 390 may set one region in the light output region 3311 or 3312 as a light emitting region 3351 or 3352. The mobile terminal 390 may control changing of the light emitting region 3351 or 3352.

Figure 78:
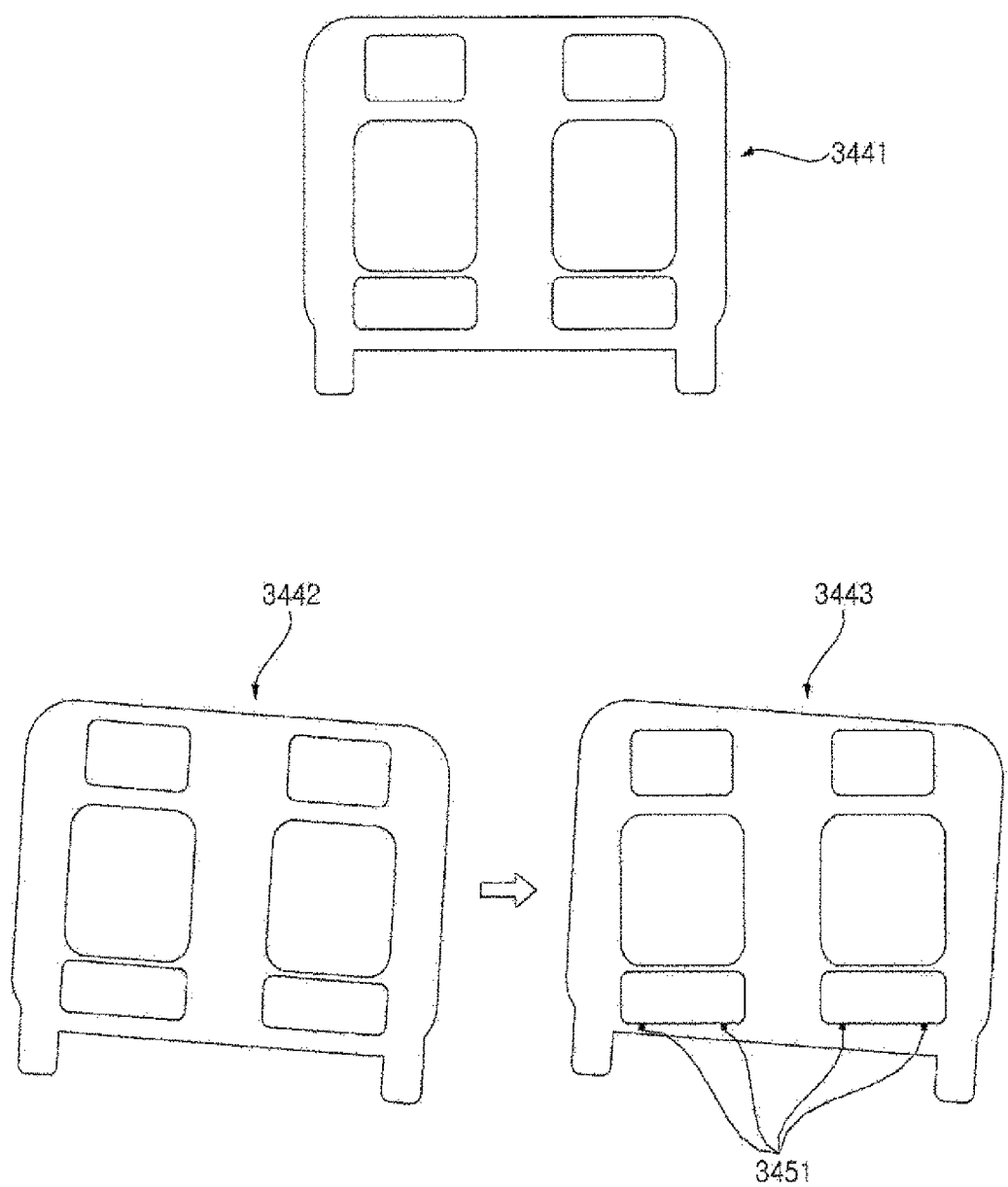
FIG. 78 is a diagram referred to for explaining how to adjust a position of a seat to alleviate car sickness according to an implementation of the present disclosure.

FIG. 78 is a diagram referred to for explaining how to adjust a position of a seat to alleviate car sickness according to an implementation of the present disclosure.

Referring to FIG. 78, the processor 407 may exchange signals with the seat system 600 via the interface unit 406. The seat system 600 may include a seat position adjustment mechanism 3451. The seat position adjusting mechanism 3451 may be disposed below a seat to raise or lower a portion of the seat.

Based on information on a state of the vehicle 10 received from an electronic device, the processor 407 may provide a control signal to the seat position adjusting mechanism to adjust a position of a seat in a direction different from a direction of an inertial force of the vehicle 10. For example, when the vehicle 10 accelerates with a predetermined acceleration value, the processor 407 may raise a rear part of a seat. For example, when the vehicle 10 decelerates with a predetermined deceleration value, the processor 407 may raise a front part of a seat. For example, when the vehicle 10 makes a turn with a predetermined rotational acceleration value, the processor 407 may raise a portion of a seat, which is disposed in a direction of a centripetal force.

Figure 79:
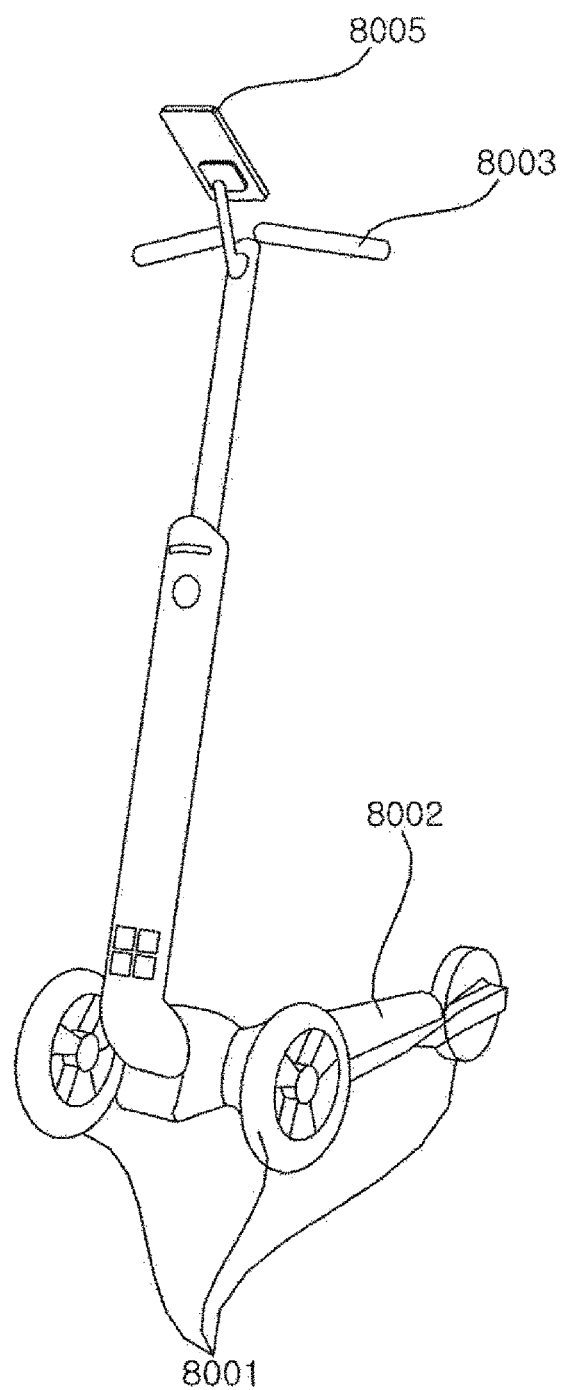
FIG. 79 illustrates an exterior of a personal mobility vehicle according to an implementation of the present disclosure.

FIG. 79 illustrates an exterior of a personal mobility vehicle according to an implementation of the present disclosure.

Figure 80:
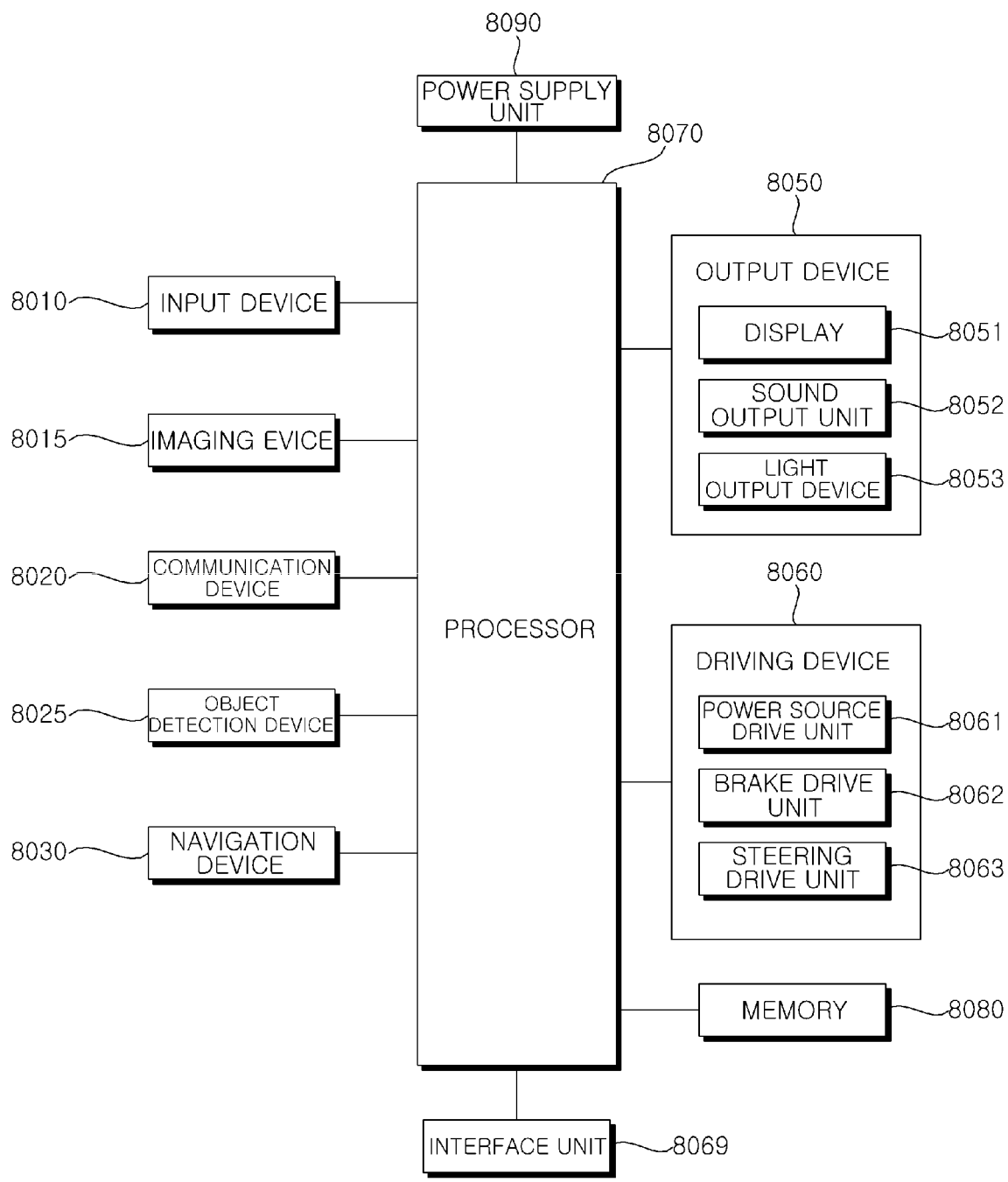
FIG. 80 illustrates an example of a control block diagram of a personal mobility vehicle according to an implementation of the present disclosure.

FIG. 80 illustrates an example of a control block diagram of a personal mobility vehicle according to an implementation of the present disclosure.

Figure 81:
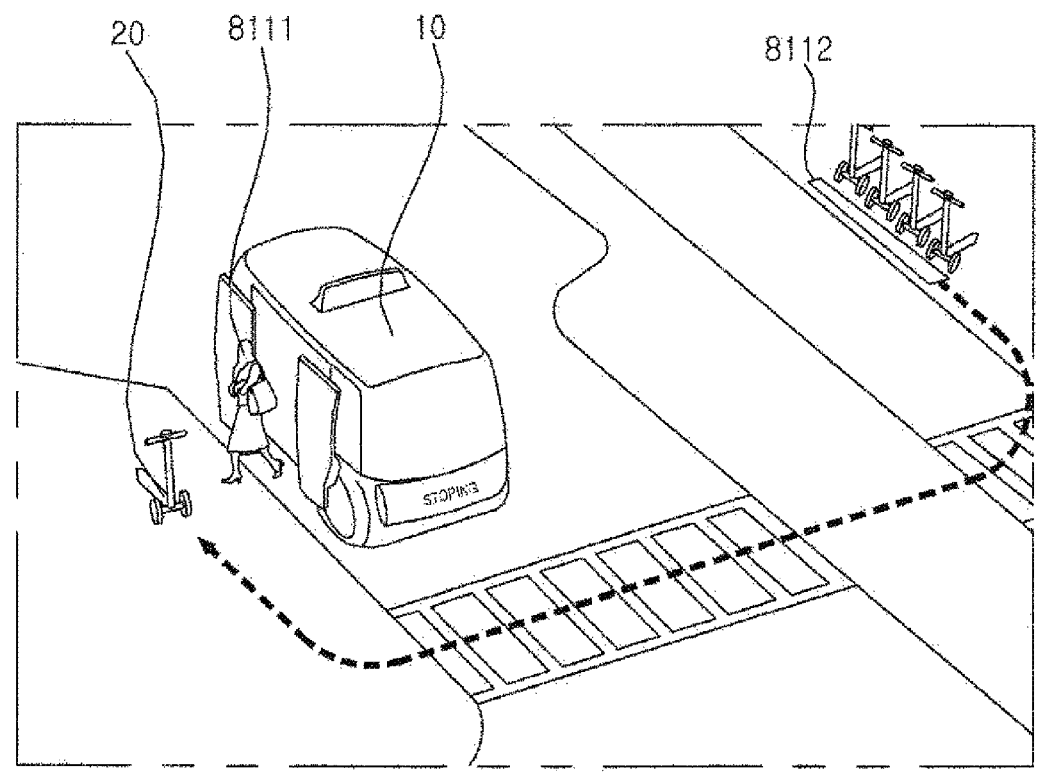
FIG. 81 illustrates an example of a share vehicle and a personal mobility vehicle according to an implementation of the present disclosure.

FIG. 81 illustrates an example of a share vehicle and a personal mobility vehicle according to an implementation of the present disclosure.

Referring to FIGS. 79 to 81, a personal mobility vehicle 20 may be described as an autonomous vehicle for transporting a single user. The person mobility vehicle 20 may include at least one vehicle 8001, a user boarding part 8002, and a user interface device 8005. The user interface device 8005 may include an input device 8010, an imaging device 8015, and an output device 8050. In some implementations, the personal mobility vehicle 20 may further include a part such as a handle 8003, which can be in contact with a human body.

The personal mobility vehicle 20 may include the input device 8010, the imaging device 8015, a communication device 8020, an object detection device 8025, a navigation device 8030, the output device 8050, a drive device 8060, an interface unit 8069, a processor 8070, a memory 8080, and a power supply 8090. In some implementations, the personal mobility vehicle 20 may omit some of the aforementioned components or include another component.

The input device 8010 may receive a user input. The input device 200 may convert the user input into an electrical signal. The input device 8010 may include at least one of a gesture sensor configured to convert a user's gesture input into an electrical signal, a mechanical device configured to convert a user's physical input (e.g., pressing or rotating) into an electrical signal, or a microphone configured to convert a user's voice input into an electrical signal.

The imaging device 8015 may further include at least one camera. The imaging device 8015 may acquire a user image. The user image acquired by the imaging device 8015 may be used for user authorization.

The communication device 8020 may wirelessly exchange signals with an external device. The communication device 8020 may exchange signals with the external device directly or via a network. The external device may include at least one of a server (e.g., a server 8282 in FIG. 82A or a server 8211 in FIG. 82B), a mobile terminal, or a share vehicle 10.

To perform communication, the communication device 8020 may include at least one of a Radio Frequency (RF) circuit or an RF element which is configured to implement at least one communication protocol. In some implementations, the communication device 8020 may use a plurality of communication protocols. The communication device 8020 may switch a communication protocol depending on a distance to a mobile terminal.

The object detection device 8025 may detect an object external to the personal mobility vehicle 20. The object detection device 8025 may include at least one of a camera, a radar, a lidar, an ultrasonic sensor, or an infrared sensor. The object detection device 8025 may provide data on an object, which is generated based on a sensing signal by a sensor, to at least one electronic device included in the vehicle.

The navigation device 8030 may provide navigation information. The navigation information may include at least one of map information, information on a set destination, information on a route to the set destination, information on various objects on the route, lane information, or information on the current location of the vehicle.

The output device 8050 may output information. The output device 8050 may include a display 8051, a sound output unit 8052, and a light output device 8053. The display 8051 may output information visually. The sound output unit 8052 may output information audibly. The light output unit 8053 may output light of at least one color. The light output device 8053 may be disposed in at least one part of the personal mobility vehicle 20 so as to allow a user to easily recognize a color of output light.

The drive device 8060 is a device for electrically controlling driving of various devices of the personal mobility vehicle 20. The drive device 8060 may control motion of a wheel. The drive device 8060 may include a power source drive unit 8061, a brake drive unit 8062, and a steering drive unit 8063. The power source drive unit 8061 may control a power source of the personal mobility vehicle 20. For example, when an engine is a power source, the power source drive unit 8061 may control an engine output torque and the like. For example, when a motor is a power source, the power source drive unit 8061 may control a rotational speed, torque, and the like of the motor. The brake drive unit 8062 may perform electronic control of a brake device. The steering drive unit 8063 may perform electronic control of a steering device.

The interface unit 8069 may exchange signals with another device in a wired manner. For example, the interface unit 8069 may be connected to the mobile terminal 390 in a wired manner, and exchange signals therewith.

The processor 8070 may be electrically connected to the input device 8010, the imaging device 8015, the communication device 8020, the object detection device 8025, the navigation device 8030, the output device 8050, the drive device 8060, the interface unit 8069, and the memory 8080, and exchange signals therewith. The processor 8070 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 8070 may receive a signal including information or data from at least one server (a server 8212 in FIG. 82A, or a server 8211 in FIG. 82b) via the communication device 8020. Based on the received signal, the processor 8070 may control at least one of the output device 8050 or the drive device 8060.

Via the communication device 8020, the processor 8070 may receive information on a get-off location of the share vehicle 10 in which a user is onboard. The information on a get-off location of the share vehicle 10 may be provided from at least one server (a server 8212 in FIG. 82A, or a server 8211 in FIG. 82b). The processor 8070 may provide a control signal to the drive device 8060 such that the share vehicle 10 moves autonomously to the get-off location. In this case, the processor 8070 may use navigation data provided by the navigation device 8030.

Via the communication device 8020, the processor 8070 may receive information on a time when the share vehicle 10 reaches the get-off location. The processor 8070 may provide a control signal to the drive device 8060 such that the personal mobility device 20 arrives at the get-off location at the time of arrival of the share vehicle 10. The time of arrival of the share vehicle 10 at the get-off location may reflect a moving time of the share vehicle 10 according to a traffic condition.

Via the communication device 8020, the processor 8070 may receive information on an anticipated get-on location of the share vehicle 10 which a user is anticipated get on. The processor 8070b may provide a control signal to the drive device 8060 to transport the user to the anticipated get-on location.

While moving along a route to a charging station, the processor 8070 may receive information on a get-off location. In this case, the processor 8070 may change the route by changing the destination from the charging station to the get-off location.

Via the communication device 8020, the processor 8070 may receive identification information related to a user. Based on the identification information, the processor 8070 may provide a control signal to the light output device 8053 so as to output light for identification with a first color. Based on the light for identification, the user is able to recognize a personal mobility vehicle allocated to the user.

Via the communication device 8020, the processor 8070 may receive first information on a user from a server that manages the share vehicle 10. Based on the first information, the processor 8070 may authorize the user based on the first user. The first information may include user authorization information.

The memory 8080 is electrically connected with the main controller 8070. The memory 8080 may store basic data for each unit, control data for the operational control of each unit, and input/output data. The memory 8080 may be implemented as at least one of a ROM, a RAM, an EPROM, a flash drive, or a hard drive. The memory 8080 may store various data for the overall operation of the personal mobility vehicle 10 such as programs for the processing or control of the processor 8070. In some implementations, the memory 8080 may be integrally formed with the processor 8070, or may be implemented as a sub-component of the processor 8070.

The power supply 8090 may supply power to the personal mobility vehicle 20. The power supply 8090 may include a battery. The power supply 8090 may operate in accordance with a control signal provided from the main controller 170.

Figure 82A:
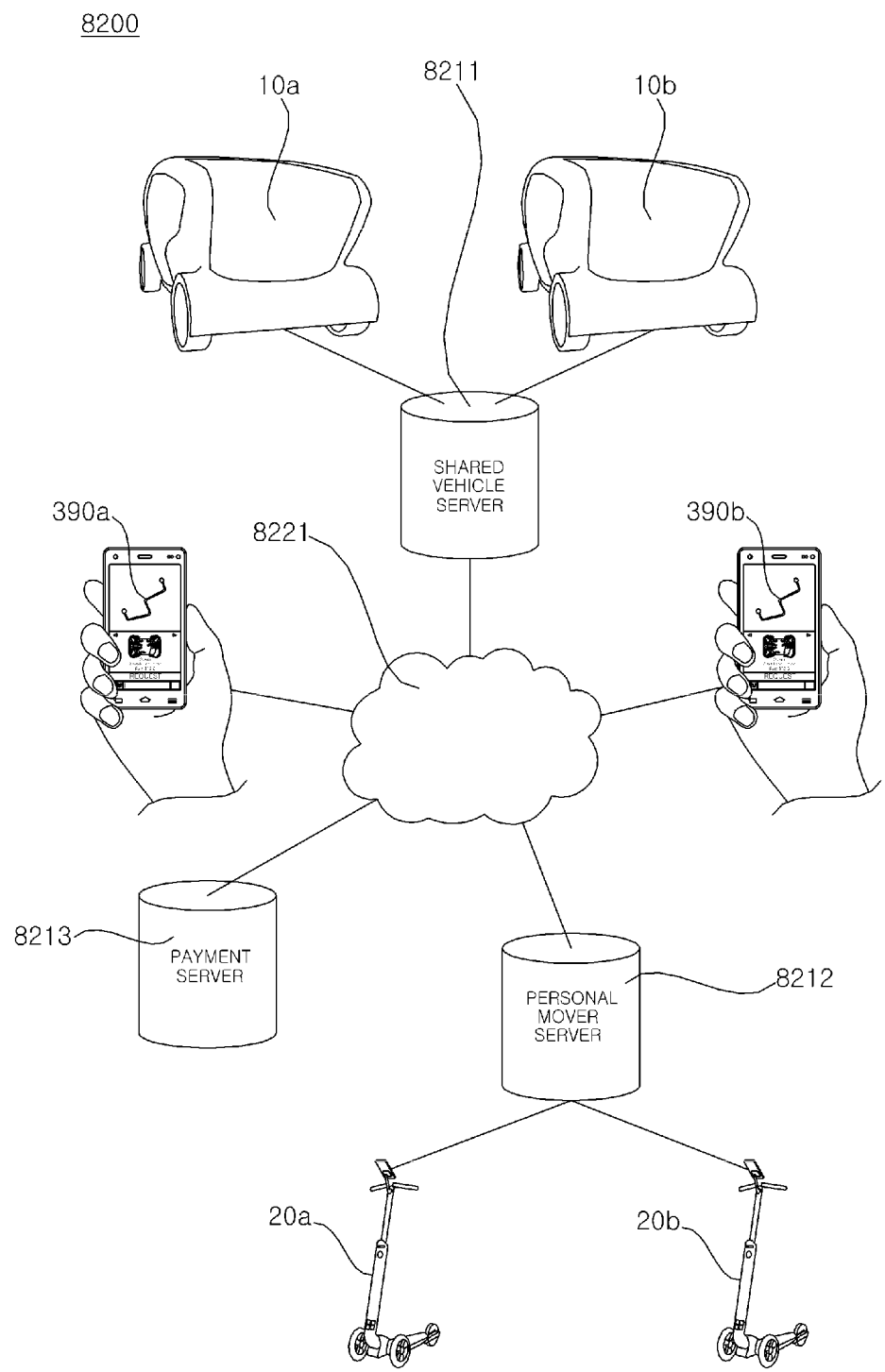
FIGS. 82A and 82B are diagrams referred to for explaining a user transportation system according to an implementation of the present disclosure.
Figure 82B:
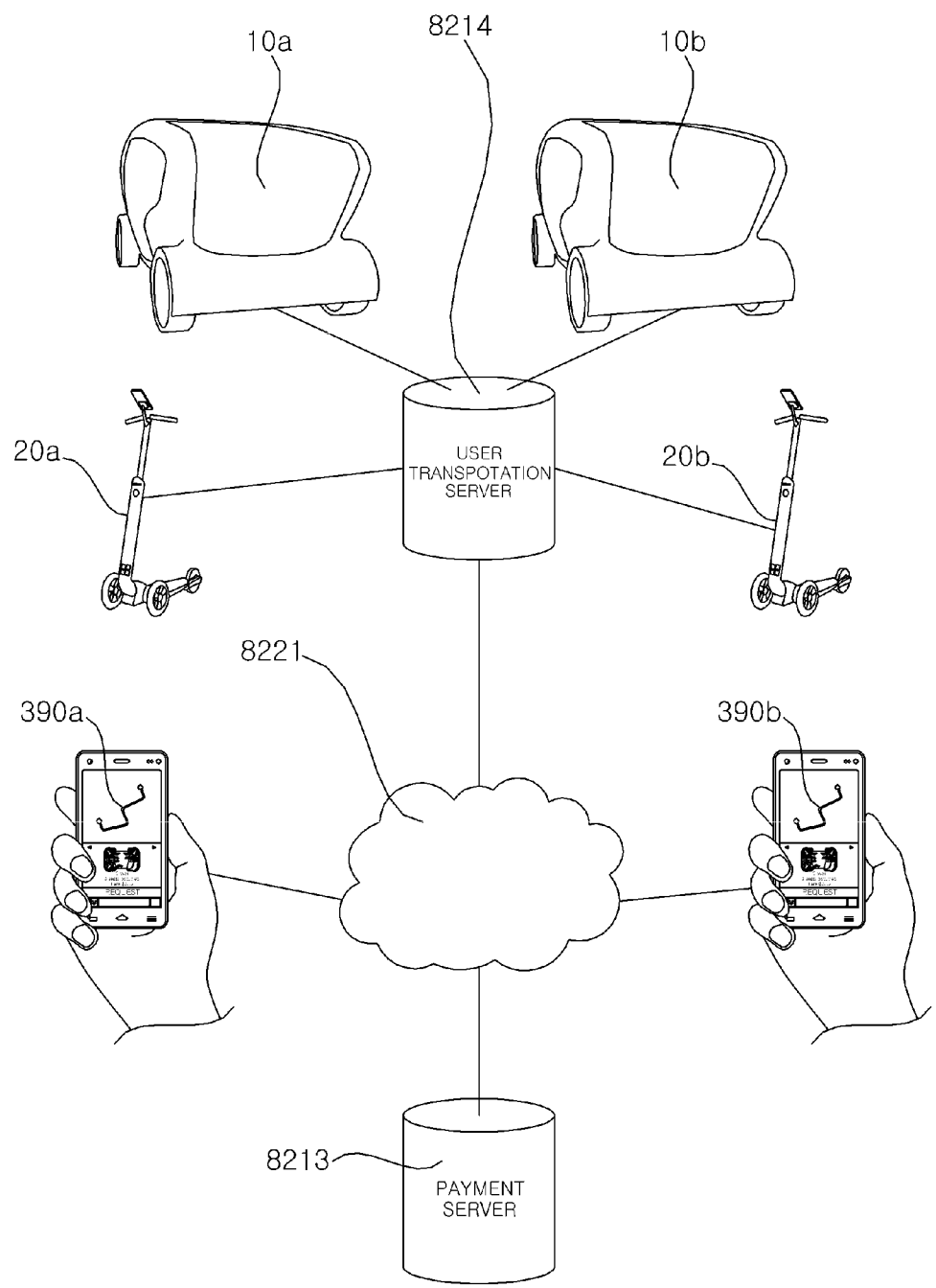

FIGS. 82A and 82B are diagrams referred to for explaining a user transportation system according to an implementation of the present disclosure.

A user transportation system 8200 may include at least one server 8211, 8212, or 8213, at least one share vehicle 10a or 10b, and at least one personal mobility vehicle 20a or 20b. In some implementations, the user transportation system 8200 may further include at least one user mobile terminal 390a or 390b, and a payment server 8213.

The at least one server 8211, 8212, or 8213 may receive a signal for requesting a transportation service from an initial start location to a final destination of a first user. The at least one server 8211, 8212, or 8213 may transmit a first request signal such that a share vehicle moves from an anticipated get-on location to an anticipated get-off location of the first user. The at least one server 8211, 8212, or 8213 may determine whether there is a region not allowed for share vehicles to drive on a route from the initial start location to the final destination. When it is determined that there is a region not allowed for share vehicles to drive on a route from the initial start location to the final destination, at least one server 8211, 8212, or 8213 may transmit a second request signal such that the personal mobility vehicle moves to at least one of the initial start location or the anticipated get-off location.

The at least one share vehicle 10a or 10b may move from the anticipated get-on location to the anticipated get-off location in accordance with the first request signal. The at least one personal mobility vehicle 20a or 20b may move to the initial start location to the anticipated get-on location or from the anticipated get-off location to the final destination in accordance with the second request signal.

Referring to FIG. 82A, the user transportation system 8200 may include a share vehicle server 8211, a plurality of share vehicles 10a and 10b, a personal mobility vehicle server 8212, a plurality of personal mobility vehicles 20a and 20b, user mobile terminals 390a and 390b, and a payment server 8213.

The share vehicle server 8211 may manage the plurality of share vehicles 10a and 10b. The share vehicle server 8211 may receive a signal from the user terminals 390a and 390b. Based on the received signal, the share vehicle server 8211 may assign the share vehicles 10a and 10b. Based on the received signal, the share vehicle server 8211 may transmit an operation command signal to the share vehicles 10a and 10b. For example, the share vehicle server 8211 may transmit at least one of a movement command signal, a stopping command signal, an acceleration command signal, a deceleration command signal, or a steering command signal.

In some implementations the share vehicle server 8211 may exchange signals with the personal mobility vehicle server 8212.

The plurality of share vehicles 10a and 10b may operate based on an operation command signal received from the share vehicle server 8211. The share vehicles 10a and 10b may move to the get-on location of the first user based on a signal received from the share vehicle server 8211. The share vehicles 10a and 10b may move to the get-off location of the first user from the get-off location of the first user based on a signal received from the share vehicle server 8211.

The personal mobility vehicle server 8212 may manage a plurality of personal mobility vehicles 20a and 20b. The personal mobility vehicle server 8212 may receive signals from a user terminal 390a or 390b. The personal mobility vehicle server 8212 may receive a signal from the share vehicle server 8211. Based on the received signal, the personal mobility vehicle server 8212 may assign the personal mobility vehicle 20a or 20b. Based on the received signal, the personal mobility vehicle server 8212 may transmit an operation command signal to the personal mobility vehicle 20a or 20b. For example, the personal mobility vehicle server 8212 may transmit at least one of a moving command signal, a stopping command signal, an acceleration command signal, a decelerating command signal, or a steering command signal to the personal mobility vehicle 20a or 20b.

The plurality of personal mobility vehicles 20a and 20b may operate based on an operation command signal received from the personal mobility vehicle server 8212. Based on a received signal, the personal mobility vehicle 20a or 20b may move to an initial start location of a first user. Based on a received signal, the personal mobility vehicle 20a or 20b may move from the initial start location of the first user to a get-on location (or an anticipated get-on location) of the share vehicle 10a or 10b. Based on a received signal, the personal mobility vehicle 20a or 20b may move to a get-off location (or an anticipated get-off location) of the first user. Based on a received signal, the personal mobility vehicle 20a or 20b may move from the get-off location of the first user to a final destination of the first user.

The user terminal 390a or 390b may receive a user input to use at least one of the share vehicle 10a or 10b or the mobility vehicle 20a or 20b. The user terminal 390a or 390b may transmit a mobility service request signal based on a user to at least one of the share vehicle server 8211 or the personal mobility vehicle server 8212.

The payment server 8213 may make payment of a price for a mobility service used by a user. The payment server 8213 may make payment by receiving payment data from at least one of the share vehicle server 8211, the personal mobility vehicle server 8212, the share vehicle 10a or 10b, or the personal mobility vehicle 20a or 20b.

The description about the user transportation system 8200 in FIG. 82A may apply to the user transportation system 8200 in FIG. 82B. Hereinafter, the user transportation system 8200 in FIG. 82B will be described mainly about difference from the user transportation system 8200 in FIG. 82A.

The user transportation system 8200 may include a user transportation server 8214, a plurality of share vehicles 10a and 10b, a plurality of personal mobility vehicles 20a and 20b, user mobile terminals 390a and 390b, and a payment server 8213.

The user transportation server 8214 may function as the share vehicle server 8211 and the personal mobility vehicle server 8212 shown in FIG. 82A. The user transportation server 8214 may manage the plurality of share vehicles 10a and 10b. The user transportation server 8214 may manage the plurality of personal mobility vehicles 20a and 20b.

Figure 83:
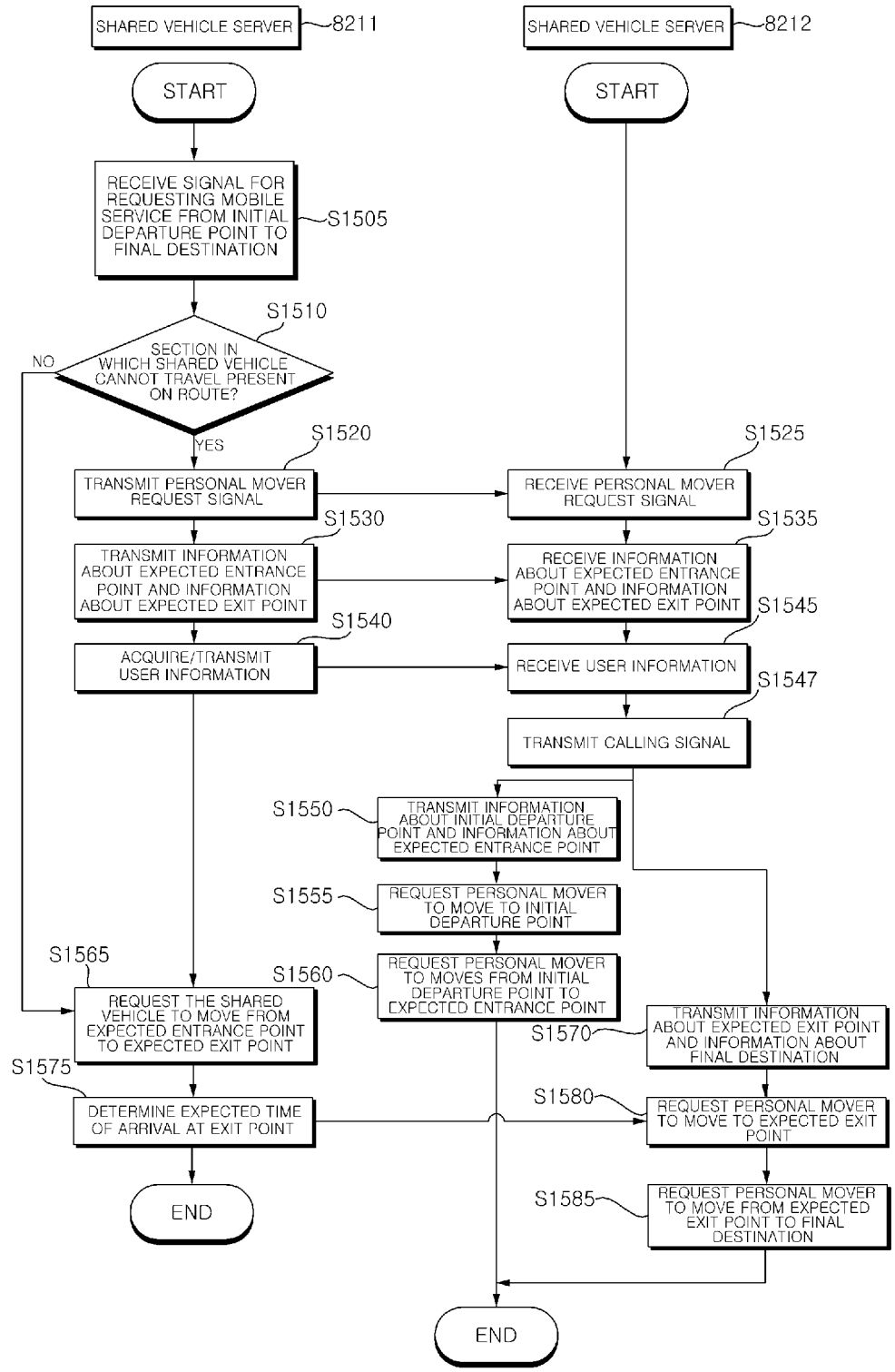
FIG. 83 is a flowchart of a user transportation system according to an implementation of the present disclosure.

FIG. 83 is a flowchart of a user transportation system according to an implementation of the present disclosure.

Figure 84:
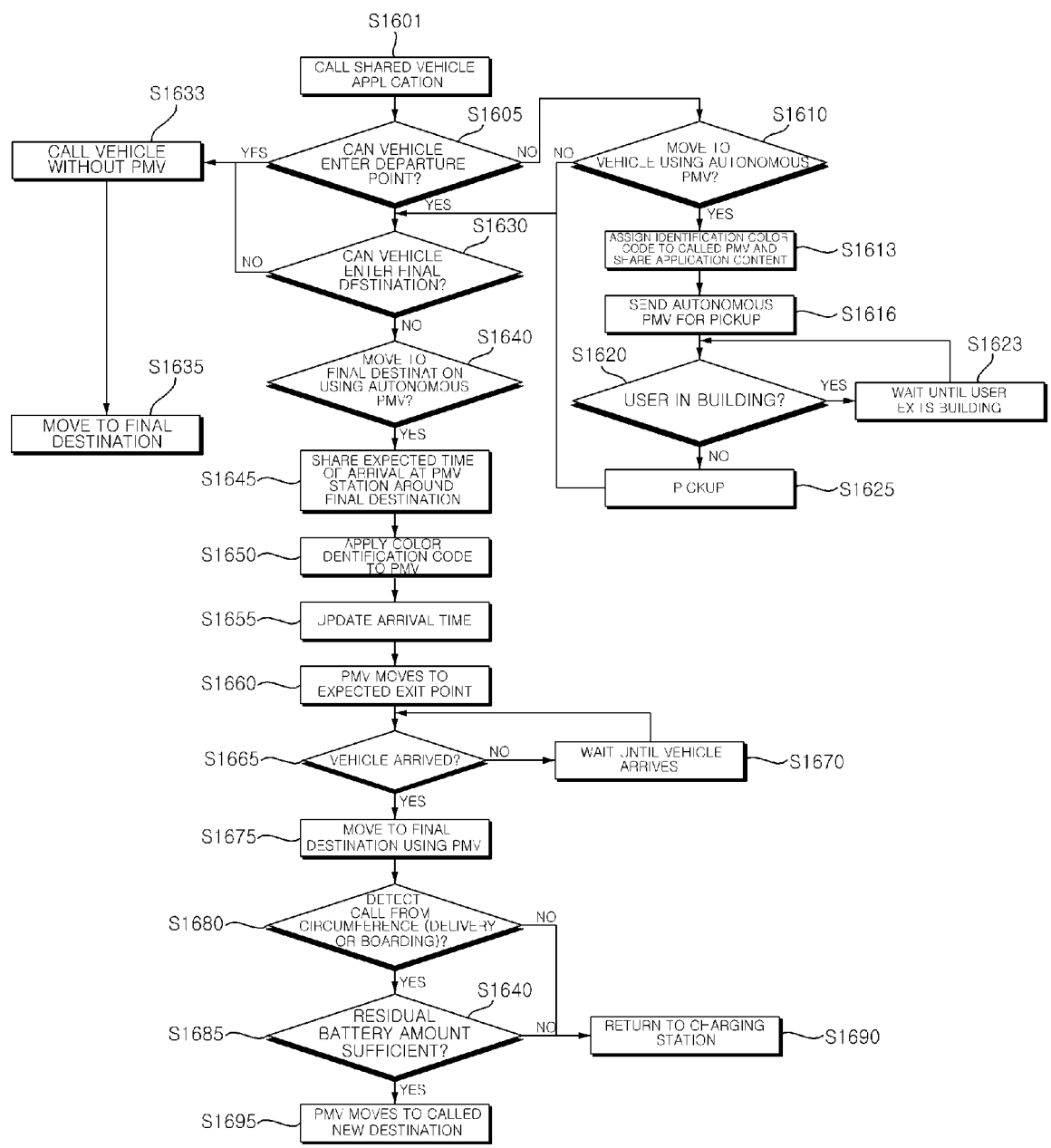
FIG. 84 is a flowchart of a user transportation method of the user transportation system 8200 shown in FIG. 82A.

FIG. 84 is a flowchart of a user transportation method of the user transportation system 8200 shown in FIG. 82A.

Figure 85:
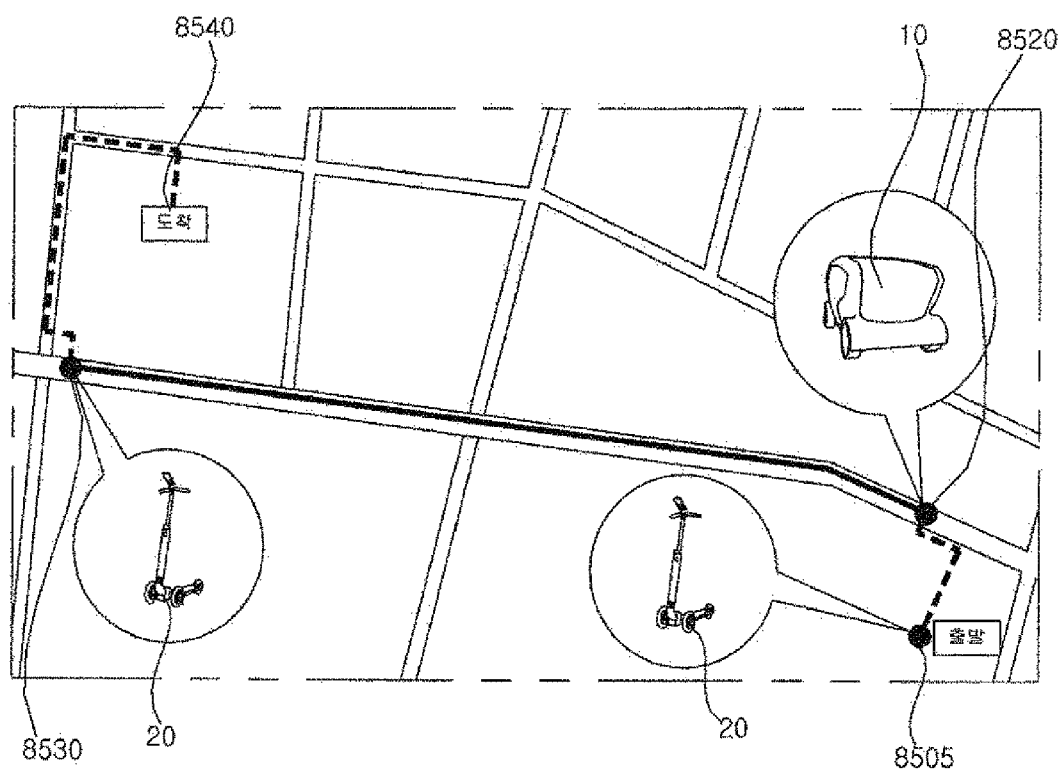
FIG. 85 is a diagram referred to for explaining how to use a share vehicle and a personal mobility vehicle depending on a route according to an implementation of the present disclosure.

FIG. 85 is a diagram referred to for explaining how to use a share vehicle and a personal mobility vehicle depending on a route according to an implementation of the present disclosure.

Referring to FIGS. 83 to 85, the share vehicle server 8211 may receive, from a first user's terminal (the terminal 390a in FIG. 82A), a signal for requesting a transportation service from an initial start location to a final destination (S1505). The share vehicle server 8211 may determine whether there is a region not allowed for share vehicles to drive on a route from the initial start location to the final destination (S1510). For example, the share vehicle server 8211 may determine whether there is a region having no lane on a route from the initial start location to the final destination.

When it is determined that there is a region not allowed for share vehicles to drive, the share vehicle server 8211 may transmit a signal to the personal mobility vehicle server 8212 to request a personal mobility vehicle (S1520).

The personal mobility vehicle server 8212 may receive a signal for requesting a transportation service of a personal mobility vehicle (S1525). The signal for requesting a transportation service of a personal mobility vehicle may include a signal indicative of a user's item delivery request.

The share vehicle server 8211 may transmit anticipated get-on location information and anticipated get-off location information (S1530).

The personal mobility vehicle server 8212 may receive information on an anticipated get-on location 8520 and information on an anticipated get-off location (S1535). When it is determined that a share vehicle is not allowed to drive at least a partial region in the entire route from an initial start location 8505 to a final destination (S1510), the personal mobility vehicle server 8212 may receive at least one of the information on the anticipated get-on location 8520 and the information on the anticipated get-off location. The anticipated get-on location 8520 may be defined as a location to which the share vehicle 10a is allowed to move, and which is closest to the initial start location 8505. The anticipated get-off location 8530 may be defined as a location to which the share vehicle 10a is allowed to move, and which is closest to the final destination.

The share vehicle server 8211 may acquire the user's first information and transmits the first information (S1540).

The personal mobility vehicle server 8212 may receive the user's first information (S1545). Prior to step S1560 or S1585, when it is determined that a user is already onboard the personal mobility vehicle 20a, the personal mobility vehicle server 8212 may transmit the user's first information to the personal mobility vehicle 20a. The personal mobility vehicle 20a may authorize the user based on the received first information.

The personal mobility vehicle server 8212 may transmit a call signal to any personal mobility vehicle 20a out of the plurality of personal mobility vehicles 20a and 20b based on a distance between each of the plurality of personal mobility vehicles 20a and 20b and the anticipated get-off location 853, and based on an amount of remaining energy of each of the plurality of personal mobility vehicles 20a and 20b (S1547).

The personal mobility vehicle server 8212 may transmit information on the initial start location and the information on the anticipated get-on location 8520 for the share vehicle 10a to the called personal mobility vehicle 20a (S1550).

The personal mobility vehicle server 8212 may request the personal mobility vehicle 20a to move toward the initial start location (S1555). In some implementations, the personal mobility vehicle server 8212 may request the personal mobility vehicle 20a to move toward the initial start location with an item requested by the user's item delivery request signal. In this case, the personal mobility vehicle server 8212 may request the personal mobility vehicle 20a to move toward a location where to acquire the item requested by the user's item delivery request signal before moving toward the initial start location.

The personal mobility vehicle server 8212 may transmit a signal to the personal mobility vehicle 20a to move from the initial start location to the anticipated get-on location 8520 for the share vehicle 10a with the user being onboard the personal mobility vehicle 20a (S1560).

The share vehicle server 8211 may request the share vehicle 10a to move from the anticipated get-on location 8520 to the anticipated get-off location 8530 (S1565).

The personal mobility vehicle server 8212 may transmit the information on the anticipated get-on location 8530 and final destination information of the share vehicle 10a to the personal mobility vehicle 20a (S1570).

The share vehicle server 8211 may determine an anticipated arrival time of the share vehicle 10a at the get-off location (S1575).

The personal mobility vehicle server 8212 may transmit a signal to the personal mobility vehicle 20a to move toward the anticipated get-off location 8530 (S1580). The step 1580 may include: receiving, by the personal mobility vehicle server 8212, information on a time of arrival of the share vehicle 10a at the anticipated get-off location 8530; and transmitting, by the personal mobility vehicle server 8212, a signal to the personal mobility vehicle 20a to be located at the anticipated get-off location 8530 at the time of arrival of the share vehicle 10a at the anticipated get-off location 8530. The time of arrival of the share vehicle 10a at the anticipated get-off time 8530 may be determined based on traffic information. In some implementations, the personal mobility vehicle server 8212 may request a signal to the personal mobility vehicle 20a to move toward an anticipated get-off location with an item requested by a user's item delivery request signal. In this case, the personal mobility vehicle server 8212 may request the personal mobility vehicle 20a to move toward a location whether to acquire the item requested by the user's item delivery request signal before moving toward the anticipated get-off location.

The personal mobility vehicle server 8212 may transmit a signal to the personal mobility vehicle 20a to move from the anticipated get-off location 8530 to a final destination with a user being onboard the personal mobility vehicle 20a (S1585). In some implementations, the user transportation method may further include: transmitting, by the personal mobility vehicle server 8212, information on an anticipated get-on location of the share vehicle 10a to the personal mobility vehicle 20a; and transmitting, by the personal mobility vehicle server 8212, a signal to the personal mobility vehicle 20a to move toward the anticipated get-on location. For example, the personal mobility vehicle server 8212 may transmit a signal to the personal mobility vehicle 20a to move toward an anticipated get-on location with an item requested by an item delivery request signal. In this case, the personal mobility vehicle server 8212 may request the personal mobility vehicle 20a to move toward a location where to acquire the item requested by the item delivery request signal before moving toward the anticipated get-on location.

FIG. 84 is illustrates a flowchart of a user transportation system according to an implementation of the present disclosure. FIG. 84 is a flowchart of the user transportation system shown in FIG. 82B.

FIG. 85 is a diagram referred to for explaining how to use a share vehicle and a personal mobility vehicle depending on a route according to an implementation of the present disclosure.

Referring to FIGS. 84 and 85, the user terminal 390a may request a service of moving from the initial start location to the final destination 8540 with a share vehicle. A user transportation server 8214 may assign a share vehicle 10a to the user (S1601).

The user transportation server 8214 may determine whether the start location 8505 is a location allowed for the share vehicles 10a and 10b to enter (S1605).

If it is not determined that the start location 8505 is a location allowed for vehicles to enter, the user transportation server 8214 may check, via the user terminal 390a, whether to use the personal mobility vehicles 20a and 20b (S1610). If it is determined to use the personal mobility vehicles 20a and 20b, the user transportation server 8214 may call any personal mobility vehicle 20a out of the personal mobility vehicles 20a and 20b, and give a color code for identifying the called personal mobility vehicle 20a. The user transportation server 8214 may provide information on the color code for identification to the user terminal 390a (S1613).

The user transportation server 8214 may provide a signal to the personal mobility vehicle 20a to move to the initial start location 8505 (s1616).

The user transportation server 8214 may determine whether a user is inside a building (S1620). When it is determined that the user is inside a building, the user transportation server 8214 may keep the personal mobility vehicle 20a waiting until the user comes out of the building (S1623). When it is determined that the user is outside a building, the user transportation server 8214 may provide a signal to the personal mobility vehicle 20a to move to an anticipated get-on location 8520 with the user being onboard the personal mobility vehicle 20a.

The user transportation server 8214 may determine whether the final destination is a location allowed for the share vehicles 10a and 10b to enter (S1630).

When it is determined that the final destination is a location allowed for the share vehicles 10a and 10b to enter, the user transportation server 8214 may call any one share vehicle 10a out of the share vehicles 10a and 10b (S1633).

The user transportation server 8214 may provide a signal to the share vehicle 10a to move to the final destination 8540 with the user being onboard, who gets on the share vehicle 10a at the anticipated get-on location 8520 (S1635).

When it is determined in the step S1630 that the final destination is a location allowed for the share vehicles 10a and 10b to enter, the user transportation server 8214 may check, via the user terminal 390a, whether to use the personal mobility vehicles 20a and 20b (S1640).

When it is determined to use the personal mobility vehicles 20a and 20b, the user transportation server 8214 may share an anticipated arrival time with a station in the vicinity of the final destination 8540 (S1645). The station may keep the plurality of personal mobility vehicles 20a and 20b and charge batteries thereof.

The user transportation server 8214 may apply a color identification code to any one personal mobility vehicle 20a out of the personal mobility vehicles 20a and 20b (S1650).

The user transportation server 8214 may update a time of arrival at a get-off location (S1655).

The user transportation server 8214 may transmit a signal to the personal mobility vehicle 20a to move to an anticipated get-off location 8530 of the share vehicle 10a.

The user transportation server 8214 may determine whether the share vehicle 10a arrives at the anticipated get-off location 8530 (S1665). If the share vehicle 10a does not arrive, the user transportation server 8214 may transmit a signal to the personal mobility vehicle 20a to wait at the anticipated get-off location 8530 until the share vehicle 10a arrives (S1670).

When it is determined that the share vehicle 10a arrives at the anticipated get-off location 8530, the user transportation server 8214 may transmit a signal to the personal mobility vehicle 20a to move from the anticipated get-off location 8530 to the final destination 8540 with the user being onboard (S1675).

The user transportation server 8214 may sense another user call in the vicinity of the personal mobility vehicle 20a (S1680), and, if there is no another user call, the user transportation server 8214 may transmit a signal to the personal mobility vehicle 20a to return back to the station (S1690). If there is another user call, the personal transportation server 8214 may determine whether remaining battery power of the personal mobility vehicle 20a is sufficient (s1685). If it is determined that the remaining battery power of the personal mobility vehicle 20a is sufficient, the user transportation server 8214 may provide a signal to the personal mobility vehicle 20a to move to a called new destination 8540. If it is not determined that the remaining battery power of the personal mobility vehicle 20a is sufficient, the user transportation server 8214 may transmit a signal to the personal mobility vehicle 20a to return back to the station.

Figure 86:
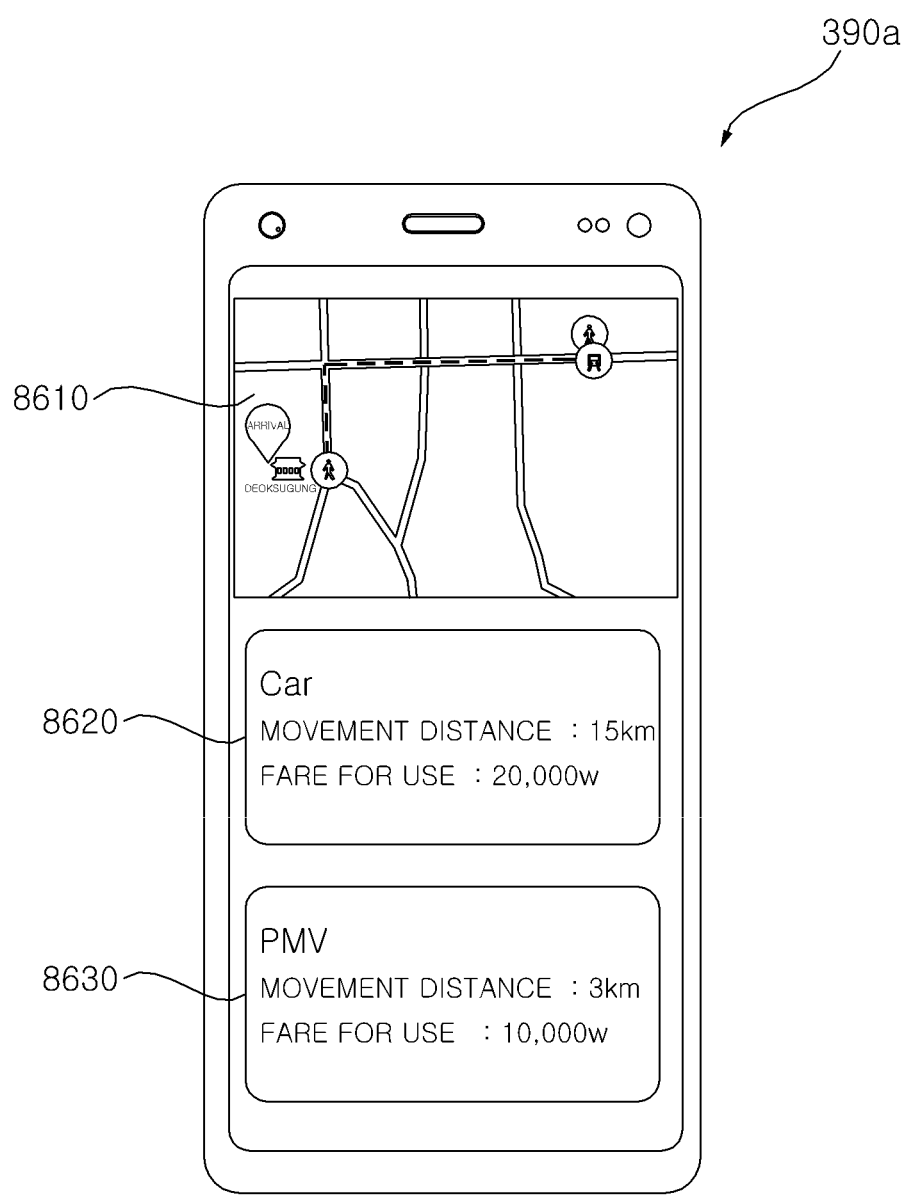
FIG. 86 is a diagram referred to for explaining information provided by a user's mobile terminal according to an implementation of the present disclosure.

FIG. 86 is a diagram referred to for explaining information provided by a user's mobile terminal according to an implementation of the present disclosure.

Referring to FIG. 86, at least one of a share vehicle server 8211, a personal mobility vehicle server 8212, or a user transportation server 8214 may transmit information on a user transportation service to a user terminal 390a. At least one of the share vehicle server 8211, the personal mobility vehicle server 8212, or the user transportation server 8214 may transmit route information, information on use of a share vehicle 20a, and information on movement of a personal mobility vehicle 20a. The user terminal 390a may display the information on the user transportation service. The user terminal 390a may display information 8610 on a route used by a user, by using the share vehicle 10a and the personal mobility vehicle 20a. The user terminal 390a may display information 8620 on a moving distance of the share vehicle 20a and the fare of the share vehicle 20a. The user terminal 390a may display information 8630 on the moving distance of the share vehicle 20a and the fare of the share vehicle 20a.

Figure 87:
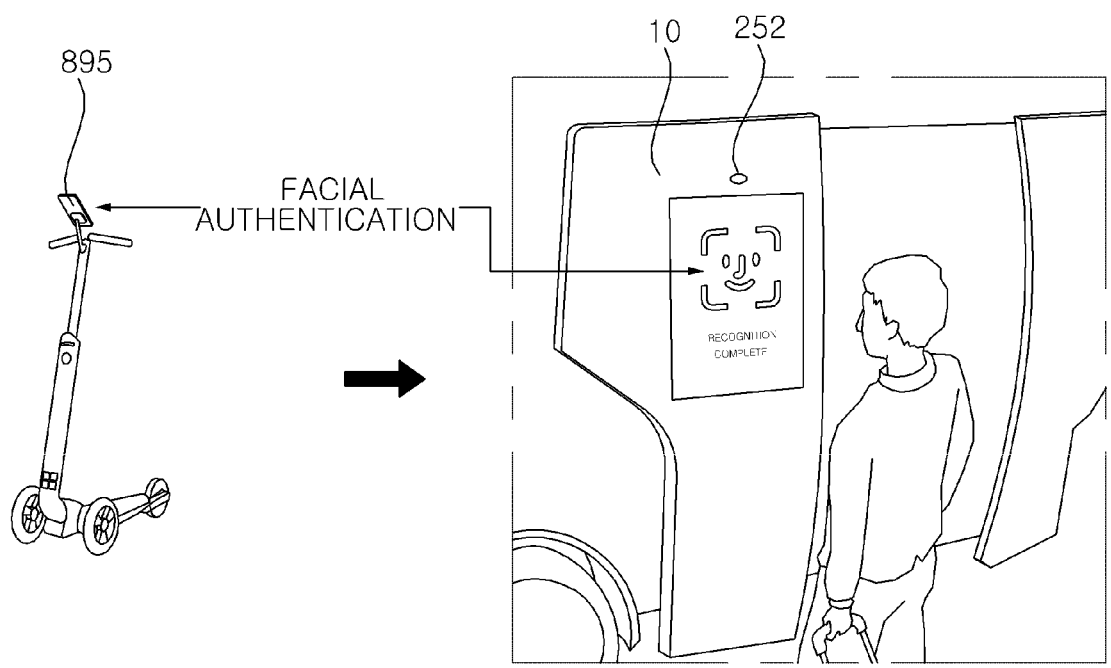
FIG. 87 is a diagram referred to explaining sharing information between a share vehicle system and personal mobility vehicle system according to an implementation of the present disclosure.

FIG. 87 is a diagram referred to explaining sharing information between a share vehicle system and personal mobility vehicle system according to an implementation of the present disclosure.

Referring to FIG. 87, an imaging device 8015 of a personal mobility vehicle 20 may acquire a user image. The personal mobility vehicle 20 may transmit the user image to a personal mobility vehicle server 8212. The personal mobility vehicle server 8212 (see FIG. 82A) may authorize a user based on the received user image. The personal mobility vehicle server 8212 may share authorization information with a share vehicle server 8211 and share vehicles 10a and 10b.

At least one of an internal camera 251 or an external camera 252 of the share vehicle 10 may acquire a user image. The share vehicle 10 may transmit the user image to the share vehicle server 8211 (see FIG. 82A). The share vehicle server 8211 may authorize the received user image. The share vehicle server 8211 may share authorization information with the personal mobility vehicle server 8212 and personal mobility vehicles 20a and 20b.

Figure 88:
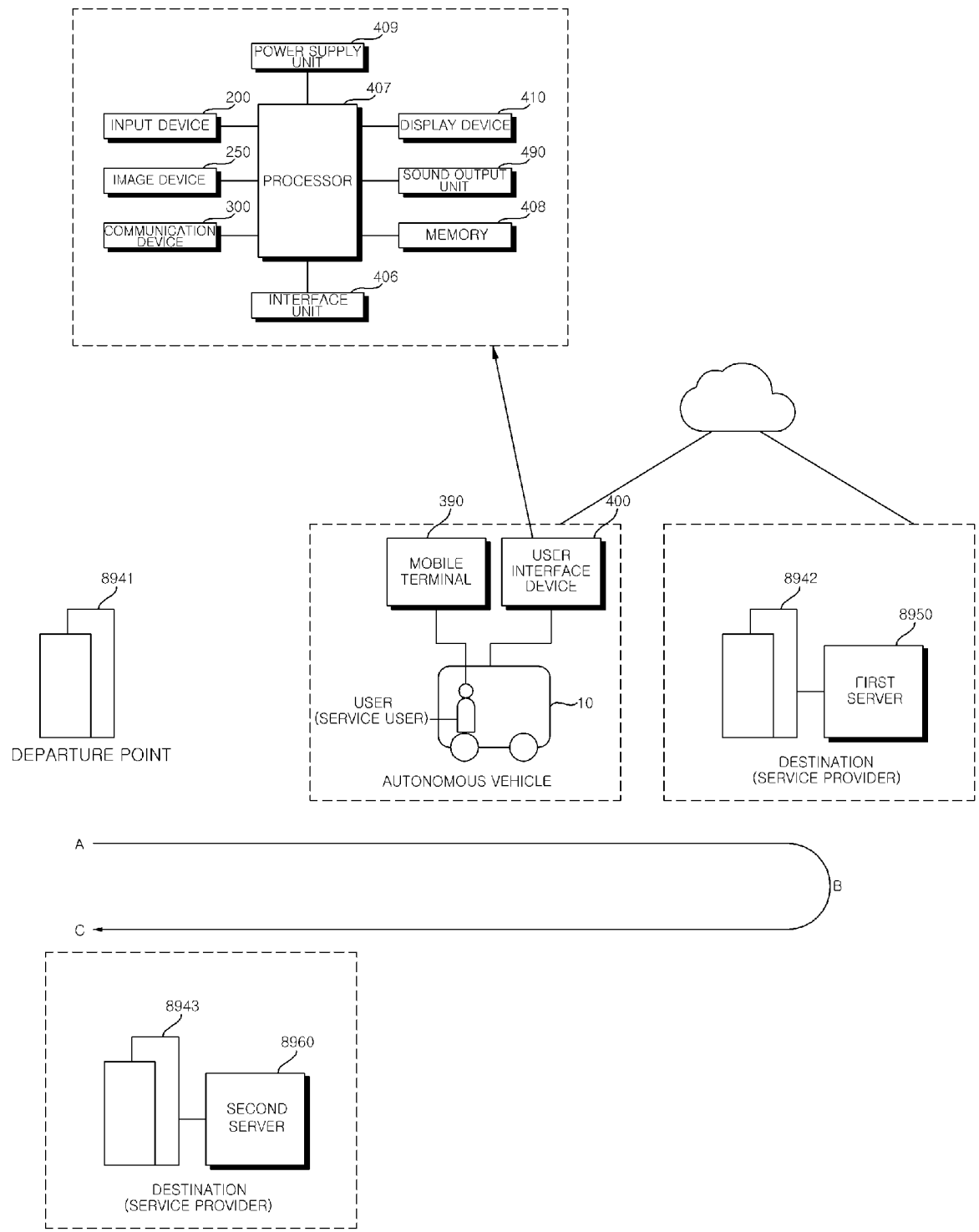
FIG. 88 is a diagram referred to for explaining a destination service information providing system according to an implementation of the present disclosure.

FIG. 88 is a diagram referred to for explaining a destination service information providing system according to an implementation of the present disclosure.

Referring to FIG. 88, the destination service information providing system may include a user terminal 390, a share vehicle server 8211 (see FIGS. 82A and 82B), a first server 8950, and a share vehicle 10.

The user terminal 390 may receive a user input. The user terminal 390 may receive a user input with a first location set as a destination. In response to the user input with the first location set as a destination, the user terminal 390 may transmit a signal to the share vehicle server 8211.

The share vehicle server 8211 may be referred to as an autonomous vehicle server. The autonomous vehicle server 8211 may set the first location, which is requested via the user terminal 390, as a destination. The autonomous vehicle server 8211 may transmit a signal to the autonomous vehicle 10 to move to the first location with a user being onboard the autonomous vehicle 10.

The first server 8950 may transmit, to at least one of the share vehicle server 8211 or the autonomous vehicle 10, first pre-information first post-information on a service provided at the first location. The first server 8950 may generate data for providing a service at the first location, by reflecting user data. The first server 8950 may acquire a user's feedback data respondent to the data for providing a service. The feedback data may be understood as a data that is generated while the user uses the service provided at the first location. For example, the feedback data may include at least one of the following: data which is generated while the user gets medical treatment; data which is generated when the user purchase an item; data which is generated while the user passes through an airport boarding gate; data which is generated while the user checks in to a hotel; data which is generated while the user orders food; data which is generated while the user enters at work; data which is generated while the user attends is confirmed; data which is generated when the user enters a gym or a movie theater, and data which is generated when the user uses a repair service at a repair center. The first server 8950 may generate the first post-information based on the feedback information.

The share vehicle 10 may be referred to as an autonomous vehicle. The autonomous vehicle 10 may receive pre-information from the first server 8950 based on a signal received from the autonomous vehicle server 8211, while moving toward the first location. The autonomous vehicle 10 may output the pre-information on at least one display 411, 412, or 413. The autonomous vehicle 10 may acquire a user input respondent to the pre-information. The autonomous vehicle 10 may transmit user input-based user data to the first server 8950. The autonomous vehicle 10 may generate cost charging data based on the user data. The autonomous vehicle 10 may transmit the cost charging data to the first server 8950. The first server 8950 may proceed to payment based on the received cost charging data.

In some implementations, the destination service information providing system may further include a second server 8960. The second server 8960 may provide second pre-information on a service provided at a second location. The autonomous vehicle may receive the second priori information while starting from the first location and then moving toward the second location. When a condition is satisfied, the autonomous vehicle 10 may switch the information displayed on at least one display 411, 412, or 413 from the first post-information to the second pre-information.

The autonomous vehicle 10 may include the display system 400 (see FIG. 55). The display system 400 may function as a vehicle user interface device that provides a function of interface between the autonomous vehicle 10 and a user. The display system 400 may be referred to as a vehicle user interface device.

The vehicle 10 may move from a start location 8941 to a first location 8942 with a user being onboard. The user may arrive at the first location 8942 and use a service provided at the first location 8942. Next, the vehicle 10 may move from the first location 8942 to a second location 8943. The user may arrives at the second location 8943 and use a service provided at the second location 8943.

As illustrated with reference to FIG. 55, the vehicle user interface device 400 may include an input device 200, an imaging device 250, a communication device 300, a display device 400, a sound output unit 490, an interface unit 406, a processor 407, a memory 408, and a power supply 409. The description about the display system 400 with reference to FIGS. 55 to 67 may apply to the vehicle user interface device 400. The vehicle user interface device 400 will be described mainly about a difference or characteristic compared to the display system 400 with reference to drawings from FIG. 88.

The input device 200 may convert a user input into an electrical signal.

The communication device 300 may wirelessly exchange signals with at least one server. For example, the communication device 300 may wirelessly exchanges signals with the first server 8950 and the second server 8960. The first serer 8950 may be defined as a server that is used to provide a service at the first location 8942. The second server 8960 may be defined as a server that is used to provide a service at the second location 8943. The first location 8942 and the second location 8943 may be at least one of a hospital, an item purchase place, an airport, a hotel, a restaurant, an office, a school, a gym, a theater, or a service center.

At least one display 411, 412, or 413 may output information. For example, at least one display 411, 412, or 413 may output at least one of pre-information or post-information on a service provided at the first location 8942. For example, at least one display 411, 412, or 413 may output at least one of pre-information or post-information on a service provided at the second location 8943. Pre-information may be defined as information that is provided to a user before the user arrives at the first location 8942 or the second location 8943. Alternatively, pre-information may be defined as information that is provided to a user before the user uses a service provided at the first location 8942 or the second location 8943. Based on the pre-information, the user may use a service provided at the first location 8942 or the second location 8943. Post-information may be defined as information that is provided to a user after the user leaves the first location 8942 or the second location 8943. Alternatively, post-information may be information that is provided to a user after the user uses a service provided at the first location 8942 or the second location 8943.

The interface unit 406 may exchange signals with at least one electronic device installed at the vehicle 10.

While the vehicle 10 moves toward the first location 8942, the processor 407 may receive, from the first server 8950, pre-information on a service provided at the first location 8942.

The processor 407 may output the pre-information on at least one display 411, 412, or 413.

The processor 407 may acquire a user input respondent to the pre-information. The processor 407 may acquire the user input via at least one of the input device or the communication device. For example, by receiving an electrical signal generated by the input device, the processor 407 may acquire a user input. By receiving an electrical signal, converted by a mobile terminal 390, via the communication device 300, the processor 407 may acquire a user input.

The processor 407 may transmit user input-based user data to the first server 8950 via the communication device 300.

The processor 407 may acquire a user's personal information via at least one of the input device 200 or the communication device 300, and transmit the acquired personal information to the first server 8950 via the communication device 300.

While the vehicle 10 moves from the first location 8942 to the second location 8943, the processor 407 may receive, from the first server 8950, post-information on a service provided at the first location 8942. The processor 407 may output the post-information on the display 411, 412, or 413. The post-information may be understood as information different from pre-information.

While the vehicle 10 moves from the first location 8942 to the second location 8943, the processor 407 may receive, from the second server 8960, pre-information on a service provided at the second location 8943. When a condition is satisfied, the processor 407 may control the display 411, 412, or 413 such that post-information on a service provided at the first location 8942, which is being displayed on the display 411, 412, or 413, switches to the pre-information on the service provided at the second location 8943.

In some implementations, the condition may be a first condition requiring that a distance from the first location 8942 to the vehicle is greater than a distance from the second location 8943 to the vehicle 10. The condition may be a second condition requiring reception of a user input for setting the second location 8943 as a destination. The condition may be a third condition requiring reception of a user input for terminating a screen about the first location 8942.

The processor 407 may acquire, from at least one electronic device installed in the vehicle 10, data relating to a user's intention of using a service provided at the first location 8942. When the data relating to the user's intention of using the service provided at the first location 8942 is acquired, the processor 407 may stop outputting pre-information. First data may be data that is generated by at least one of a seat position adjusting mechanism or an internal camera in response to a user's motion of reclining the seat backward.

Figure 89:
FIG. 89 illustrates a flowchart of a destination service information providing system according to an implementation of the present disclosure.

FIG. 89 illustrates a flowchart of a destination service information providing system according to an implementation of the present disclosure.

Referring to FIG. 9, the processor 407 may set a destination (S205). The processor 407 may set a destination based on a user input received via the input device 200. By receiving a user input, received by the mobile terminal 390, via the communication device 300, the processor 407 may set a destination. In some implementations, the destination may be understood as the first location 8942.

The processor 407 may acquire user information (S210). The processor 407 may acquire user information based on a user input received via the input device 200. The processor 407 may acquire user information from the mobile terminal 3990. The user information may include profile information, authorization information, biometric information, body information, or service usage history information of a user.

The processor 407 may request destination service information (S220). For example, when it is determined that a distance between the vehicle 10 and the destination is equal to or smaller than a reference value, the processor 407 may request the destination service information. For example, when it is determined that an anticipated arrival time at the destination is equal to or smaller than a reference value, the processor 407 may request the destination service information.

When a request is received from the vehicle user interface device 400, the first server 8950 may provide pre-information on a service to the vehicle user interface device 400 (s225).

The processor 407 may display the pre-information of the service on the display 411, 412, or 413 (S230). For example, the processor 407 may stop a content, which a user is now viewing, and instead display the pre-information on the service. For example, the processor 407 may display a content, which a user is viewing, on a first region of the display 411, 412, or 413 and display the pre-information on the service on a second region of the display 411, 412, o4 413.

The processor 407 may receive a user input based on the pre-information (S235).

The processor 407 may transmit user data based on the user input to the first server 8950 (S240).

The vehicle 10 may arrive at the destination, and the first server 890 may provide the service. The first server 8950 may proceed to payment for the service (S245). In some implementations, the payment system 700 of the cabin system 100 may generate, in advance, cost charging data for the service provided through the first server 8950 based on user input data. The first server 8950 may proceed to payment based on the cost charging data.

The first server 8950 may provide post-information on the service to the vehicle user interface device 400 (S250).

The processor 407 may receive the post-information on the service via the communication device 300, and display the post-information on the service (S255).

FIGS. 90A and 90B illustrates examples of service information provided depending on a destination according to an implementation of the present disclosure.

Referring to FIG. 90A, a first location 8942 or a second location 8943 may be a hospital. Depending on a situation, a hospital may be the first location 8942 or the second location 8943. Pre-information on a service provided at the first location 8942 or the second location 8943 may include hospital reception status, waiting number information, or doctor-in-charge information. User data may include at least one of patient medical data for reception, data on previous medication, questionnaire data, body temperature data, heart rate data, or blood pressure data. Post-information on a service provided at the first location 8942 or the second location 8943 may include at least one of information on posterior-medication, information whether a medicinal item is received, disease-related information, nutrition intake guidance information, or reservation guidance information.

In some implementations, the cabin system 100 may further include a health care sensor. The health care sensor may generate information on at least one of a user's body temperature, heat beat, or blood pressure. The processor 407 may transmit the information on at least one of the user's body temperature, heat beat, or blood pressure to the first server 8950.

The first location 8942 or the second location 8943 may be an item purchase place, such as a department store, a mart, a grocery store. Depending on a situation, the item purchase place may be the first location 8942 or the second location 8943. Pre-information on a service provided at the first location 8942 or the second location 8943 may include at least one of new item information, popular item information, or discount information. User data may include at least one of a user's body data, SNS data, information on an item of interest, or membership history data. Post-information on a service provided at the first location 8941 or the second location 8942 may include at least one of purchased item-related information or delivery service information.

The first location 8942 or the second location 8943 may be an airport. Depending on a situation, the airport may be the first location 8942 or the second location 8943. Pre-information on a service provided at the first location 8942 or the second location 8943 may include at least one of terminal information, airline information, delay information, airport information, or pre-check in information. User data may include at least one of booked flight ticket data, passport data, user biometric authorization data, or baggage data. Post-information on a service provided at the first location 8941 or the second location 8942 may include at least one of customer satisfaction survey information or information on jet lag solutions.

The first location 8942 or the second location 8943 may be a hotel. Depending on a situation, the hotel may be the first location 8942 or the second location 8943. Pre-information on a service provided at the first location 8942 or the second location 8943 may include at least one of pre-check in information, available room information, concierge service information, tour information, linking service, or information on services for types of stay. User data may include at least one of membership history data, passport data, user biometric authorization data, user state data, baggage data, preferred environment data, or co-occupant data. Post-information on a service provided at the first location 8941 or the second location 8942 may include at least one of customer satisfaction survey information or membership update information.

The first location 8942 or the second location 8943 may be a restaurant, such as a drive-through café or a fine restaurant. Depending on a situation, the restaurant may be the first location 8942 or the second location 8943. Pre-information on a service provided at the first location 8942 or the second location 8943 may include at least one of menu information, preparation progress information, vehicle entrance congestion information, or anticipated waiting time information. User data may include at least one of selected menu data, route information, data on a franchise store anticipated to visit, or payment data. Post-information on a service provided at the first location 8941 or the second location 8942 may include customer satisfaction survey information.

Referring to FIG. 90B, the first location 8942 or the second location 8943 may be an office. Depending on a situation, the office may be the first location 8942 or the second location 8943. Pre-information on a service provided at the first location 8942 or the second location 8943 may include at least one of schedule information, company-related new information, or company mail system access information. User data may include at least one of entry authority data or biometric authorization data. Post-information on a service provided at the first location 8941 or the second location 8942 may include next-day schedule information.

The first location 8942 or the second location 8943 may be a school. Depending on a situation, the school may be the first location 8942 or the second location 8943. Pre-information on a service provided at the first location 8942 or the second location 8943 may include at least one of prerequisite study information, class timetable information, school supplies information, parent note information, notification information, or extracurricular activity information. User data may include identification data. Post-information on a service provided at the first location 8941 or the second location 8942 may include at least one of parent note information, notification information, study summary information, extra-curricular information, or supplemental class information.

The first location 8942 or the second location 8943 may be a gym. Depending on a situation, the gym may be the first location 8942 or the second location 8943. Pre-information on a service provided at the first location 8942 or the second location 8943 may include at least one of information on types of available workouts, trainer information, or information on workouts recommended for each body type. User data may include at least one of body data, data on a workout of interest or SNS data. Post-information on a service provided at the first location 8941 or the second location 8942 may include at least one of eating habit-related information or supplemental workout information.

The first location 8942 or the second location 8943 may be a theater, such as a movie theater or a stage theater. Depending on a situation, the theater may be the first location 8942 or the second location 8943. Pre-information on a service provided at the first location 8942 or the second location 8943 may include at least one of information a snack menu available in the theater, theater location information, theater-related advertisement information, or recommended performance list information. The performance list information may include, for example, information about a performance of a movie, performance of a play, music performance, and musical performance. User data may include at least one of reservation data, data on a performance of interest, information on a history of viewed performances, or co-occupant data. Post-information on a service provided at the first location 8941 or the second location 8942 may include at least one of anticipated performance information, reservation information, or performance rating information.

The first location 8942 or the second location 8943 may be a service center. Depending on a situation, the service center may be the first location 8942 or the second location 8943. Pre-information on a service provided at the first location 8942 or the second location 8943 may include at least one of repair engineer information, or information on quick fixes for types of symptom types. User data may include at least one of customer data, data on an item requested to repair, or symptom data. Post-information on a service provided at the first location 8941 or the second location 8942 may include at least one of customer satisfaction survey information or revisit reservation information.

Figure 91A:
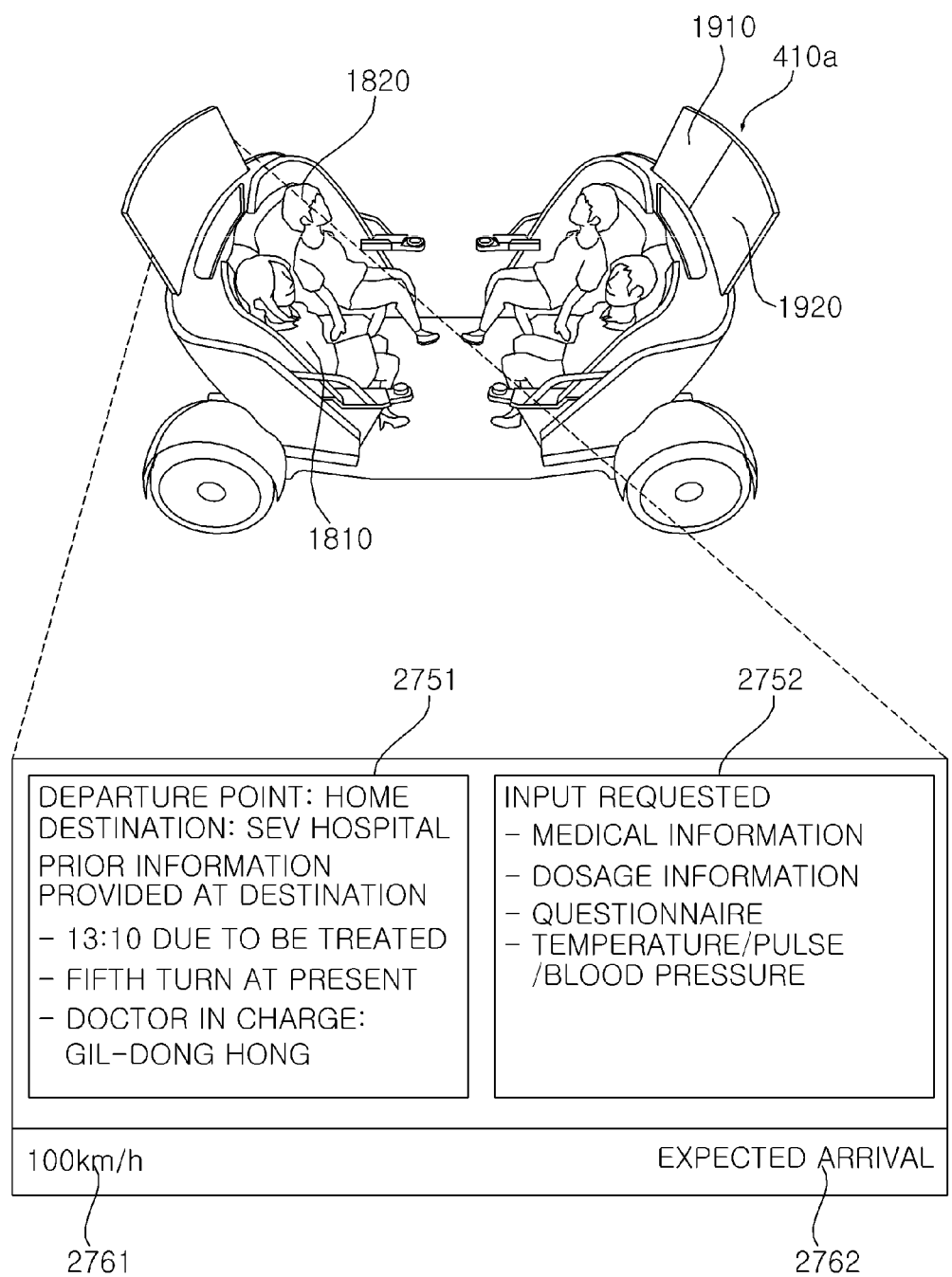
FIGS. 91A to 91C illustrate examples of information provided by a vehicle user interface device according to an implementation of the present disclosure.
Figure 91B:
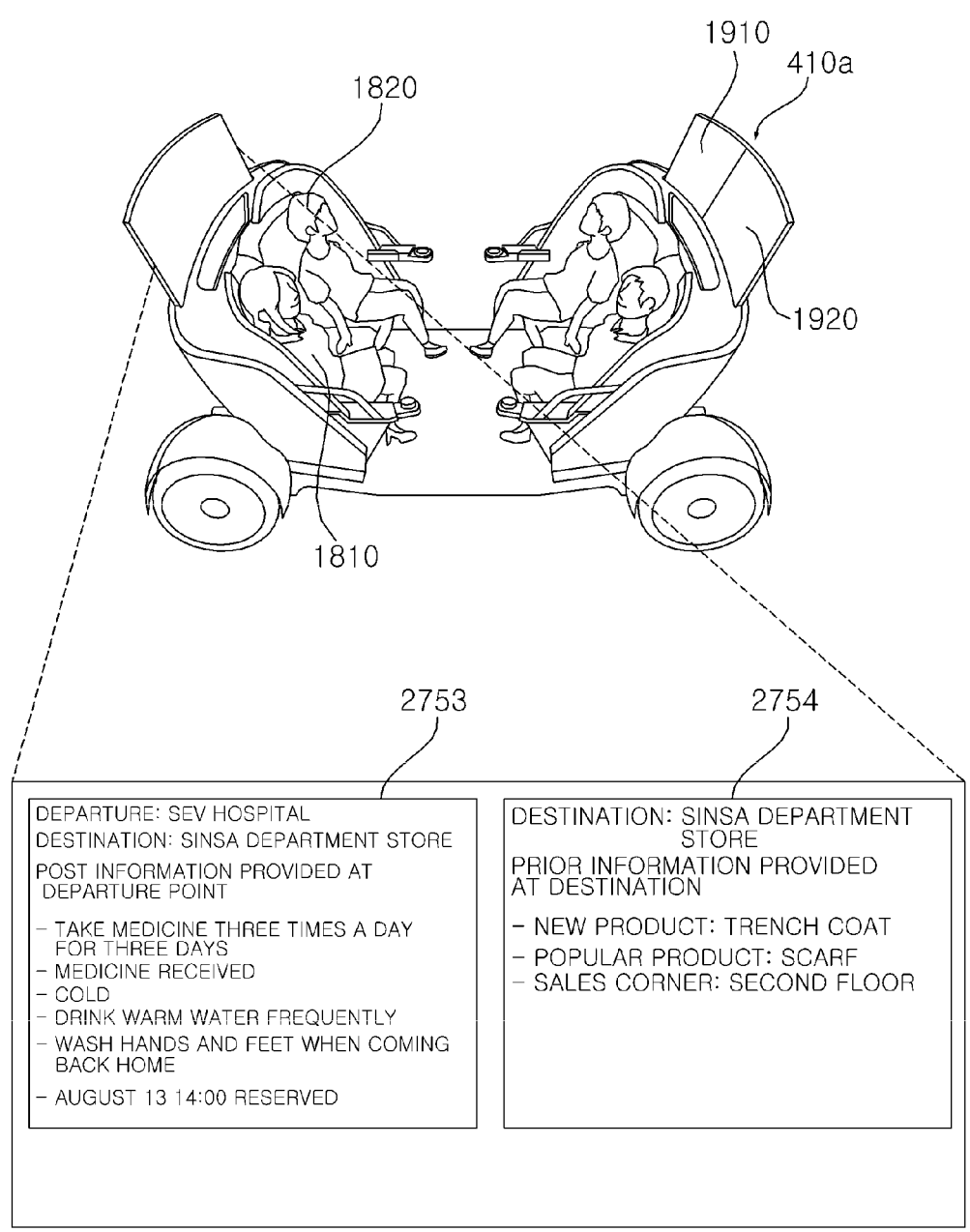
Figure 91C:
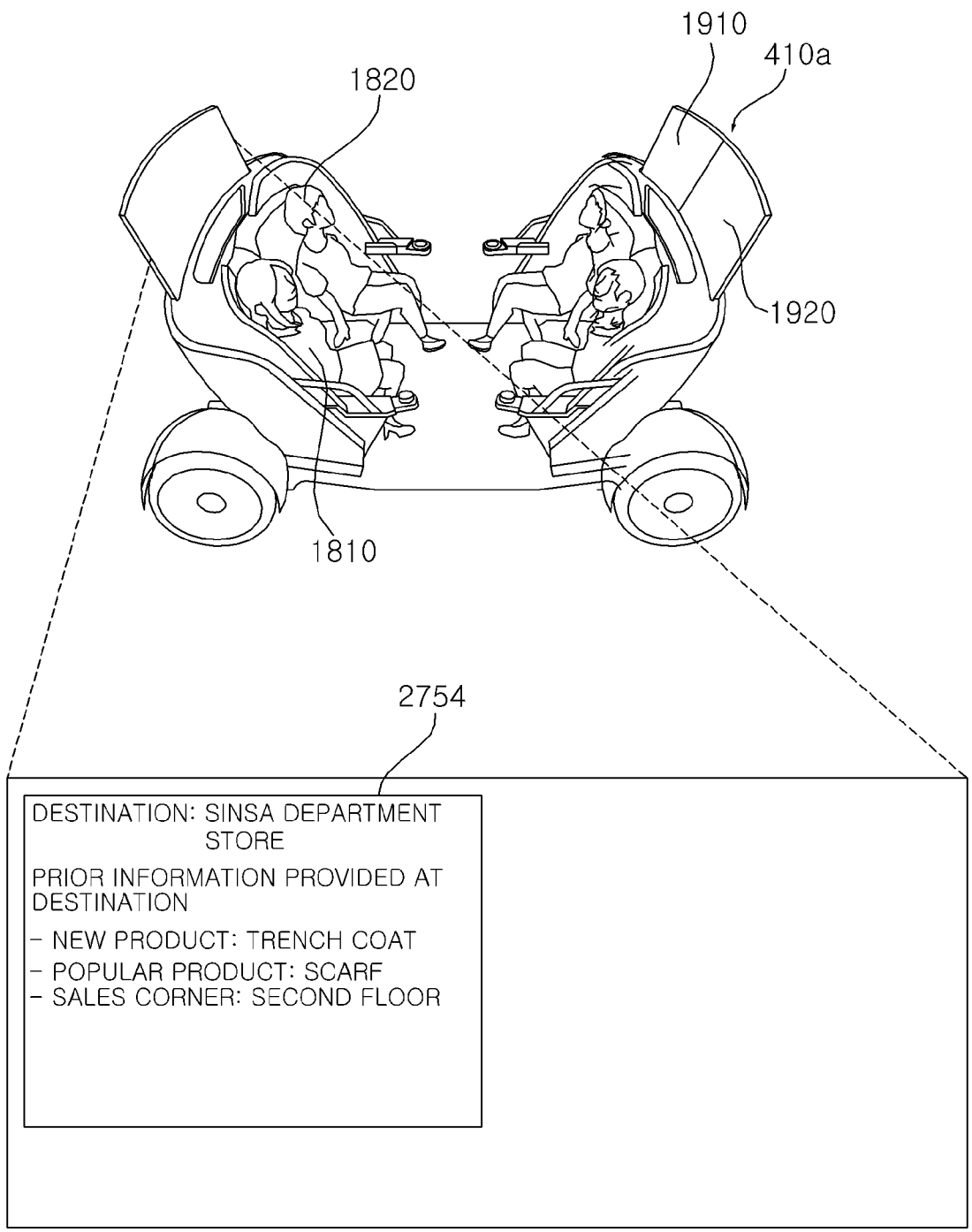

FIGS. 91A to 91C illustrate examples of information provided by a vehicle user interface device according to an implementation of the present disclosure.

As illustrated in FIG. 91A, while the vehicle 10 moves from a start location to the first location 8942, the processor 407 may display, on the display 411, 412, or 413, pre-information 2751 on a service provided from the first server 8950. The pre-information 2751 is the same as described above with reference to FIGS. 90A and 90B. In response to the pre-information 2751, the processor 407 may request 2752 a user input. The processor may receive a user input via the input device 200, and generate user data based on the user input. The user data is the same as described above with reference to FIGS. 90A and 90B.

In some implementations, the processor 407 may display, on one region of the display 411, 412, or 413, information 2761 on a driving speed of the vehicle 10. The processor 407 may display, on one region of the display 411, 412, or 413, information 2762 on an anticipated time of arrival at the first location 8942.

In some implementations, the processor 407 may provide a signal to at least one electronic device (e.g., an ECU) installed in the vehicle 10 to adjust the driving speed, so that the vehicle 10 arrives at the first location at a reserved time for a service of the first location 8942.

As illustrated in FIG. 91B, while the vehicle 10 moves from a start location to the second location 8943, the processor 407 may display post-information 2753 on a service provided from the first server 8950 on the display 411, 412, or 413. The post-information 2753 is the same as described above with reference to FIGS. 90A and 90B. The processor 407 may display, on the display 411, 412, or 413, pre-information 2754 provided from the second server 8960. The pre-information 2754 is the same as described above with reference to FIGS. 90A and 90B.

In some implementations, the processor 407 may display both the post-information 2753 provided from the first server 8950 and the pre-information 2754 provided from the second server 8960 on the display 411, 412, or 413.

As illustrated in FIG. 91C, depending on a predetermined condition, the processor 407 may switch displaying the post-information 2753 on the display 411, 412, or 413, to displaying the pre-information provided.

In some implementations, the present disclosure may be implemented in a recording medium in the form of a code readable by a processor provided in the electronic apparatus. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). Furthermore, the recording medium readable by a processor may be distributed over computer systems connected over a network, and the code readable by a processor may be stored and executed in a distributed manner.

What is claimed is:

1. An electronic device configured to charge an occupant in a vehicle, the electronic device comprising:
    an interface unit including at least one of a communication module, a terminal, a pin, a cable, a port and a circuit and configured to exchange signals with at least one internal camera configured to capture at least one image of an inside of a cabin of the vehicle;

at least one processor; and at least one computer memory that is operably connectable to the at least one processor and that has stored thereon instructions which, when executed, cause the at least one processor to perform operations comprising:

receiving, through the interface unit, image data that was generated based on processing the at least one image of the inside of the cabin captured by the at least one internal camera;

determining whether a user purchases an item in a cargo box in the vehicle based on a motion of the user detected from the received image data; and generating cost charging data based on the motion of the user.

2. The electronic device of claim 1, wherein the operations further comprise:

specifying the user to be charged, based on the image data.

3. The electronic device of claim 2, wherein the at least one image comprises (i) at least one first image that was captured by the at least one internal camera before the user is onboard the vehicle, and (ii) at least one second image that was captured by the at least one internal camera after the user is onboard the vehicle, wherein receiving the image data comprises receiving, through the interface unit, (i) first image data that was generated based on processing the at least one first image, and (ii) second image data that was generated based on processing the at least one second image, and wherein the operations further comprise:

processing, by the at least one processor, the first image data and the second image data to compare the first image data with the second image data.

4. The electronic device of claim 2, wherein the operations further comprise:

determining whether the motion of the user detected from the image data corresponds to at least one of (i) a contamination cause motion, (ii) a breaking motion, or (iii) a theft motion.

5. The electronic device of claim 4, wherein the operations further comprise:

determining that the motion of the user detected from the image data corresponds to (i) the contamination cause motion;

receiving, via the interface unit, vehicle movement data regarding a movement of the vehicle; and based on a determination that the contamination cause motion of the user is related to the movement of the vehicle: determining not to generate the cost charging data or to generate the cost charging data at a discounted cost.

6. The electronic device of claim 4, wherein the operations further comprise:

determining that the motion of the user detected from the image data corresponds to (i) the contamination cause motion; and determining not to generate cost charging data or to generate cost charging data at a discounted cost, based on a determination that the contamination cause motion of the user is related to an item that was purchased in the cabin of the vehicle.

7. The electronic device of claim 1, wherein the interface unit is further configured to (i) exchange signals with a plurality of internal cameras of the vehicle and (ii) receive a signal from a seat system based on a detection of the user sitting in the vehicle, and wherein the operations further comprise:

based on receiving, from the seat system, the signal indicative of the detection of the user sitting in the vehicle: receiving the image data that was generated based on processing at least one image captured by at least one of the plurality of internal cameras that are associated with a seat of the vehicle in which the user is sitting.

8. The electronic device of claim 1, wherein the interface unit is further configured to (i) exchange signals with a single internal camera of the vehicle and (ii) receive a signal from a seat system based on a detection of the user sitting in the vehicle, and wherein the operations further comprise:

based on receiving, from the seat system, the signal indicative of the detection of the user sitting in the vehicle: perform processing to distinguish a region that corresponds to a seat of the vehicle in which the user is sitting, based on the image data that was generated based on processing at least one image captured by the single internal camera.

9. The electronic device of claim 1, wherein the interface unit is configured to exchange signals with at least one external camera that is configured to capture an image of an outside of the vehicle, and wherein the operations further comprise:

generating body profile data of the user based on at least one of (i) first image data that was generated based on processing at least one first image captured by the at least one internal camera, or (ii) second image data that was generated based on processing at least one second image captured by the at least one external camera; and tracking the motion of the user based on the body profile data of the user.

10. The electronic device of claim 1, wherein the operations further comprise:

specifying a direction of a hand of the user reaching out to the item in the cargo box in the vehicle, based on the received image data; and based on the direction of the hand of the user, specifying the user to be charged.

11. The electronic device of claim 10, wherein determining whether the user purchases the item in the cargo box, based on the motion of the user detected from the received image data, comprises: determining that the user purchases the item based on a detection, in the received image data, of (i) an item selecting motion of the user and (ii) an item opening motion of the user, and wherein generating the cost charging data comprises: based on a determination that the user purchases the item, generating the cost charging data including price information of the purchased item.

12. The electronic device of claim 11, wherein the operations further comprise:

based on detecting, in the received image data, a change in lighting related to a particular storage area of the cargo box, determining that the specified user has selected the item provided in the particular storage area.

13. The electronic device of claim 11, wherein the operations further comprise:

based on detecting the item selecting motion of the user, providing a first signal to at least one other electronic device provided in the vehicle via the interface unit to output item selection information; and based on detecting the item opening motion of the user, providing a second signal to the at least one other electronic device via the interface unit to output item purchase information.

14. The electronic device of claim 10, wherein the operations further comprise:
based on detecting, in the received image data, the motion of the user (i) selecting the item and (ii) putting the item back into the cargo box: determining that a purchase of the item is cancelled.

15. The electronic device of claim 1, wherein the interface unit is further configured to exchange signals with a communication device, and
wherein the operations further comprise:
storing the received image data based on which the cost charging data is generated; and
based on transmitting the cost charging data to a mobile terminal of the user via the interface unit and the communication device, transmitting the stored image data to the mobile terminal.

16. The electronic device of claim 1, wherein generating the cost charging data is further based on at least one of (i) a vehicle travel operation or (ii) a service providing operation that is provided to the user.

17. The electronic device of claim 1, wherein the interface unit is further configured to exchange signals with a communication device, and
wherein the operations further comprise transmitting the cost charging data to a payment server.

18. The electronic device of claim 17, wherein the interface unit is further configured to exchange signals with at least one external camera that is configured to capture an image of an outside of the vehicle, and
wherein transmitting the cost charging data to the payment server comprises:
transmitting the cost charging data to the payment server based on detecting an exit motion of the user from the vehicle, wherein detecting the exit motion of the user is based on at least one of (i) first image data that was generated based on processing at least one first image captured by the at least one internal camera, or (ii) second image data that was generated based on processing at least one second image captured by the at least one external camera.

19. An operation method of an electronic device provided in a vehicle, the method comprising:
acquiring, by at least one processor, image data that was generated based on processing at least one image captured by at least one internal camera provided in a cabin of the vehicle;
monitoring, by the at least one processor, a motion of a user detected in the acquired image data;
determining, by the at least one processor, whether a user purchases an item in a cargo box in the vehicle based on the motion of the user;
generating, by the at least one processor, cost charging data based on the motion of the user; and
transmitting, by the at least one processor and through an interface unit, a signal comprising the cost charging data.

* * * * *